US012112498B2

(12) United States Patent
Lankalapalli et al.

(10) Patent No.: US 12,112,498 B2
(45) Date of Patent: Oct. 8, 2024

(54) PHOTOSENSOR PROCESSING FOR IMPROVED LINE SCANNER PERFORMANCE

(71) Applicant: FARO Technologies, Inc., Lake Mary, FL (US)

(72) Inventors: Kishore Lankalapalli, Sanford, FL (US); Michael Shen, Lake Mary, FL (US); Paul C. Atwell, Lake Mary, FL (US); Keith G. Macfarlane, Lake Mary, FL (US); Jacint R. Barba, Lake Mary, FL (US); Nitesh Dhasmana, Lake Mary, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 18/388,808

(22) Filed: Nov. 10, 2023

(65) Prior Publication Data

US 2024/0095944 A1    Mar. 21, 2024

Related U.S. Application Data

(63) Continuation of application No. 17/073,923, filed on Oct. 19, 2020, now Pat. No. 11,854,219.

(60) Provisional application No. 63/031,974, filed on May 29, 2020, provisional application No. 62/978,000, filed on Feb. 18, 2020, provisional application No. 62/924,444, filed on Oct. 22, 2019.

(51) Int. Cl.
*G06T 7/70*     (2017.01)
*G01B 11/25*    (2006.01)
*G06T 7/00*     (2017.01)
*H04N 23/667*   (2023.01)

(52) U.S. Cl.
CPC ............ *G06T 7/70* (2017.01); *G01B 11/2518* (2013.01); *G06T 7/97* (2017.01); *H04N 23/667* (2023.01)

(58) Field of Classification Search
CPC .. G06T 7/70; G06T 7/97; G06T 7/521; G01B 11/2518; G01B 11/005; G01B 5/008; H04N 23/667
USPC .......................................................... 382/103
See application file for complete search history.

(56) References Cited

U.S. PATENT DOCUMENTS

| | | |
|---|---|---|
| 8,028,432 B2 | 10/2011 | Bailey et al. |
| 10,404,967 B2 | 9/2019 | Willomitzer |
| 2012/0026510 A1 | 2/2012 | Crampton et al. |
| 2015/0330761 A1 | 11/2015 | Gong |
| 2015/0330762 A1 | 11/2015 | Gong |
| 2015/0330763 A1 | 11/2015 | Gong |

(Continued)

OTHER PUBLICATIONS

U.S. Appl. No. 17/073,923, filed Oct. 19, 2020, 2021-0118167, Allowed.

(Continued)

*Primary Examiner* — Stephen P Coleman
(74) *Attorney, Agent, or Firm* — McCarter & English, LLP; Dave S. Christensen

(57) ABSTRACT

A method includes providing a measuring device having a projector, a camera with a photosensitive array, and at least one processor, projecting with the projector a line of light onto an object, capturing with the camera an image of the projected line of light on the object within a window subregion of the photosensitive array, and calculating with the at least one processor three-dimensional (3D) coordinates of points on the object based at least in part on the projected line of light and on the captured image.

20 Claims, 89 Drawing Sheets

(56) References Cited

U.S. PATENT DOCUMENTS

| | | |
|---|---|---|
| 2015/0330764 A1 | 11/2015 | Gong |
| 2015/0330765 A1 | 11/2015 | Gong |
| 2015/0330766 A1 | 11/2015 | Gong |
| 2015/0355310 A1 | 12/2015 | Gong et al. |
| 2018/0364034 A1 | 12/2018 | Reiter |
| 2019/0317470 A1 | 10/2019 | Lankalapalli et al. |
| 2021/0118167 A1 | 4/2021 | Lankalapalli et al. |

OTHER PUBLICATIONS

Aptina, Leveraging Dynamic Response Pixel Technology to Optimize Inter-scene Dynamic Range. An Aptina™ Technology White Paper. aptina.com. 7 pages, (2010).

European Office Action for Application No. 20201922.0, dated Mar. 4, 2021, 15 pages.

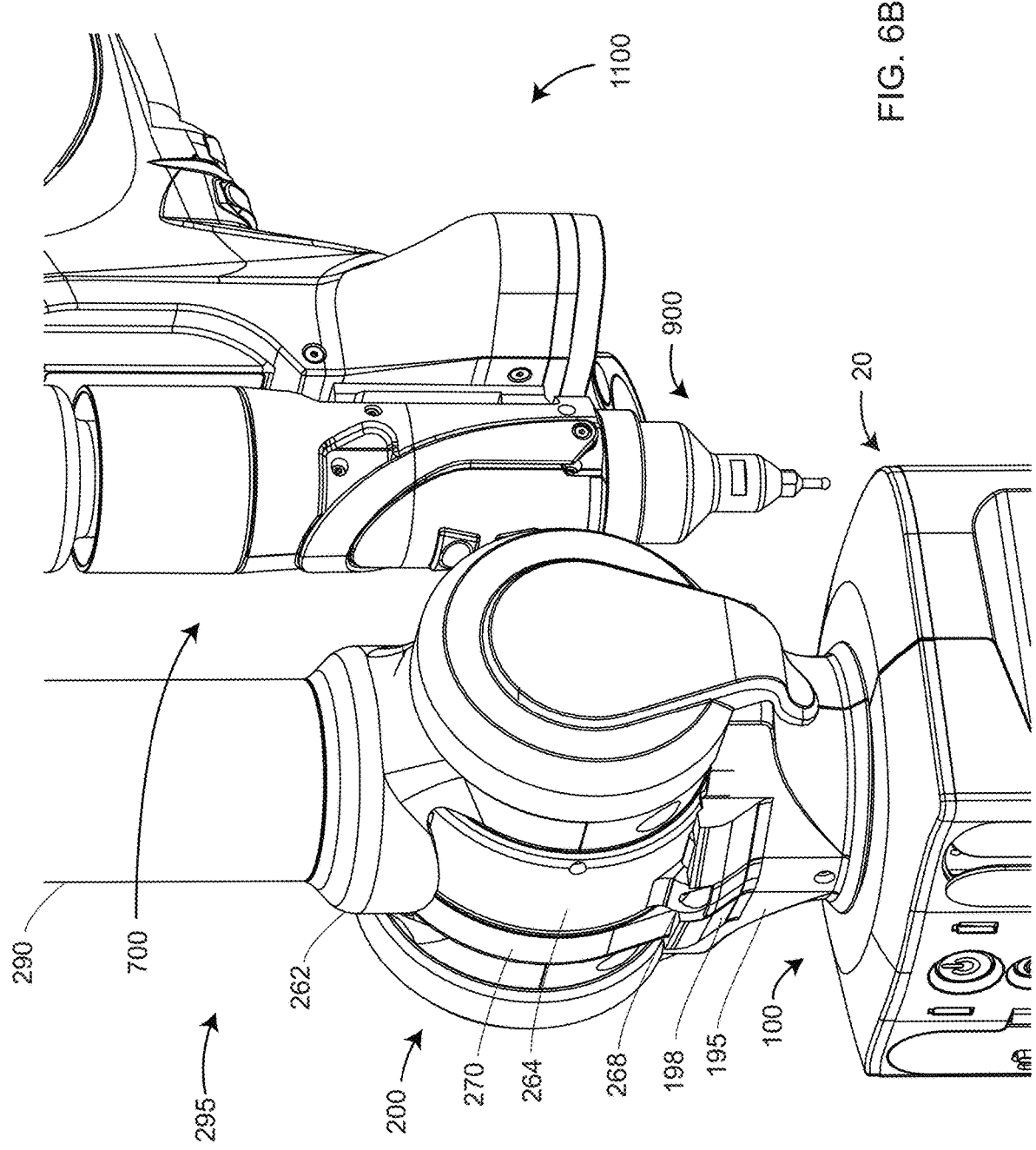

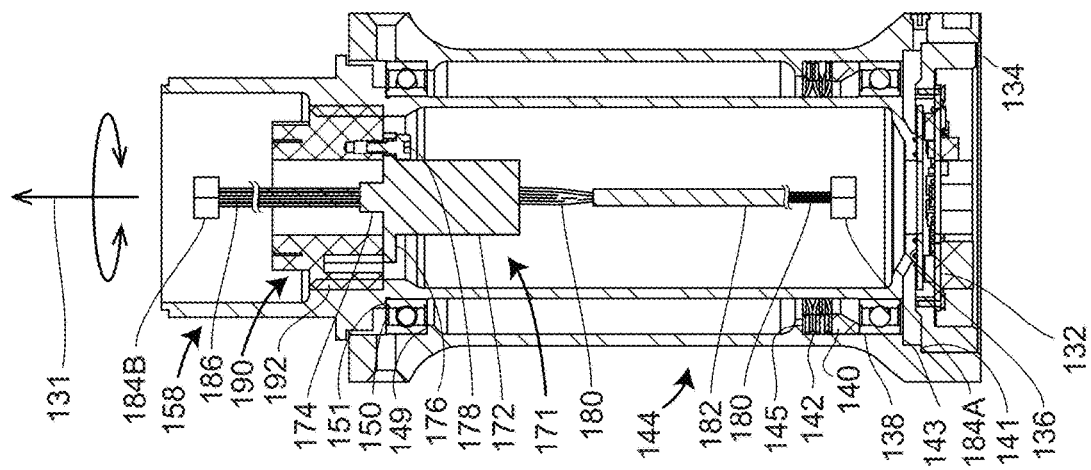
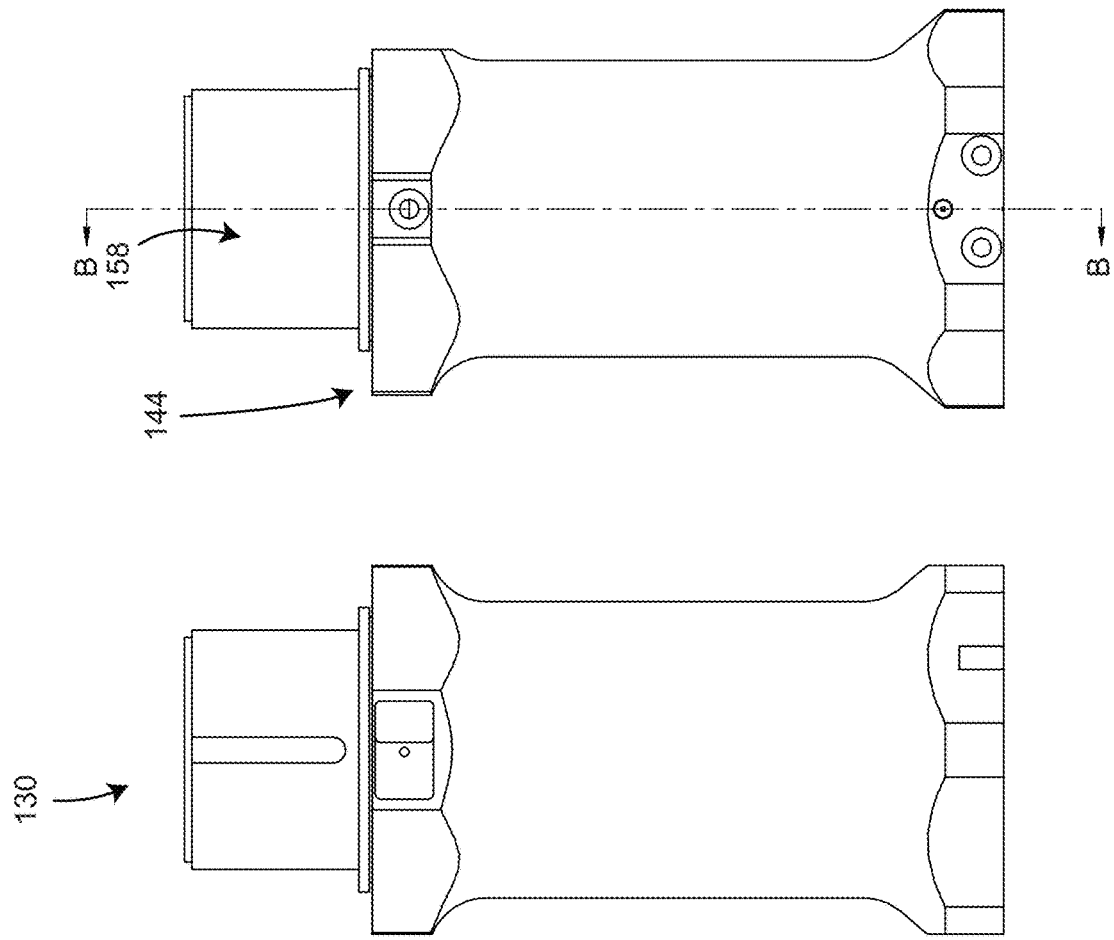

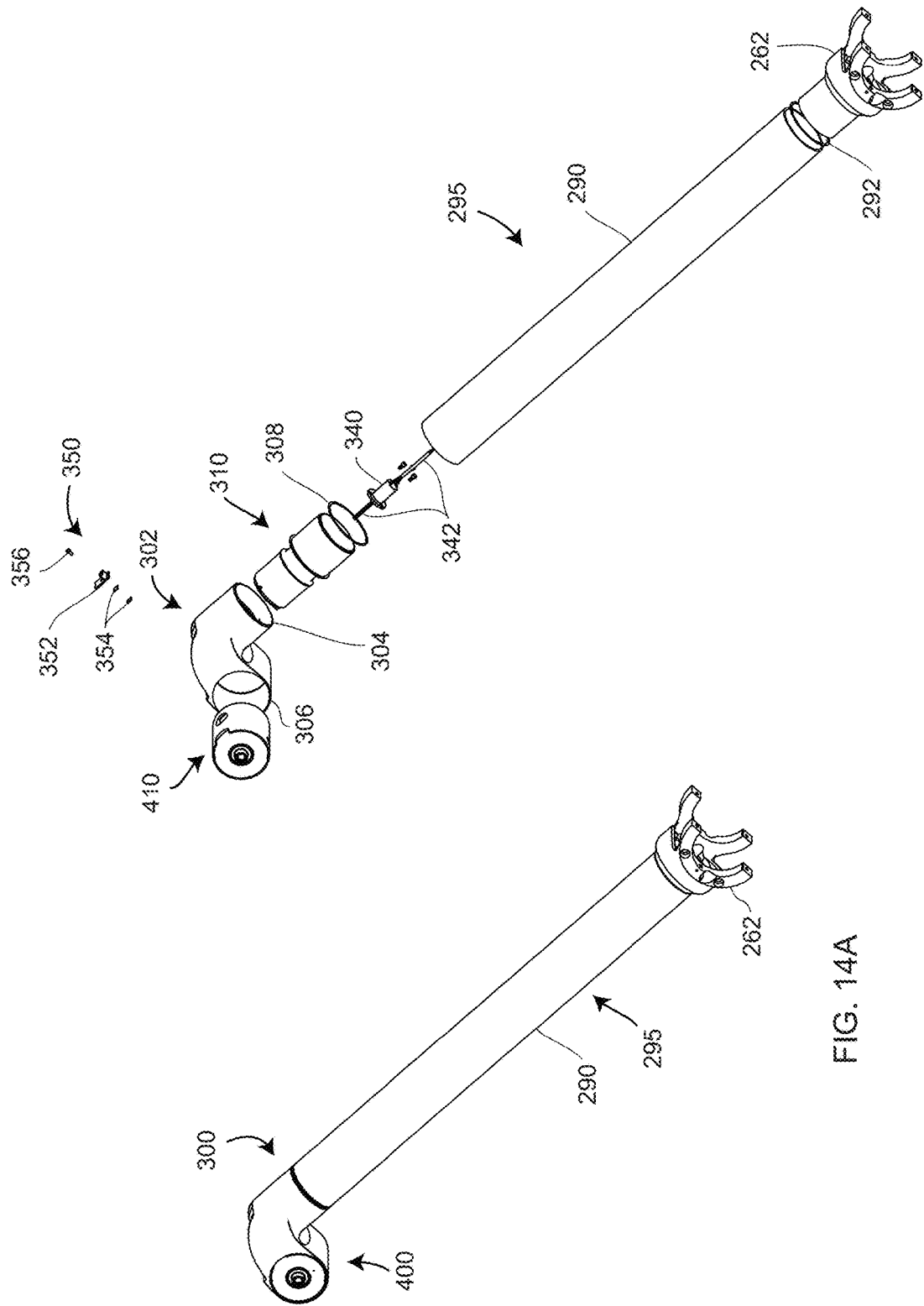

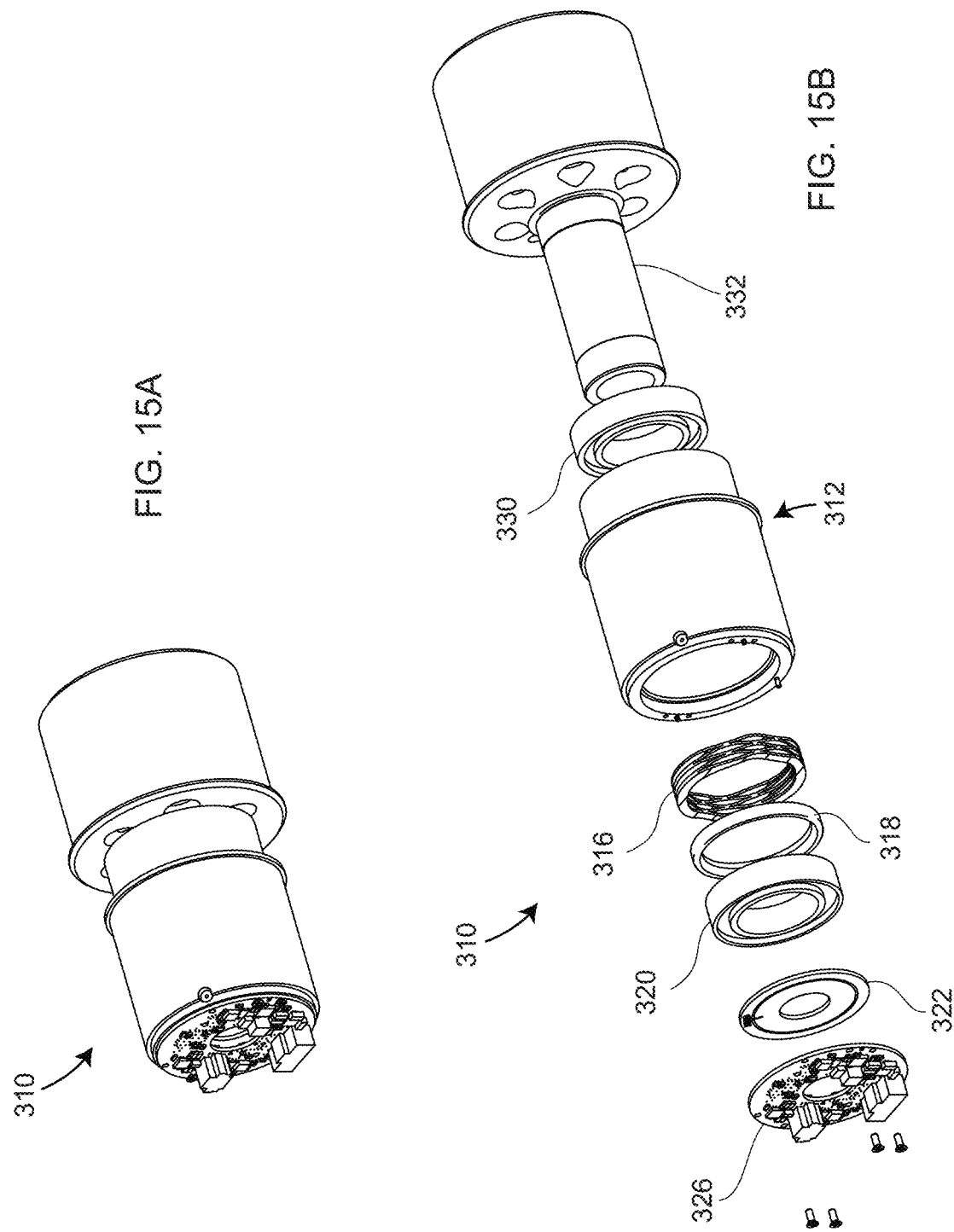

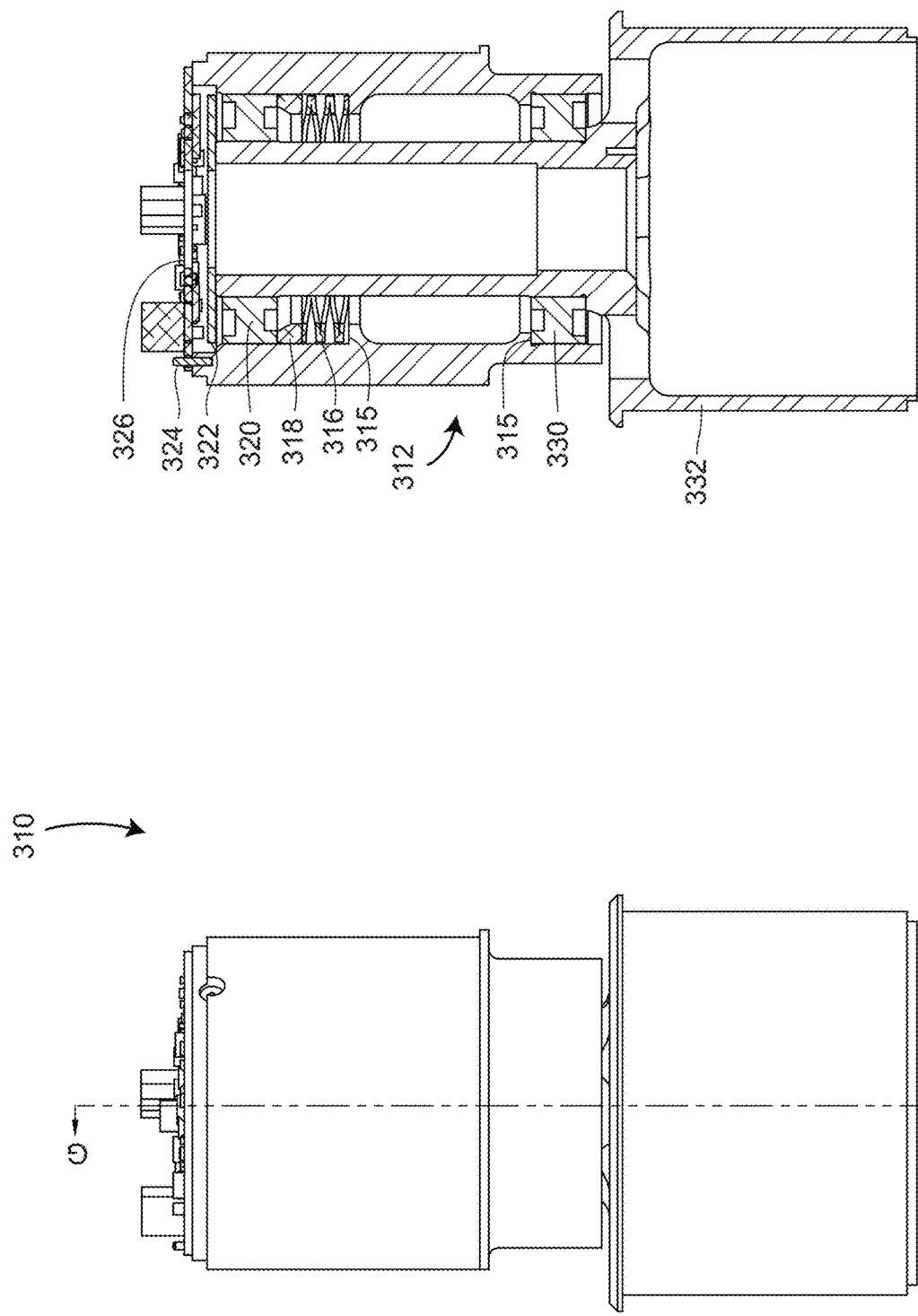

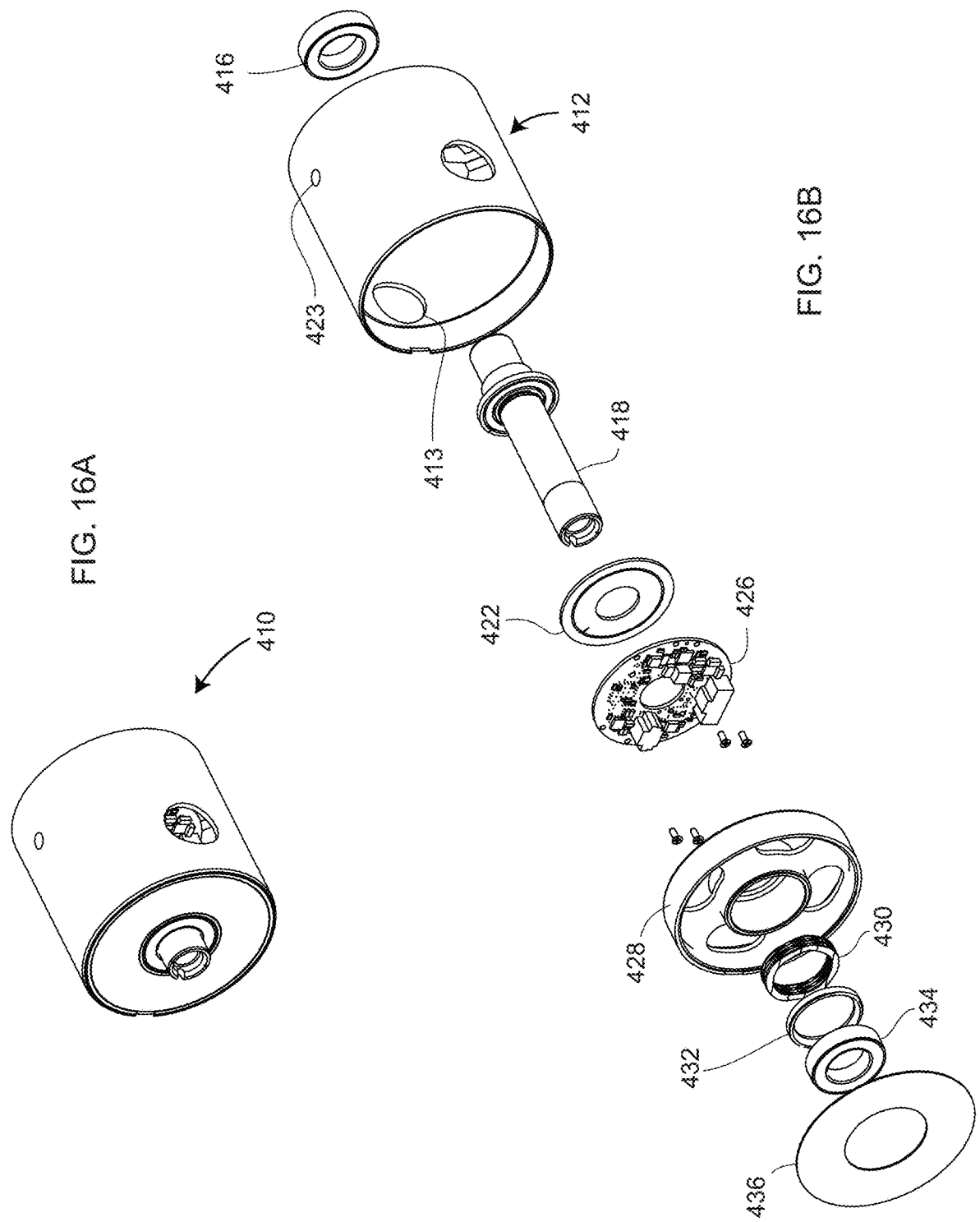

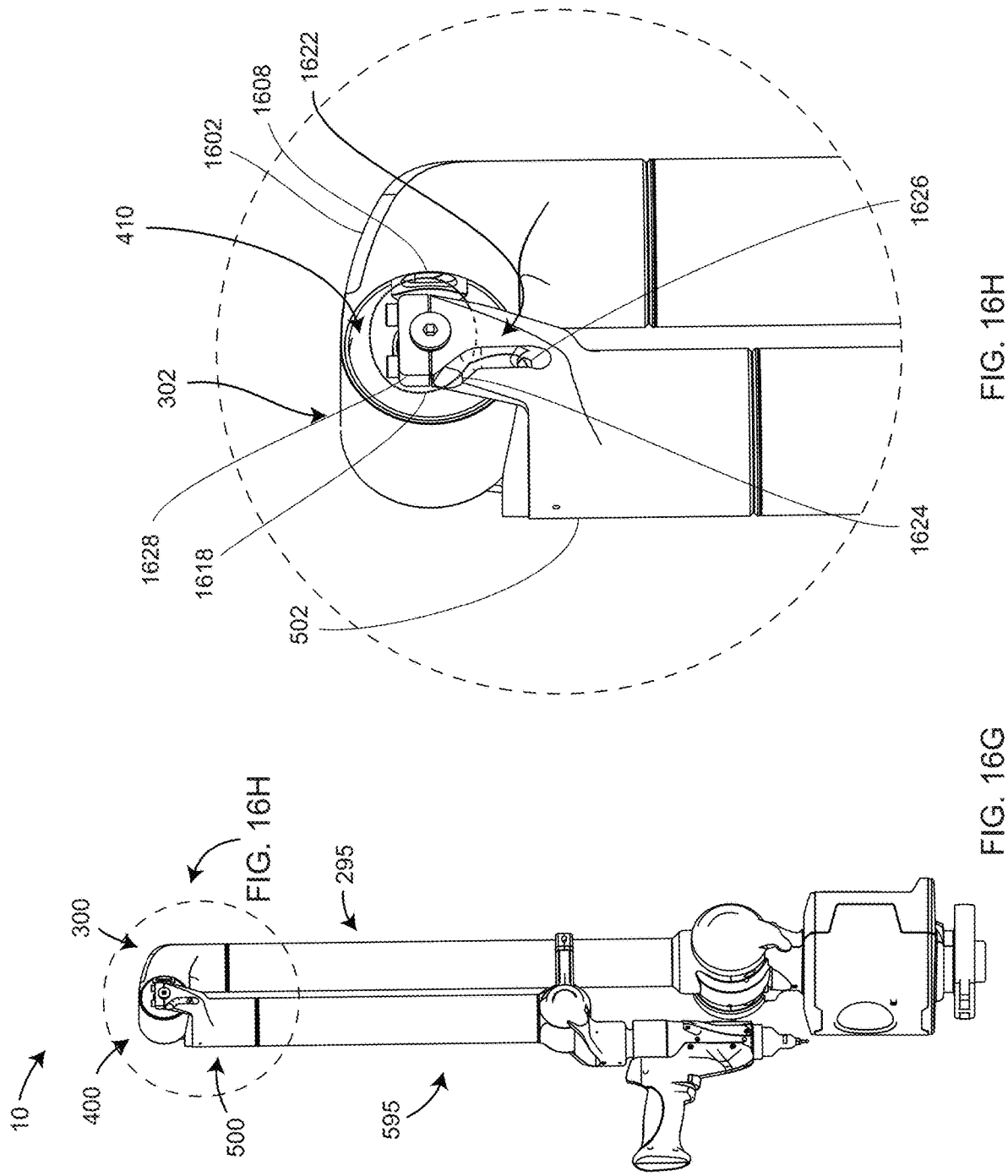

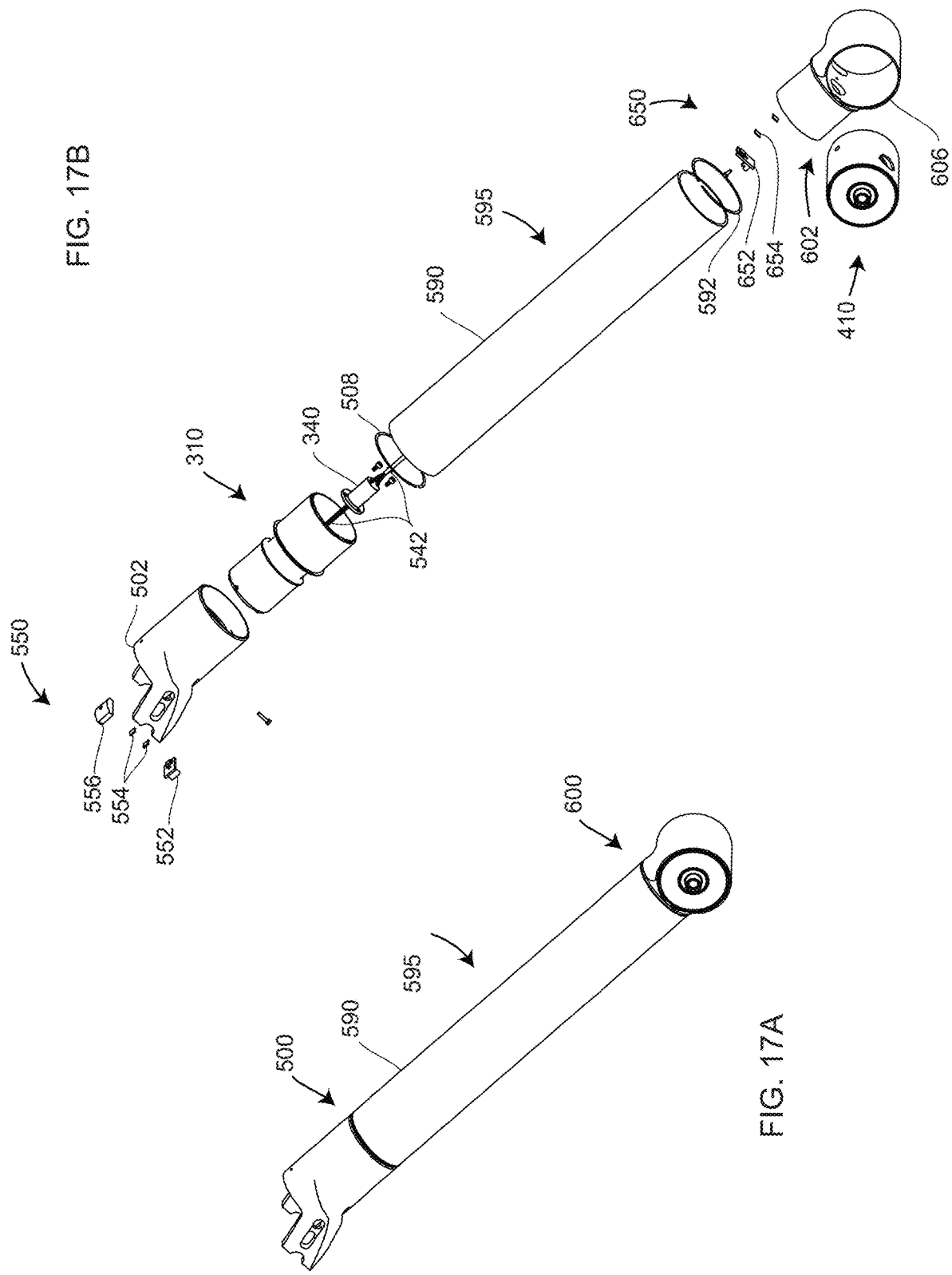

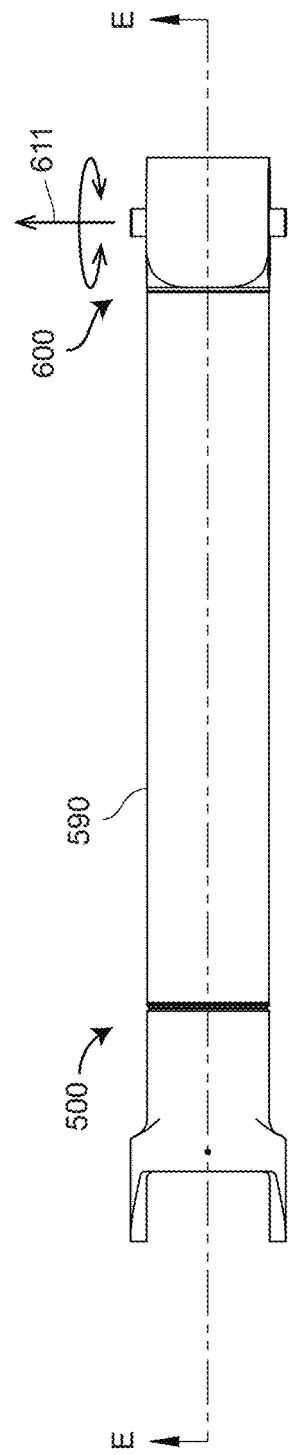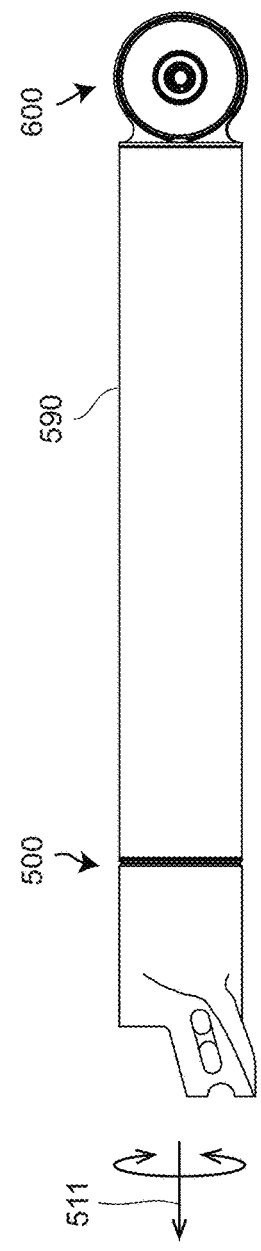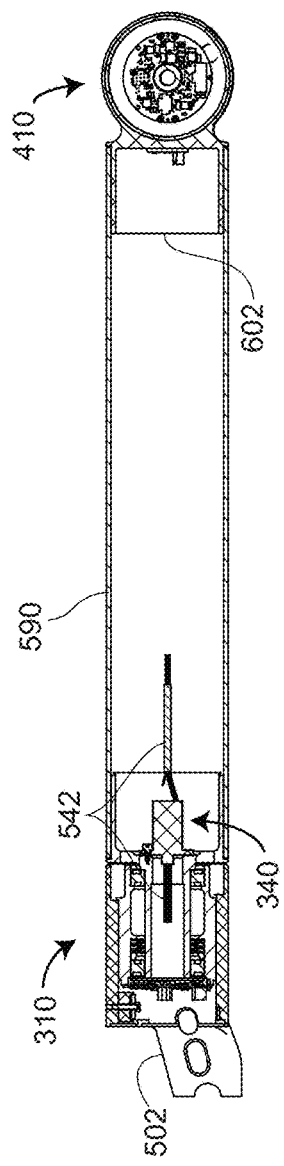

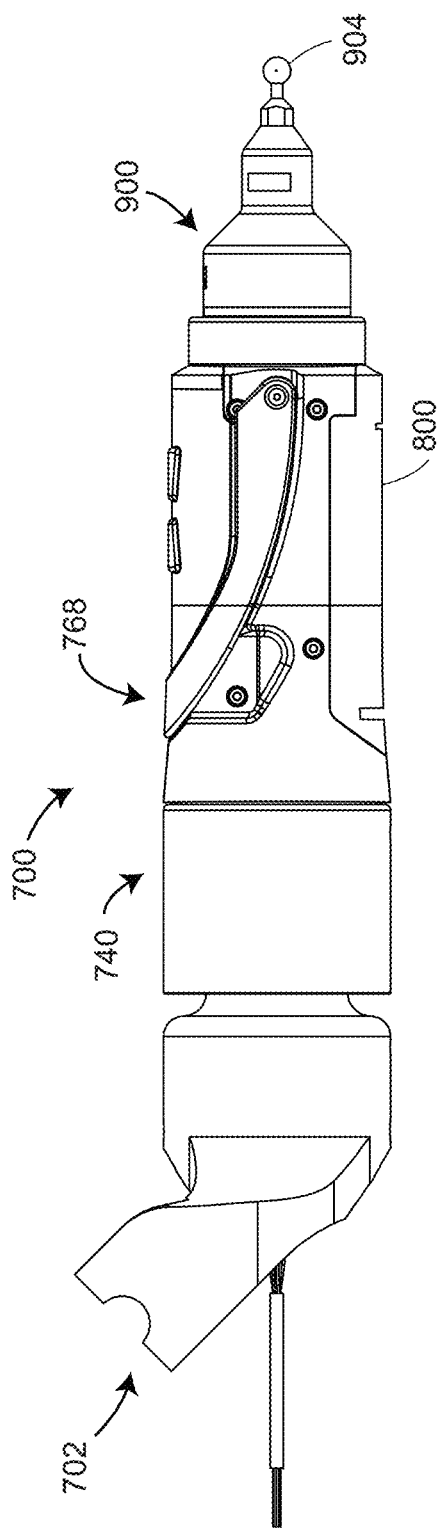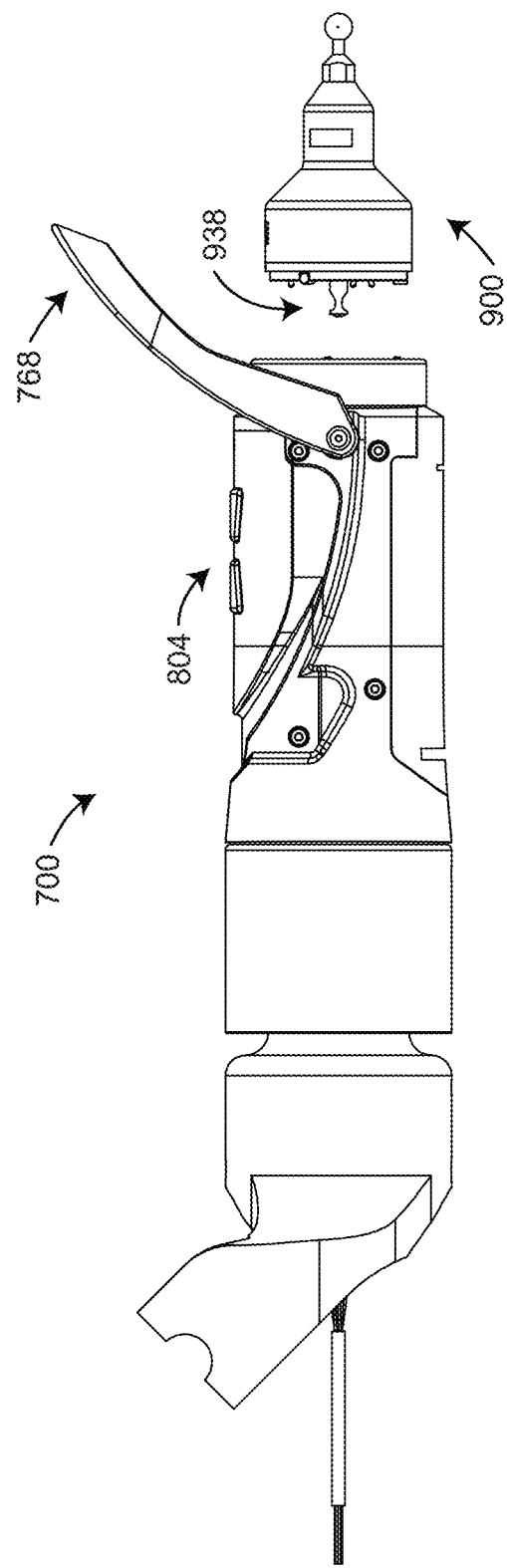

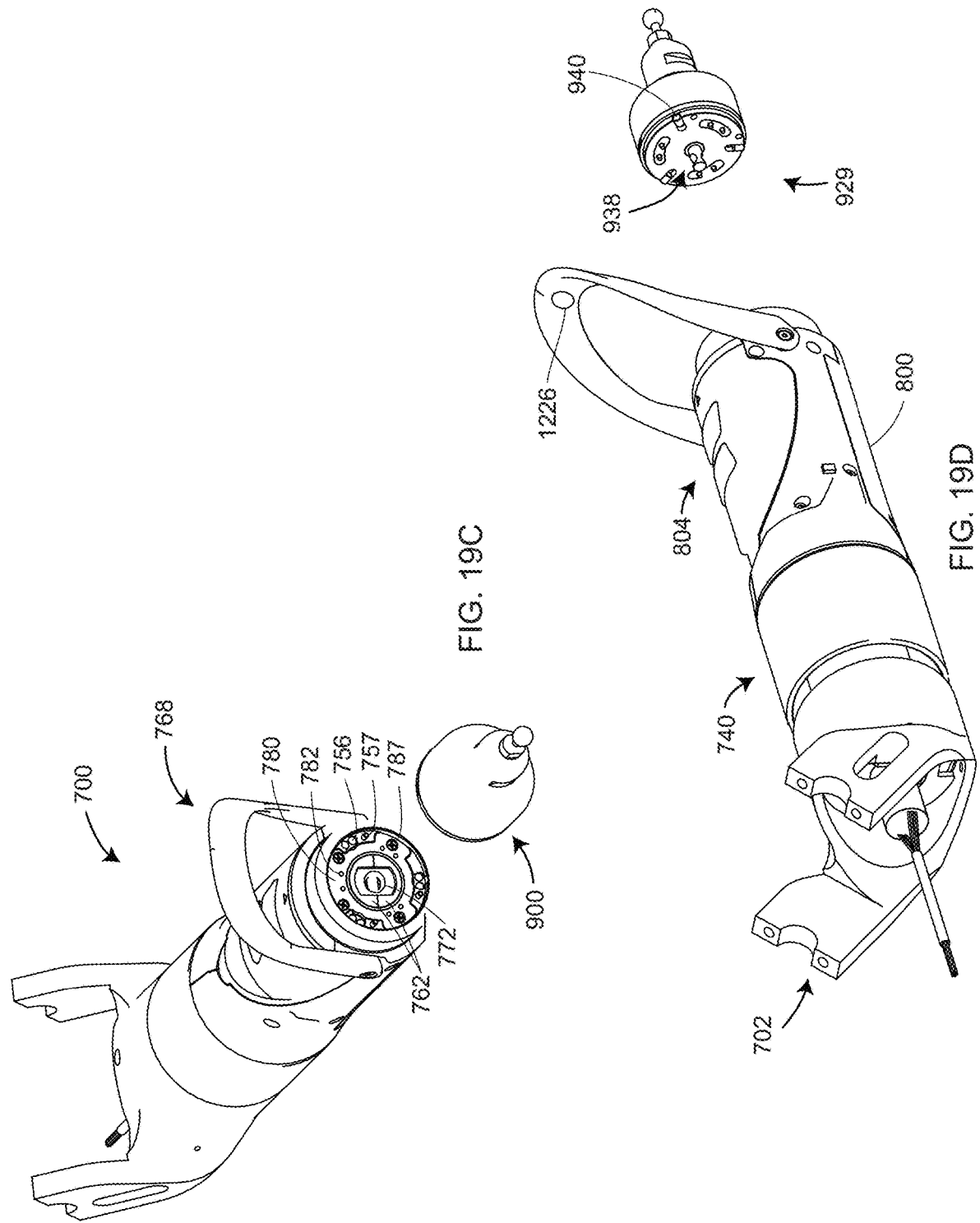

SECTION G-G

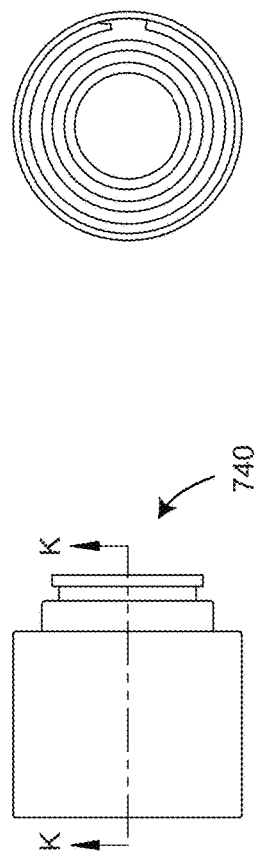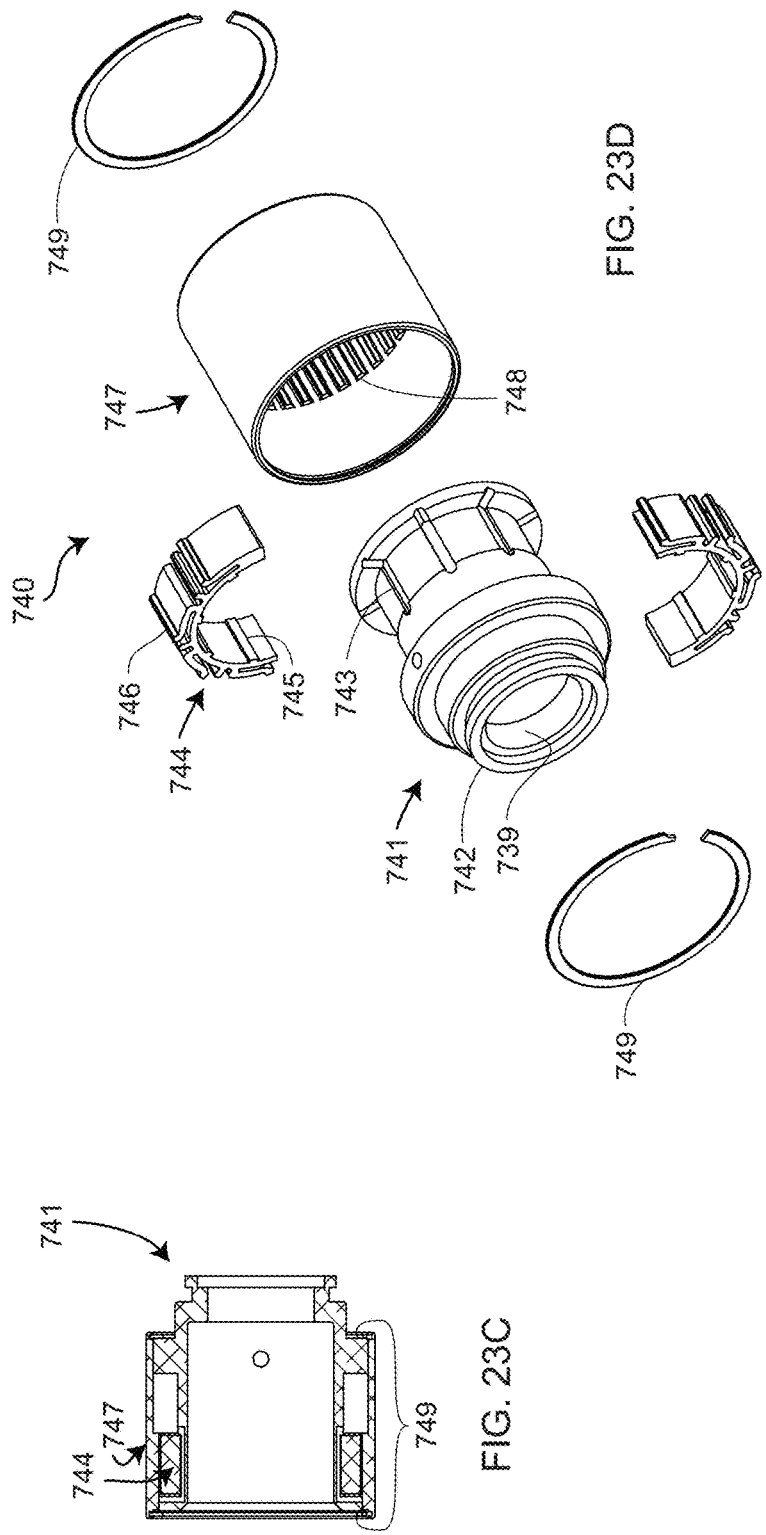

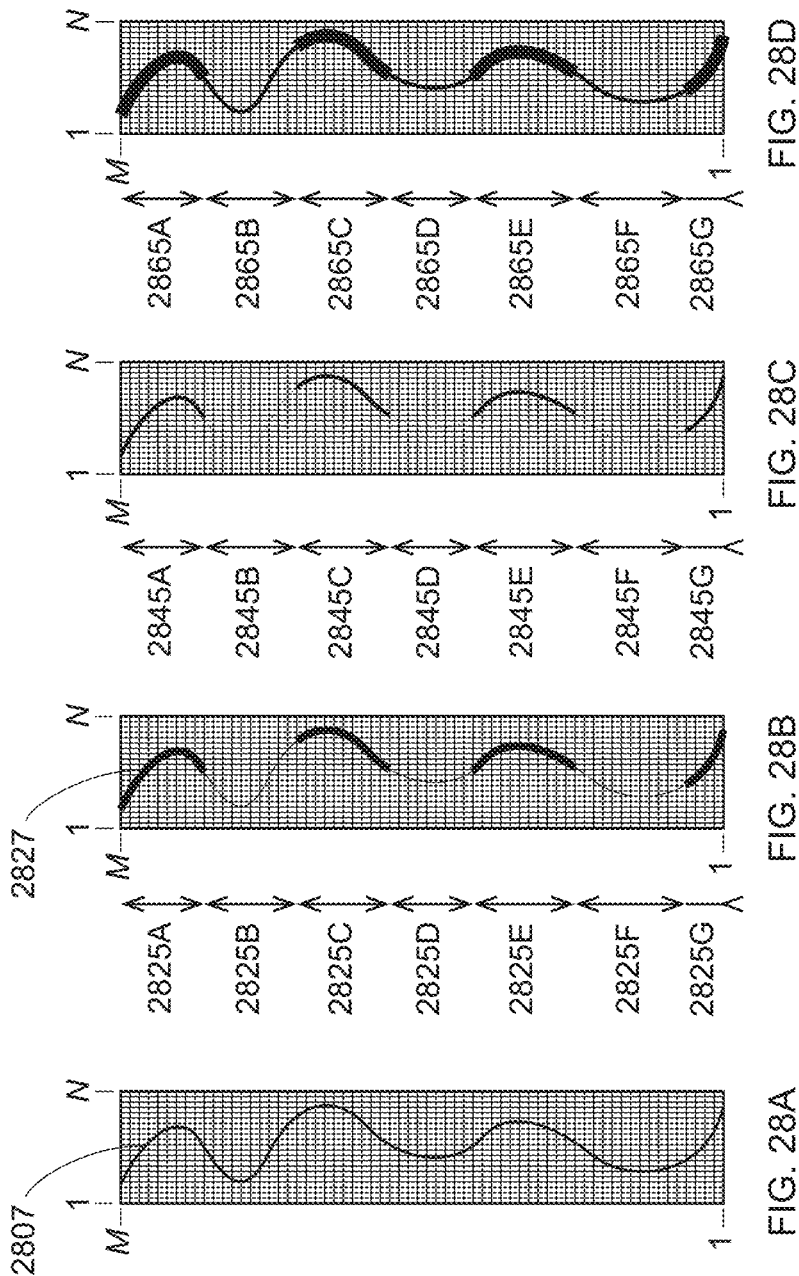

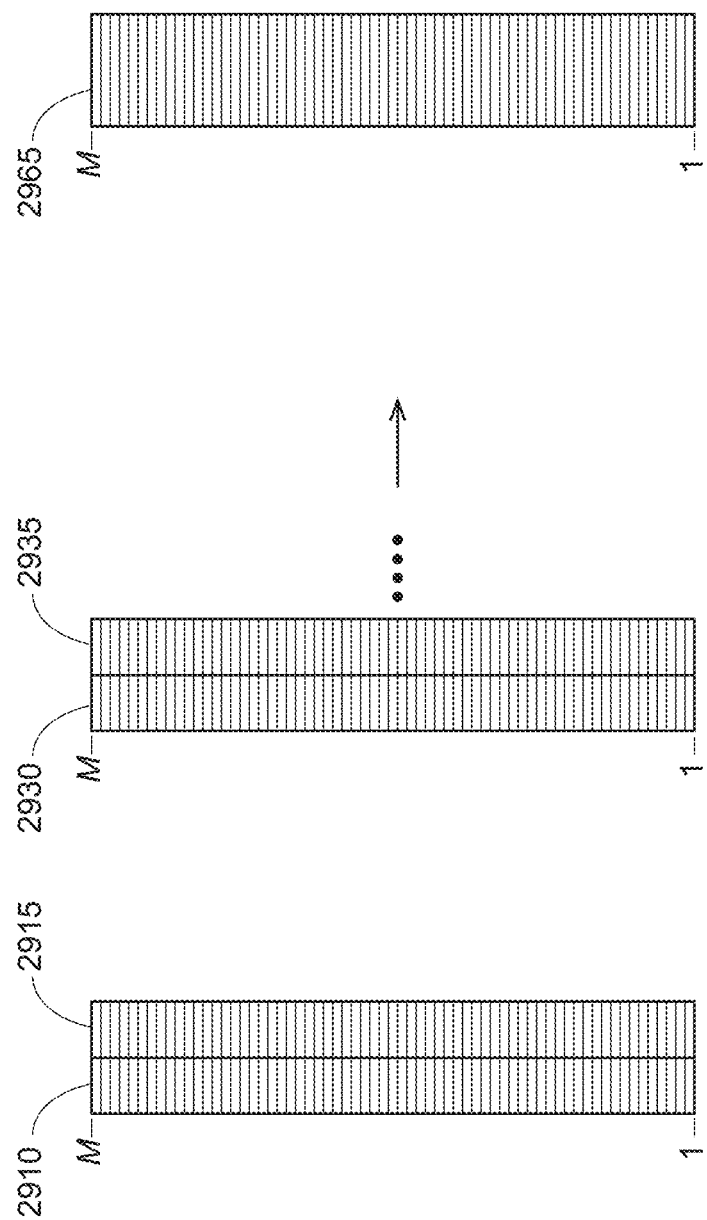

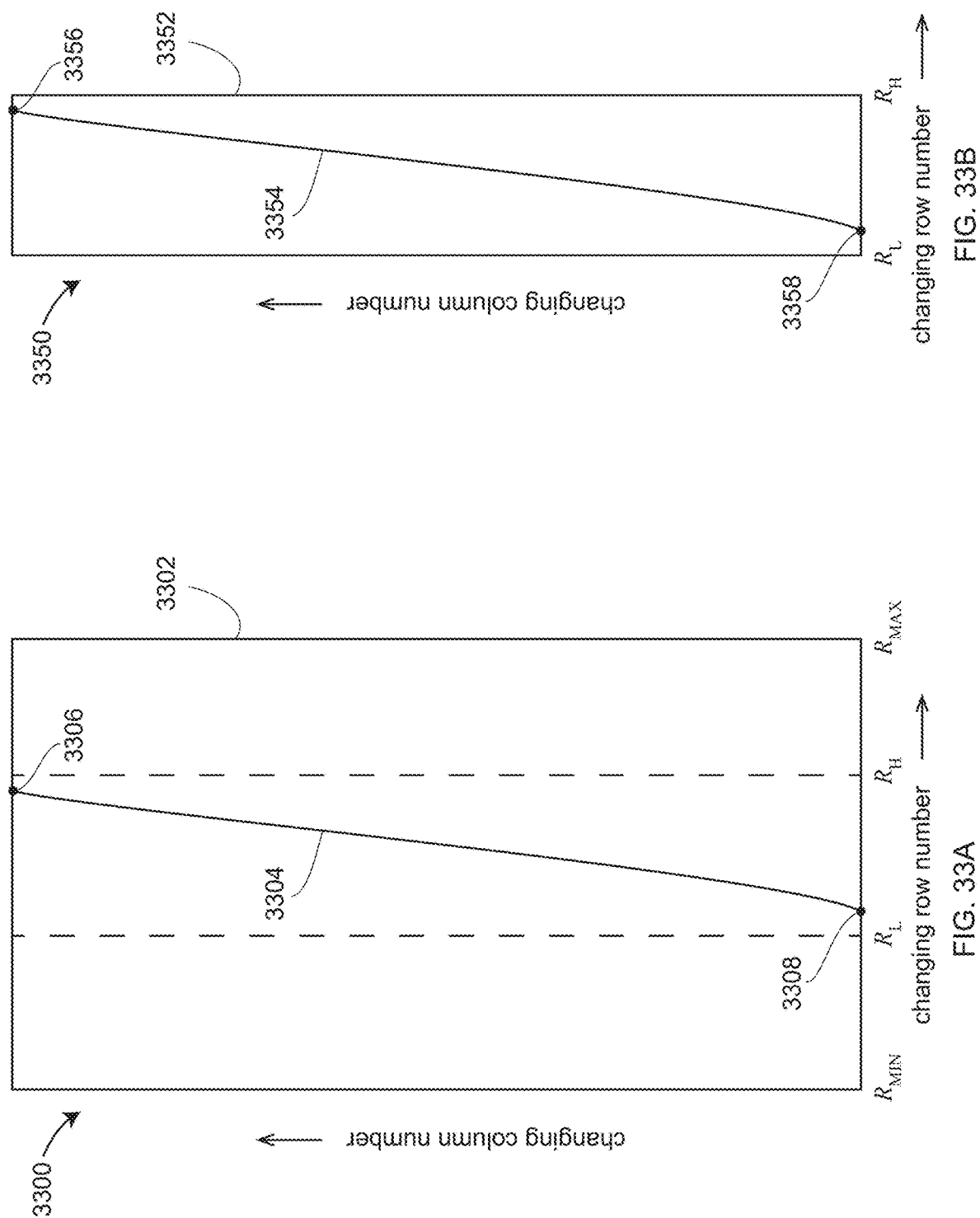

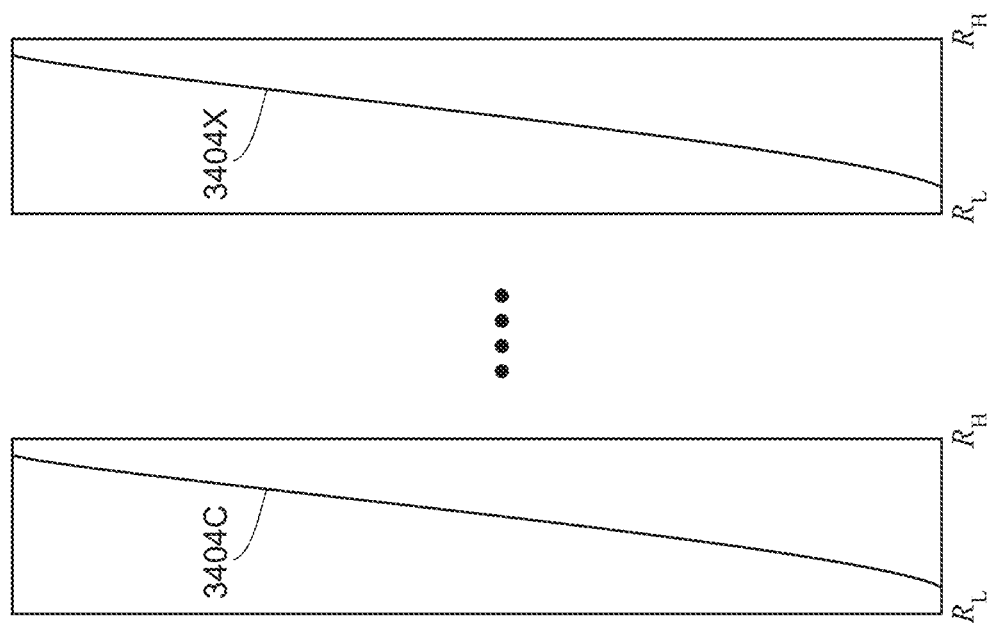
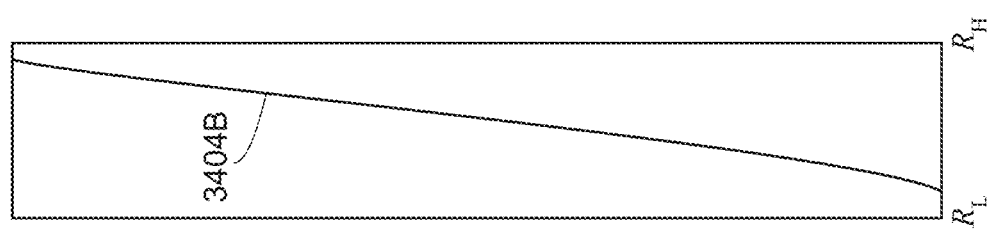
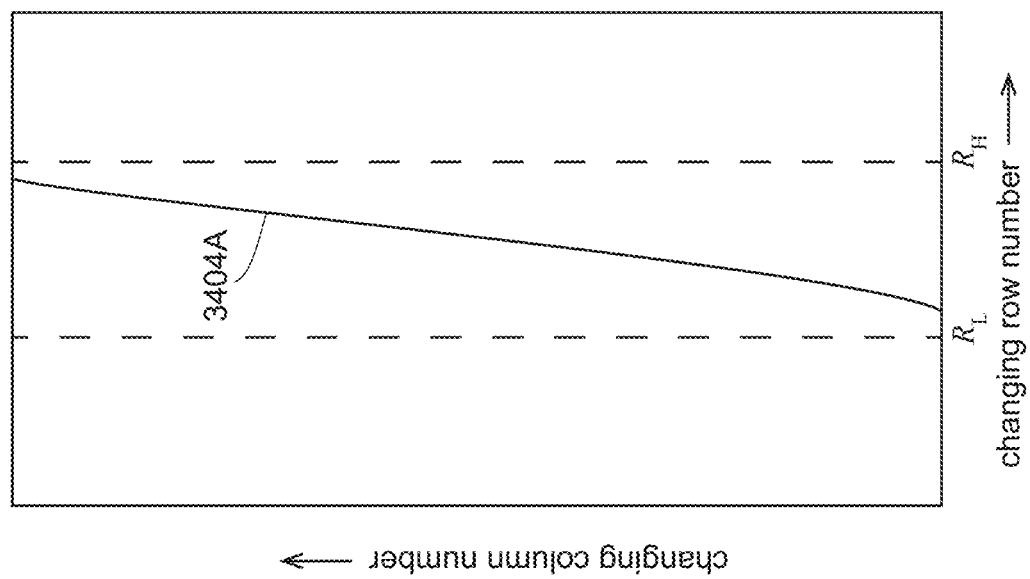
FIG. 34B
FIG. 34A

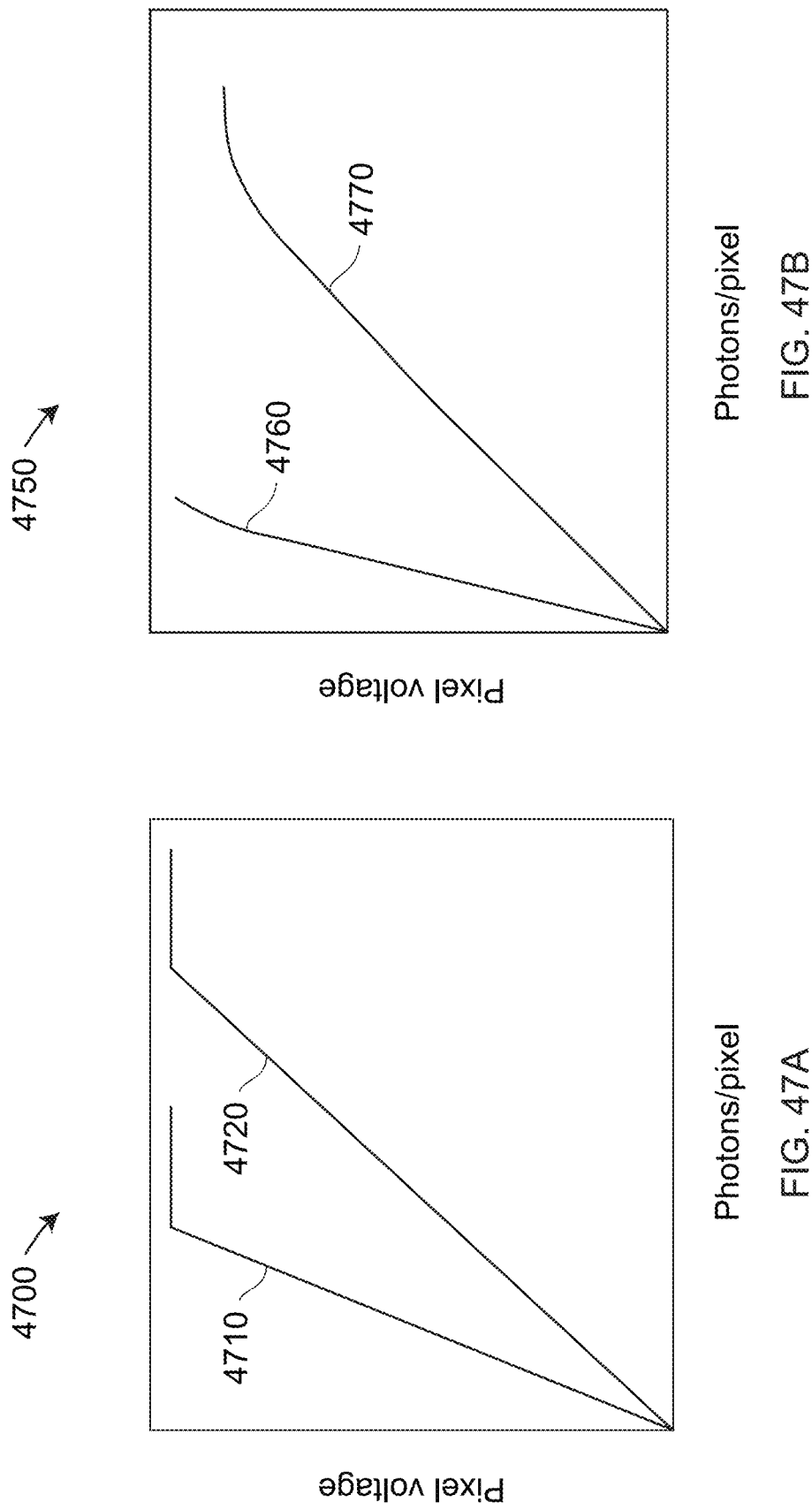

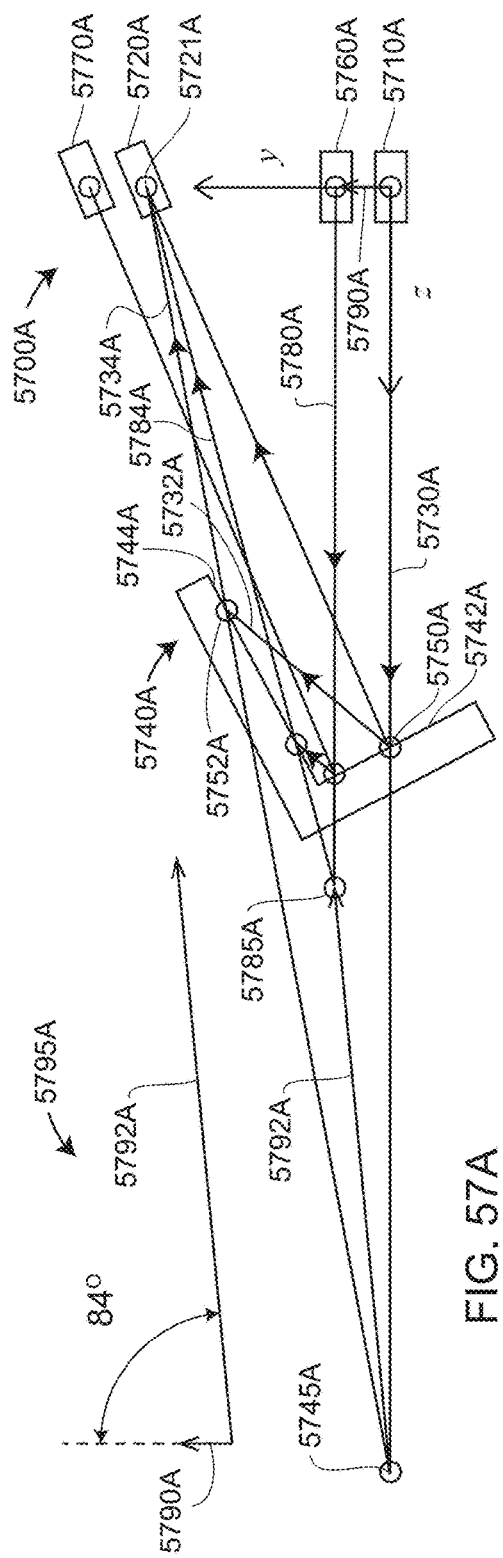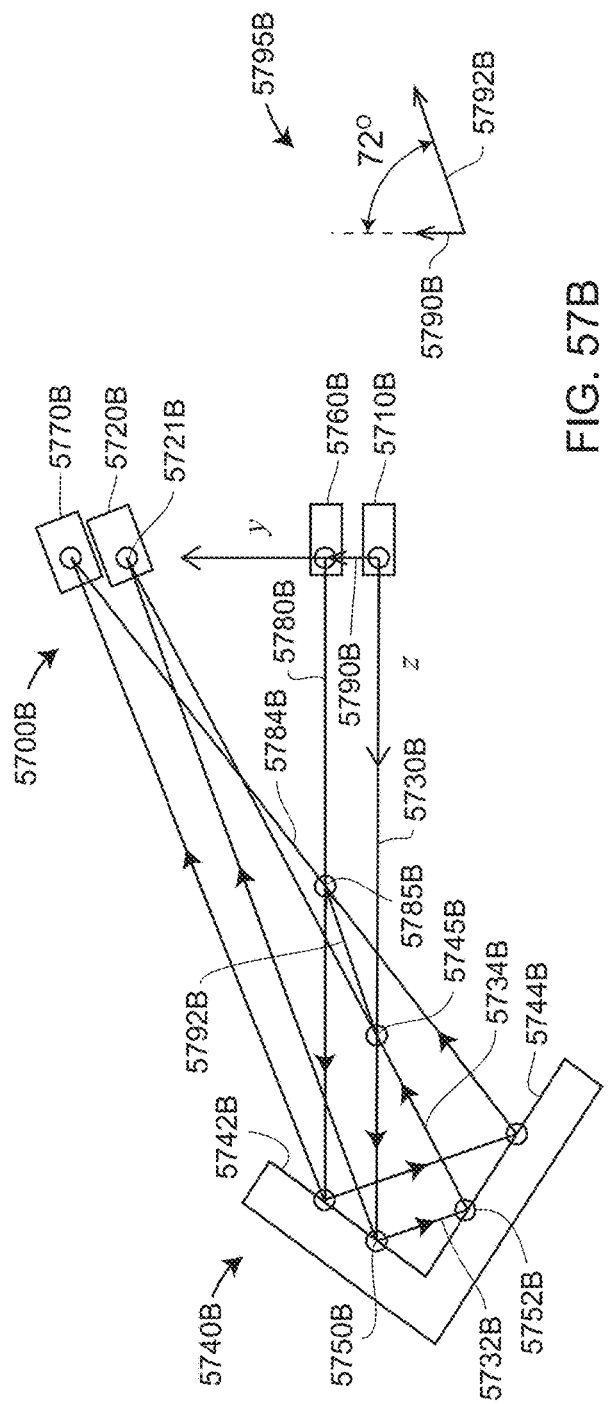
FIG. 57A
FIG. 57B

PHOTOSENSOR PROCESSING FOR IMPROVED LINE SCANNER PERFORMANCE

CROSS REFERENCE TO RELATED APPLICATIONS

This present application is a continuation of U.S. patent application Ser. No. 17/073,923, filed Oct. 19, 2020, which claims the benefit of U.S. Provisional Application Ser. No. 63/031,974, filed May 29, 2020, and U.S. Provisional Application Ser. No. 62/978,000, filed Feb. 18, 2020, and U.S. Provisional Application Ser. No. 62/924,444, filed Oct. 22, 2019, the contents all of which are incorporated herein by reference.

BACKGROUND

The present disclosure relates to a coordinate measuring system, including coordinate measuring system having or cooperating with a portable articulated arm coordinate measuring machine (AACMM).

Portable articulated arm coordinate measuring machines (AACMMs) have found widespread use in the manufacturing or production of parts where it is desired to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

A probe such as a tactile probe or a laser line probe (also known as line scanners) are used to measure 3D coordinates of an object. A tactile probe typically includes a small spherical probe tip that is held in contact with a point to be measured. A laser line probe (LLP), typically held away from the object, emits a line of light that intersects the object. A camera captures an image of the projected light on the object, and a processor evaluates the captured image to determine corresponding 3D coordinates of points on the object surface.

In some cases, light from an LLP may reflect off a first portion of a surface an intersect a second portion of the surface before returning to the LLP camera. This effect is referred to as multi-bounce or multipath interference. In such a case, the LLP may incorrectly determine the 3D coordinates of the object surface.

Accordingly, while existing LLP's are suitable for their intended purposes the need for improvement remains, particularly in providing an LLP that captures data at a faster rate than has previously been possible without compromising accuracy or sensitivity and while maintaining high dynamic range (HDR). Further, there is a need for improvement in providing an LLP that can reliably detect and remove 3D coordinates incorrectly determined based on multipath interference.

BRIEF DESCRIPTION

According to one aspect of the present disclosure, a method is disclosed in which the method comprises: projecting with the projector a first line of light onto an object; capturing with the camera a first image of the first line of light on the object within a first window subregion of the photosensitive array, the first image producing at least two collections of pixel readout values from the photosensitive array, the at least two collections including a first collection of pixel readout values having a first exposure time and a second collection of pixel readout values having a second exposure time greater than the first exposure time, the first collection of pixel readout values being assigned to odd rows within the first window, the second collection of pixel readout values being assigned to even rows of the first window, wherein a first size of the first window subregion is based at least in part on a first number of rows and a first number of columns within the photosensitive array; determining with the processor a plurality of three-dimensional (3D) coordinates of points on the object based on the first line of light, the first image of the first line of light, the first exposure time, and the second exposure time; determining with the processor a second window subregion within the first window subregion based at least in part on the first image of the first line of light on the object, a second size of the second window subregion based on at least one of: a second number of rows of the photosensitive array, that are different from the first number of rows of the photosensitive array, and a second number of columns of the photosensitive array, that are different from the first number of columns of the photosensitive array; and projecting with the projector a second line of light on the object; capturing with the camera a second image of the second line of light on the object within the second window subregion; determining with the processor a plurality 3D coordinates of second points on the object based at least in part on the second line of light and the second image of the second line of light; storing the plurality of 3D coordinates determined for the first image, and the plurality of 3D coordinates of second points on the object based on the second size of the second window subregion.

According to one aspect of the present disclosure, a method is disclosed in which the method comprises: projecting with the projector a first line of light onto an object; capturing with the camera a first image of the first line of light on the object within a first window subregion of the photosensitive array, the first image producing at least two collections of pixel readout values from the photosensitive array, the at least two collections including a first collection of pixel readout values having a first exposure time and a second collection of pixel readout values having a second exposure time greater than the first exposure time, the first collection of pixel readout values being assigned to even rows within the first window, the second collection of pixel readout values being assigned to odd rows within the first window, wherein a first size of the first window subregion is based at least in part on a first number of rows and a first number of columns within the photosensitive array; determining with the processor a plurality of three-dimensional (3D) coordinates of points on the object based on the first line of light, the first image of the line of light, the first exposure time, and the second exposure time; determining with the processor a second window subregion within the first window subregion based at least in part on the captured image of the first line of light on the object, a second size of the second window subregion based on at least one of: a second number of rows of the photosensitive array, that are different from the first number of rows of the photosensitive array, and a second number of columns of the photosensitive array, that are different from the first number of columns of the photosensitive array; and projecting with the projector a second line of light on the object; capturing with the camera a second image of the second line of light on the object within the second window subregion; determining with the processor a plurality of 3D coordinates of second points on the object based at least in part on the second line of light and the second image of the second line of light; storing the plurality of 3D coordinates of the points determined for the first image, and the plurality of 3D coordinates of second points on the object based on the second size of the second window subregion.

According to one aspect of the present disclosure, a method is disclosed in which the method comprises: projecting a first line of light onto an object; capturing with the camera a first image of the first line of light on the object within a first window subregion, the first image producing two collections of pixel readout values, the two collections including a first collection of pixel readout values having a first exposure time and a second collection of pixel readout values having a second exposure time, the first collection of pixel readout values being assigned to odd rows, the second collection of pixel readout values being assigned to even rows, wherein a first size of the first window subregion is based at least in part on a first number of rows and a first number of columns of the photosensitive array; determining three-dimensional (3D) coordinates of points on the object based at least in part on the projected first line of light, the captured first image of the first line of light, the first exposure time, and the second exposure time; determining a second window subregion based at least in part on the captured image of the first line of light on the object, wherein a second size of the second window subregion is based at least in part on: a second number of rows of the photosensitive array, that are different from the first number of rows of the photosensitive array, a second number of columns of the photosensitive array, that are different from the first number of columns of the photosensitive array; and storing the determined 3D coordinates, and 3D coordinates of second points on the object based at least in part on the second size of the second window subregion.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6B is an isometric view showing relative positions of some elements of the AACMM when connected arm segments are held in a vertical orientation according to an embodiment of the present disclosure;

FIGS. 8A, 8B, 8C, 8D are front, side, cross-sectional, and exploded views, respectively, of a first-axis cartridge according to an embodiment of the present disclosure;

FIGS. 14A, 14B, 14C, 14D, 14E are isometric, exploded, front, side, and section views, respectively, of a third-axis assembly, a fourth-axis assembly, and a first segment according to an embodiment of the present disclosure;

FIGS. 15A, 15B, 15C, 15D are isometric, exploded, front, and section views of a third/fifth axis cartridge according to an embodiment of the present disclosure;

FIGS. 16A, 16B, 16C, 16D are isometric, exploded, front, and section views of a fourth/sixth axis cartridge according to an embodiment of the present disclosure;

FIGS. 16E, 16F, 16G, 16H are isometric, partially exposed views of elements of third-, fourth-, and fifth-axis assemblies according to an embodiment;

FIGS. 17A, 17B, 17C, 17D, 17E are isometric, exploded, front, side, and section views, respectively, of a fifth-axis assembly, a sixth-axis assembly, and a second segment according to an embodiment of the present disclosure;

FIGS. 19A, 19B are side views of a seventh-axis assembly having a tactile probe assembly latched in placed and detached, respectively, according to an embodiment of the present disclosure;

FIGS. 19C, 19D are a first isometric view and a second isometric view, respectively, of a seventh-axis assembly and a detached tactile probe assembly according to an embodiment of the present disclosure;

FIGS. 23A, 23B, 23C, 23D are top, right, section, and exploded views, respectively, of a nut assembly according to an embodiment of the present disclosure;

FIGS. 28A, 28B, 28C, 28D illustrate patterns of reflected light observed on a photosensitive array according to an embodiment;

FIGS. 29A, 29B, and FIG. 29C illustrates a method of processing data from multiple images to obtain an image having an improved dynamic range according to an embodiment of the present disclosure;

FIGS. 33A, 33B are schematic illustrations showing windowing used in a photosensitive array according to an embodiment of the present disclosure;

FIGS. 34A, 34B are schematic illustrations showing window size adjusted during measurements according to an embodiment of the present disclosure;

FIGS. 47A, 47B are plots of high conversion gain and low conversion gain of representative photosensitive array pixels;

FIG. 57A, 57B are exemplary generation of 3D points from spurious multipath reflections illustrating the generation of relatively large relative movement angles according to an embodiment.

The detailed description explains embodiments of the disclosure, together with advantages and features, by way of example with reference to the drawings.

DETAILED DESCRIPTION

A line of light projected by an LLP onto an object is imaged by a photosensitive array and processed using electronics, including a processor. In embodiments the processing techniques improve speed and dynamic range of 3D measurements obtained by the LLP. In other embodiments the methods are used to more effectively eliminate spurious points caused by multipath reflection.

Figure 1A:
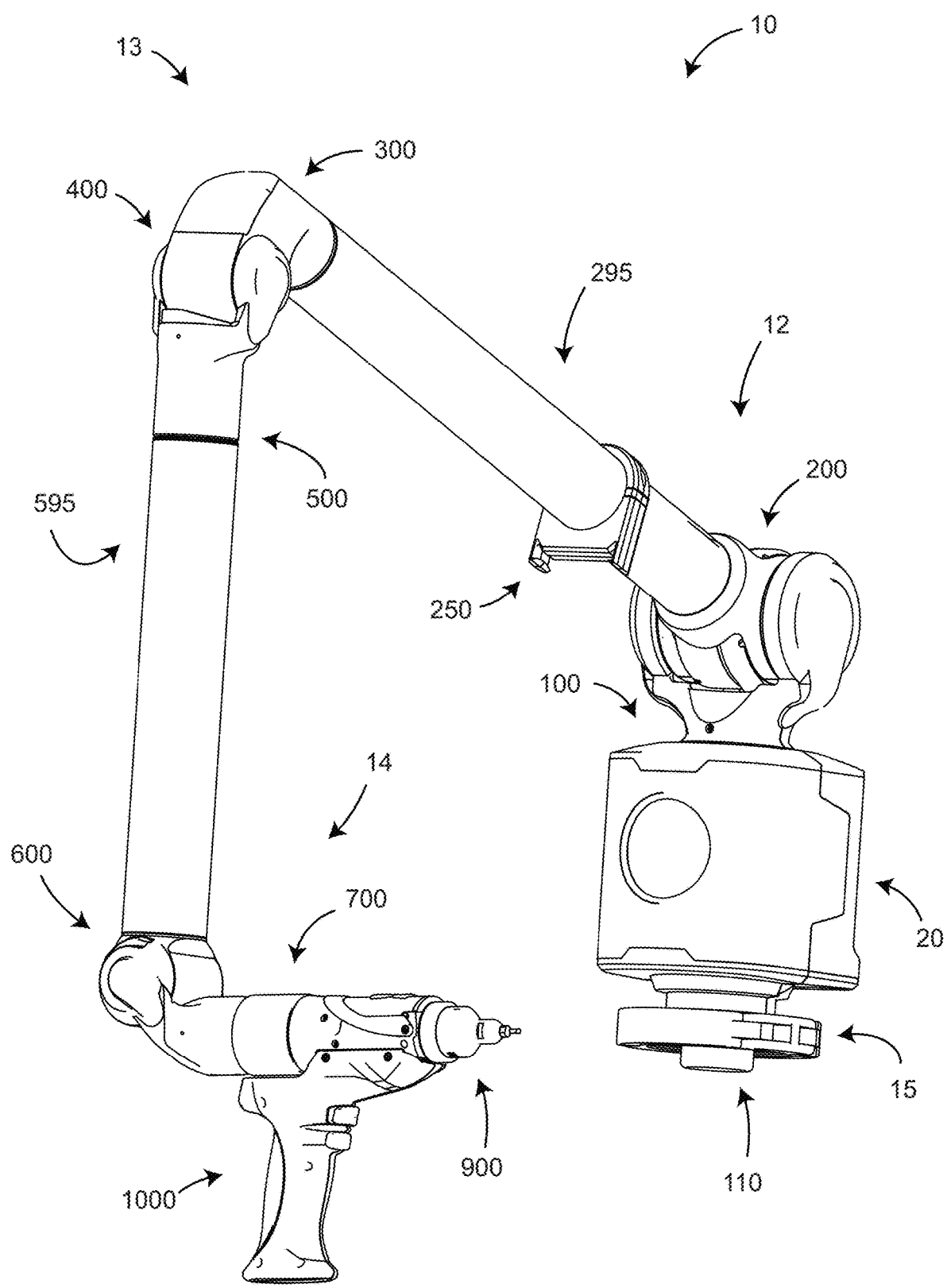
FIGS. 1A, 1B are two isometric views of a portable articulated AACMM according to an embodiment of the present disclosure.
Figure 1B:
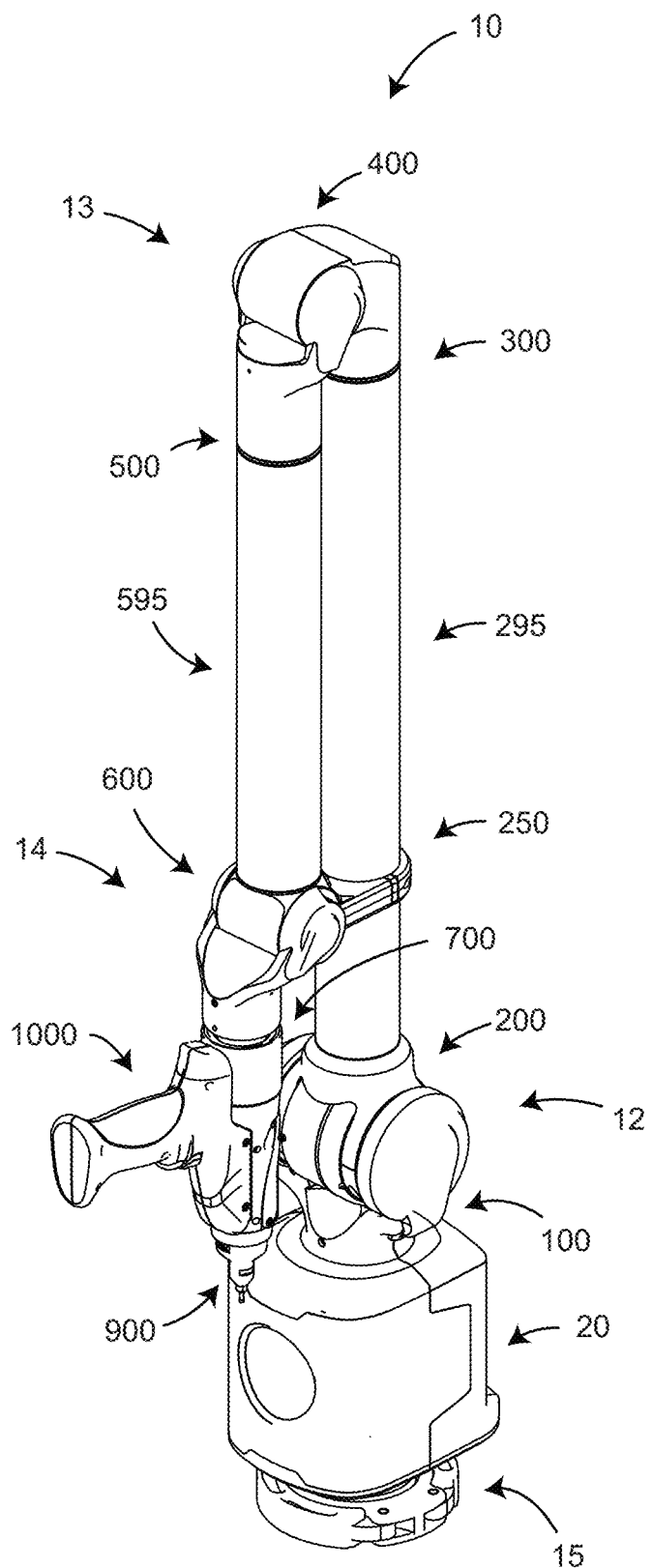
Figure 1C:
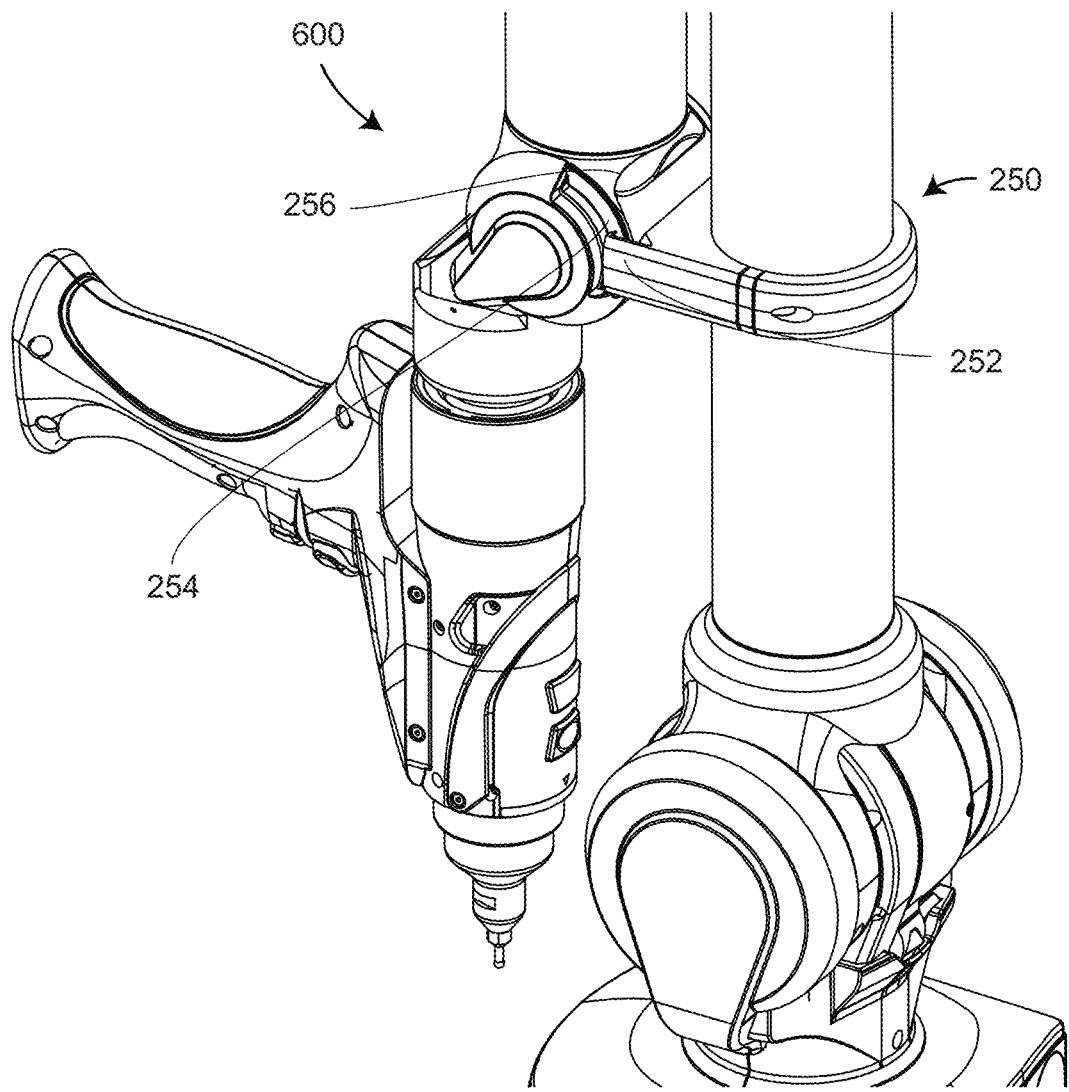
FIG. 1C is a partial isometric view of an AACMM according to an embodiment of the present disclosure.

FIGS. 1A, 1B, 1C illustrate, in isometric view, an articulated arm coordinate measuring machine (AACMM) 10 according to various embodiments of the present disclosure, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile-probe assembly 900 and a handle 1000 are attached to the seventh-axis assembly. Each of the axis assemblies may provide either a swivel rotation or a hinge rotation. In the embodiment illustrated in FIGS. 1A, 1B, 1C, the first-axis assembly 100 provides a swivel rotation about an axis aligned to a mounting direction of the base 20. In an embodiment, the second-axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking-clamp fingers 252, thereby permitting unencumbered or free movement of the arm segments 295, 595 as illustrated in FIG. 1A. In another embodiment, the parking clamp is attached to the second segment 595 rather than the first segment 295 (FIG. 1B). In another embodiment, the parking clamp fingers attach to a different element than the parking-clamp recess of FIG. 1C. In another embodiment, clamping is provided by a different mechanism than the parking-clamp fingers 252.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; a parking clamp affixed to one of the plurality of connected arm segments, the parking clamp having a plurality of fingers disposed lock in place two of the plurality of the connected arm segments when the plurality of fingers are pressed into a parking clamp recess of the AACMM, the parking clamp further disposed to release the two of the plurality of the connected arm segments when the fingers of the parking clamp are pulled away from the parking clamp recess; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

In an embodiment, the AACMM further includes a bumper, the bumper coupled to the AACMM and arranged to contact the parking clamp when the plurality of fingers are pressed into place in the parking clamp recess.

FIG. 2 is a block diagram of base electronics 2000. FIG. 2 includes modular power supply 2005, battery packs 2010, and a power supply 2015. These elements are shown in greater detail in a block diagram of FIG. 2A. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus 2021 for the purpose of lightweight communication, provides communication among the dual battery smart charger 2020 and smart battery packs 2010. In an embodiment, the smart battery packs 2010 include a first battery pack 2011 and a second battery pack 2012. In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6A:
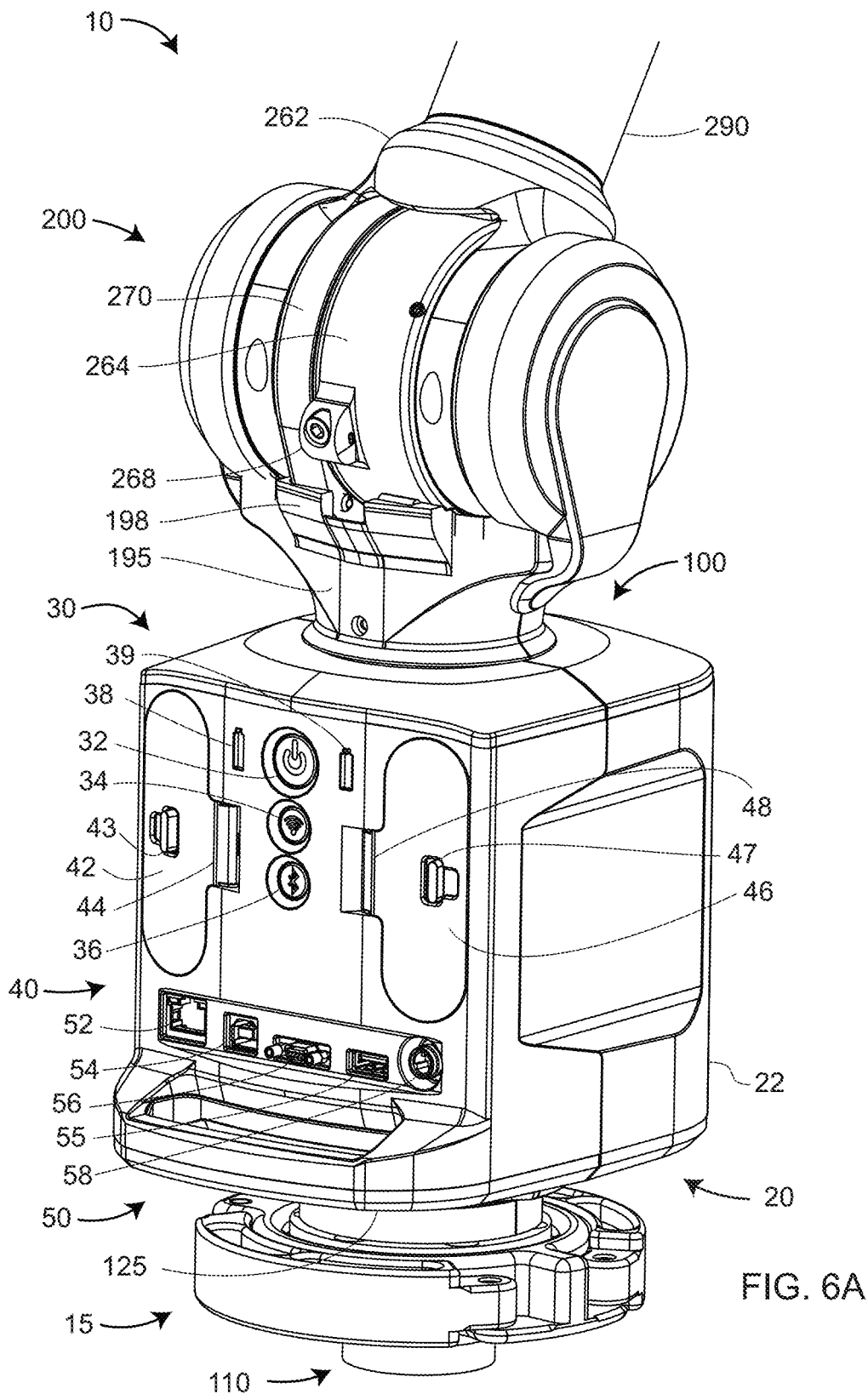
FIG. 6A is an isometric view describing some elements in a lower portion of the AACMM according to an embodiment of the present disclosure.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6A. In an embodiment, the first battery door 42 and the second battery door 46 cooperate with a first battery-door hinge 44 and a second battery-door hinge 48, respectively, as well as a first battery-door latch 43 and a second battery-door latch 47, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6A.

Part of the electrical power passing through the line 2022 arrives at the regulator 2031, which provides a 5 VDC local voltage through a point 2135 to the environmental sensor and recorder 2070 (FIG. 2C) and to a user interface (IF) 2025, which includes an electrical on/off switch 2026 and a microcontroller (MCU) 2027. The electrical on/off switch 2026 is activated in response to pressing of a mechanical actuator or on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regulator 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm end.

Figure 2A:
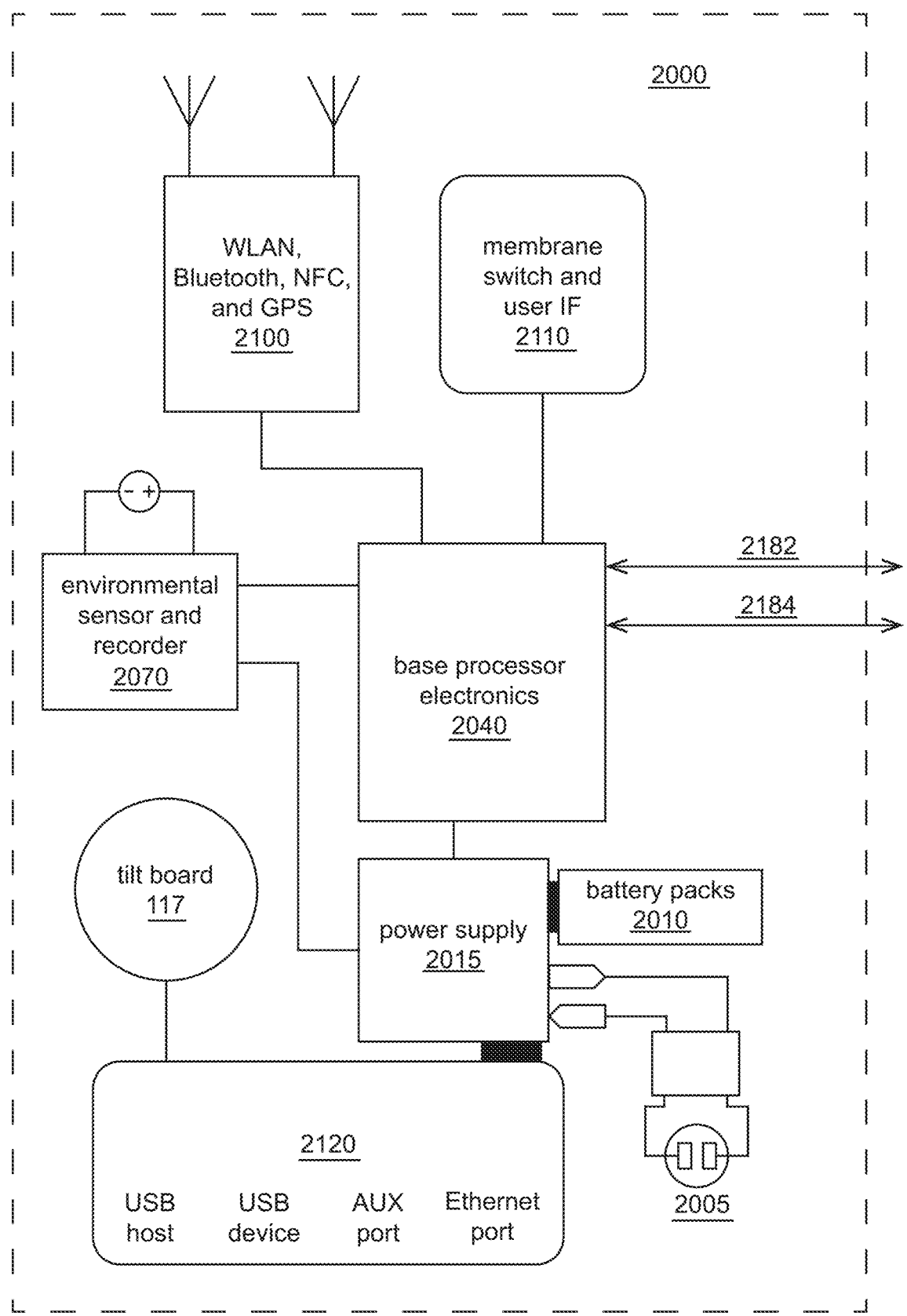
FIG. 2A is a block diagram of base electronics of an AACMM of FIG. 1A-1C according to an embodiment of the present disclosure.
Figure 2B:
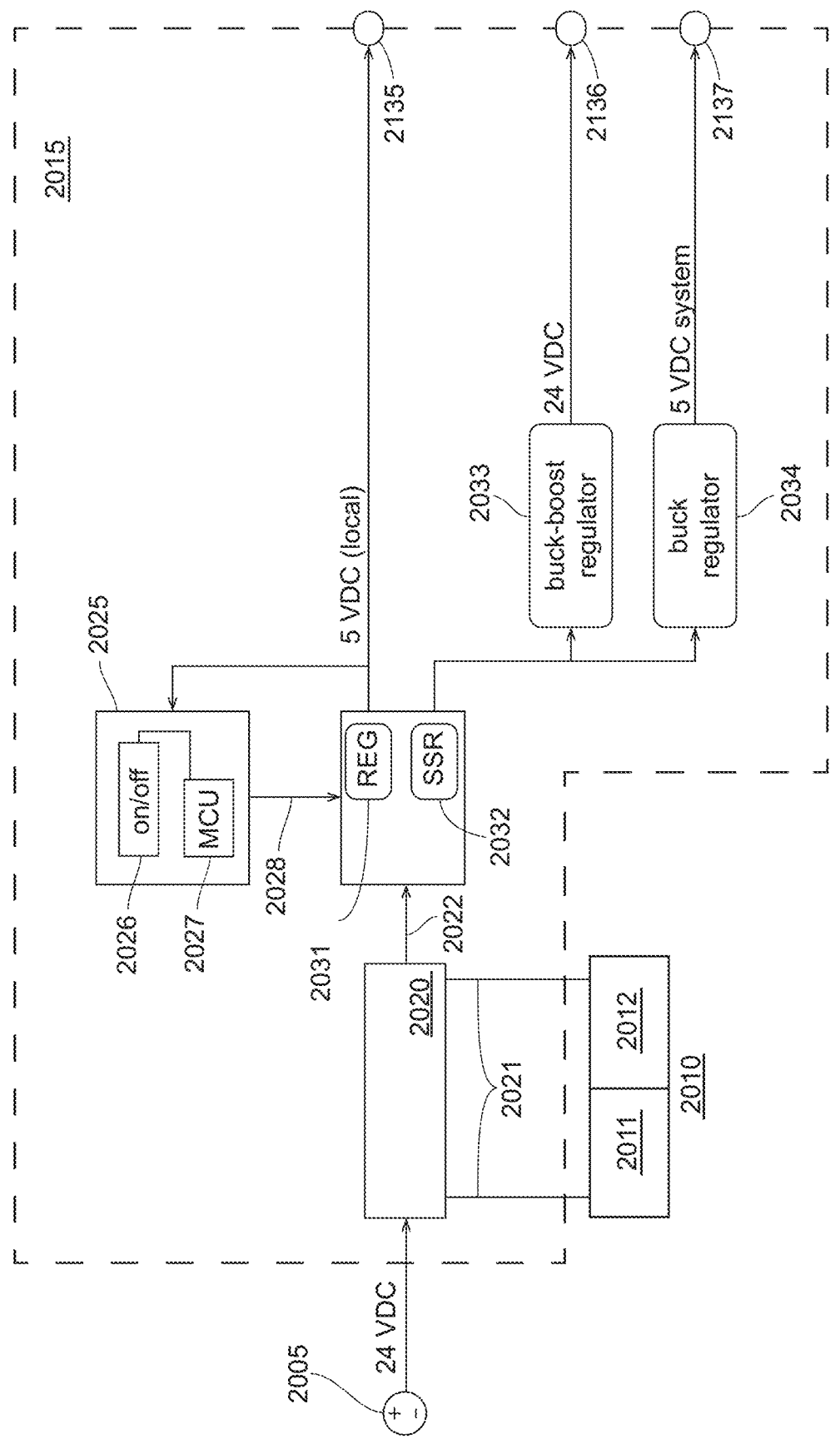
FIGS. 2B, 2C, 2D are block diagrams providing further detail of elements within the block diagram of FIG. 2A according to an embodiment of the present disclosure.
Figure 2C:
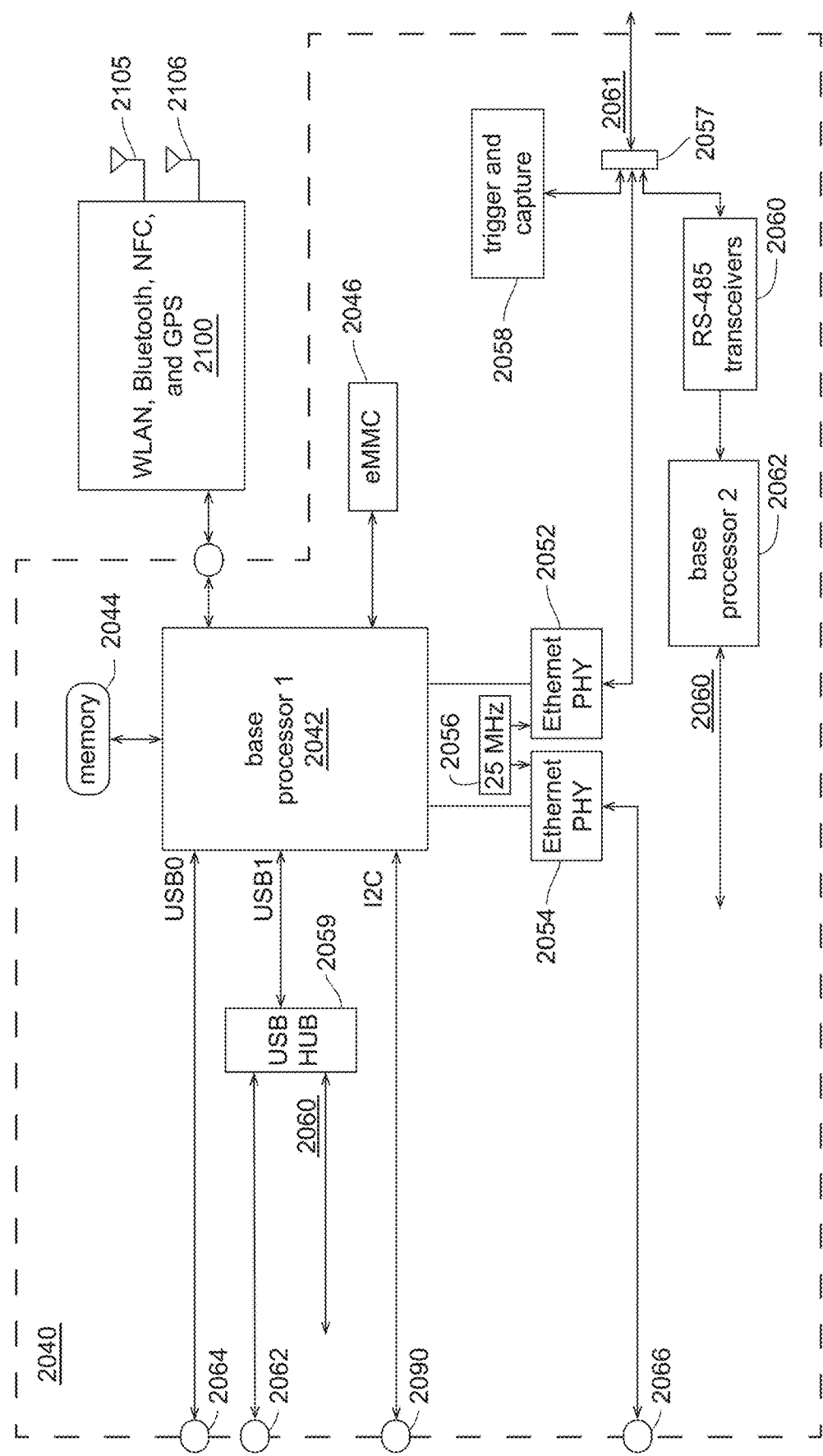
Figure 2D:
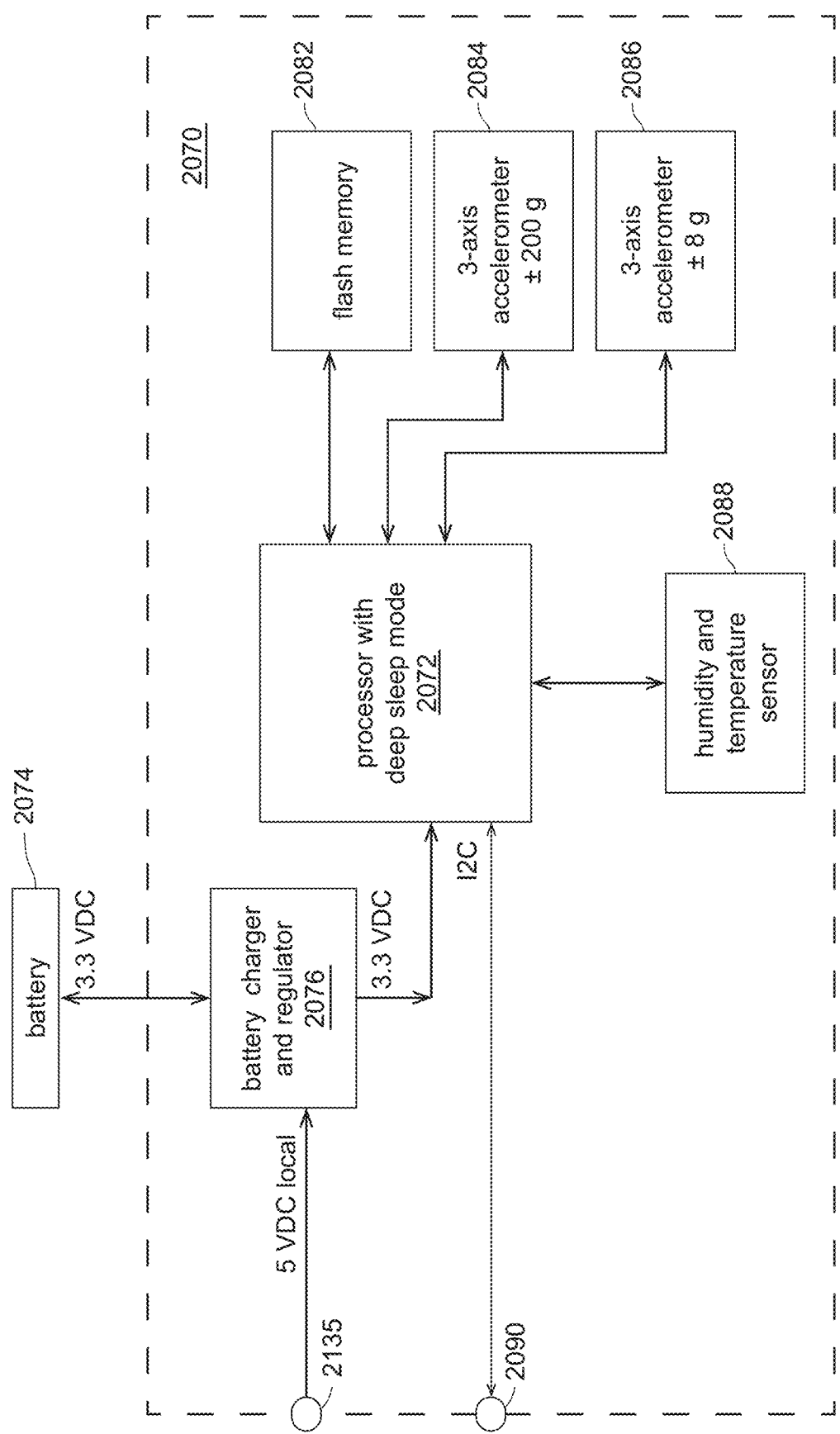

A block diagram of the environmental sensor and recorder 2070 is shown in FIG. 2C. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger or regulator 2076 uses the 5 VDC local voltage to charge the battery 2074.

FIG. 2B is a block diagram of the base processor electronics 2040, which includes a first base processor 2042 and a second base processor 2062. In an embodiment, the second base processor 2062 is a real-time processor. In an embodiment, the processor with deep-sleep mode (FIG. 2C) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55. Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through to a USB hub 2059 and on to the first base processor 2042.

In an embodiment, an Ethernet signal may be provided over an Ethernet port 52 as shown in FIG. 6A. Ethernet is a computer networking technology based on IEEE 802.3 standards. The Ethernet signal arrives at a point 2066 in FIG. 2B, travels to an Ethernet PHY 2054, which is clocked 2056 at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as LLPs.

Figure 22C:
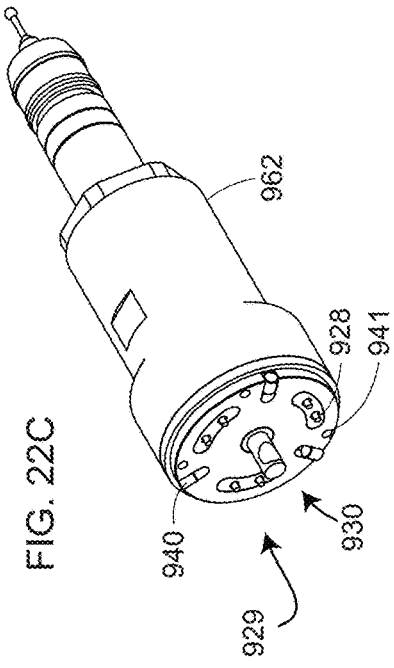
FIGS. 22A, 22B, 22C, 22D, 22E are front, bottom, isometric, section, and exploded views, respectively, of a touch-trigger probe assembly according to an embodiment of the present disclosure.
Figure 22D:
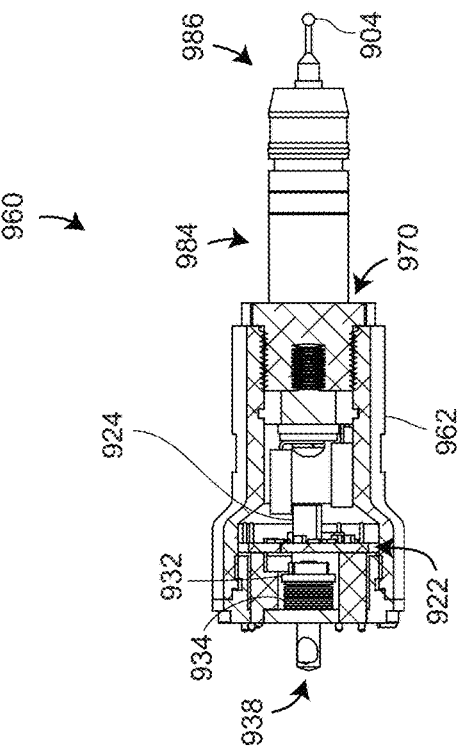
Figure 22A:
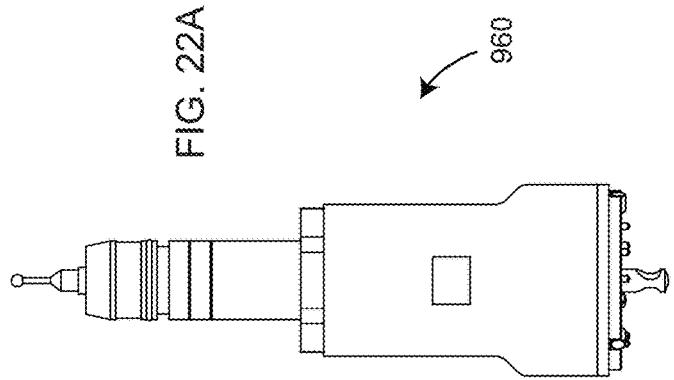
Figure 22B:
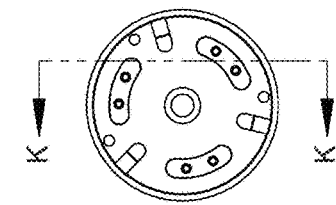

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22A. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 22D) on the hard-probe assembly 900. In contrast, a touch-trigger probe assembly 960 (FIG. 22A) triggers a reading when a designated force is applied to the probe tip 904. Hence angular readings are taken in response to the trigger signal sent from the touch-trigger probe assembly 960. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2059 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN). In an embodiment, the WLAN is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device capable of wirelessly exchanging data with external devices such as computing devices. BLE is a wireless personal area network technology designed and marketed by the Bluetooth Special Interest Group. The BLE device is enabled by pressing a Bluetooth™ button 36 shown in FIG. 6A. The on-off button 32, the Wi-Fi button 34, and the Bluetooth™ button 36 are part of a (larger) membrane switch and user interface (IF) 2110 shown in FIG. 2.

In an embodiment, the board 2100 further includes near-field communication (NFC) hardware. In an embodiment, the NFC hardware includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver. In an embodiment, the GPS receiver is used to track the location of the AACMM 10, for example, to determine the location of the AACMM 10 when leased. In another embodiment, the GPS receiver is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN, Bluetooth™ device, NFC hardware, and GPS receiver are used in conjunction with antennas, which may include antennas 2105, 2106.

Figure 3:
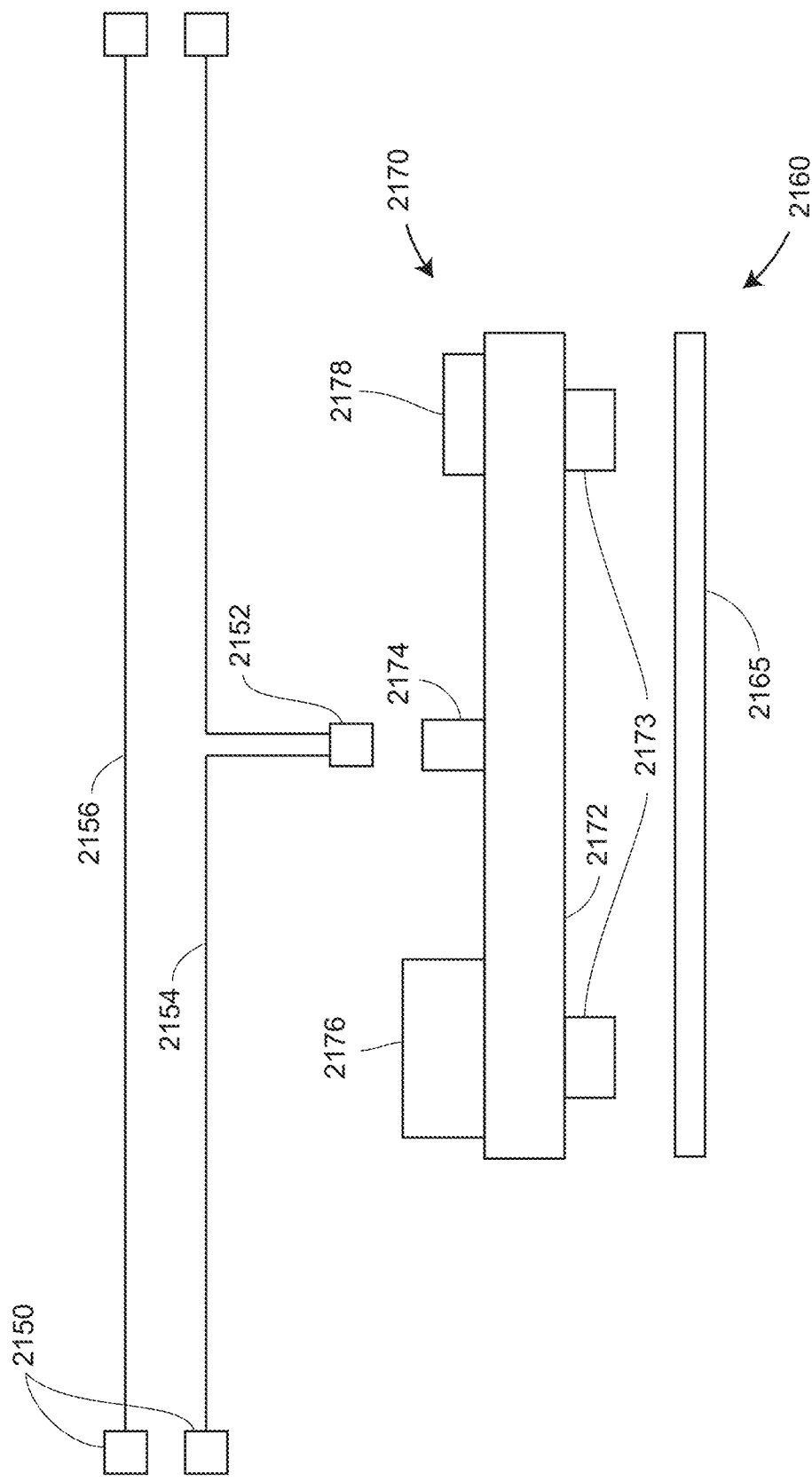
FIG. 3 is a block diagram of bus cables and their relation to encoder components according to an embodiment of the present disclosure.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2). Each encoder PCB 2172 connects to a corresponding T-cable 2154 of the first bus 2182. Cable connectors 2150 on each end of the T-cable 2154 attach to cable connectors 2150 on adjacent T-cables 2154 in the AACMM 10. In this way, angle information may be transferred from each angular encoder 2160 through the first bus 2182 to the base processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2). Cable connectors 2150 of adjacent interconnect cables 2156 are connected together to provide a continuous electrical path for the second bus 2184.

Figure 4A:
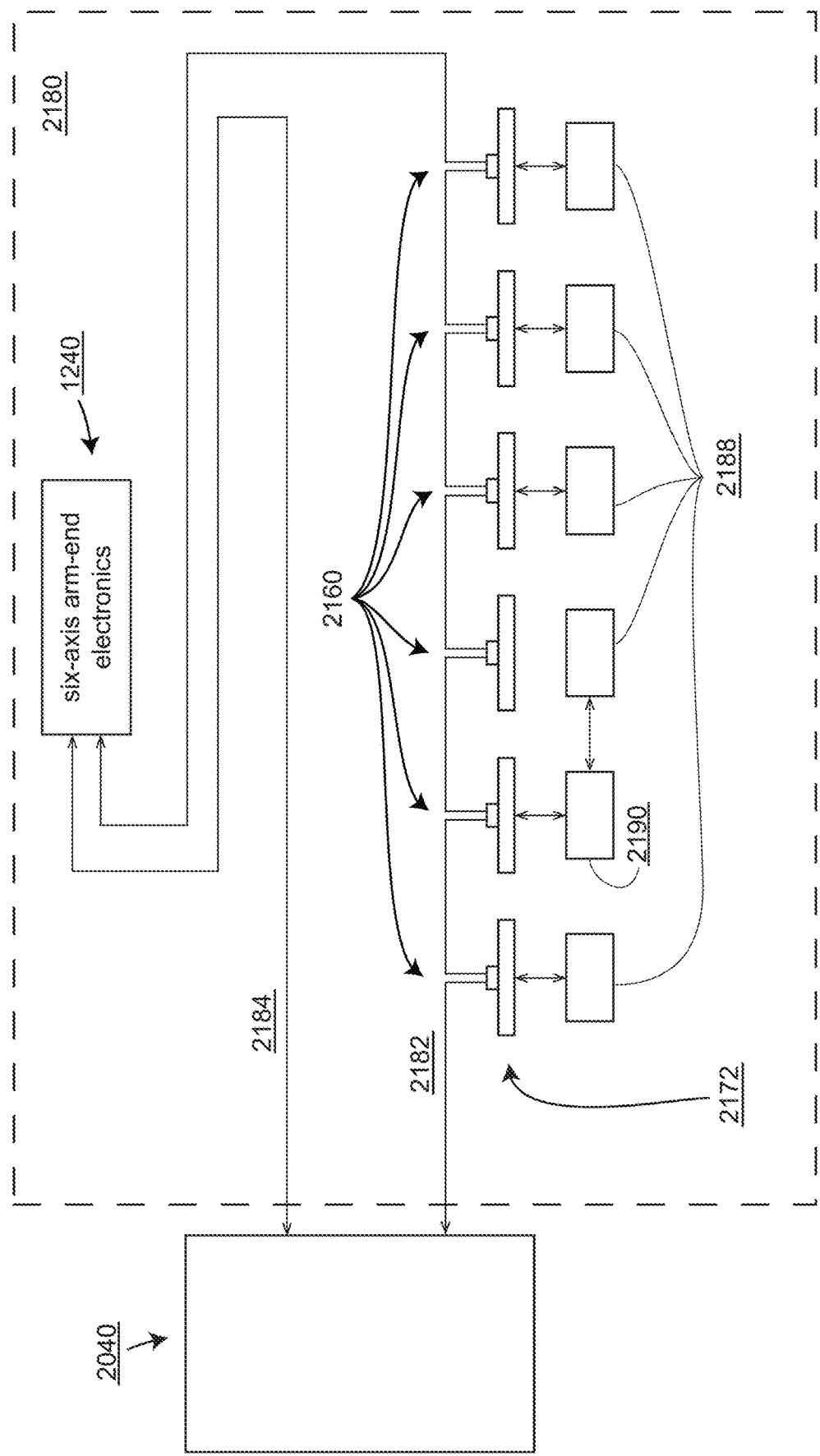
FIGS. 4A, 4B are block diagrams of interconnecting elements in six-axis electronics and seven-axis electronics according to an embodiment of the present disclosure.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide the possibility of compensating angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
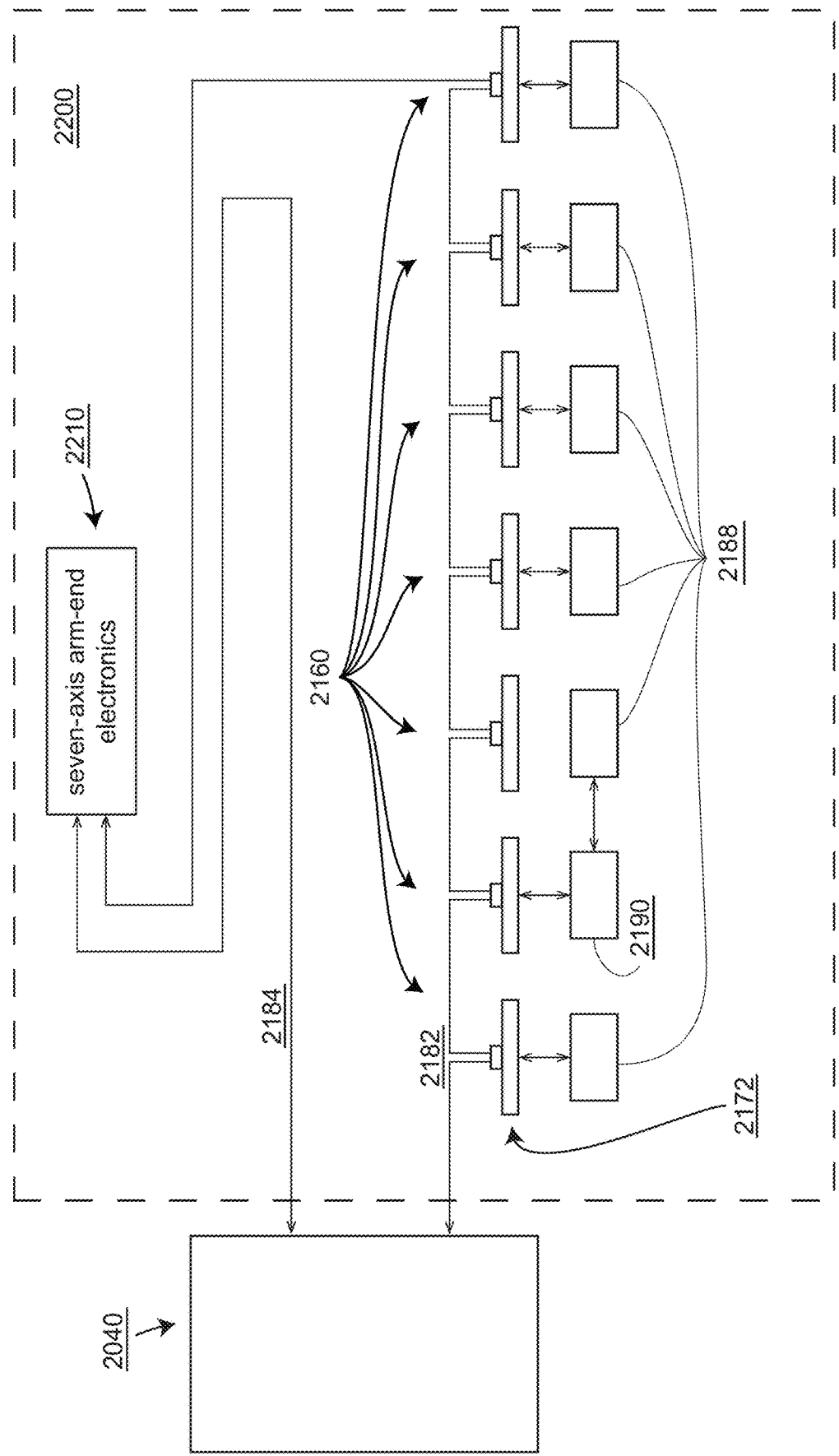

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
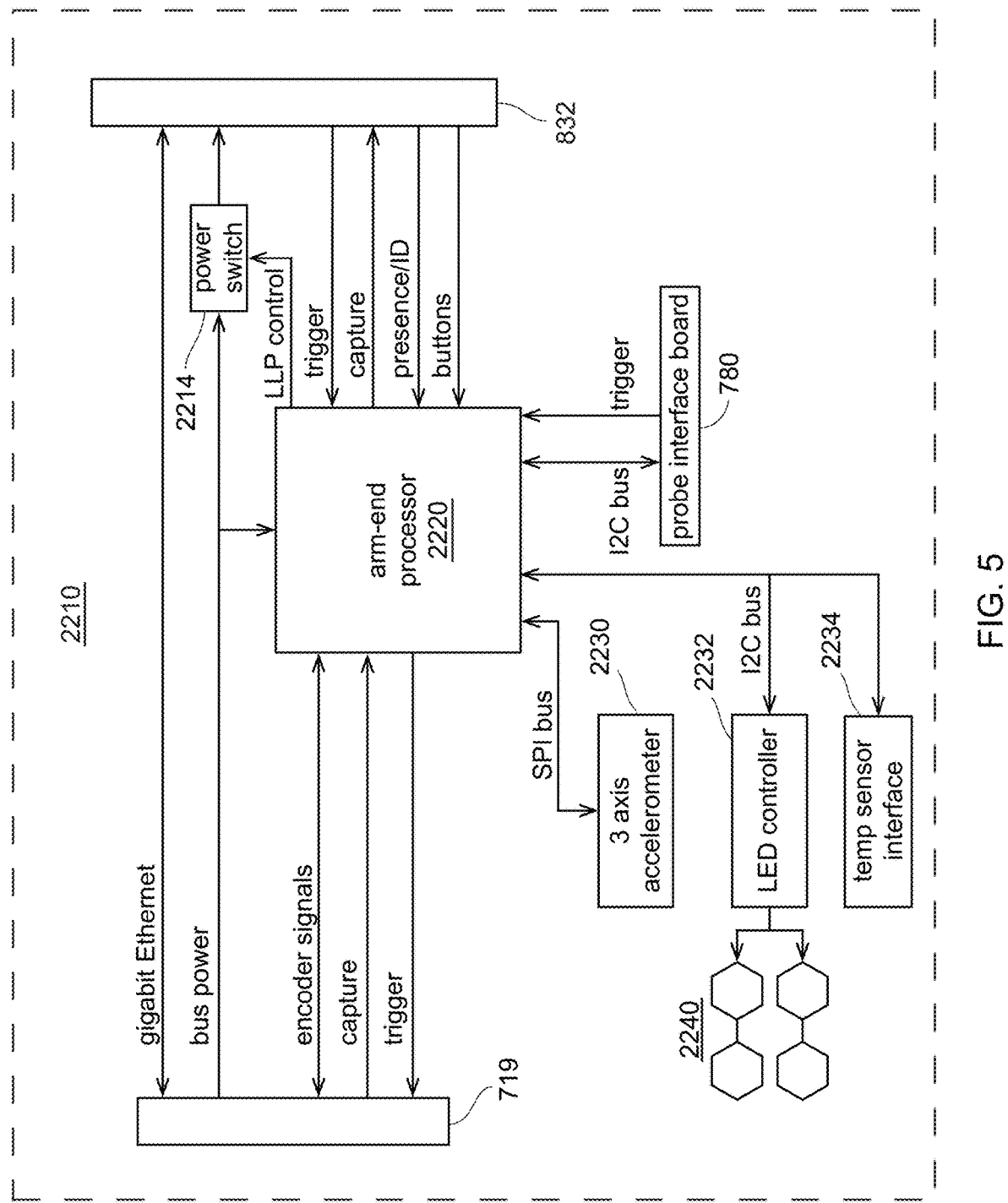
FIG. 5 is a block diagram of seven-axis arm-end electronics according to an embodiment of the present disclosure.
Figure 24A:
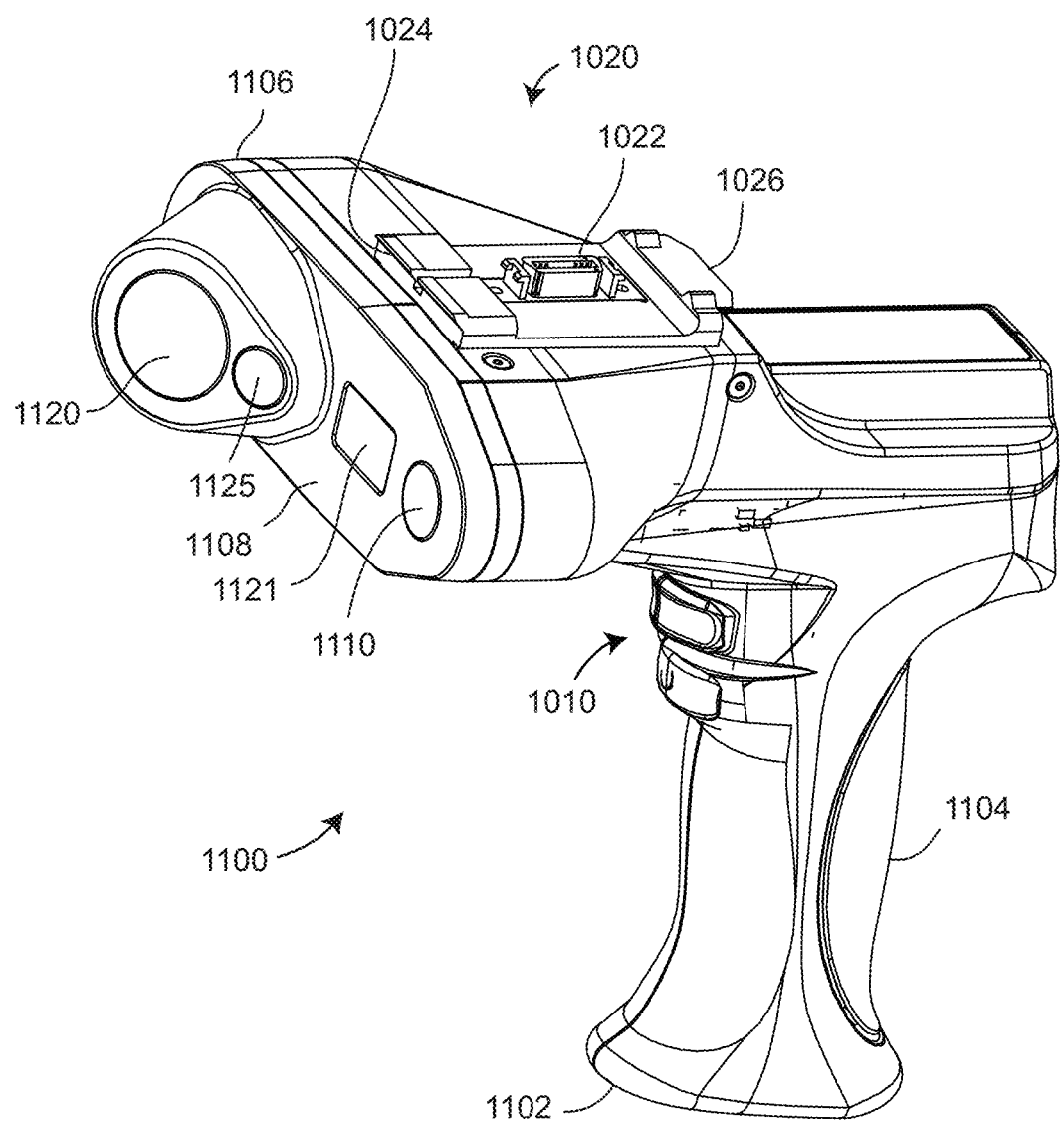
FIGS. 24A, 24B are isometric and partial section views, respectively, of an LLP according to an embodiment of the present disclosure.
Figure 24B:
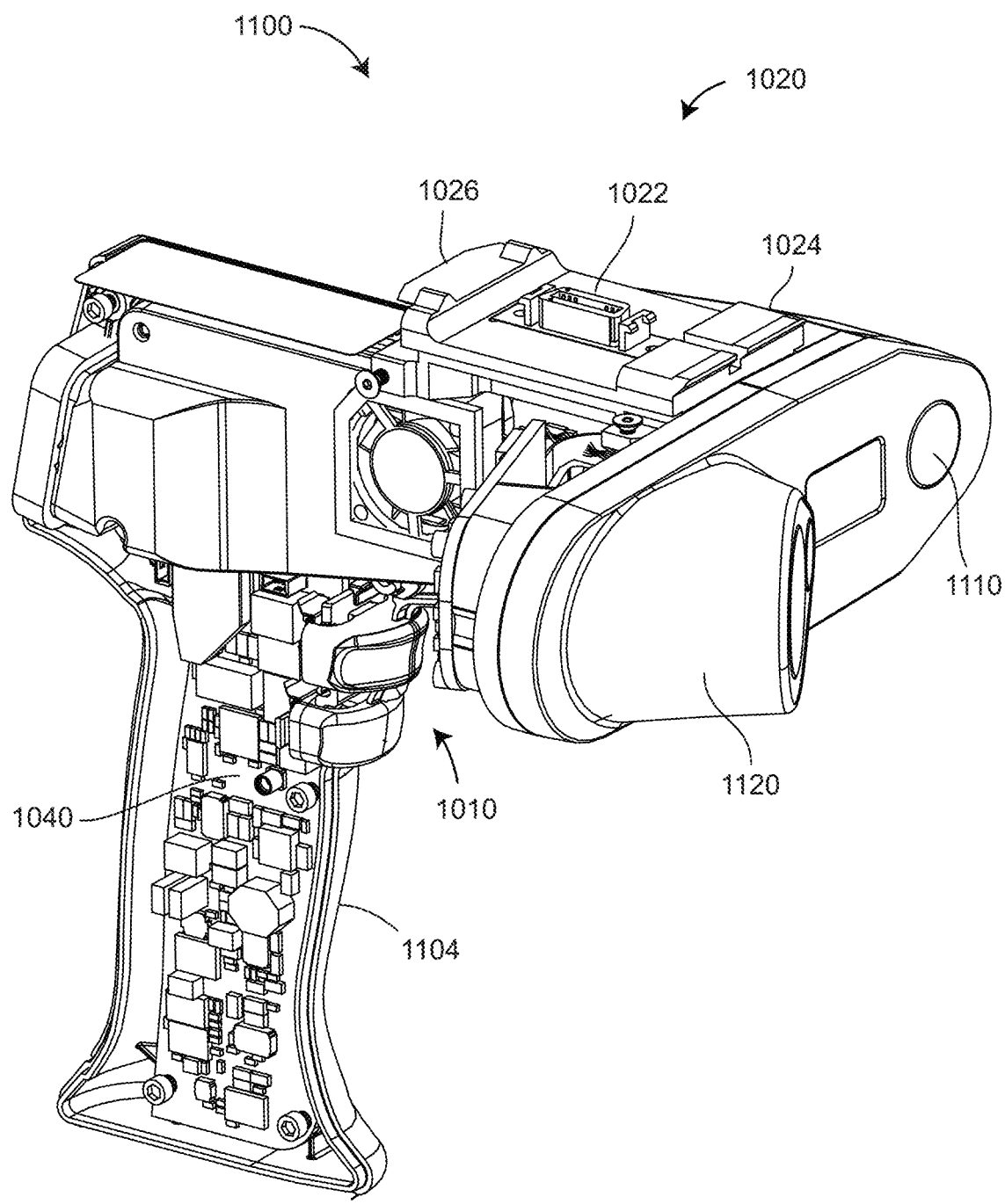

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2) and the second bus 2184 of the sixth-axis assembly 600. An arm-to-handle connector 832 in FIG. 5, and further shown in FIGS. 18B, 19H, connects to a handle-to-arm connector 1022 (FIG. 18D) of an accessory such as an LLP 1100 as shown in FIGS. 24A, 24B or to a handle 1000 as shown in in FIGS. 18A, 18C, 18D, 18E. FIG. 5 includes a probe interface board 780, further illustrated in FIGS. 19C, 19F, 20A, 21A, 21B. The probe interface board 780 is configured to make electrical contact with removable tactile probes, as discussed further herein below. The probe interface board 780 communicates bidirectionally with the arm-end processor 2220 through an I2C bus. When a touch-trigger probe assembly 960 (FIG. 22D) is attached, the probe interface board 780 further sends trigger signals from the probe interface board 780 to the arm-end processor 2220.

Figure 19E:
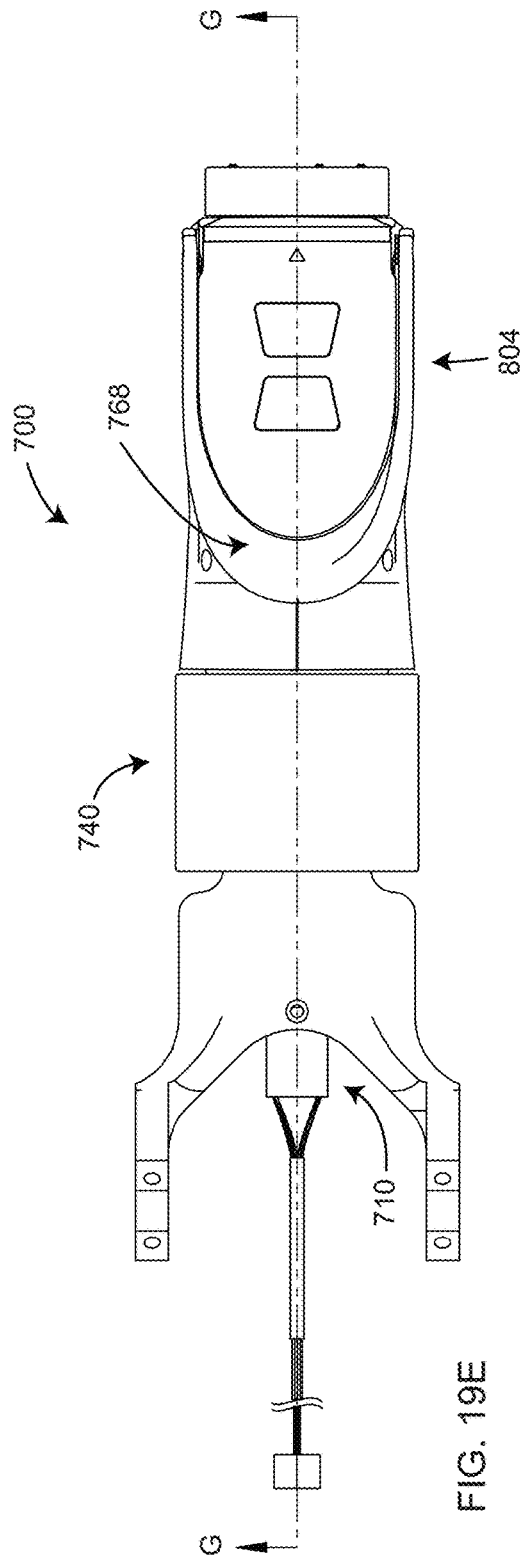
FIGS. 19E, 19F are top and section views of a seventh-axis assembly according to an embodiment of the present disclosure.
Figure 19F:
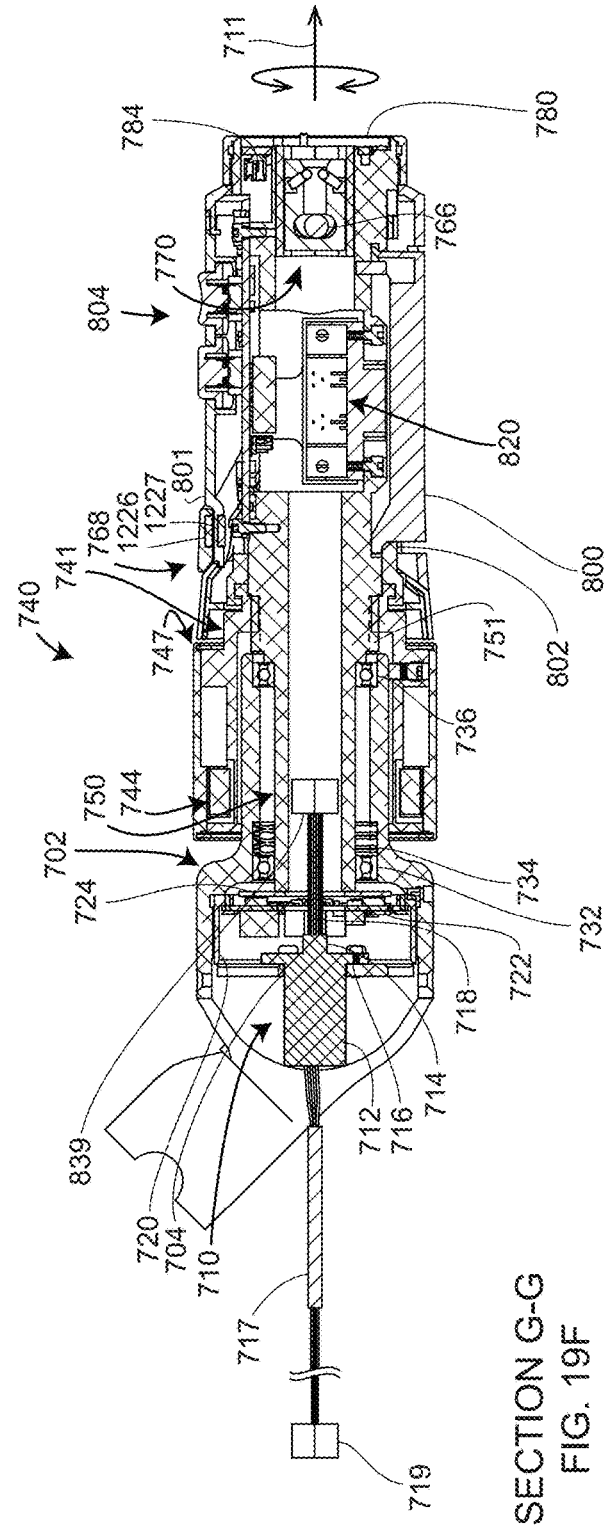
Figure 19G:
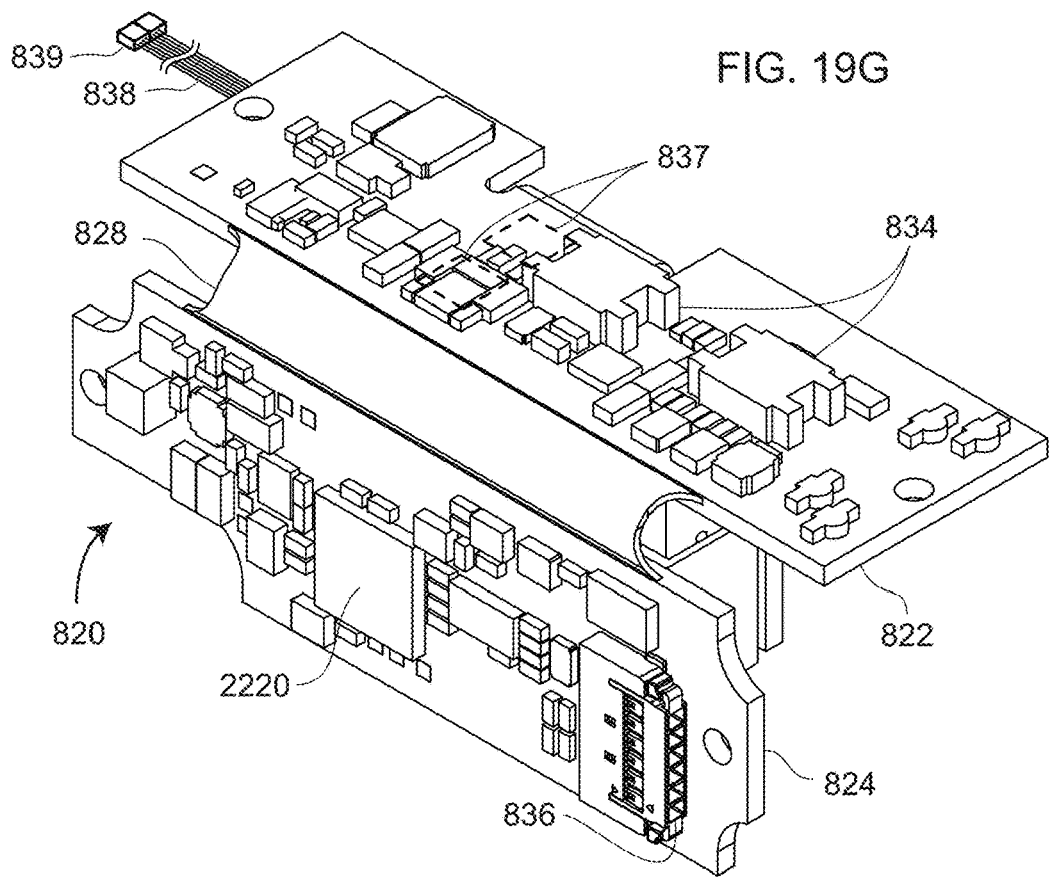
FIGS. 19G, 19H are first and second isometric views of a seventh-axis circuit board according to an embodiment of the present disclosure.

In an embodiment, the seven-axis arm-end electronics 2210 includes an arm-end processor 2220 as shown in FIGS. 5 and 19G. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service.

Figure 25A:
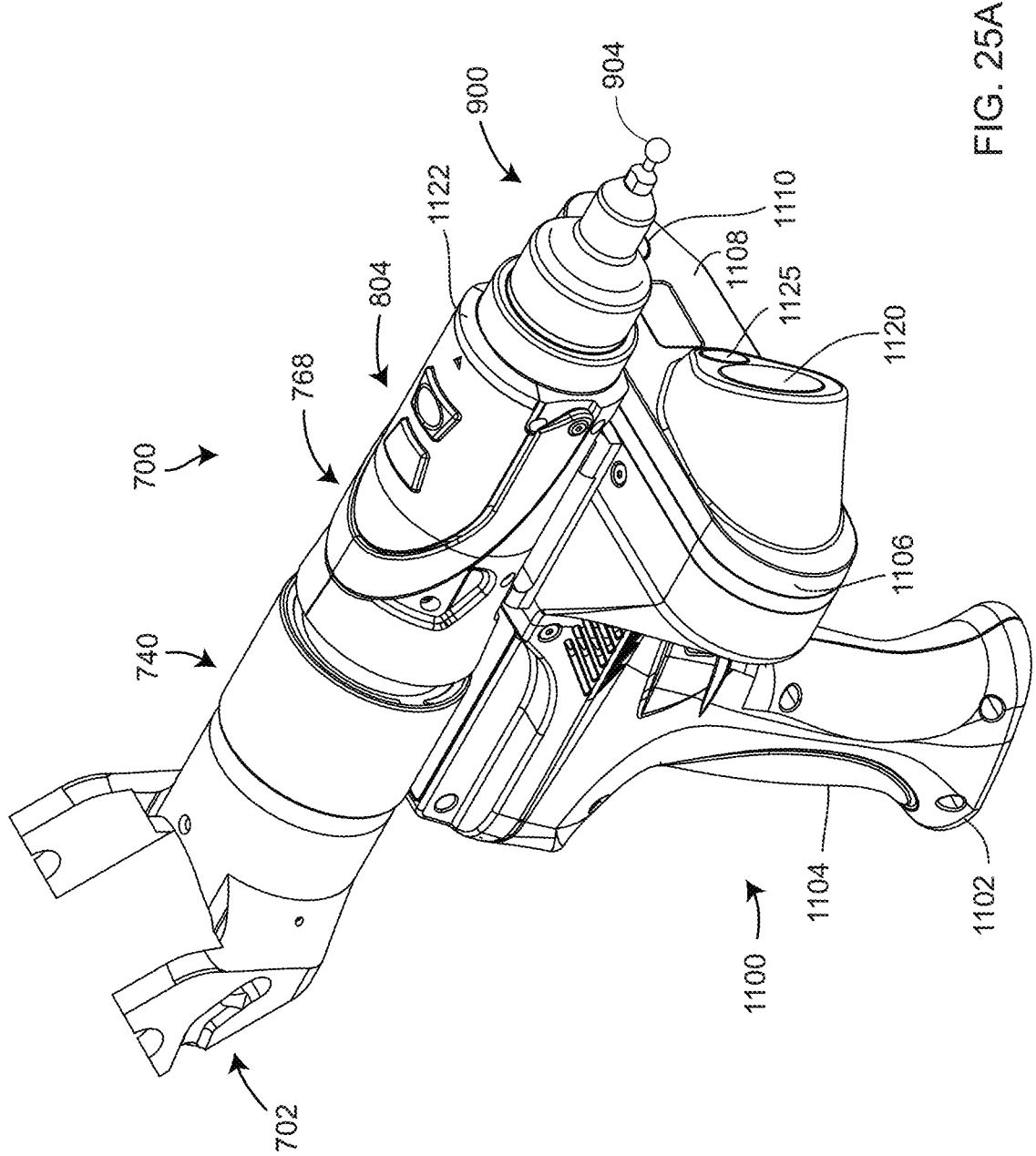
FIGS. 25A, 25B are isometric and front views, respectively, of a seventh-axis assembly attached to an LLP according to an embodiment of the present disclosure.

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser 1122 and another color from a lower light diffuser of an end-effector assembly 1200, as shown in FIG. 25A.

In an embodiment, the arm-end processor 2220 also communicates with a temperature sensor interface 2234 over an I2C bus. The temperature sensor interface provides a measured temperature that may be used to compensate for thermal expansion of elements attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. Besides sending bus power to the LLP 1100 or other accessory device, the arm-to-handle connector 832 also transfers high-speed data from accessories such as the LLP 1100 over the second bus 2184 (FIG. 4A, 4B) to the first base processor 2042. In an embodiment, actuator or button presses may result in signals being transmitted the arm-to-handle connector 832 to the arm-end processor 2220 in response to pressing of a handle button 1010 shown in FIGS. 18A, 18E, 24A, 24B. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases, an accessory may send a trigger signal to the arm-end processor 2220. An accessory device may also send a presence/ID signal indicating its presence and identity (e.g a serial number, MAC address or other identifying pattern, text or code) in the system.

FIGS. 6A, 6B show some elements of the lower arm. The mounting device 15 provides a way of a attaching the AACMM 10 to a mounting ring as discussed further herein below in relation to FIG. 7J. The shock-absorber bumper 110 provides a way to cushion a potential drop of the AACMM 10 when affixing the arm to a mounting ring, as discussed herein below in relation to FIGS. 7E, 7F, 7G, 7H. The base 20 includes elements shown in FIGS. 6A, 6B such as a base cover 22, a control panel 30, a battery access 40, and a port panel 50, as well as mechanical elements shown in later figures, as discussed herein below. The control panel 30 includes the on-off button 32, the Wi-Fi button 34, the Bluetooth™ button 36, the first-battery indicator light 38, and the second-battery indicator light 39. The battery access 40 includes the first battery door 42, the first battery-door latch 43, the first battery-door hinge 44, the second battery door 46, the second battery-door latch 47, and the second battery-door hinge 48. The port panel 50 includes an Ethernet port 52, a USB data-transfer port 54, a USB charging port 55, an auxiliary port 56, and a power supply port 58.

The first-axis assembly 100 is shown in FIGS. 6A, 6B, 7A, 7B, 7C, 7D. The first-axis assembly 100 includes a first-axis cartridge 130 and a first-axis yoke structure 194. The handle 125 and the shock-absorber bumper 110 are coupled to the first-axis assembly 100. As shown in FIGS. 8A, 8B, 8C, in the first-axis cartridge 130, a first-axis shaft 158 rotates about a first axis 131 relative to a first-axis housing 144. As shown in FIGS. 9A, 9B, with continuing reference to FIG. 8C, the first-axis cartridge 130 includes an encoder board with read heads 132, a read-head plate 134, an encoder disk 136, a lower bearing 138, a preload bearing spacer 140, a wave washer 142, a first-axis housing 144, an upper bearing 150, and a first-axis shaft 158. The first-axis housing 144 includes a lower or third lip 145 against which the wave washer 142 is placed.

In an embodiment, in a first manufacturing step the upper bearing 150 is held in place between a fifth lip 151 of the first-axis shaft 158 and a fourth lip 149 of the first-axis housing 144. The wave washer 142 is benched against the third lip 145 and brought into contact with the preload bearing spacer 140, which is brought into contact with an outer race of the lower bearing 138. In an embodiment, in a second manufacturing step, the first-axis shaft 158 is press fit against the lower bearing 138 until a bottom of the lower bearing lies on a plane of the second lip 143. A press fit, also known as an interference fit or a friction fit, is a fastening between two parts obtained by pressing the parts together under conditions in which there is a slight interference between the parts, resulting in friction that holds the parts tightly in place. The wave washer 142 and preload bearing spacer 140 press downward on the outer race of the lower bearing 138, which in turn presses down on the ball in the lower bearing. In response, the inner race presses upward on the ball in the lower bearing 138. The lower bearing 138 when subjected to such forces is said to be preloaded, a condition that improves the performance of the bearing. Advantages obtained by preloading a bearing include increased bearing rigidity and better consistency in angular movements.

In an embodiment, the spring force from the wave washer 142 further presses the third lip 145 upward, causing the fourth lip 149 to press upward on an outer race of the upper bearing 150 and, in reaction, causing the fifth lip 151 to press downward on the inner race of the upper bearing 150. Hence preload is also applied to the upper bearing 150. In an embodiment, the lower bearing 138 and the upper bearing 150 are deep groove ball bearings. In another embodiment, the lower bearing 138 and the upper bearing 150 are angular contact ball bearings. In other embodiments, other types of bearings are used.

In an embodiment, with the first-axis shaft 158 press fit in place, glue is applied to the glue grooves 159 of the first-axis shaft 158 and the encoder disk 136 is adjusted in place and allowed to cure. Screws 133 attach the encoder board with read heads 132 to the read-head plate 134, which is benched against the first lip 141 of the first-axis housing 144.

In an embodiment, a brush assembly 152 includes a carbon brush 153, a brush spring 154, and a set screw 155. The brush assembly is inserted through the first-axis housing 144, enabling the carbon brush to electrically ground the upper bearing, which can otherwise generate static electricity during rotation. Hence, use of the brush assembly 152 improves electrical reliability.

Figure 8D:
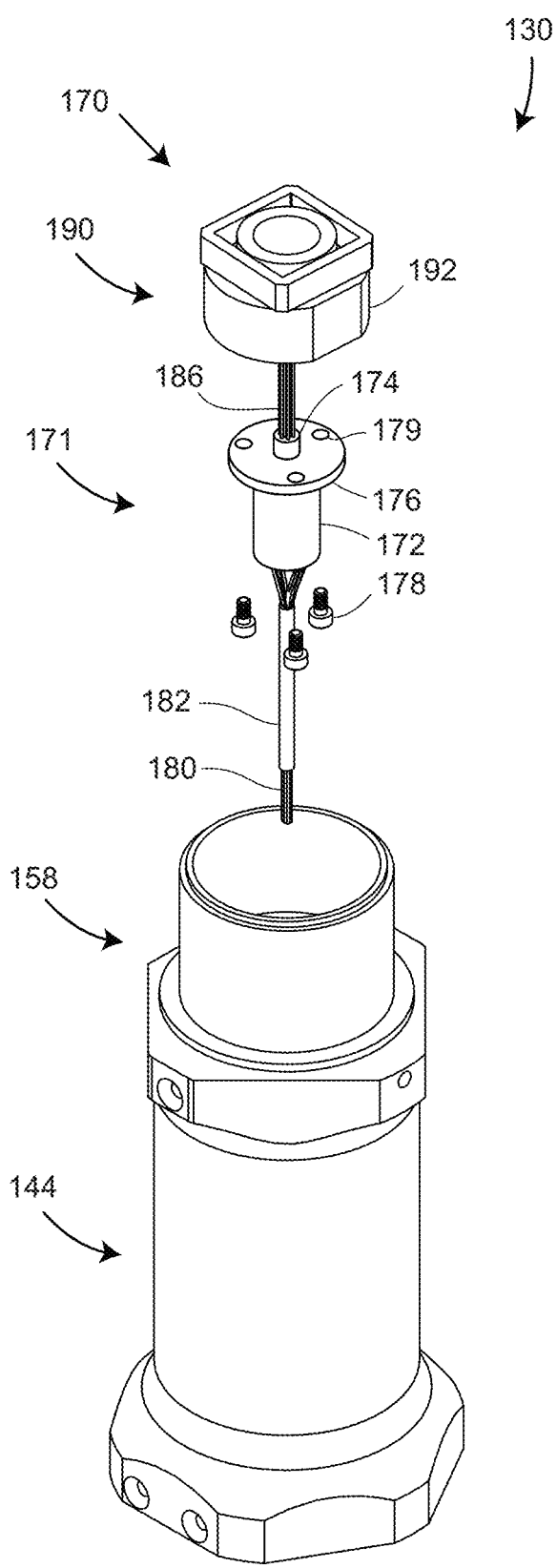
Figure 9A:
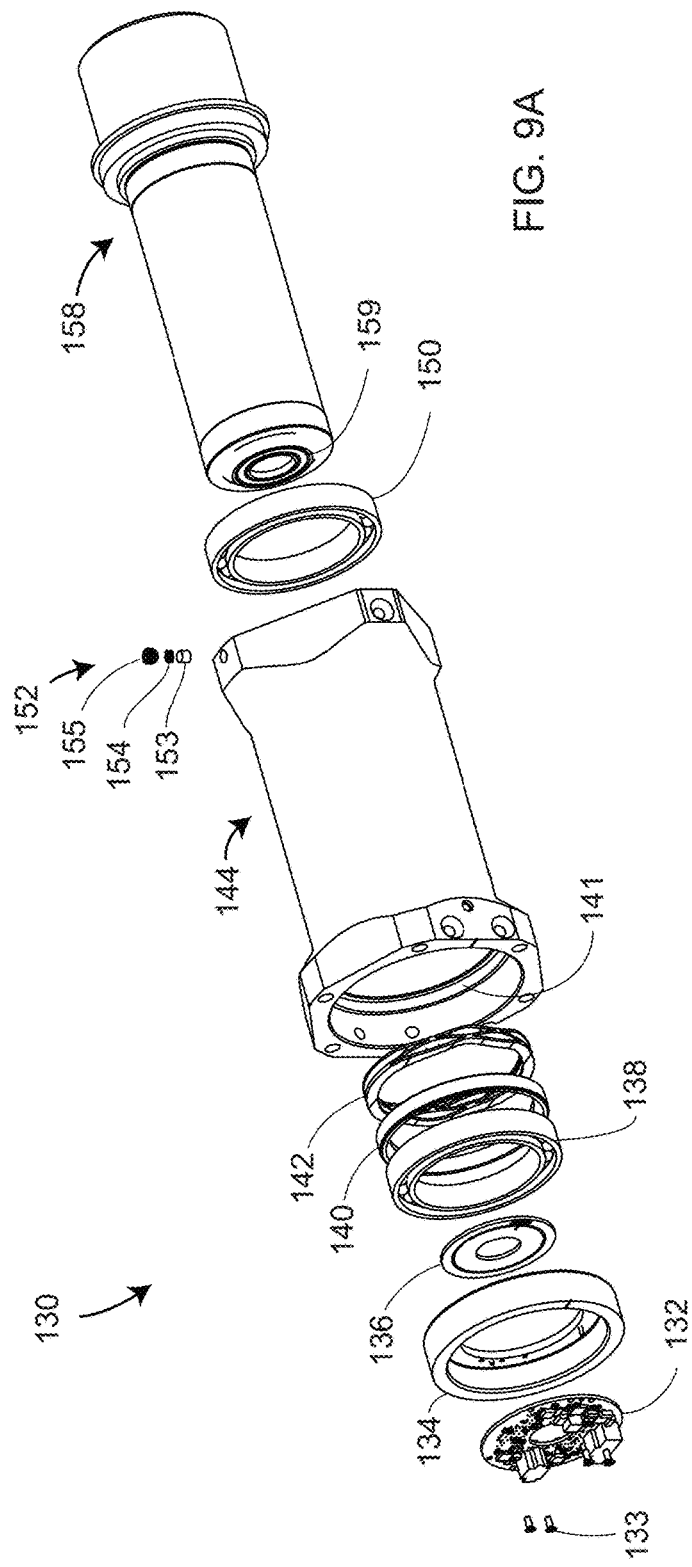
FIGS. 9A, 9B are exploded and isometric views of the first-axis cartridge according to an embodiment of the present disclosure.
Figure 9B:
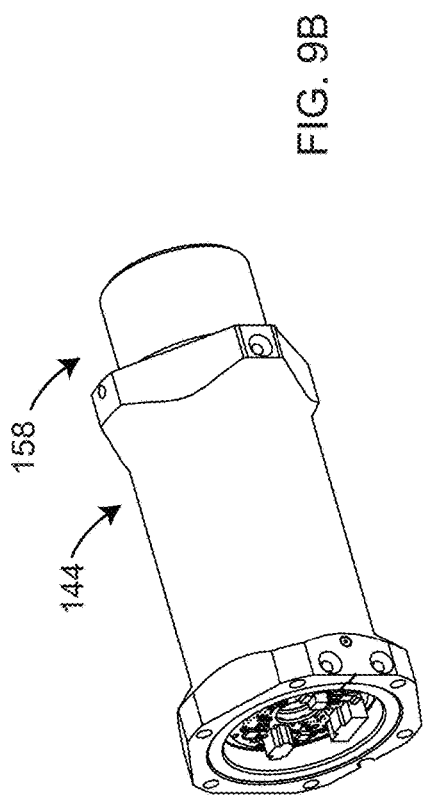

In an embodiment illustrated in FIGS. 8C, 8D, the first-axis cartridge 130 further includes an electrical transfer assembly 170. The electrical transfer assembly 170 includes a first-axis slip ring 171, a slip-ring adapter 190, and cable elements. Cable elements include bus connectors 184A, 184B, first cable wires 180, and a cable jacket 182. The first-axis slip ring 171 includes a slip-ring housing 172, a slip-ring flange 176, slip-ring holes 179, and slip-ring screws 178. In an embodiment, the slip-ring adapter 190 screws onto the first-axis shaft 158 in a threaded portion 192. First-axis slip-ring screws 178 extend through slip-ring holes 179 of the slip-ring flange 176 to attach the first-axis slip ring 171 to the slip-ring adapter 190. The slip-ring flange 176 and the slip-ring housing 172 turn together, but the slip-ring shaft 174 turns independently of the slip-ring housing. Furthermore, first cable wires 180, which enter the slip-ring housing 172, turn with the slip-ring housing 172, while the second cable wires 186, which enter the slip-ring shaft 174, turn with the slip-ring shaft 174. In an embodiment, electrically contacting brushes keep electrical continuity among first cable wires 180 and second cable wires 186 even as the slip-ring shaft 174 rotates relative to the slip-ring housing 172. In an embodiment, the slip-ring shaft 174 does not rotate relative to the slip-ring housing 172 until the second cable wires 186 become twisted enough to apply a restoring torque to the slip-ring shaft 174.

Figure 7B:
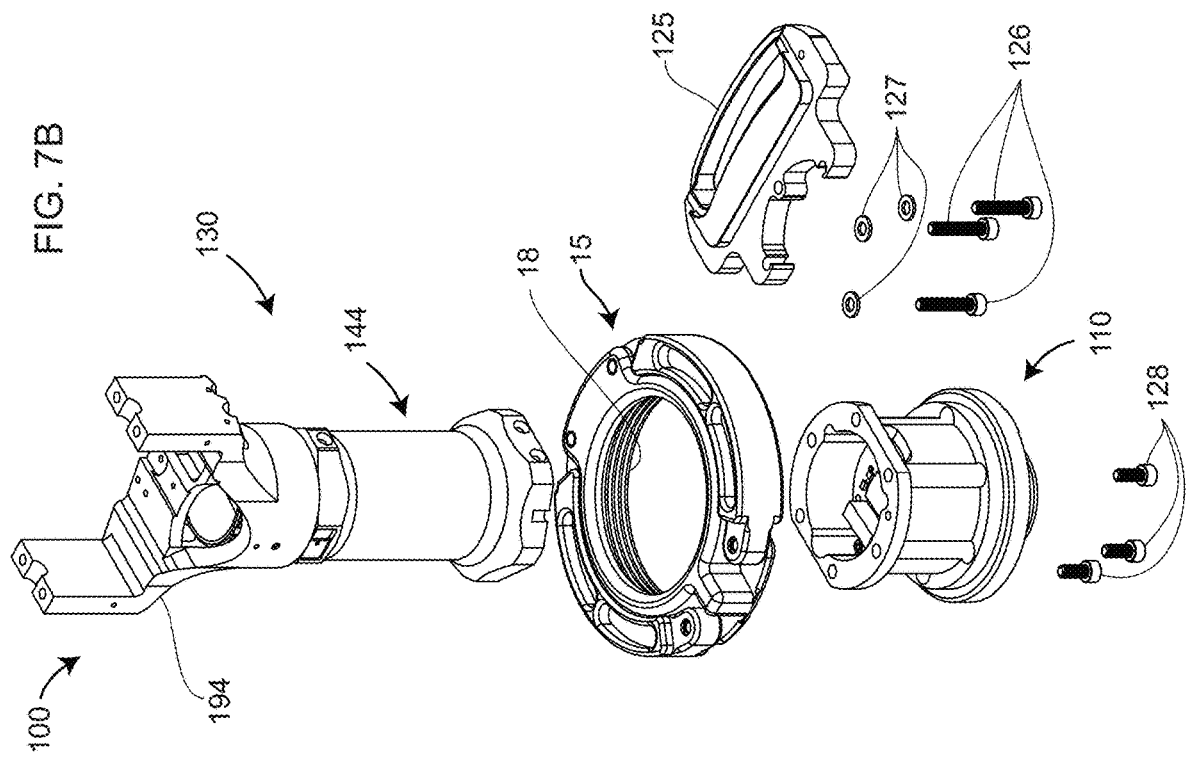
FIGS. 7A, 7B are isometric and exploded views, respectively, of a first-axis assembly and a mounting device according to an embodiment of the present disclosure.
Figure 7A:
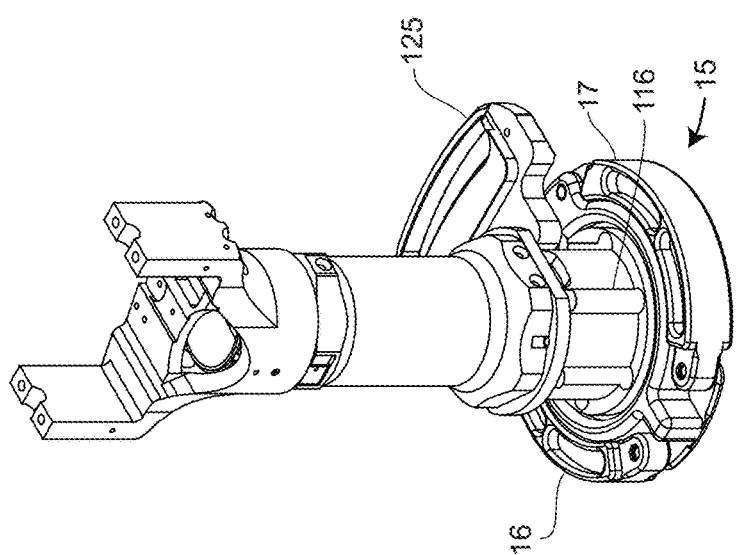
Figure 7D:
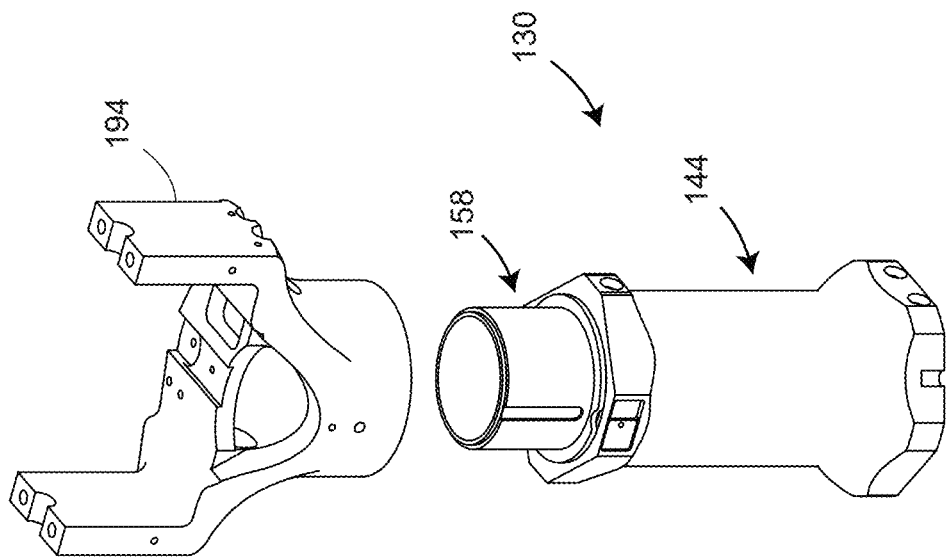
FIGS. 7C, 7D are isometric and exploded views, respectively, of a first-axis cartridge and a first-axis yoke structure according to an embodiment of the present disclosure.
Figure 7C:
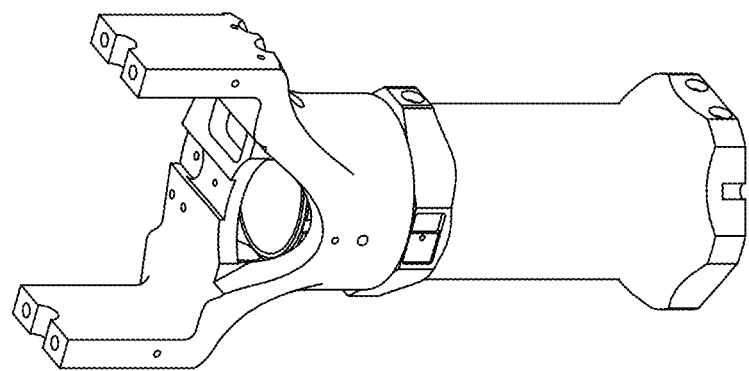
Figure 7F:
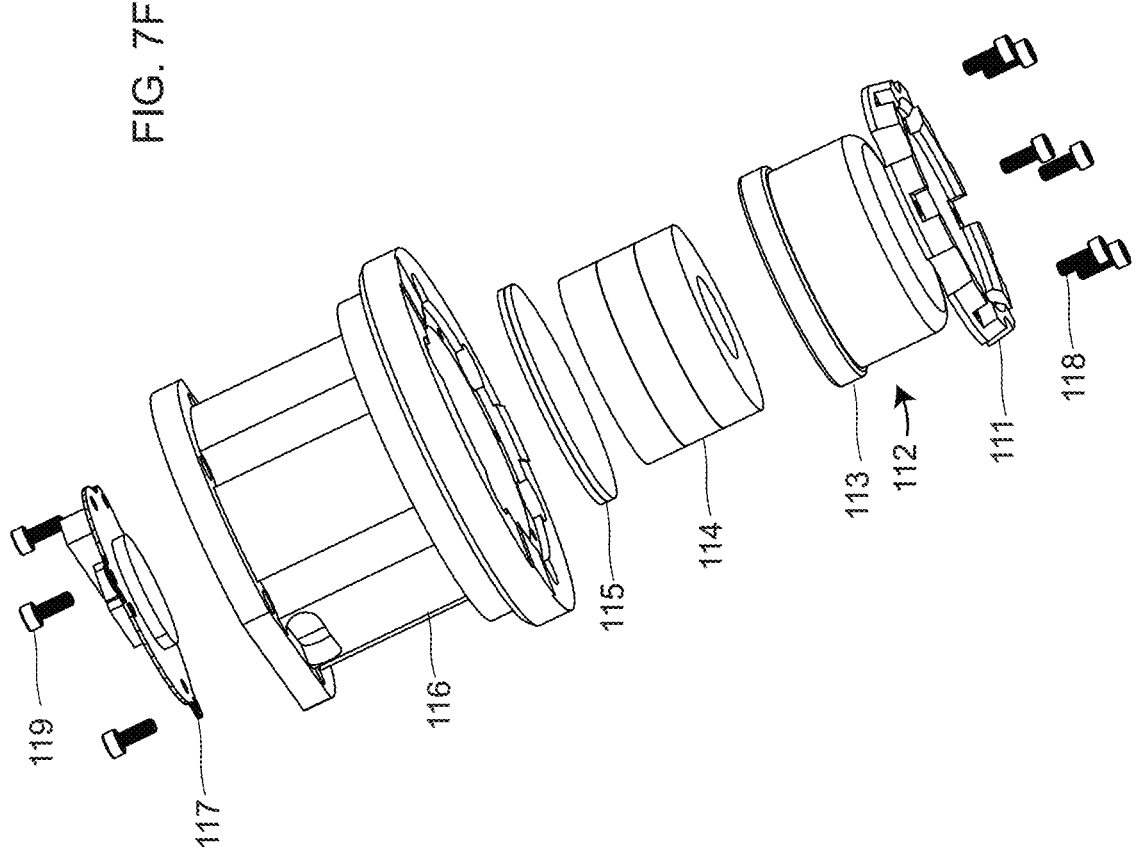
FIGS. 7E, 7F, 7G, 7H are isometric, exploded, front, and cross-sectional views, respectively, of a shock-absorber bumper according to an embodiment of the present disclosure.
Figure 7E:
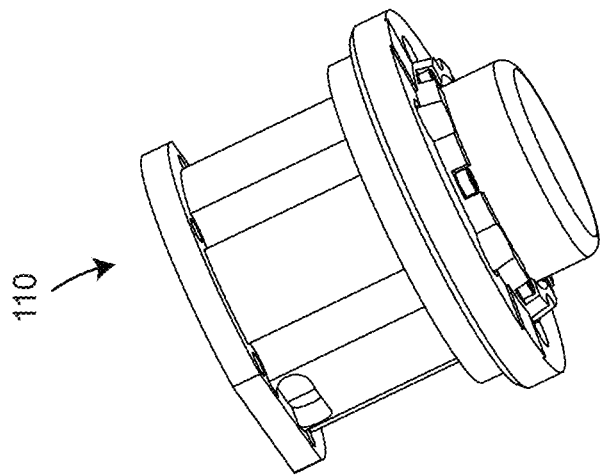
Figure 7H:
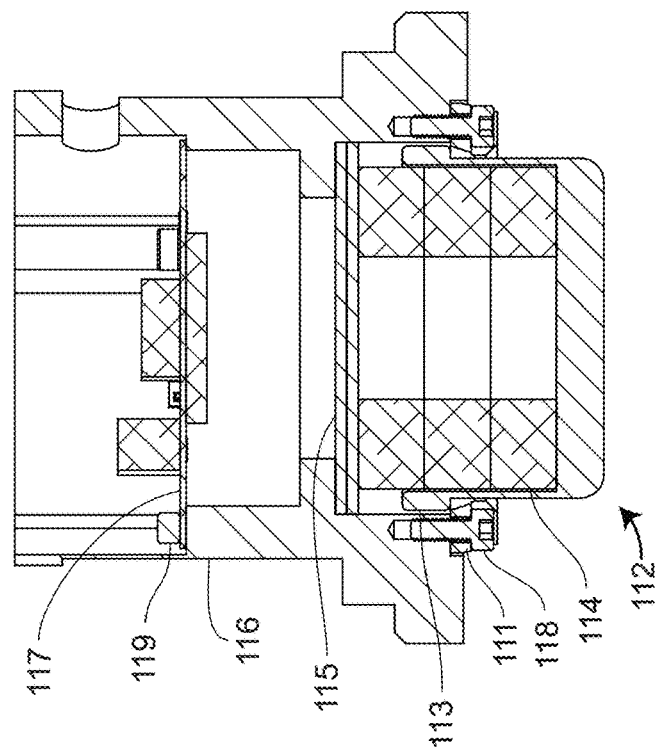
Figure 7G:
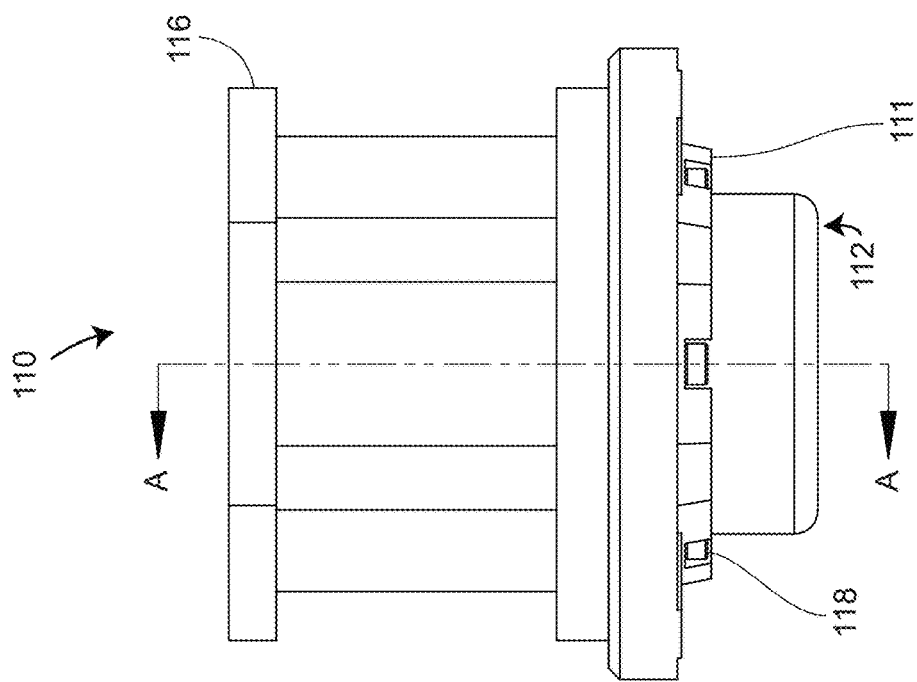

In an embodiment illustrated in FIGS. 7A, 7B, the first-axis assembly 100 includes the first-axis cartridge 130, the first-axis yoke structure 194, the shock-absorber bumper 110, the handle 125, screws 126, 128, and washers 127. Optionally or alternatively, the first-axis assembly 100 may be used in conjunction with the mounting device 15. In an embodiment, the three short base screws 128 attach one side of the shock-absorber bumper 110 to a bottom of the first-axis housing 144, while the three long base screws 126 and corresponding washers 127 attach the handle 125 and the shock-absorber bumper 110 to the bottom of the first-axis housing 144. In an embodiment, the mounting device 15 sits loosely on the shock-absorber bumper 110 until it is tightened onto a mounting ring as described further herein below.

FIGS. 7E, 7F, 7G, 7H illustrate the shock-absorber bumper 110, which includes lower screws 118, a guiding retainer ring 111, a bell 112, a damper 114, a preload spacer 115, a base nut retainer 116, a tilt board 117, and upper screws 119. The bell further includes a bell lip 113. The damper 114 sits in the bell 112, which rests on the guiding retainer ring 111, which is screwed onto a bottom of the base nut retainer 116. The preload spacer 115 sits atop the damper 114 and makes contact with the base nut retainer 116, as shown in the section view of FIG. 7H. Upper screws 119 attach the tilt board 117 to the base nut retainer 116. The damper 114 is made of compressible material so that the bell 112 deflects or compresses upward when a force is applied to a bottom of the bell 112. The purpose of the shock-absorber bumper 110 is to reduce mechanical shock to the AACMM 10 that may occur if the AACMM 10 suddenly drops when being mounted to a table, stand, or similar structure.

Figure 7J:
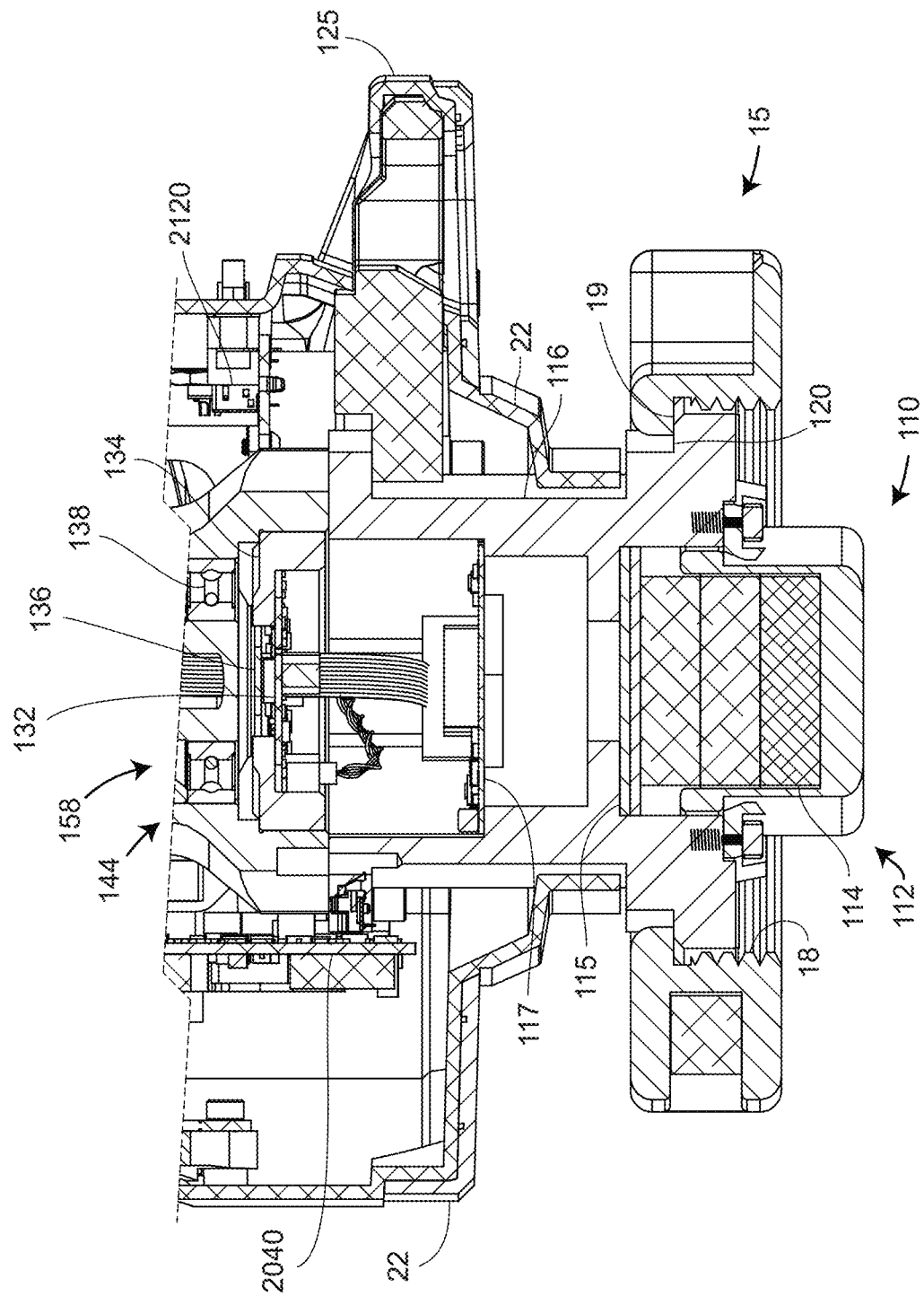
FIG. 7J is a cross-sectional view of a lower portion of the articulated-arm base and the mounting device according to an embodiment of the present disclosure.

Advantages provided by the shock-absorber bumper 110 may be understood by referring to FIG. 7J, which shows the shock-absorber bumper 110, the first-axis housing 144, the base cover 22, the handle 125, the base processor electronics 2040, the rear connector interface 2120, and the tilt board 117. Also shown in FIG. 7J and FIG. 7A are the mounting device 15, which includes screw threads 18, a mounting device lip 19, a first wing 16, and a second wing 17. The mounting device 15 is described in U.S. Pat. No. 8,028,432, the contents of which are incorporated by reference herein.

In an embodiment, an externally threaded mounting ring (not shown) is attached to a mounting surface such as an instrument stand, tripod, or table. In an embodiment, internal screw threads 18 of the mounting device 15 engage the external screw threads of the mounting ring. As the screw threads are tightened, a mounting device lip 19 is drawn into firm contact with a base-nut retainer shelf 120 of the mounting device 15. In this way, the AACMM 10 is locked firmly in place. Advantageously, the screw threads on the mounting device may be temporarily loosened to allow the base 20 of the AACMM 10 to be turned to different direction before being retightened.

Initially, when the base 20 of the AACMM 10 is being positioned by the user on the mounting ring, the bottom of the AACMM 10 may not be centered on the mounting ring. As a result, when the AACMM 10 is centered on the ring, the AACMM 10 may drop suddenly, shocking the mechanical elements within the AACMM 10. The shock-absorber bumper 110 reduces or minimizes the risk of damage to the AACMM 10 by catching the mounting surface with the bottom of the bell 112 and slowing the descent of the AACMM 10 as the damper 114 compresses. In other embodiments, the mounting device 15 is attached to threads not included on a mounting ring. In still other embodiments, the AACMM 10 is attached to a mounting without use of the mounting device 15. In this embodiment, the shock-absorber bumper may provide protection against rapid falls of and shocks to the AACMM 10.

A portable articulated arm coordinate measuring machine (AACMM), comprising: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a shock-absorber assembly coupled to a lower portion of the AACMM, the shock-absorber assembly operable to reduce mechanical shock to the AACMM when the AACMM is brought into contact with a support element; and a processor operable to determine three-dimensional (3D) coordinates of a point measured by the measurement device based at least in part on the provided data corresponding to the position of the measurement device.

In an embodiment, the shock-absorber assembly includes a retractable surface that, when brought into contact with the support element, retracts toward an interior of the shock-absorber assembly through compression of a damper material.

Figure 10:
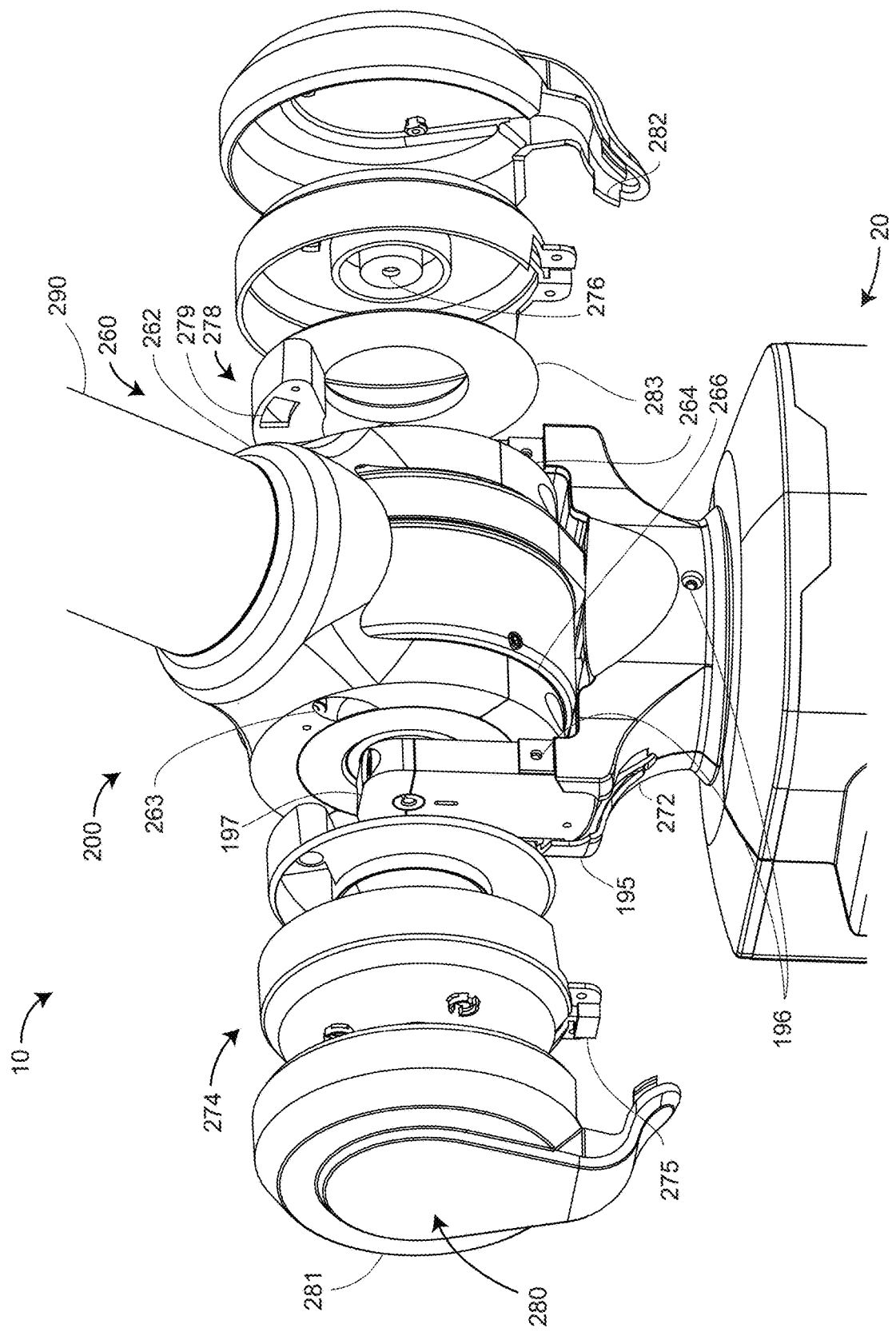
FIG. 10 is an exploded view of a lower portion of the AACMM according to an embodiment of the present disclosure.
Figure 11:
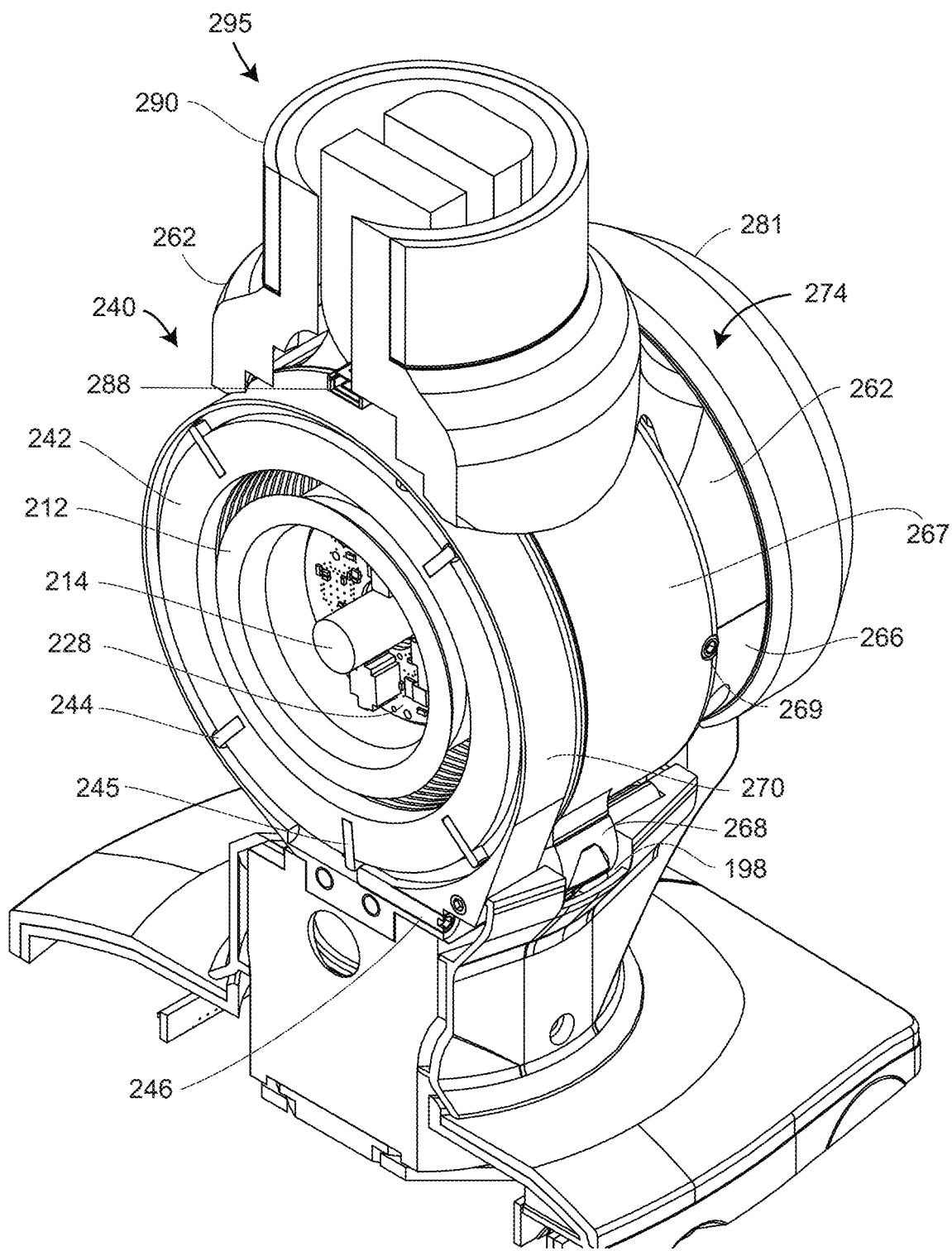
FIG. 11 is a partial isometric view of a second axis/counterbalance assembly and surrounding components according to an embodiment of the present disclosure.
Figure 12:
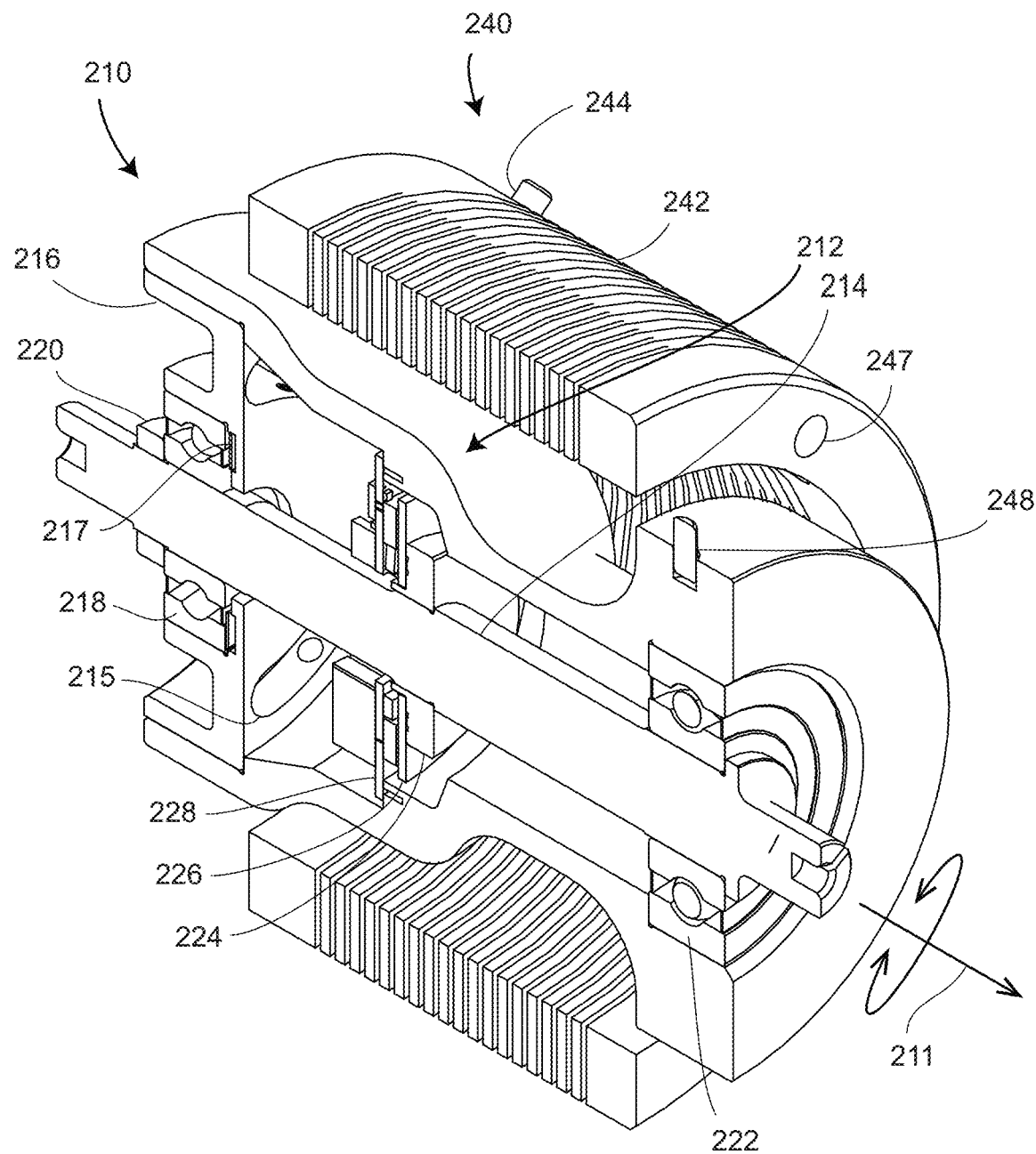
FIG. 12 is a partial section view of a second-axis cartridge and counterbalance ring according to an embodiment of the present disclosure.
Figure 13:
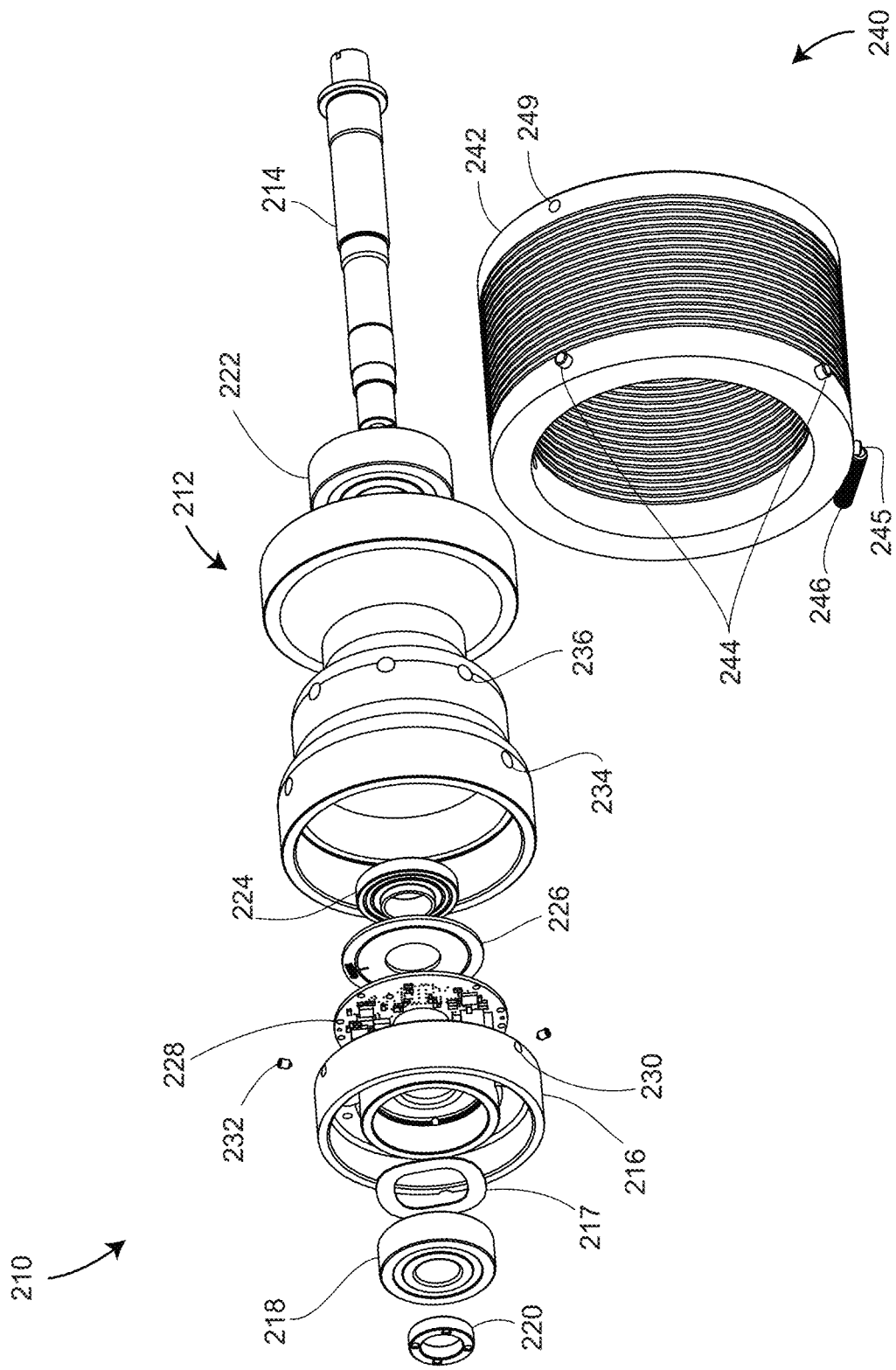
FIG. 13 is an exploded view of the second-axis cartridge and counterbalance ring according to an embodiment of the present disclosure.

FIGS. 6A, 6B, 10, 11 show some external elements of the second-axis assembly 200, including first-segment yoke 260, second-axis cap 280, cable cover 274, and cable-track 278. The first-segment yoke 260 includes first-segment yoke beam 262, first-segment-yoke right bow 264, and first-segment-yoke left bow 266. FIGS. 12, 13 show some internal elements of the second-axis assembly 200, including the second-axis cartridge 210 and the counterbalance ring 240. In an embodiment, the second-axis assembly 200 provides a hinge-type rotation about a second axis 211. In an embodiment, the second-axis assembly 200 also includes the counterbalance ring 240 that provides a torque that lightens the downward force on arm segments held by an operator, thereby making it easier for an operator to support and maneuver the AACMM 10 in making measurements.

In an embodiment, the second-axis cartridge 210 includes a second-axis shaft 214, a left second-axis bearing 222, a second-axis housing 212, a second-axis disk mount 224, an encoder disk 226, an encoder board with read heads 228, a cartridge inner plate 216, a wave washer 217, a right second-axis bearing 218, and a lock nut 220. In an embodiment, the left second-axis bearing 222 is press fit onto both the second-axis shaft 214 and the second-axis housing 212. In an embodiment, the cartridge inner plate 216 is press fit to the second axis housing, and the inner race of the right second-axis bearing 218 is press fit onto the second-axis shaft 214. The wave washer 217 applies force to the outer race of the right second-axis bearing 218 but not to the inner race. The inner race of the right second-axis bearing is held in place with the lock nut 220. In an embodiment, the force applied by the wave washer 217 pushes the outer race of the right second-axis bearing 218 against a ball in the right second-axis bearing 218, with a corresponding and oppositely directed force between applied to the ball by the inner race. The distance between the inner race of the right second-axis bearing 218 and the inner race of the left second-axis bearing 222 is set so that upon tightening the lock nut 220 into position, the inner race of left second-axis bearing 222 pulls inward on the shaft, with an oppositely directed force applied to the ball by the outer race. The result of the application of these forces is a preloading similar to preloading of the bearings in the first-axis cartridge 130. Bearing lock set screws 232 are passed through outer access holes 234 and inner access holes 230, where the inner access holes 230 penetrate both cylindrical portions of the cartridge inner plate 216, enabling the bearing lock set screws 232 to hold rigidly fix the position of the outer race of the right second-axis bearing 218. Although the wave washer 217 applies a force to the outer race that establishes preload of the bearings in the second-axis cartridge 210, the wave washer 217 may be subject to vibration when the AACMM 10 is in use. Hence the bearing lock set screws provides a more stable locking into position of the outer race of the right second-axis bearing 218. In an embodiment, epoxy is further applied to the outer race to hold it in place.

In an embodiment, the second-axis disk mount 224 is press fit onto the second-axis shaft 214. The encoder disk 226 is glued and centered on the second axis 211 and allowed to cure. The encoder board with read heads 228 is centered on the encoder disk and affixed to the second-axis housing 212. In an embodiment, disk centering holes 236 in the second-axis housing 212 are used to assist in centering the encoder disk on the rotating second-axis shaft 214. A tool inserted through the disk centering holes 236 is used to move or nudge the encoder disk 226 in a direction to center it on the shaft. In an embodiment, the centering procedure is performed while slowly rotating the second-axis shaft 214 on a rotation fixture used in a manufacturing process. As the encoder disk 226 is slowly rotated, electrical signals generated by the rotation fixture indicate a direction in which the encoder disk 226 should be moved or nudged to center the encoder disk 226 on the second-axis shaft 214.

A wire-routing slot 215 (FIG. 12) is cut into the cartridge inner plate 216 to pass the busses 2182, 2184 through the second-axis cartridge 210. An anti-rotation pin 248 that is pressed into the second-axis housing 212 mates with first-segment yoke beam 262 shown in FIGS. 10, 11. The first-segment yoke beam 262 attaches to the first-segment tube 290 of the first segment 295 as further shown in FIGS. 11, 14A, 14B, 14C, 14D, 14E. Hence the second-axis housing 212 rotates together with the first segment 295. The first-segment yoke beam 262 further attaches to first-segment-yoke right bow 264 and first-segment-yoke left bow 266 as shown in FIG. 10. In an embodiment, a temperature sensor 288 is included adjacent to the first-segment yoke beam 262.

As shown in FIG. 12 and FIG. 13, the counterbalance ring 240 includes a torsion spring 242, spring retaining pins 244, threaded holes 247 to accept yoke locking screws, an anti-rotation threaded hole 249 to accept an anti-rotation set screw, and a tensioning set screw 246. Threaded holes 247 in the counterbalance ring 240 attach with yoke locking screws to holes 265 in first-segment yoke beam 262 shown in FIG. 14D. Likewise, the anti-rotation threaded hole 249 receives an anti-rotation set screw 269 to fix one side of the torsion spring 242 to a counterbalance ring cylinder 267 as shown in FIG. 11. Hence, the side of the torsion spring that includes the threaded hole 247 and the anti-rotation threaded hole 249 turns along with the first segment yoke beam and the first segment 295.

In contrast, the other side of the torsion spring is fixed to a spring tension plate 270 attached rigidly to the base 20, as shown in FIG. 11. A tensioning set screw 246 in FIGS. 11, 13 is brought into contact with a spring tension pin 245. A counterbalance ring bump 268 makes contact with a first-axis yoke bumper 198 when the first segment 295 is rotated as far as possible about the second axis 211 (FIG. 12) in one direction. At this position, the amount of force exerted by one side of the torsion spring 242 relative to the other side is determined by an adjustment of the tensioning set screw 246. As the first segment 295 is rotated to bring the counterbalance ring bump 268 farther from the first-axis yoke bumper 198, the amount of force exerted by the torsion spring 242 increases. The effect of the increase in the force as the first segment 295 is moved away from a vertical orientation is to apply an increasing force to the first segment 295, with the force directed opposite the direction of gravity. In this way, the arm segments are made to feel lighter and easier to handle to the user. Spring retaining pins 244 shown in FIGS. 11, 13 keep the torsion spring 242 centered within the spring tension plate 270.

As illustrated in FIG. 10 and FIG. 11, the second-axis shaft 214 is clamped between upper prongs of the first-axis yoke structure 194 and first-axis-yoke caps 197. Hence the second-axis shaft 214 is fixed in relation to the base 20. A first-axis yoke cover 195 is placed over a lower portion of the yoke structure 194 and locked into place with screws applied to first-axis-yoke-cover screw holes 196. Placed about each side of the first-axis yoke structure 194 (FIG. 7B) are a cable-track 278, a cable cover 274, and a second-axis cap 280. The second-axis cap 280 includes a cap body 281 and a cap snap connector 282, the cap snap connector 282 attaching to a cap snap receptacle 272 of the first-axis yoke cover 195. In an embodiment, the assembly includes two opposing second-axis caps 280, each having a cap snap connector 282 that couples with a respective cap snap receptacle 272. Wires routed from the base 20 pass through an opening in the cap snap receptacle 272 and through a cable-cover pass-through 275 of the cable cover 274. The wires are channeled by a cable-track plate 283 and through a cable-track window 279 of the cable-track 278. The wires pass through a first-segment yoke cable hole 263. The wires that pass through the first-segment yoke cable hole 263 may pass directly into the first-segment tube 304:: 290 or through the wire-routing slot 215 to the encoder board connector 2174 (FIG. 3) before passing back through the wire-routing slot 215 into the first-segment tube, as shown in FIGS. 10, 14E. In an embodiment, wires of the first bus 2182 (FIG. 4A) pass through the first-segment yoke cable hole 263 on one side of the first-segment yoke beam 262 while the wires of the second bus 2184 pass through the first-segment yoke cable hole 263 on the other side. In an embodiment, the cable-track 278 and the cable cover 274 are attached to the second-axis shaft 214 with a screw that passes through a cable-cover screw hole 276. In an embodiment, each second-axis cap 280 is snapped onto a corresponding cable cover 274.

Figure 14C:
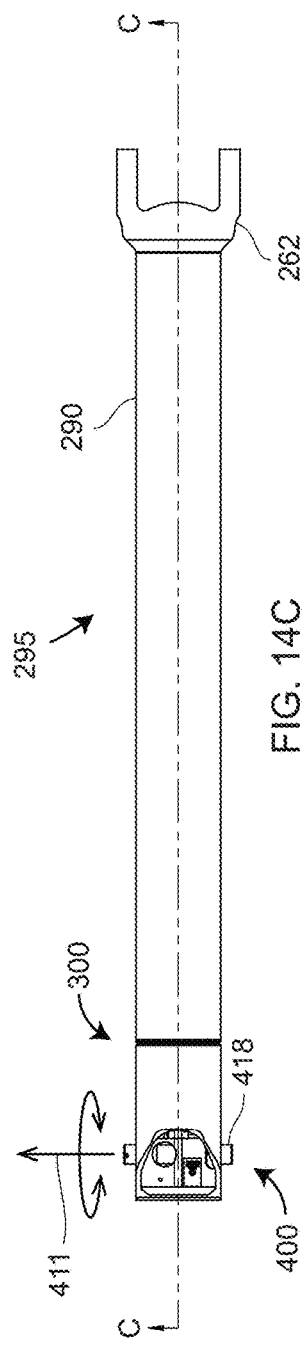
Figure 14D:
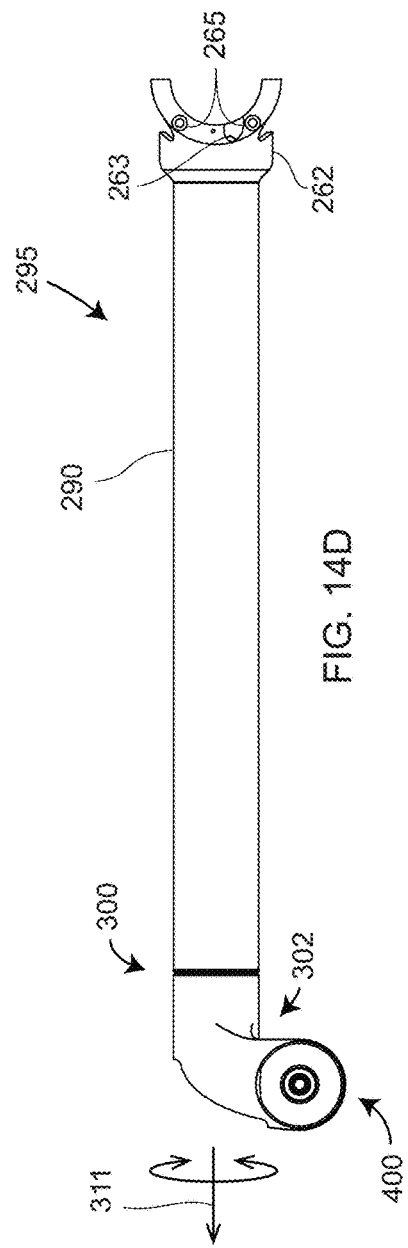
Figure 14E:
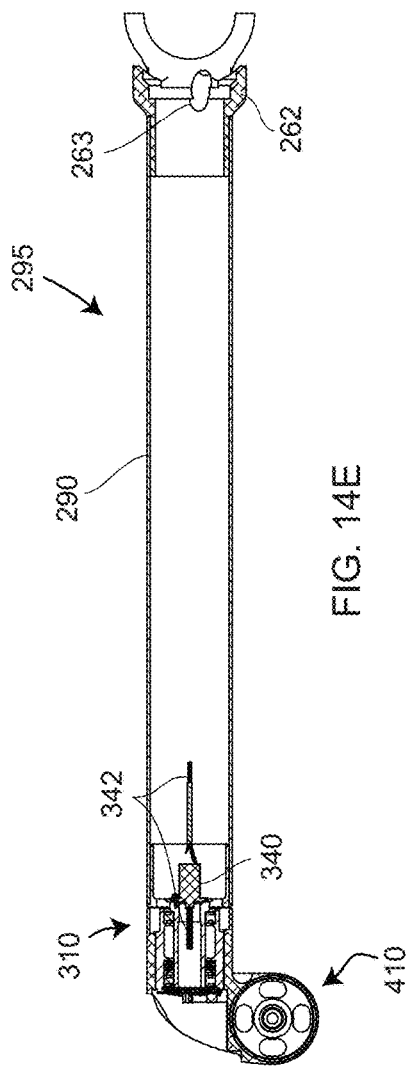

FIGS. 14A, 14B, 14C, 14D, 14E illustrate the first-segment yoke beam 262, the first segment 295, the third-axis assembly 300, and the fourth-axis assembly 400. The section view of FIG. 14E shows that the first-segment yoke beam 262 attaches inside the first-segment tube 290. FIG. 14B shows a conductive grounding ring 292 that provides grounding between the first-segment yoke beam 262 and the first-segment tube 290, thereby improving electrical reliability and performance of the AACMM 10. Likewise, a conductive grounding ring 308 provides grounding between the cartridge adapter 302 and the first-segment tube 290. In an embodiment, the first-segment tube 290 is made of a carbon-fiber composite material.

The wires of the first bus 2182 and the second bus 2184 (FIG. 4A) are routed through the first-segment yoke cable hole 263 as described herein above. The bus wires 2182, 2184 continue as cables 342 to pass through the third/fifth axis slip ring 340, which is a part of the third/fifth-axis cartridge 310. The term third/fifth axis slip ring indicates that the same slip-ring assembly 340 is used in both the third-axis assembly 300 and in the fifth-axis assembly 500 (FIG. 1A). The term third/fifth cartridge indicates that the same cartridge assembly 310 is used in both the third-axis assembly 300 and the fifth-axis assembly 500. In an embodiment, the cartridge adapter 302 may be the same component in the third-axis assembly 300 and the fourth-axis assembly 400 since these axis assemblies house the third/fifth-axis cartridge 310 and the fourth/sixth-axis cartridge 410, respectively. The third-axis assembly 300 provides rotation of the cartridge adapter 302 about a third axis 311 shown in FIG. 14D. The fourth-axis assembly 400 provides rotation of fourth/sixth-axis shaft 418 about a fourth axis 411 shown in FIG. 14C.

The third/fifth-axis cartridge 310 illustrated in FIGS. 14E, 15A, 15B, 15C, 15D includes an encoder board with read heads 326, an encoder disk 322, an upper bearing 320, a preload bearing spacer 318, a wave washer 316, a third/fifth-axis housing 312, a lower bearing 330, a third/fifth-axis shaft 332, and the third/fifth-axis slip ring 340 with cables 342. The third/fifth-axis shaft 332 rotates relative to the third/fifth-axis housing 312.

In an embodiment, the third/fifth-axis shaft 332 is press fit against an inner race of the upper bearing 320. The wave washer 316 is placed against a housing upper ledge. The preload bearing spacer 318 sits between the wave washer 316 and an outer race of the upper bearing 320. The spring action of the wave washer 316 acts to push the outer race of the upper bearing 320 against a ball in the upper bearing 320. In reaction, the inner race of the upper bearing 320 pushes oppositely against the ball in the upper bearing 320. The wave washer 316 also pushes downward on the housing lower ledge 315, thereby pushing the outer race of the lower bearing 330 against the ball in the lower bearing 330. In response, the inner bearing presses oppositely against a ball in the lower bearing 330. In this way, a preload is applied to the bearings 320, 330 in the third/fifth-axis cartridge 310. In an embodiment, the encoder disk 322 is glued to the third/fifth-axis shaft 332, centered on the third/fifth-axis shaft 332, and cured in place. The encoder board with read heads 326 is pinned in place with the pin 324.

The fourth/sixth-axis cartridge 410 illustrated in FIGS. 16A, 16B, 16C, 16D includes a fourth/sixth-axis bearing 416 located the encoder side, a fourth/sixth-axis housing 412, a fourth/sixth-axis shaft 418, an encoder disk 422, an encoder board with read heads 426, a drum flexure 428, a wave washer 430, a preload bearing spacer 432, a fourth/sixth-axis bearing 434 located on the spring side, and a protective cover 436. The fourth/sixth-axis shaft 418 rotates relative to the fourth/sixth-axis housing 412. In an embodiment, the fourth/sixth-axis cartridge 410 does not include a slip ring but rather provides routing for the wires through as described herein below with respect to FIGS. 16E, 16F, 16G, 16H. In an embodiment a slip ring is not used on those second-axis assembly 200, the fourth-axis assembly 400, or the sixth-axis assembly 600 because the total amount of rotation is limited by the hinge movement of these assemblies. In an embodiment, the cartridge 410 is sized to fit within the opening 306.

In an embodiment, with the wave washer 430 and the preload bearing spacer 432 held in place by the drum flexure 428, the inner race of the fourth/sixth-axis bearing 434 is press fit to the fourth/sixth-axis shaft 418, while the inner race of the fourth/sixth-axis bearing 416 is press fit against the fourth/sixth-axis shaft 418 and benched against the shaft first ledge 417. The force applied by the wave washer 430 and preload bearing spacer 432 pushes the outer race of the fourth/sixth-axis bearing 434 against a ball in the fourth/sixth-axis bearing 434, and a counter force presses the inner race of the fourth/sixth-axis bearing 434 in an opposing direction against the ball in the fourth/sixth-axis bearing 434. At the same time, the forces on the fourth/sixth-axis bearing 434 pull the outer race of the fourth/sixth-axis bearing 416 against a housing first ledge 414. This combination of actions provides preloads for the bearings 416, 434. In an embodiment, the encoder disk 422 is glued to the housing second ledge 424, after which it is centered on the fourth/sixth-axis shaft 418 and cured in place. In an embodiment, the encoder board with read heads 426 is attached to the fourth/sixth-axis housing 412. In an embodiment, centering of the encoder disk 422 about the fourth/sixth-axis shaft 418 is facility by moving or nudging the encoder disk with a tool placed through one or more encoder-adjustment holes 423 in the fourth/sixth-axis housing 412. In an embodiment, the encoder disk 422 is positioned adjacent ledge 420.

Figure 16C:
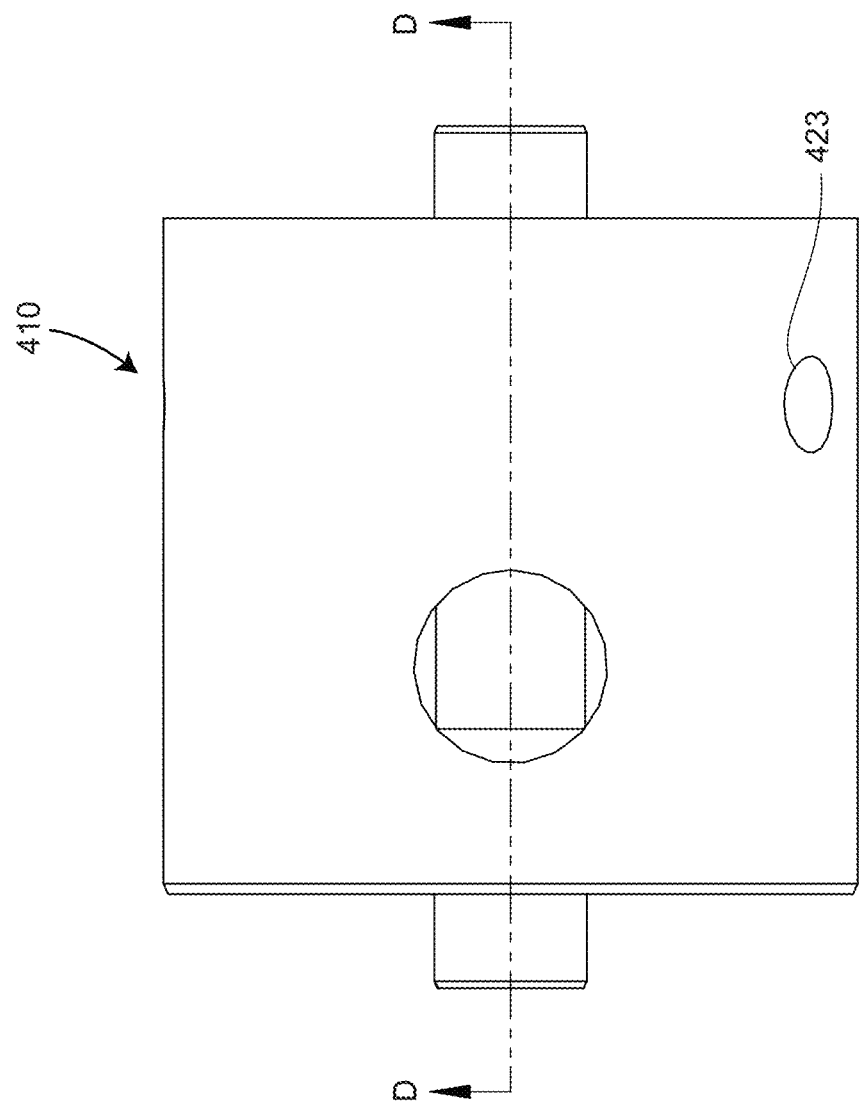
Figure 16D:
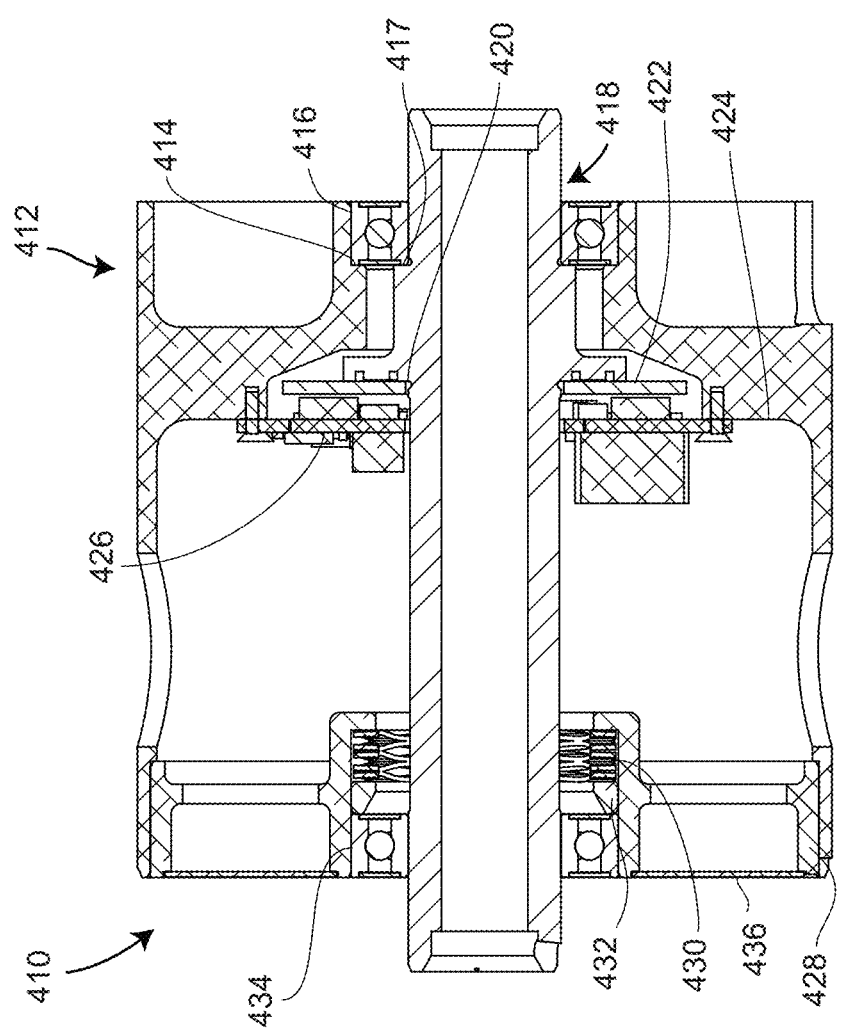
Figure 16F:
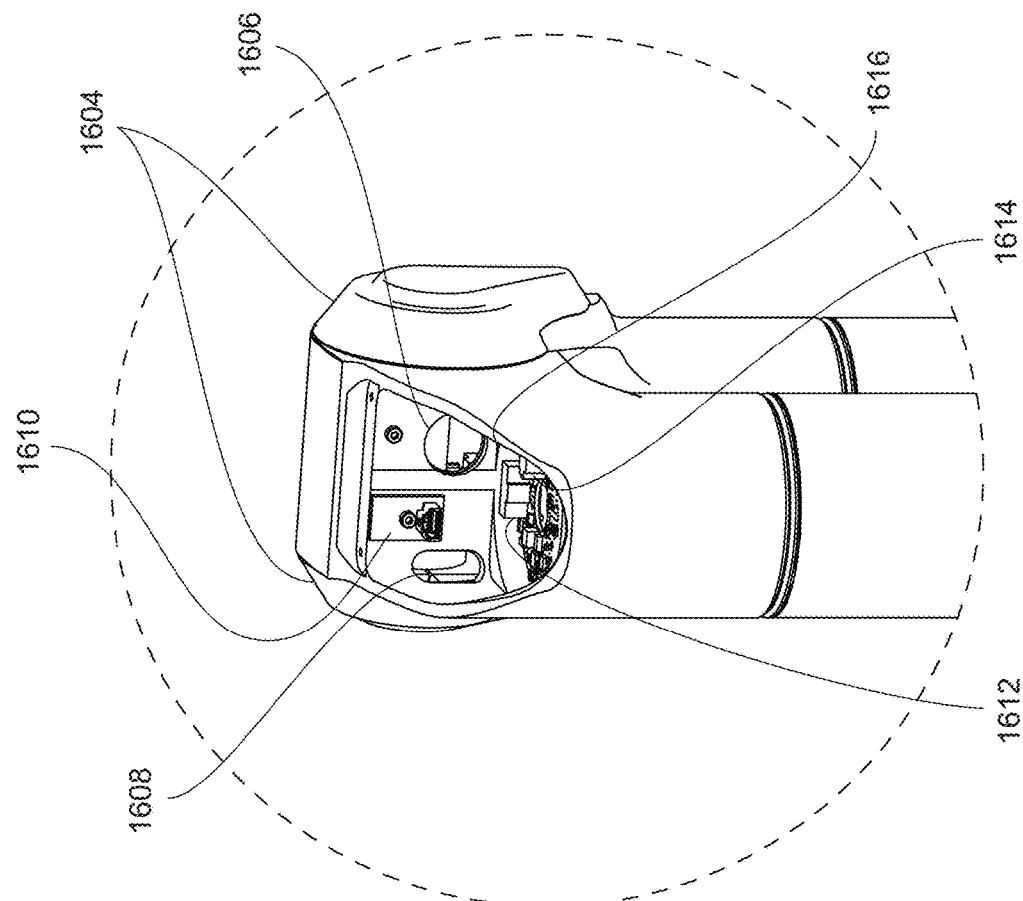
Figure 16E:
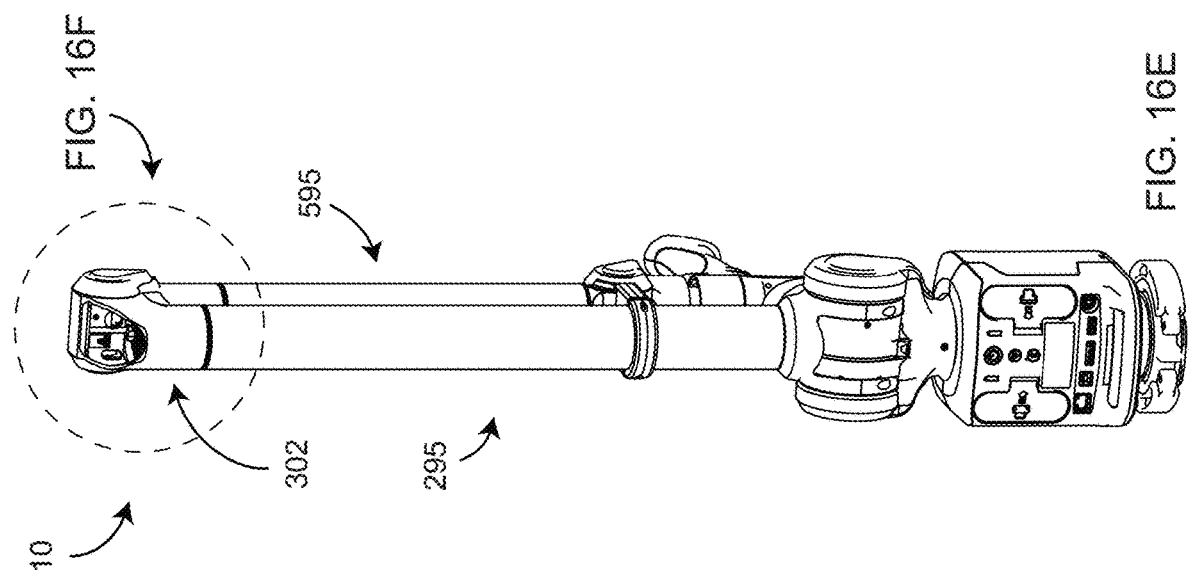

FIGS. 16E, 16F show the AACMM 10 including the first segment 295, second segment 595, and cartridge adapter 302. The cartridge adapter 302 includes a top-bumper opening 1616 that accommodates a top bumper 1602 as shown in FIGS. 16G, 16H. The encoder board with read heads 326 (FIG. 15B) is visible through the top-bumper opening 1616. An encoder connector 1612 and a temperature-sensor connector 1614 are attached to the encoder board 326. A cable (not shown) attaches the temperature-sensor assembly 350 and temperature sensor connector 1610 to the temperature-sensor connector 1614. The temperature-sensor assembly 350 shown in FIG. 14B includes a temperature sensor 352, thermal putty 354, and screw 356. Readings from the temperature sensor are sent through the encoder board 326 (FIG. 15B) to the encoder connector 1612 where they are transferred to the first bus or t-cables 2154 (FIG. 3). The cables 342 (FIG. 14B), which include the first bus or t-cables 2154 and the second bus or interconnect cables 2156, pass from the third/fifth-axis slip ring 340 (FIG. 14B) through a hole in the encoder board 326. The cable wires in the first bus or t-cables 2154 attach to the encoder connector 1612, which in an embodiment is a T-connector, and continue on through the encoder-access hole 1606. The first housing hole 413 in the fourth/sixth-axis housing of FIG. 16B is aligned with the encoder-access hole 1606, thereby enabling the cable wires in the first bus or t-cables 2154 to pass through the holes 1606 and 413 before attaching to a connector on the encoder board with read heads 426. The wires of the first bus or t-cables 2154 pass back through the encoder-access hole 1606. The wires of the first bus or t-cables 2154 and the second bus or interconnect cables 2156 travel through the exit hole 1608, as may be seen from a different perspective in FIG. 16H.

FIGS. 16G, 16H show that the fifth-axis yoke/receptacle 502 and the first-axis-yoke cap 1628 clamp to the fourth/sixth-axis shaft 418 (FIG. 16B). Cable wires passing through the exit hole 1608 make one-and-a-half-turn cable loop 1618 traveling through a channel 1622 by passing through a channel loop hole 1624 before passing through a channel exit hole 1626 to enter the fifth-axis assembly 500. Side bumpers 1604 (FIG. 16F) are placed over some elements as shown in FIG. 16H.

FIGS. 17A, 17B, 17C, 17D, 17E illustrate the fifth-axis assembly 500, the second segment 595, and the sixth-axis assembly 600. The fifth-axis assembly 500 includes a temperature-sensor assembly 550, a fifth-axis yoke/receptacle 502, a third/fifth-axis cartridge 310, and a conductive grounding ring 508. The second segment 595 includes a second-segment tube 590. The sixth-axis assembly includes a temperature-sensor assembly 650, a fourth/sixth-axis cartridge receptacle 606, and a cartridge adapter 602. As shown in FIGS. 17B, 17E, the third/fifth-axis cartridge 310 attaches to the inner portion of the second-segment tube 590, which in an embodiment is hollow. In an embodiment, another part of the third/fifth-axis cartridge 310 fits in the fifth-axis yoke/receptacle 502. In an embodiment, the temperature-sensor assembly 550 includes a temperature sensor 552, thermal putty 554, and a metal contact 556 that holds the temperature sensor 552 in place. In an embodiment, the third/fifth-axis cartridge 310 includes the elements described in FIGS. 15A, 15B, 15C, 15D, including the third/fifth-axis slip ring 340 and corresponding cables 542. The conductive grounding ring 508 provides electrical continuity between the third/fifth-axis cartridge 310 and the second-segment tube 590, which in an embodiment is made of carbon-fiber composite.

As shown in FIGS. 17B, 17E, the fourth/sixth-axis cartridge 410 fits inside the fourth/sixth-axis cartridge receptacle 606, which in turn attaches to the inside of the second-segment tube 590. In an embodiment, the temperature-sensor assembly 650 includes a temperature sensor 652 and thermal putty 654. In an embodiment, the fourth/sixth-axis cartridge 410 includes the elements described in FIGS. 16A, 16B, 16C, 16D. The conductive grounding ring 592 provides electrical continuity between the third/fifth-axis cartridge 310 and the second-segment tube 590. In an embodiment illustrated in FIG. 17D, the fifth-axis assembly 500 provides for swivel rotation about a fifth-axis 511. As illustrated in FIG. 17C, the sixth-axis assembly 600 provides for a hinge rotation of the fourth/sixth-axis shaft 418 (FIG. 16B) in the sixth-axis assembly 600 about the sixth-axis 611.

Figure 18A:
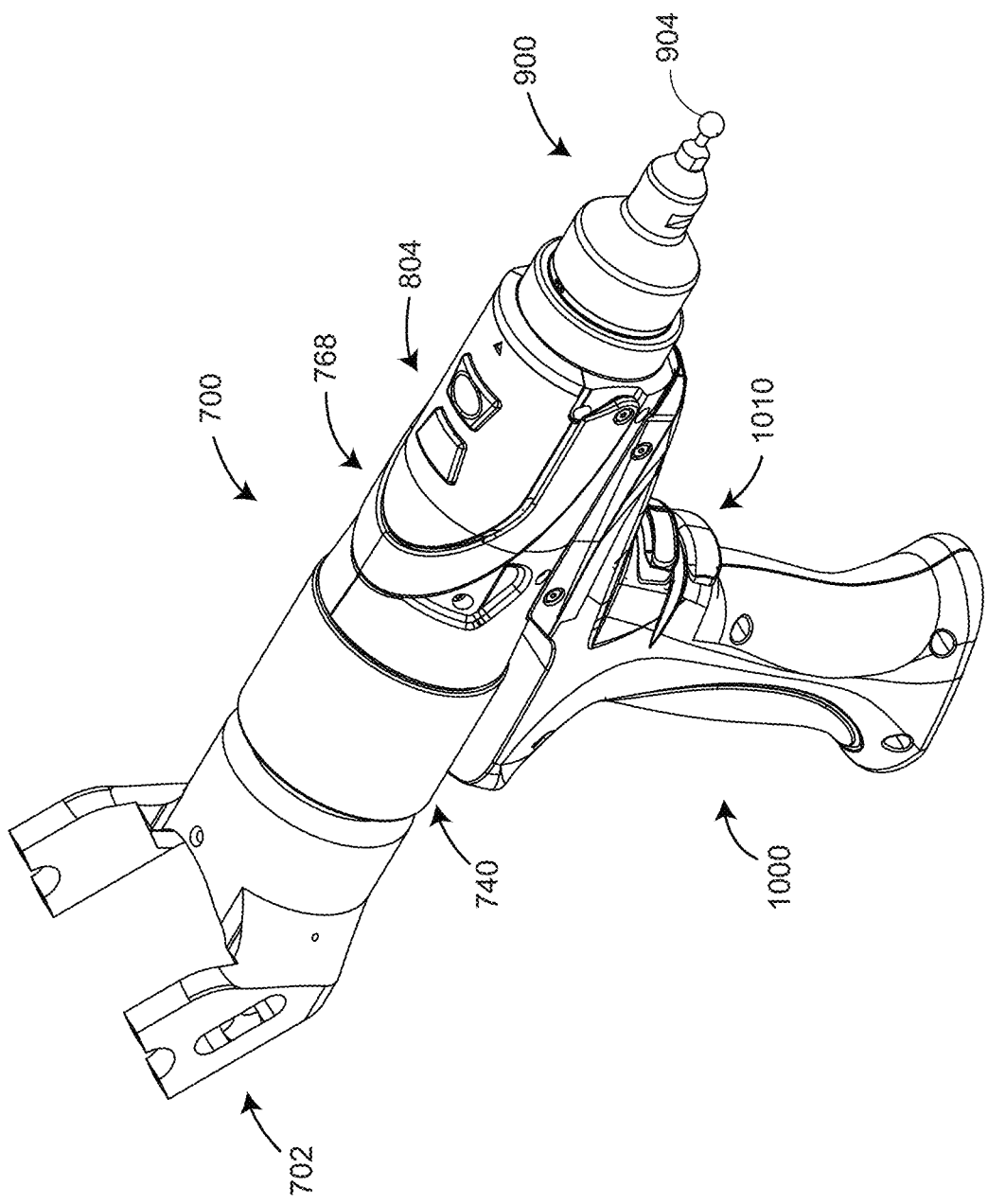
FIG. 18A is an isometric view of a seventh-axis assembly including a removable handle according to an embodiment of the present disclosure.

In an embodiment, the AACMM 10 includes seven rotation axes, as illustrated beginning with FIG. 18A. In another embodiment, the AACMM 10 includes six rotation axes, as illustrated beginning with FIG. 25A. In an embodiment illustrated in FIGS. 18A, 18B, 19A, 19B, 19C, 19D, 19E, 19F, 19G, 19H, 20A, the seventh-axis assembly 760 includes a seventh-axis housing/yoke 702, a shaft 750, a seventh-axis slip ring 710, a probe latch 768, upper end-effector buttons 804, a seventh-axis circuit board 820, and a carrier member 770. In an embodiment, the seventh-axis housing/yoke 702 attaches at one end to the fourth/sixth-axis shaft 418 (FIG. 16B) of the sixth-axis assembly 600. In this attachment, the seventh-axis housing/yoke 702 serves a yoke function. The seventh-axis housing/yoke 702 couples to outer races of a rear bearing 732 and to the outer races of a front bearing 736. The shaft 750 couples to inner races of the rear bearing 732 and the front bearing 736. In an embodiment, the shaft 750 rotates about a seventh axis 711 relative to the seventh-axis housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

In an embodiment, the encoder disk 724 is glued to the shaft 750, centered, and allowed to cure. An encoder board with read heads 722 is attached to a read-head adapter 720, which in turn is attached to the seventh-axis housing/yoke 702. A seventh-axis slip ring 710 includes a slip-ring housing 712, a slip-ring shaft 714, a slip-ring flange 716, a front slip-ring cable 718, a rear slip-ring cable 717, bus connectors 719 attached to the rear slip-ring cable 717, and bus connectors 839 attached to the front slip-ring cable 718. In an embodiment, the slip-ring flange 716 is attached to an adapter plate 704 that is coupled to the seventh-axis housing/yoke 702. The slip-ring shaft 714 rotates independently of the slip-ring housing 712 and turns in response to force applied by wires that twist as the shaft rotates about the seventh axis 711. The seventh-axis slip ring 710 maintains electrical continuity among corresponding wires in the front slip-ring cable 718 and the rear slip-ring cable 717 even as the slip-ring shaft 714 rotates relative to the slip-ring housing 712. In an embodiment, each of the rear slip-ring cable 717 and the front slip-ring cable 718 include wires of the first bus 2182 and the second bus 2184. A T-connector 2152 associated with a T-cable 2154 of the first bus 2182 attaches to a board connector 2174 of the encoder board with read heads 722.

The nut assembly 740 surrounds the seventh-axis housing/yoke 702 and the shaft 750 at a central portion of the seventh-axis assembly 700. As shown in FIGS. 23A, 23B, 23C, 23D, the nut assembly 740 includes a clutch nut 741, a clutch flexure 744, a nut cover 747 and snap rings 749. In an embodiment, the clutch flexure 744 attaches to the clutch nut 741 in two parts, with each part having flexure ridges 745 that fit into clutch nut grooves 743. As shown in FIG. 23C, a rear portion of the clutch nut 741 fits into the nut cover 747 and is locked into place with the two snap rings 749. A front portion of the clutch nut 741 includes a clutch nut flange 742 having an inner clutch-nut threaded region 739. As is shown in FIG. 19F, the inner clutch-nut threaded region 739 screws onto a threaded region 751 of the shaft 750. The clutch nut flange 742 is coupled to a push shoe 802 shown in FIGS. 18B, 19F. The purpose of the push shoe 802 is to either engage or release the removable seventh-axis cover 800, the handle 1000 (FIG. 18A), the LLP 1100 (FIG. 24A), or any other accessory attached to the seventh-axis assembly 700 in place of the removable seventh-axis cover 800. The nut assembly 740 provides a way of engaging or releasing the push shoe 802 while applying a consistent level of force to internal elements within the seventh-axis assembly 700. The result of this consistent level of force by the nut assembly 740 is to enable tactile probes and accessory measuring devices to be attached to the seventh-axis assembly 700 with a greater degree of consistency than would otherwise occur. In an embodiment, the nut assembly 740 reduces or eliminates the performing of a compensation (also referred to as a calibration) on the tactile probe or other measuring device. The behavior of the nut assembly 740 is discussed further herein below after tactile probes and other measuring devices have been discussed.

Figure 18B:
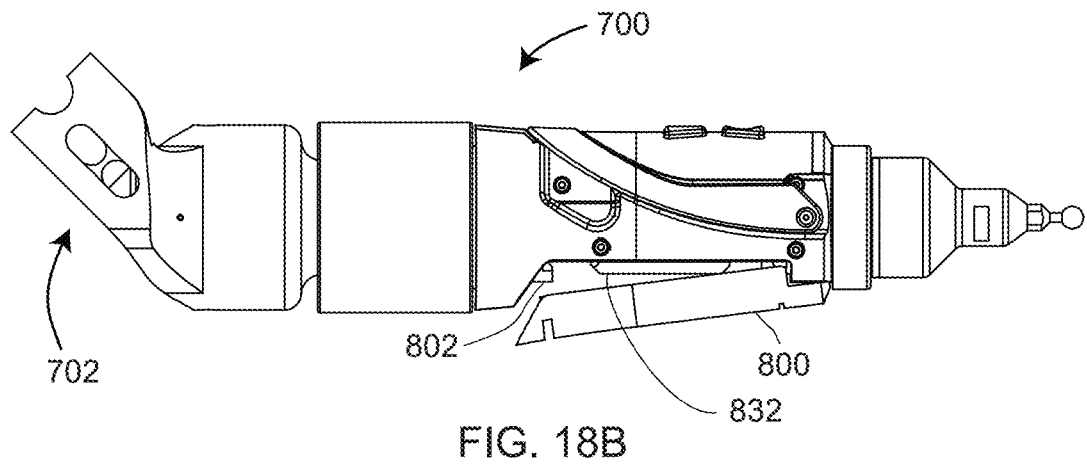
FIG. 18B is a side view of a seventh-axis assembly including a removable seventh axis cover according to an embodiment of the present disclosure.
Figure 19H:
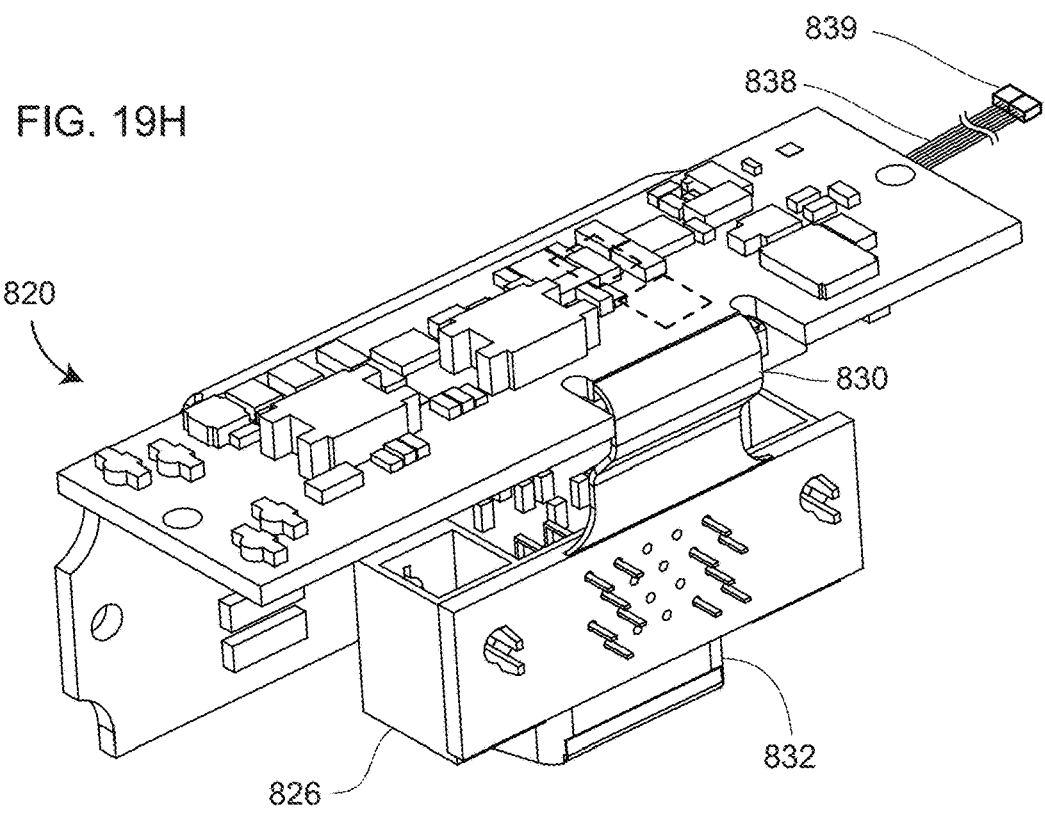

A seventh-axis circuit board 820 is shown in FIGS. 19G, 19H. In an embodiment, the seventh-axis circuit board 820 includes a left circuit board 824, an upper circuit board 822, and a right circuit board 826. In an embodiment, these three circuit boards are electrically and mechanically connected by a first flex connector 828 and a second flex connector 830. In an embodiment illustrated in FIG. 20A, the seventh-axis circuit board 820 wraps around a shaft circuit-board support 752. In an embodiment, the seventh-axis circuit board 820 further includes an arm-to-handle connector 832, which may be seen in FIGS. 18B, 19H. When a handle 1000 (FIG. 18A) or an LLP 1100 (FIG. 24A) is attached to the seventh-axis assembly 700, the arm-to-handle connector 832 makes electrical connection with the handle-to-arm connector 1022 (FIG. 24A) of the handle 1000 or the LLP 1100. In an embodiment, an arm-end processor 2220 (FIGS. 5, 19G) is included on the seventh-axis circuit board 820. Also included on the seventh-axis circuit board 820 are mechanical actuators 834 that respond to actuation or presses by an operator of upper end-effector buttons 804 shown in FIGS. 19B, 19D, 19E, 19F. The hard-probe assembly 900 is one type of tactile probe. Other types of tactile probes are discussed herein below.

FIG. 19A shows a hard-probe assembly 900 coupled to the seventh-axis assembly 700. FIG. 19B shows the hard-probe assembly 900 released from the seventh-axis assembly 700. In an embodiment, the release is obtained by moving a probe latch 768 to release a pull stud 938 of the hard-probe assembly 929. The hard-probe assembly 929 includes a probe tip 904 that an operator holds in contact with an object to be measured. When a designated upper end-effector button 804 is pressed, the encoders in the seven-axis assemblies 100, 200, 300, 400, 500, 600, 700 send synchronized encoder readings to the base processor electronics 2040, the encoder readings being synchronized to the capture signal generated by the trigger and capture circuit or signaling unit 2058 of the base processor electronics 2040. These encoder readings are combined with other recorded characteristics of the AACMM 10 to calculate 3D coordinates corresponding to a center of the probe tip 904. By measuring a number of points on the surface of an object with the probe tip 904, and by knowing the radius of the probe tip, the 3D coordinates of the object surface can be determined.

Figure 20A:
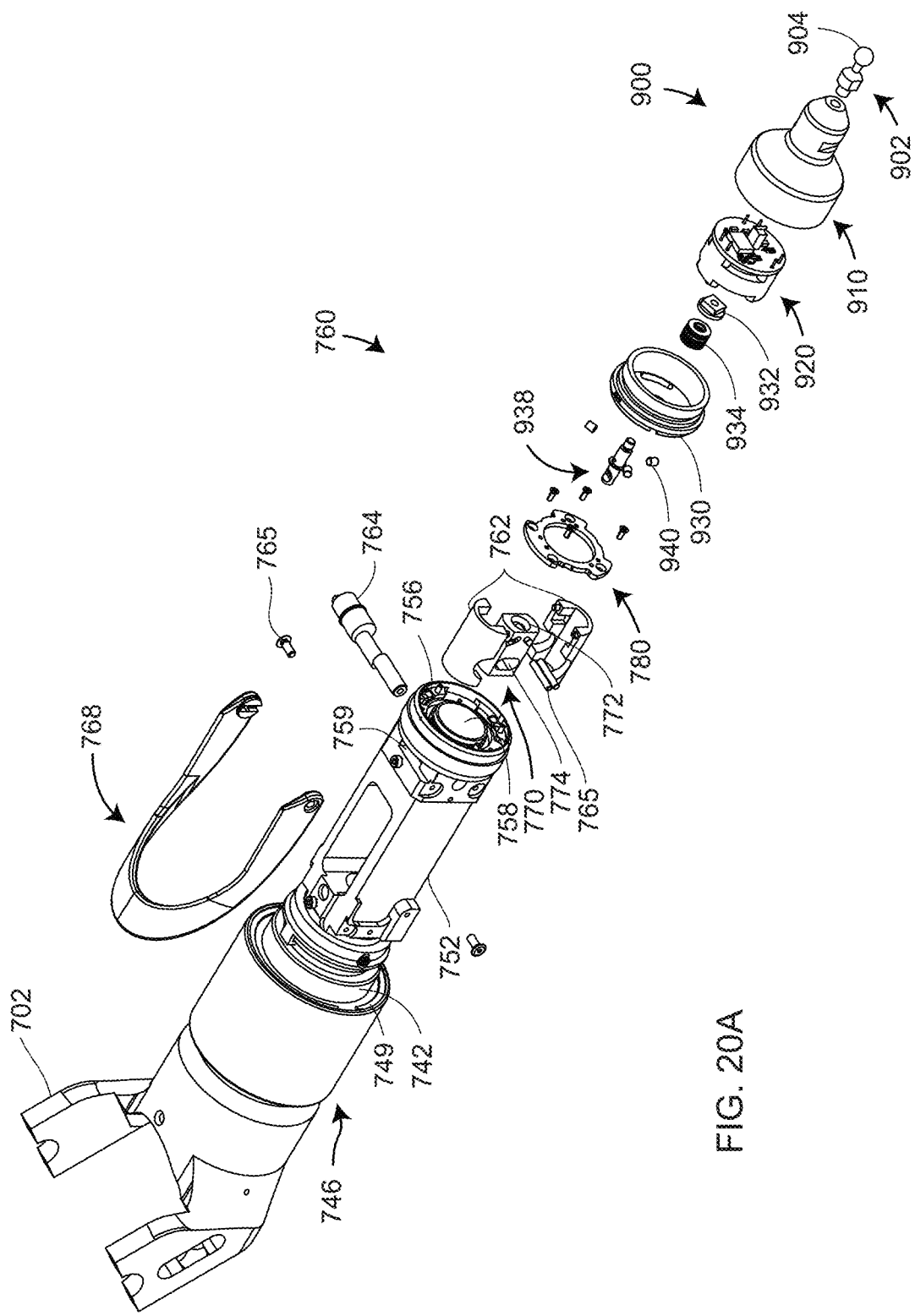
FIG. 20A is an exploded view of a seventh-axis assembly according to an embodiment of the present disclosure.
Figure 22E:
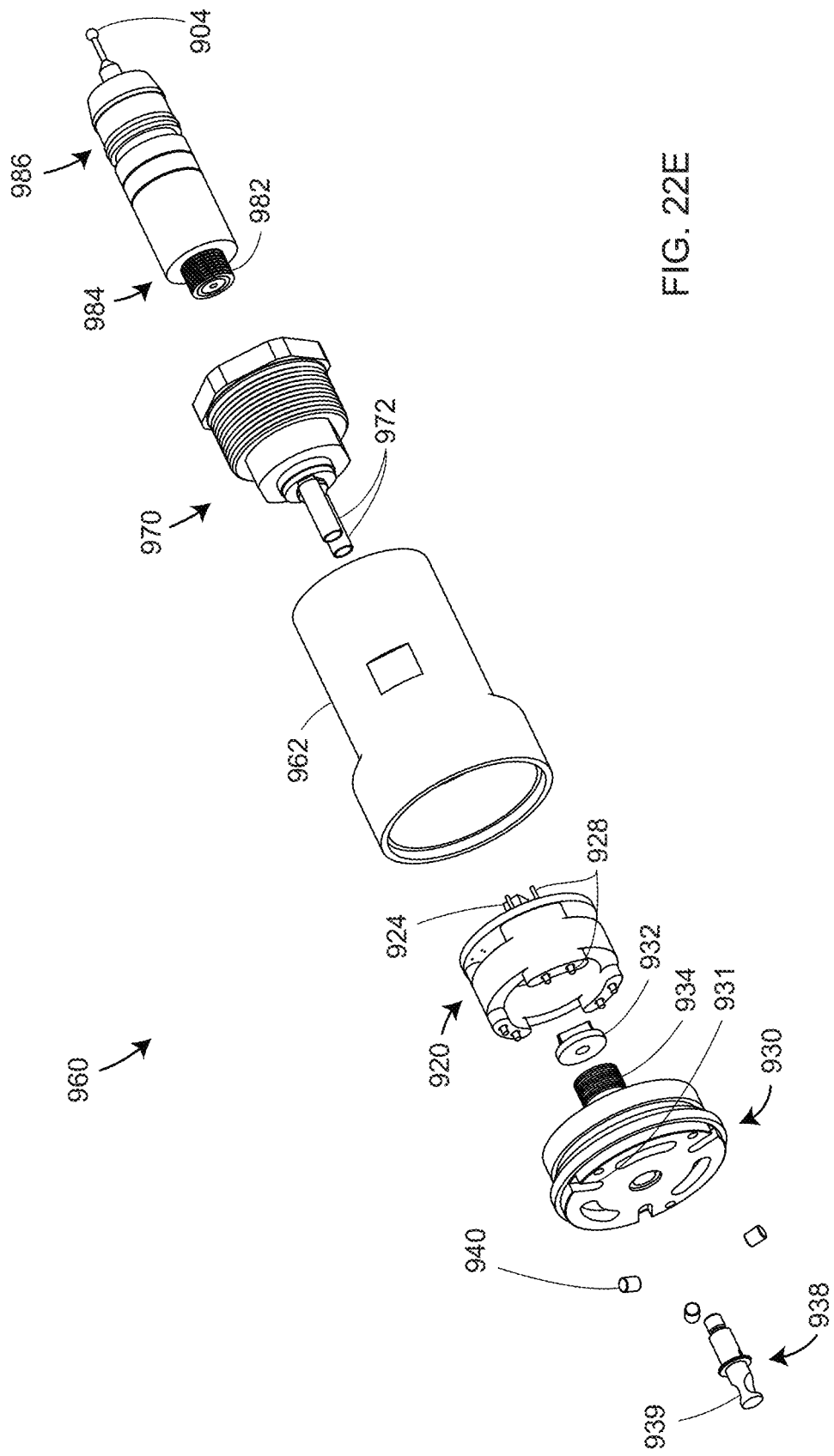

FIG. 19F shows a section view of the probe latch 768, which includes a magnet 1226, also shown in FIG. 19D. The magnet 1226 is attracted to the magnet 1227 embedded in the cover 801. The magnets 1226, 1227 hold the probe latch 768 against the cover 801 unless pulled away from the cover 801 by an operator. Ends of the probe latch 768 are attached to a camshaft 764 (FIG. 20A) by camshaft fasteners or preload pins 765. The camshaft 766 passes through a camshaft hole 774 of the carrier member 770 as illustrated in FIGS. 19F, 20A. The carrier member 770 is surrounded by two guides 762 that slide, together with the carrier member 770, into a guide cavity 758 shown in FIGS. 19C, 20A, 25A. Outside the guide cavity 758, there are three pairs of kinematic balls 756 and three alignment pins 757. The three pairs of kinematic balls 756 are brought into contact with three kinematic cylinders 940. The resulting contact between the kinematic cylinders 940 and the kinematic balls 756 ensures that the hard probe 900 may be removed and repositioned repeatably. The three kinematic cylinders 940 fit into kinematic cylinder sockets 931 as shown in FIG. 22E.

Figure 21A:
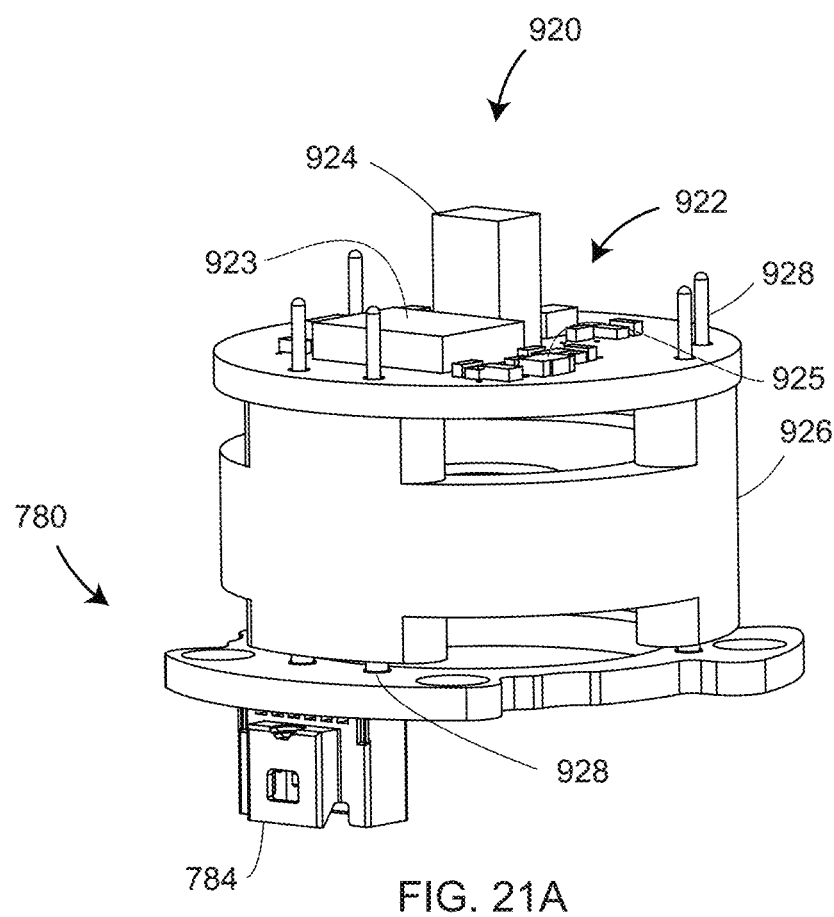
FIG. 21A is an isometric view of a probe electrical interface and a probe interface board according to an embodiment of the present disclosure.
Figure 21B:
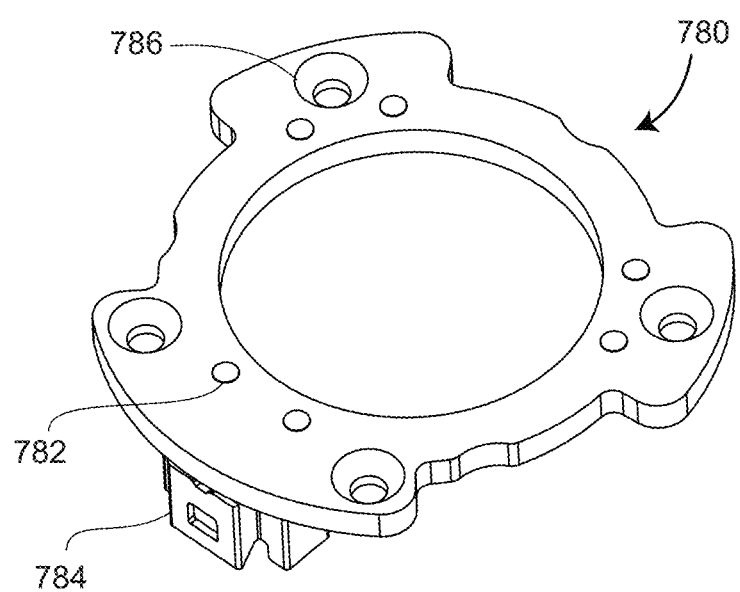
FIG. 21B is an isometric view of a probe interface board according to an embodiment of the present disclosure.

The three alignment pins 757 are positioned to ensure that each of the kinematic cylinders 940 is matched to the corresponding pair of kinematic balls 756. The alignment pins 757 fit loosely into alignment holes 941 (FIG. 22C) without touching the sides of the alignment holes 941. A probe interface board 780 shown in FIGS. 20A, 21B is attached by screw holes 786 to the front of the seventh-axis assembly 700. The probe interface board 780 includes electrical contact pads 782 that make electrical contact with spring-loaded pins 928 in the probe electrical interface 920 shown in FIG. 21A. Electrical signals are routed through the probe interface board 780 to a connector adapter 784 shown in FIGS. 19F, 21B. A space for the connector adapter 784 is provided in the connector cutout 759 of FIG. 20A. In an embodiment, the board 780 attached via fasteners 787.

Figure 20B:
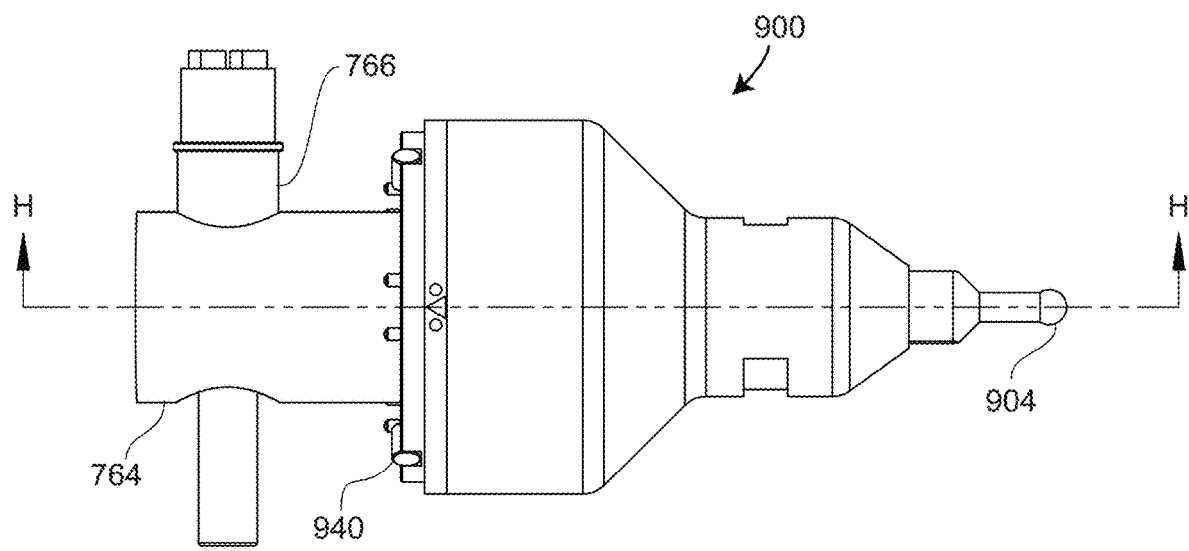
FIGS. 20B, 20C are top and section views, respectively, of a tactile probe assembly and coupling elements in an open position according to an embodiment of the present disclosure.
Figure 20C:
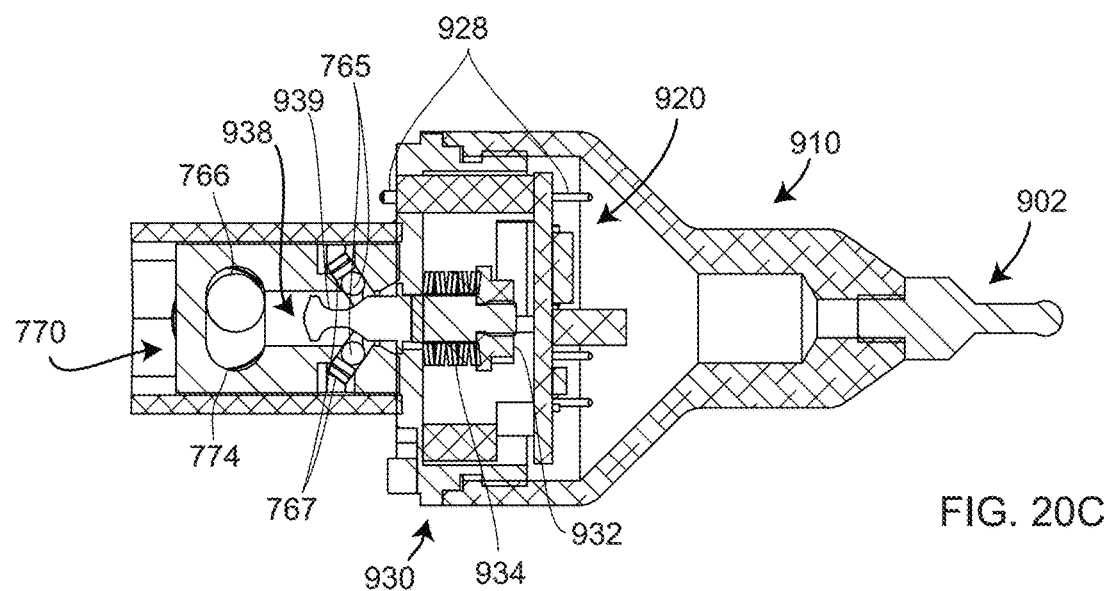
Figure 20D:
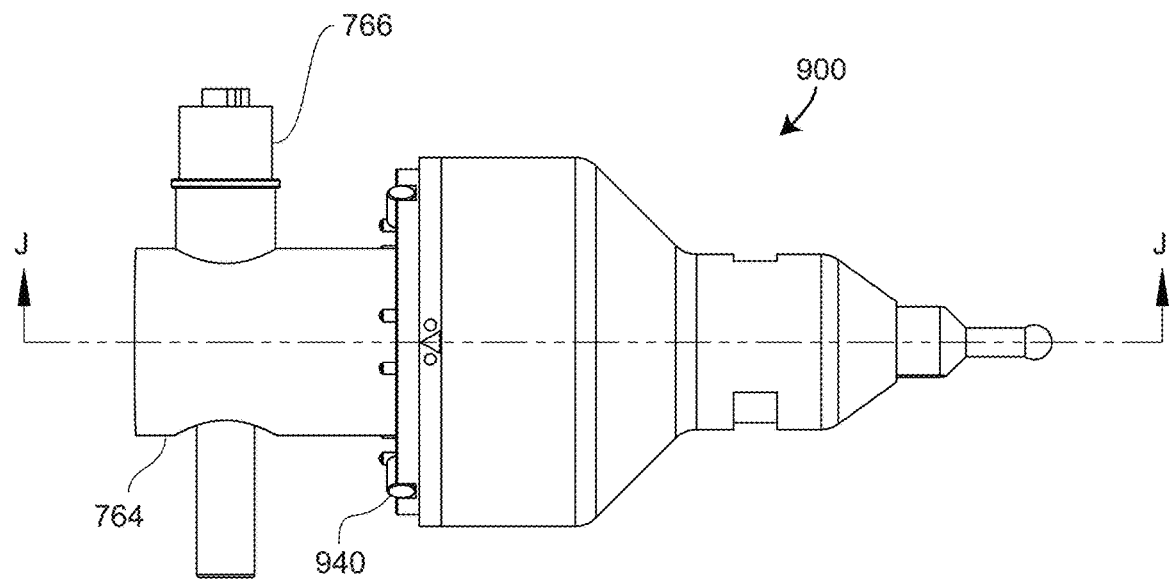
FIGS. 20D, 20E are top and section views, respectively, of a tactile probe assembly and coupling elements in a closed position according to an embodiment of the present disclosure.
Figure 20E:
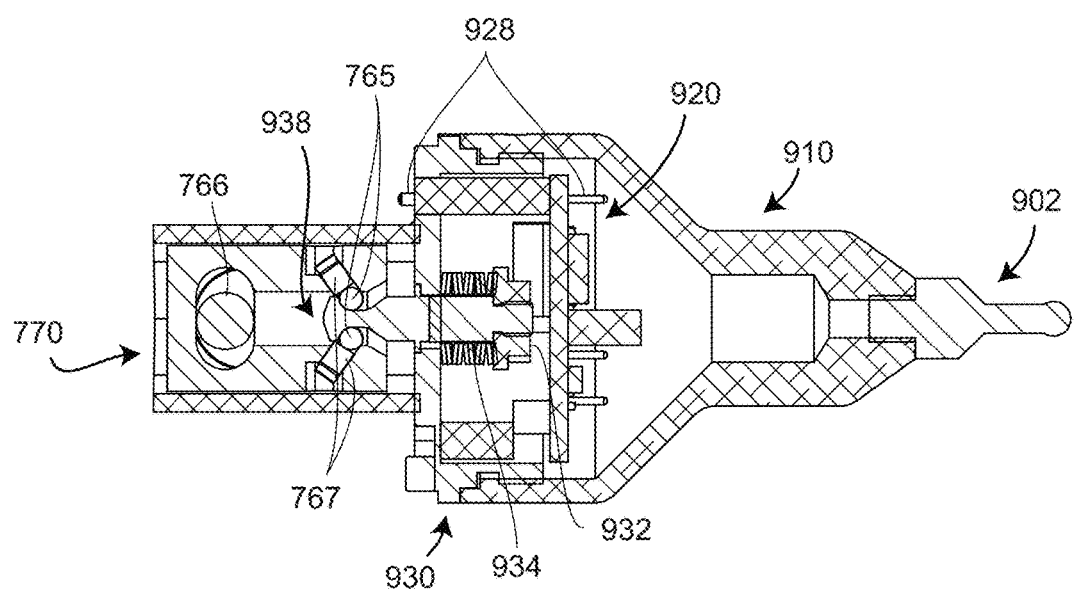

In the carrier member 770, an adapter hole 772 is sized to accept the pull stud 938. When the probe latch 768 is lifted away from the cover 801, the pull stud 938 is released, enabling the hard-probe assembly 900 to be freely moved away from the seventh-axis assembly 700. When the probe latch 768 is moved to contact the cover 801, the pull stud 938 is held firmly in place within the adapter hole 772. The open (released) and locked cases are illustrated in FIGS. 20B, 20C, 20D, 20E. FIGS. 20B, 20C illustrate a position of the components in which the hard-probe assembly 900 is not locked in place against the seventh-axis assembly 700. In this position, the camshaft 766 moves the carrier member 770 toward the front of the seventh-axis assembly 700. This causes leaf springs 767 to collapse, removing force from preload pins 765. In this state, the pull stud 938 is not constrained. FIGS. 20D, 20E illustrate a position of the components in which the hard-probe assembly 900 is locked in place with the hard-probe assembly 900 held firmly against the seventh-axis assembly 700. In this position, the camshaft 766 moves the carrier member 770 away from the front of the seventh-axis assembly 700. This causes the leaf springs 767 to expand, pressing the preload pins 765 into a pull stud notch 939 of the pull stud 938.

The removable seventh-axis cover 800 is held in place when the push shoe 802 and the clutch nut 741 are screwed forward on the threaded region 751 of the shaft 750. At a predetermined position of the clutch nut 741 and push shoe 802, the force applied to the cantilevered lip 746 by the nut cover teeth 748 exceeds the amount of force used to skip over or move past the cantilevered lips 746, which terminates tightening of the clutch nut on the threaded shaft. At this point, a clicking sound is heard as the nut cover 747 is turned, but no additional tightening is obtained. Loosening of the removable seventh-axis cover 800 happens when the push shoe 802 is retracted. This loosening is possible by reversing the direction of rotation of the nut cover. The cantilevered lips 746 engage the nut cover 747 in the reverse direction, which firmly engages undersides of the cantilevered lips 746 and permits loosening of the removable seventh-axis cover 800.

Figure 20F:
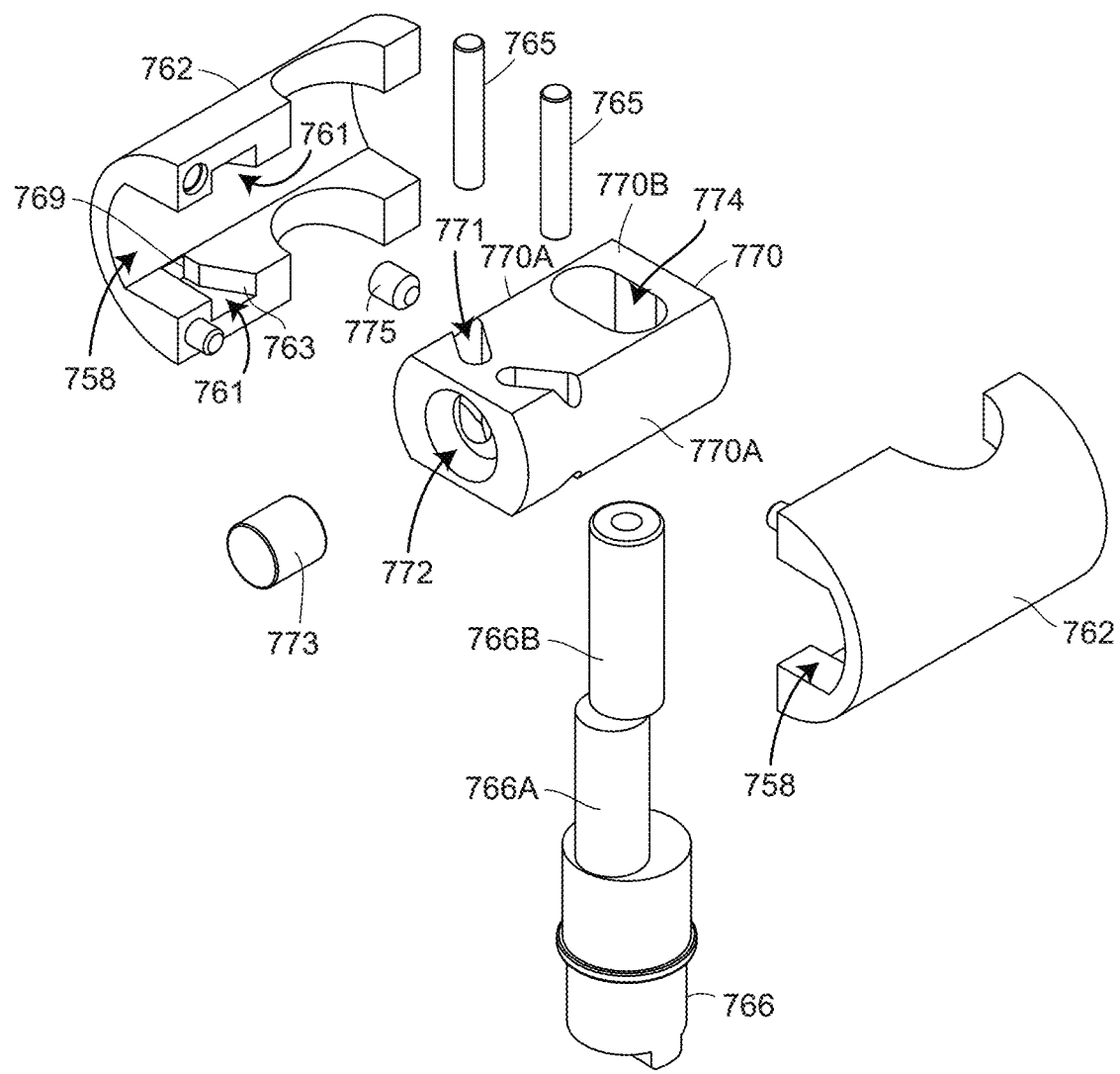
FIGS. 20F, 20G, 20H are various views of a tactile probe assembly and coupling elements according to another embodiment of the present disclosure.
Figure 20G:
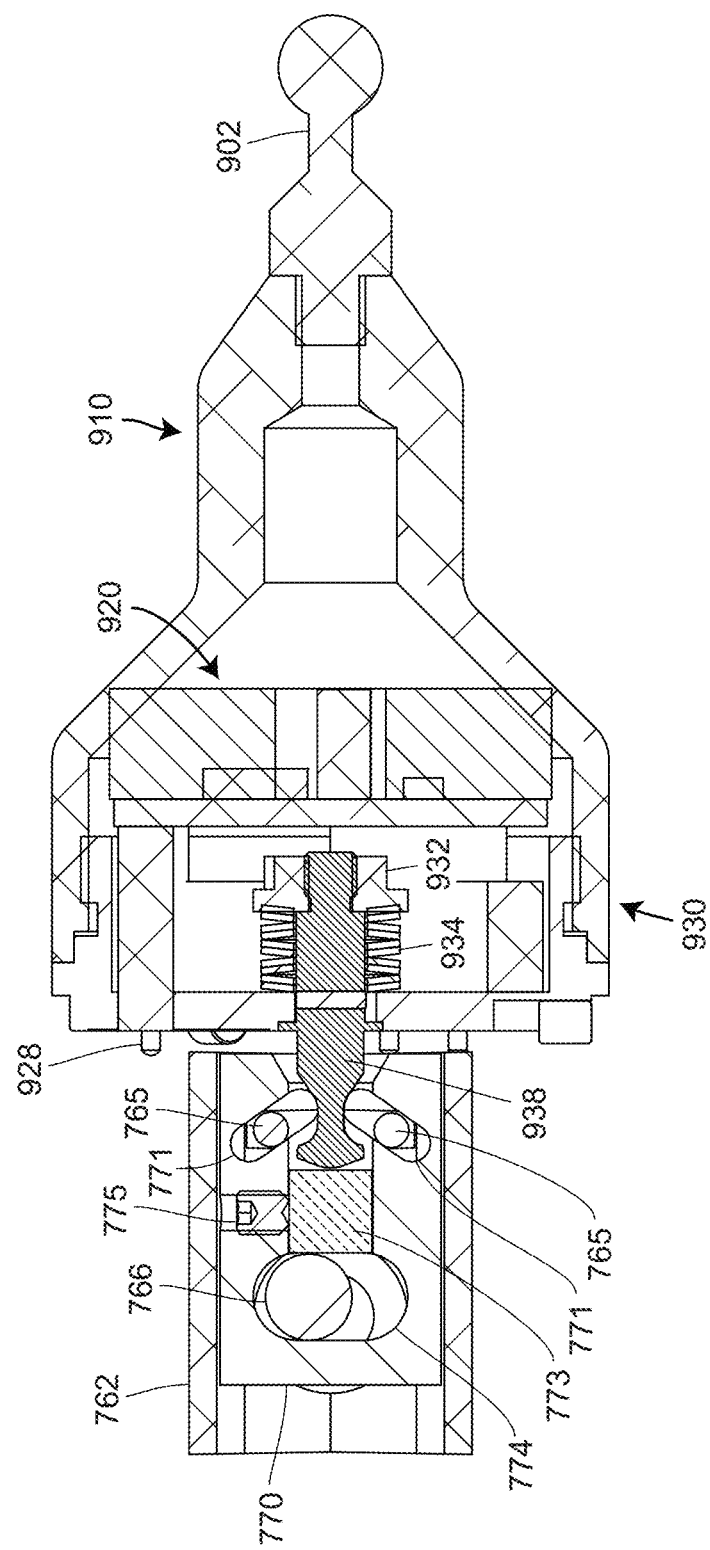
Figure 20H:
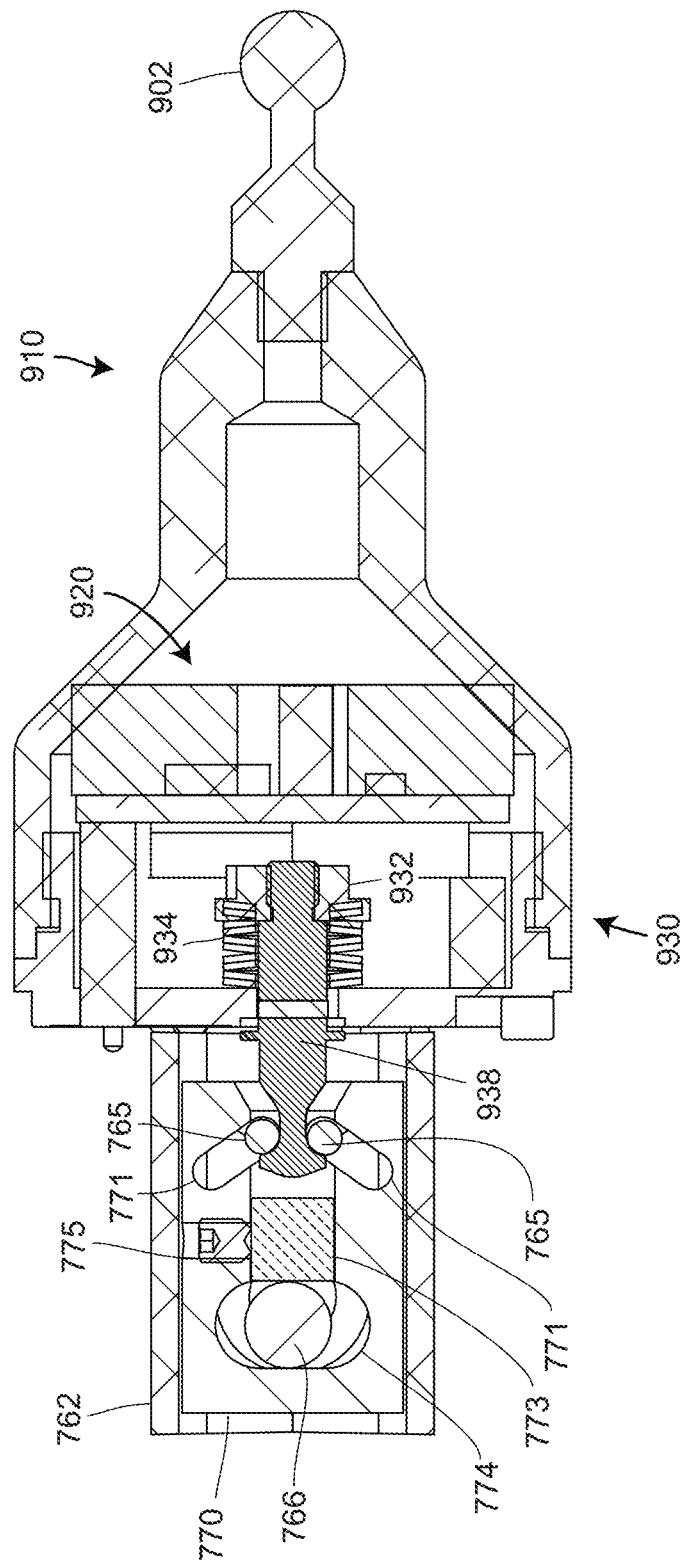

Referring now to FIGS. 20F, 20G, 20H, another embodiment is shown of an assembly for retaining the probe assembly 900 to the carrier member 770. The guides 762 are coupled together to define a guide cavity 758. The guide cavity 758 is sized and shaped to receive the carrier member 770. In the illustrated embodiment, the carrier member 770 has a pair of opposing cylindrical surfaces 770A and a pair of opposing planar surfaces 770B. As discussed herein with reference to FIGS. 20A-20E, the carrier member 770 includes a slot or elongated camshaft hole 774 that receives cam lobes 766A, 766B. The carrier member 770 also includes a pair of opposing slots 771 that extend through the carrier member 770 and are sized to receive the preload pins 765. The preload pins 765 move within slots 761 of guides 762 that have an angled surface 763 and notch 769.

The carrier member 770 further includes an adapter hole 772 having a pull stud notch 939 extending therefrom. The adapter hole 772 is sized to accept the pull stud 938. The adapter hole 772 is further sized to receive a magnet member 773. In an embodiment, the magnet member 773 is retained in the adapter hole 772 by a set screw 775. As discussed in more detail herein, the magnet member 773 holds the pull stud 938 (and thus the probe assembly 900) in place when the preload pins 765 are in an unlocked position.

As discussed herein with reference to FIGS. 20A-20E, when the probe latch 768 is moved from the unlocked to the locked position, the camshaft 766 moves the carrier member 770 within the guide cavity 758. As a result, the preload pins 765 move from an unlocked position (FIG. 20G) to a locked position (FIG. 20H). It should be appreciated that when in the locked position, the preload pins 765 engage the pull stud 938 to retain the probe assembly 900. Unlike the embodiment of FIGS. 20A-20E, there are no leaf springs to bias the preload pins 765. In this embodiment, when the probe latch 768 is in the unlocked position, the carrier member 770 is positioned to place the magnet member 773 in a position to magnetically engage the pull stud 938 with sufficient force to retain the probe assembly 900 (FIG. 20G). As the probe latch 768 is moved to the locked position, the carrier member 770 moves in a direction away from the probe assembly 900, causing the preload pins 765 to engage the pull stud 938.

It should be appreciated that the engagement of the pull stud 938 by the magnet member 773 allows the probe assembly 900 to be removably coupled to the carrier member 770. It further provides advantages in allowing the probe assembly 900 to be retained until the probe latch 768 is engaged, thus preventing or reducing the risk of the probe assembly accidentally falling out or off of the carrier member 770.

FIG. 18B illustrates the method in which the removable seventh-axis cover 800 is attached to the seventh-axis assembly 700. The push shoe 802 is drawn backward by rotating the nut assembly 740 to pull the clutch nut 741 backward. This enables the removable seventh-axis cover 800 to be pushed into place, after which the push shoe 802 is pushed forward by rotating the nut assembly 740 in a direction that moves the clutch nut 741 forward.

Figure 18C:
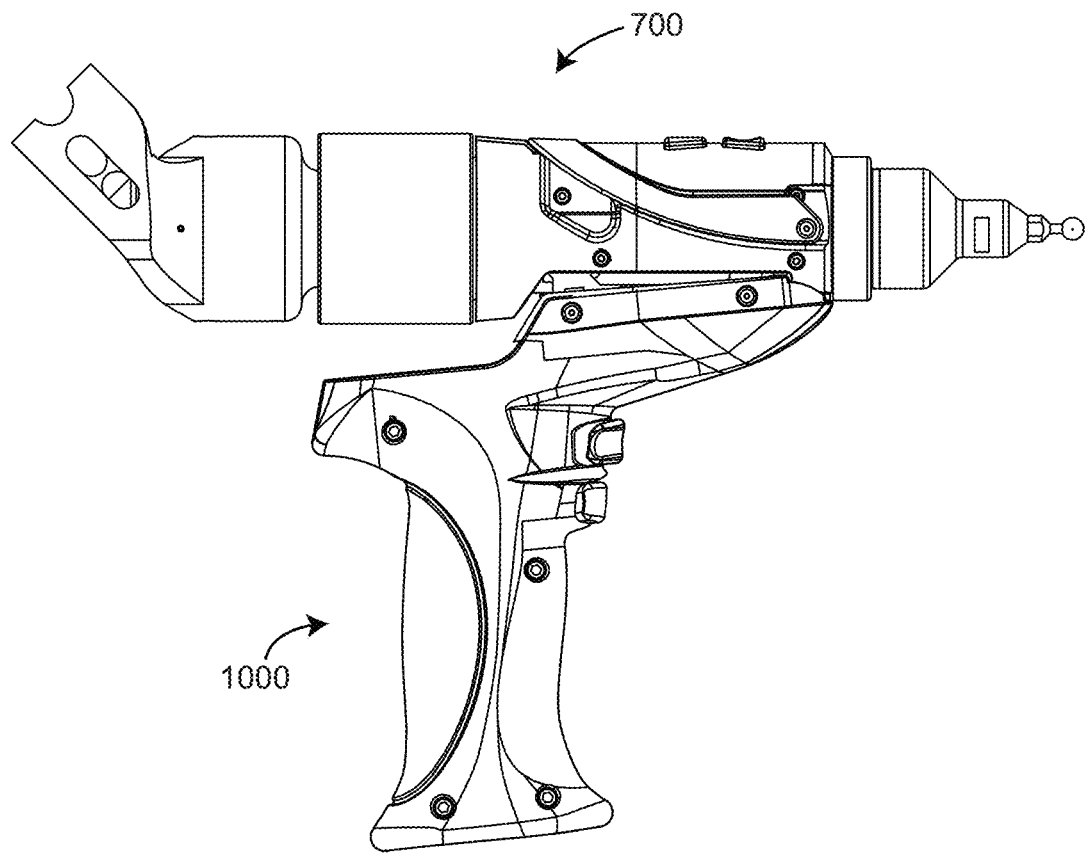
FIG. 18C is a side view of a seventh-axis assembly showing a removable handle being attached according to an embodiment of the present disclosure.
Figure 18D:
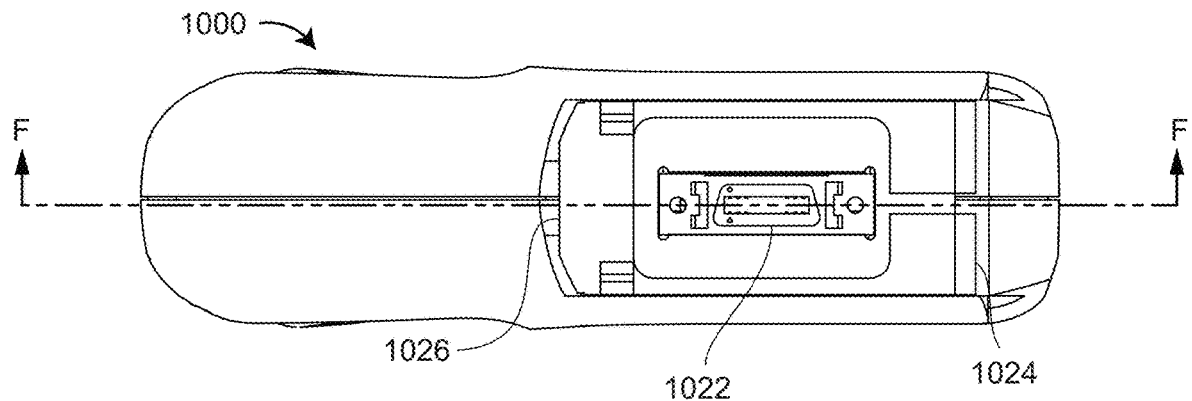
FIGS. 18D, 18E are a top view and a section view, respectively, of a removable handle according to an embodiment of the present disclosure.
Figure 18E:
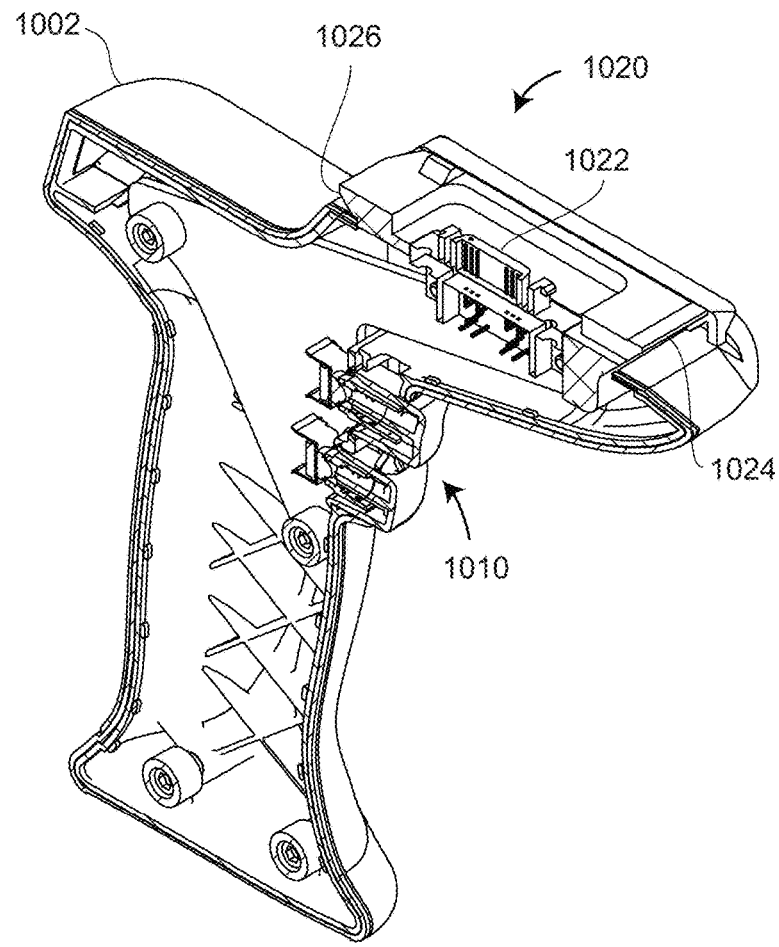

FIG. 18C illustrates the way in which the handle 1000 is attached to the seventh-axis assembly 700. After the removable seventh-axis cover 800 has been removed from the seventh-axis assembly 700, a forward grip-edge 1024 (FIG. 18D) of the handle 1000 is aligned to grip the seventh-axis assembly 700. The push shoe 802 is drawn backward by rotating the nut assembly 740 which results in the clutch nut 741 being pulled backward. The handle 1000 and handle-to-arm connector 1022 of the handle 1000 (FIGS. 18D, 18E) are pushed against the seventh-axis assembly 700 to interlock the handle-to-arm connector 1022 with the arm-to-handle connector 832 (FIG. 18B). The push shoe 802 is pushed forward by rotating the nut assembly 740 in a direction that moves the clutch nut 741 forward. As used herein, the forward direction is in a direction toward the probe tip 904. The push shoe 802 contacts the rear grip-edge 1026 (FIG. 18E), locking the handle 1000 in place. In an embodiment illustrated in FIG. 18E, wires from the handle buttons 1010 that are coupled to a handle frame 1002 send electrical signals through the handle-to-arm connector 1022 to the arm-to-handle connector 832 to the seven-axis arm-end electronics 2210 shown in FIG. 5.

FIGS. 24A, 24B illustrate elements of the LLP 1100. In an embodiment, the LLP 1100 includes an interface 1020 that provides mechanical and electrical connection to the seventh-axis assembly 700. In an embodiment, the interface 1020 includes the forward grip-edge 1024, the rear grip-edge 1026, and the handle-to-arm connector 1022. To attach the LLP 1100 to the seventh-axis assembly 700, the removable seventh-axis cover 800 is first removed. The forward grip-edge 1024 of the LLP 1100 is aligned to grip the seventh-axis assembly 700 in a similar manner to that described with respect to FIG. 18C. The push shoe 802 is drawn backward (e.g. away from the probe tip 904 when it is installed) by rotating the nut assembly 740 to pull the clutch nut 741 backward. The LLP 1100 and handle-to-arm connector 1022 of the LLP 1100 are pushed against the seventh-axis assembly 700 to interlock the handle-to-arm connector 1022 with the arm-to-handle connector 832. The push shoe 802 is pushed forward by rotating the nut assembly 740 in a direction that moves the clutch nut 741 forward (e.g. toward the probe tip 904 when it is installed). The push shoe 802 contacts the rear grip-edge 1026, locking the LLP 1100 in place.

In an embodiment illustrated in FIG. 24B, wires from the handle buttons 1010 send electrical signals through the handle-to-arm connector 1022 to the arm-to-handle connector 832 to the seven-axis arm-end electronics 2210 shown in FIG. 5. In an embodiment, the high-speed signals obtained from a camera 1120 of the LLP 1100 pass through the handle-to-arm connector 1022 and the arm-to-handle connector 832 to pass by gigabit Ethernet (FIG. 5) to bus connectors 719 (FIGS. 5, 19F). In an embodiment, the LLP 1100 includes a projector 1110 and a camera 1120 separated by a baseline distance and operable to perform a triangulation measurement to determine 3D coordinates of points illuminated by a line of laser light or a pattern of light, which might be laser light or another type of light. In an embodiment, the LLP 1100 further includes a marker light source 1125 that projects a beam of light that intersects a projected line of light in a spot, thereby indicating to a user a recommended position for locating an object to be measured. In an embodiment, the LLP 1100 includes a color camera 1121 that further enhances measured 3D coordinates with color. The camera 1120 and projector 1110 are included in a camera-projector portion 1106 that further includes an outer shell 1108. In an embodiment, the LLP 1100 is mounted on a handle 1104 that includes an enclosure 1102. In an embodiment, the elements of the LLP 1100, including the camera 1120 and the projector 1110 are supported by electronics, including a controller 1040. In an embodiment, some electronics that support processing of collected LLP data is included in the handle 1104.

Elements of the hard-probe assembly 900 shown in FIGS. 20A, 20B, 20C, 20D, 20E, 21A, 21B include a probe stylus assembly 902, a probe body 910, a probe electrical interface 920, a lock nut 932, a spring stack 934, a probe cap 930, a pull stud 938, and kinematic cylinders 940. In an embodiment, the probe stylus assembly 902 is threaded to screw into the probe body 910. In an embodiment, the probe stylus assembly 902 includes a spherical probe tip 904. In an embodiment, the probe body 910 includes a hollow portion sized to accept the probe electrical interface 920. In an embodiment, the probe electrical interface 920 includes a probe electrical interface circuit board 922, a probe interface body 926, and spring-loaded pins 928 that pass through the probe interface body 926. In an embodiment, the probe electrical interface circuit board 922 includes a processor 923, a memory 925, and a touch-probe connector adapter 924. In an embodiment, the hard-probe assembly 900 further includes a lock nut 932, a spring stack 934, a probe cap 930, a pull stud 938 and kinematic cylinders 940. The lock nut 932 and spring stack 934 hold the pull stud 938 against the probe cap 930. The kinematic cylinders 940 are affixed to the probe cap 930.

The hard-probe assembly 900 discussed above is an example of a tactile probe, so named because a tactile probe includes an element (such as the probe tip 904) that makes physical contact with an object under test. Besides the hard-probe assembly 900, another type of tactile probe is a touch-trigger probe assembly 960 illustrated in FIGS. 22A, 22B, 22C, 22D, 22E. Unlike the hard-probe assembly 900 that returns electrical signals from encoders in each of the axis assemblies 100, 200, 300, 400, 500, 600, 700 in synchrony with the capture signal produced by the base processor electronics 2040, the touch-trigger probe assembly 960 generates a trigger signal in response to the probe tip 904 lightly touching an object under test. The trigger signal is sent from the touch-trigger probe assembly 960 to each of the encoders, which respond by measuring an angle. Afterwards, the encoders return the measured values over the first bus 2182 (FIG. 2). Touch-trigger probes are popular to use on Cartesian coordinate measuring machines (CMMs), which often include a probe stylus that is relatively long and thin. Such a stylus is susceptible to bending when pressed against an object, which may result in a relatively large error in measured 3D values. By generating a trigger signal when the probe tip first lightly touches the object, the bending of the stylus is reduced or minimized. In most cases, the stylus on a tactile probe of an AACMM 10 is relatively short and thick, resulting in relatively small bending errors. However, in some cases, bending of a stylus is a consideration when making AACMM measurements. In these cases, the touch-trigger probe assembly 960 is advantageously used.

In an embodiment, a touch-trigger probe assembly 960 includes a touch-trigger probe module 986, a touch-trigger probe body 984, a touch-trigger probe adapter 970, a probe body 962, a probe electrical interface 920, a lock nut 932, a spring stack 934, a probe cap 930, and a pull stud 938. In an embodiment, the touch-trigger probe module 986 includes a probe tip 904. Touch-trigger probe modules are commercially available from many manufacturers. In an embodiment, the touch-trigger probe body 984 is selected to have a desired length. The touch-trigger probe body 984 includes a screw connector mount 982 that screws into the touch-trigger probe adapter 970. The touch-trigger probe adapter 970 sends electrical signals, including trigger signals, down interface wires 972 to a touch-probe connector adapter 924, which is part of a probe electrical interface 920. The touch-trigger probe adapter 970 and the probe electrical interface 920 fit in a probe body 962. The remaining elements of the touch-trigger probe assembly 960 are the same as for the hard-probe assembly 900 and were described herein above with respect to FIGS. 20A, 20B, 20C, 20D, 20E, 21A, 21B.

In an embodiment, a short jumper cable is run from a tactile probe transfer connector 836 (FIG. 19G) from the connector adapter 784 in the connector cutout (FIGS. 20A, 21B). This jumper cable transfers trigger signals from touch-trigger probes. It also transfers signals indicating the button has been pressed. The tactile probe transfer connector 836 and the arm-to-handle connector 832 send signals to cable transfer connectors 837 on the bottom of the upper circuit board 822. End cable wires 838 attach on one end to the cable transfer connectors 837 and on the other end to bus connectors 839. As shown in FIGS. 19F, the bus connectors 839 attach to on matching bus connectors 839 that lead through front slip-ring cable 718, seventh-axis slip ring 710, and rear slip-ring cable 717 to bus connectors 719. In an embodiment, the electrical links between the bus connectors 719, the arm-to-handle connector 832 and electronics in the seven-axis arm-end electronics 2210 are as shown in FIG. 5.

Figure 25B:
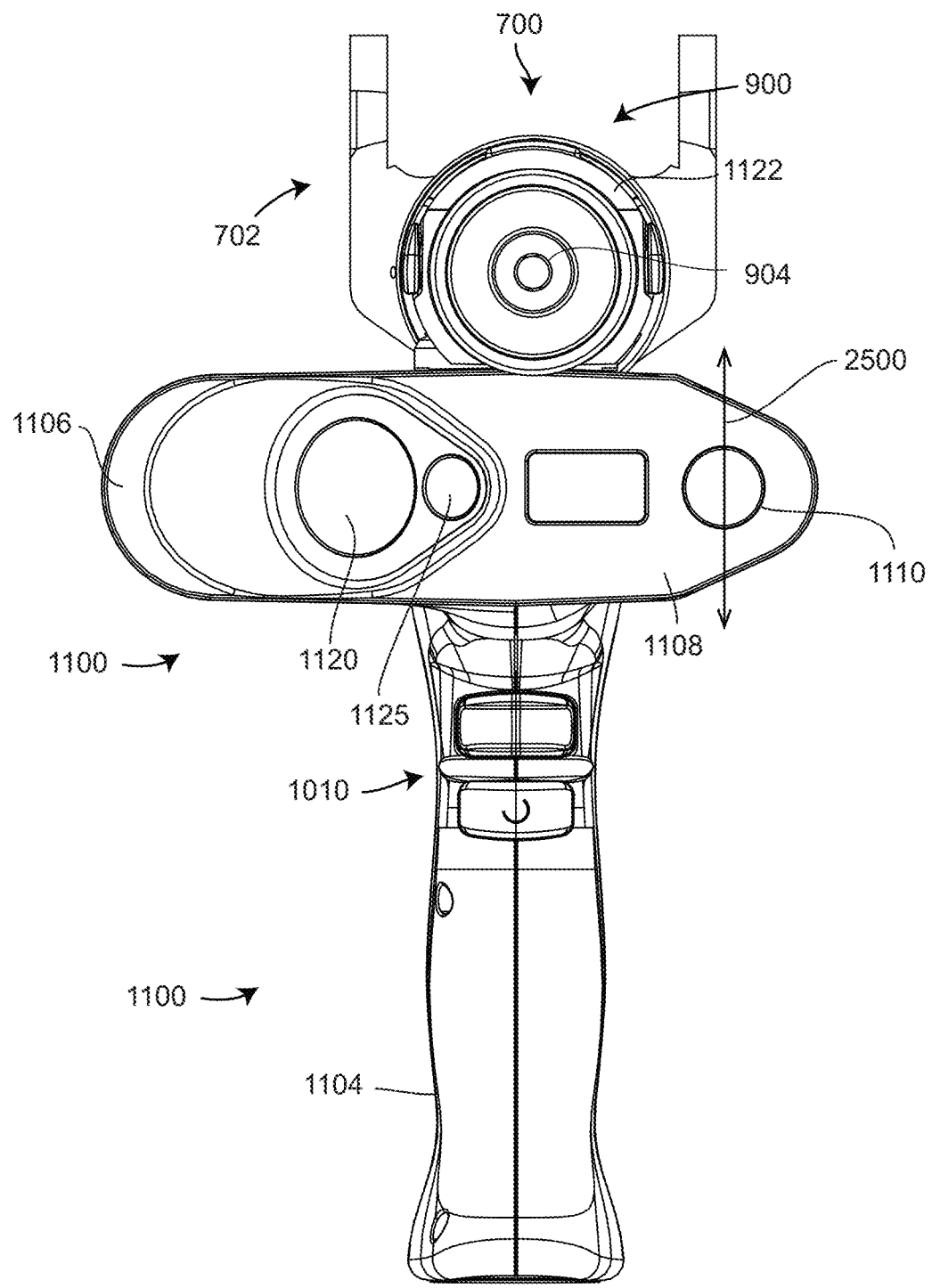

FIGS. 25A, 25B show isometric and front views, respectively, of the LLP 1100 coupled to the seventh-axis assembly 700. The LLP 1100 includes the camera 1120 and the projector 1110, both of which are included in the camera-projector portion 1106 that further includes the outer shell 1108. In an embodiment, the LLP 1100 further includes the handle 1104, which has the enclosure 1102 and handle buttons 1010. The seventh-axis assembly 700 includes the seventh-axis housing/yoke 702, the nut assembly 740, the probe latch 768, upper end-effector buttons 804, and upper light diffuser 1122. Attached to the seventh-axis assembly 700 is tactile-probe assembly 900, which includes the probe tip 904. FIG. 25B shows the line 2500 defining a plane that the beam of light emitted by the projector 1110 according to an embodiment. As seen in the front view of FIG. 25B, the beam resides in a vertical plane. From a side view, however, the beam of light 2720 is seen to expand outward at an angle A from a point 2715, as illustrated in FIG. 27B.

Figure 26:
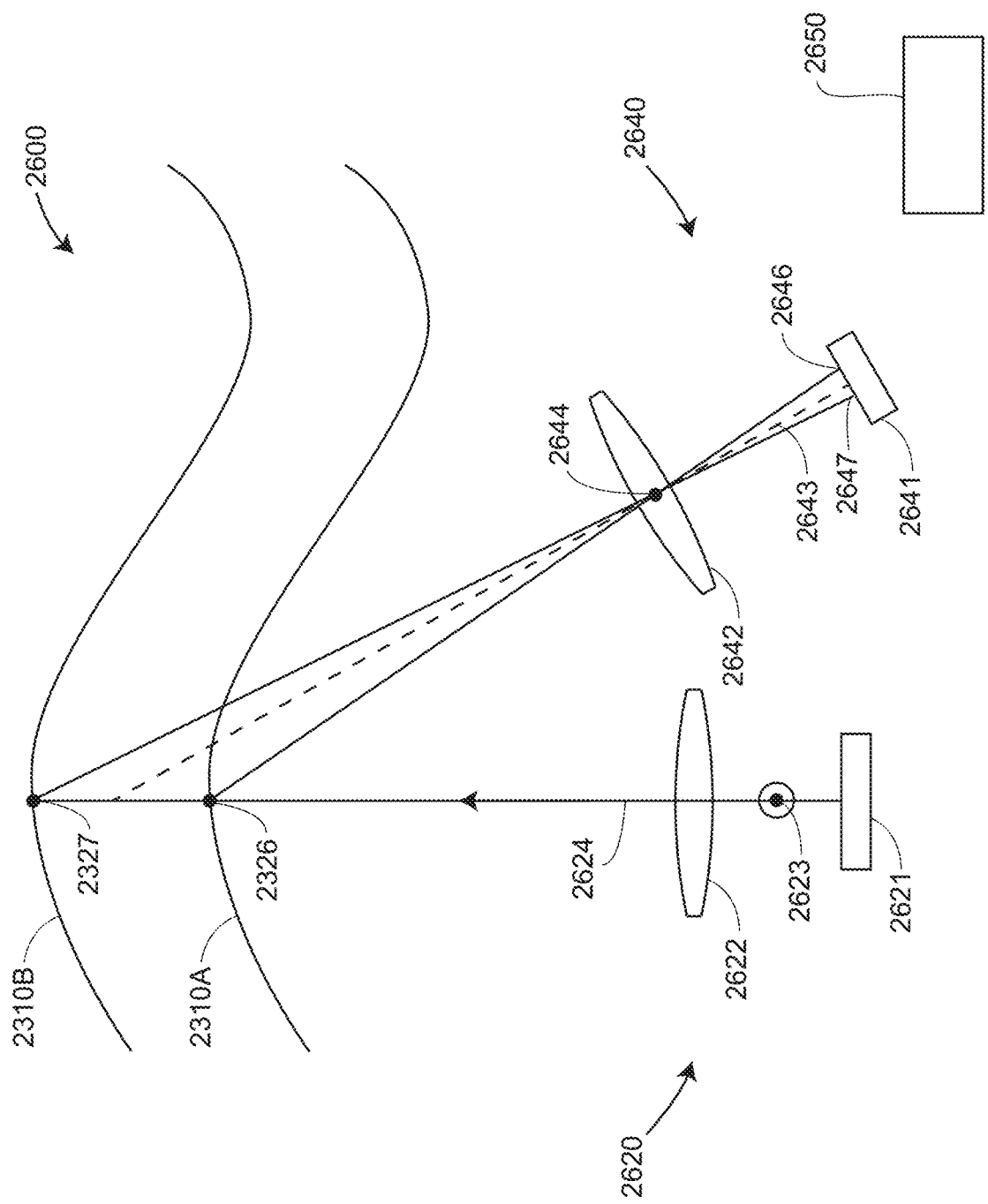
FIG. 26 illustrates schematically the principal of operation of an LLP according to an embodiment of the present disclosure.

FIG. 26 shows a schematic illustration of elements of a laser line probe (LLP) 2600, sometimes referred to as a laser line scanner or a line scanner, including a projector 2620 and a camera 2640. FIG. 26 is a top view of the LLP 2600 with the LLP 2600 looking toward object surfaces 2610A, 2610B. Because of the change in viewpoint, the camera 1100 is to the left of the projector 1110 in FIG. 25B, while the equivalent camera 2640 is to the right of the projector 2620 in FIG. 26. The projector 2620 includes a source pattern of light 2621 and a projector lens 2622. The projector lens 2622 includes a projector perspective center and a projector optical axis that passes through the projector perspective center. In the exemplary system of FIG. 26, a central ray 2624 of the beam of light coincides with the projector optical axis. The camera 2640 includes a camera lens 2642 and a photosensitive array 2641. The camera lens 2642 has a camera lens optical axis 2643 that passes through a camera lens perspective center 2644. In the exemplary LLP 2600, the camera lens optical axis 2643 and the projector optical axis are both perpendicular to a plane that encompasses the line of light 2623 projected by the source pattern of light 2621. In other words, the plane that encompasses the lines of light 2623 is in the direction perpendicular to the plane of the paper of FIG. 26. The line of light 2623 strikes an object surface, which at a first distance from the projector is object surface 2310A and at a second distance from the projector is object surface 2310B. The line of light 2623 intersects the object surface 2310A (in the plane of the paper) at a point 2326, and it intersects the object surface 2310B (in the plane of the paper) at a point 2327. For the case of the intersection point 2326, a ray of light travels from the point 2326 through the camera lens perspective center 2644 to intersect the photosensitive array 2641 at an image point 2646. For the case of the intersection point 2327, a ray of light travels from the point 2327 through the camera lens perspective center 2644 to intersect the photosensitive array 2641 at an image point 2647. By noting the position of the intersection point relative to the position of the camera lens optical axis 2643, the distance from the camera (and projector) to the object surface can be determined using the principles of triangulation, which typically rely on the "baseline" distance between the perspective centers of the projector 2620 and the camera 2640. The distance from the projector to other points projected by the line of light 2623 onto the object, that is points on the line of light that do not lie in the plane of the paper of FIG. 26, may likewise be found using the principles of triangulation.

Figure 27A:
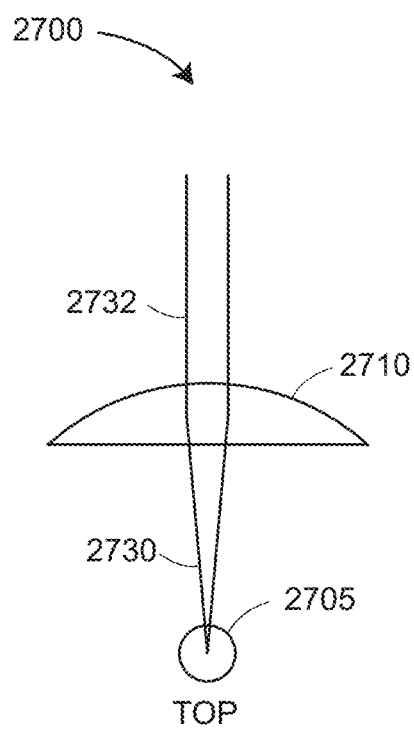
FIGS. 27A, 27B are top and side views, respectively, of an LLP light source and projection lens according to an embodiment of the present disclosure.
Figure 27B:
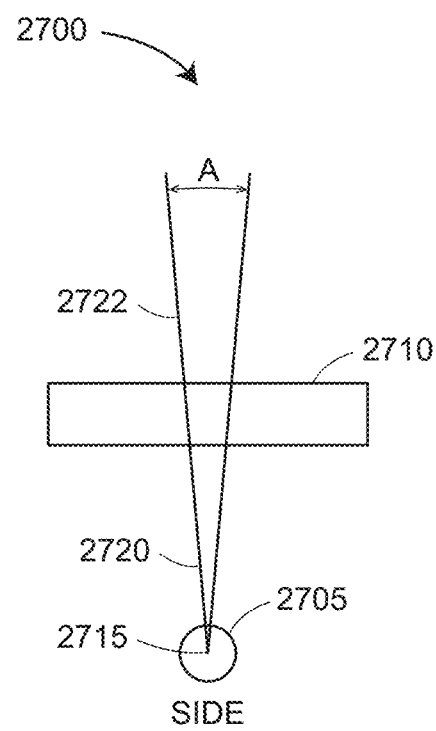

An embodiment of a light source and lens system of the projector 1110 is shown in simplified form in FIGS. 27A, 27B. A light source 2705 emits a beam of light 2720, 2730, which diverges as it travels toward a cylinder lens 2710. From the top view of FIG. 27A, the cylinder lens has a convex curvature on one surface, which causes the beam of light be collimated when viewed from the top. From the side view of FIG. 27B, the cylinder lens has no curvature so that, from the side view, the light continues to diverge 2722, 2732. In an embodiment, the light source 2705, which might be a laser diode or superluminescent diode, for example, projects light into the cylinder lens 2710. The resulting pattern of light emerging from the projector 2700 is relatively narrow and flat in one direction and relatively wider in the other direction with the light diverging at an angle A as shown in FIG. 27B. Many other types of lens systems may be used to produce an illumination pattern like that shown in FIGS. 27A, 27B.

FIGS. 28A, 28B, 28C, 28D represent images seen on a photosensitive array such as the photosensitive array within the LLP camera 1120. In FIG. 28A, the pattern 2807 seen by a photosensitive array is observed for an object surface for the case in which the irradiance (optical power per unit area) into each camera pixel is substantially constant regardless of position along the stripe. In this case, those pixels near the center of the reflected stripe pattern 2807 have pixel wells that are filled with approximately the same number of electrons. When these electrons are converted into a digital signal by an analog-to-digital converter (ADC), the digital signal level is approximately the same for each of these pixels.

In another surface having a similar shape but a different reflectance pattern, the shape of the stripe received by the photosensitive array is the same but the number of electrons in the pixel wells varies substantially, as illustrated for the pattern 2827 of FIG. 28B. In this case, the regions 2825A, 2825C, 2825E, and 2825G reflect a relatively large amount of light, which causes the pixels to saturate. In some situations, the number of electrons overflows the wells, resulting in an effect known as blooming. In the more general case, saturation refers to a condition in which electrons are not produced in a linear fashion in response to light level applied to the well. In contrast, the regions 2825B, 2825D, and 2825F reflect so little light that the electrons in the well arise to a considerable extent from electrical noise rather than from the incident light. In this low-light region, the electrical response is again not linear with respect to the incident light level. Because of the lack of linearity, the distance to the object surface is not correctly determined for the image obtained by the sensor in FIG. 28B.

FIGS. 28C, 28D illustrate a method to get around this problem. The projector 2620 projects the line of light 2623 onto the object multiple times at different optical power levels. In response, the photosensitive array 2641 captures the plurality of illuminated object lines. The processor 2650 selects from among those captured images those pixel values that are within the linear range of the photosensitive array. In this way, valid data is obtained both for those portions of the object reflecting a relatively large amount of light and those portions reflecting a relatively small amount of light.

In an exemplary case, light is projected at a relatively low-power level in a first step of FIG. 28C and projected at a relatively high-power level in a second step of FIG. 28D. In the first step of FIG. 28C, light in the regions 2845A, 2845C, 2845E, and 2845G is within the linear region of the photosensitive array, thereby producing valid results. The light in the regions 2845B, 2845D, are 2845F is too low in optical power to produce a linear response. Instead, the electrical signal in the pixels of these regions is dominated by electrical noise. In the second step illustrated in FIG. 28D, light in the regions 2865B, 2865D, and 2865F is within the linear region of the photosensitive array, thereby producing valid results. The light in the regions 2865A, 2865C, 2865E, and 2865G is too high in optical power and causes saturation. Hence the digital values obtained for the pixels in these regions cannot be trusted as having a desired level of accuracy. By combining the digital readings obtained from the regions 2845A, 2845C, 2845E, and 2845G with the digital readings obtained from the regions 2865B, 2865D, and 2865F, valid readings are obtained over the array. In an embodiment, the valid readings are obtained for the entire array.

In some cases, it may be desired to use more than two levels of optical power to accurately determine the distance to the points on a surface. Any number of levels may be used. For example, if three levels of optical power are used, they may be referred to as low, medium, and high optical powers.

The level of light reflected from a portion of an object surface depends on the reflectivity (i.e., reflectance) of the material for the given wavelength of light (projected onto a flat sample of that material). The reflectance of a given type of material may depend on the texture of the material. For example, if the material is very smooth, it may act as a mirror rather than as a surface that scatters diffusely, as is ordinarily assumed. The reflectance also depends on the angle of incidence of the projected light on the object and on the angle of reflectance of the light reflected to the camera. Very steep surfaces reflect a relatively small amount of light.

When a measurement is first begun, the overall reflectance of an object surface may not be known, with the result that the initial optical power may be selected to be too low or too high. The initial optical power selected for a sequential projection of optical powers may be adjusted according to the observed response of the photosensitive array.

The discussion herein above assumes that the optical power is adjusted to change the number of electrons captured by the pixel wells. However, it is equally possible to adjust the exposure duration (integration time) instead of the optical power to change the number of electrons in the pixel wells. A way to include the combined effects of the optical power and integration time is by using integrated energy. The optical energy for a pixel equals the integral of the optical power incident on the pixel over the integration time of the pixel.

In an embodiment that produces a high dynamic range (HDR) measurement of 3D coordinates, two or more images—for example, the images of FIGS. 28C and 28D—are captured with a photosensitive array and converted into digital values with an ADC. The digital values are processed to provide relatively accurate 3D coordinates over a larger portion of the object surface than might otherwise be possible. In an embodiment, a first image (such as the image of FIG. 28C) is processed to fill in the table 1 of FIG. 29A, and a second image (such as the image of FIG. 28D) is processed to fill in the table 2 of FIG. 29B. The cells labeled 2910 are filled in with "peak" values for different positions (1 to M) along the imaged line in FIG. 28A, and the cells labeled 2915 are filled in with corresponding calculated centroid values. The cells labeled 2930 are filled in with peak values for different positions (1 to M) along the imaged line in FIG. 28B, and the cells labeled 2935 are filled in with the corresponding calculated centroid values. The results of the table 1 and table 2 are combined to fill in the composite table 2965 of FIG. 29C with composite centroid values, which are used by a processor to determine 3D coordinates of the object. More details on how peaks and centroids are determined is discussed further herein below. The example given here was for the case of two captured images (e.g., FIGS. 28C, 28D), but as indicated by the ellipsis following table 2, more images may be included in determining the composite array of FIG. 29C.

Figure 30:
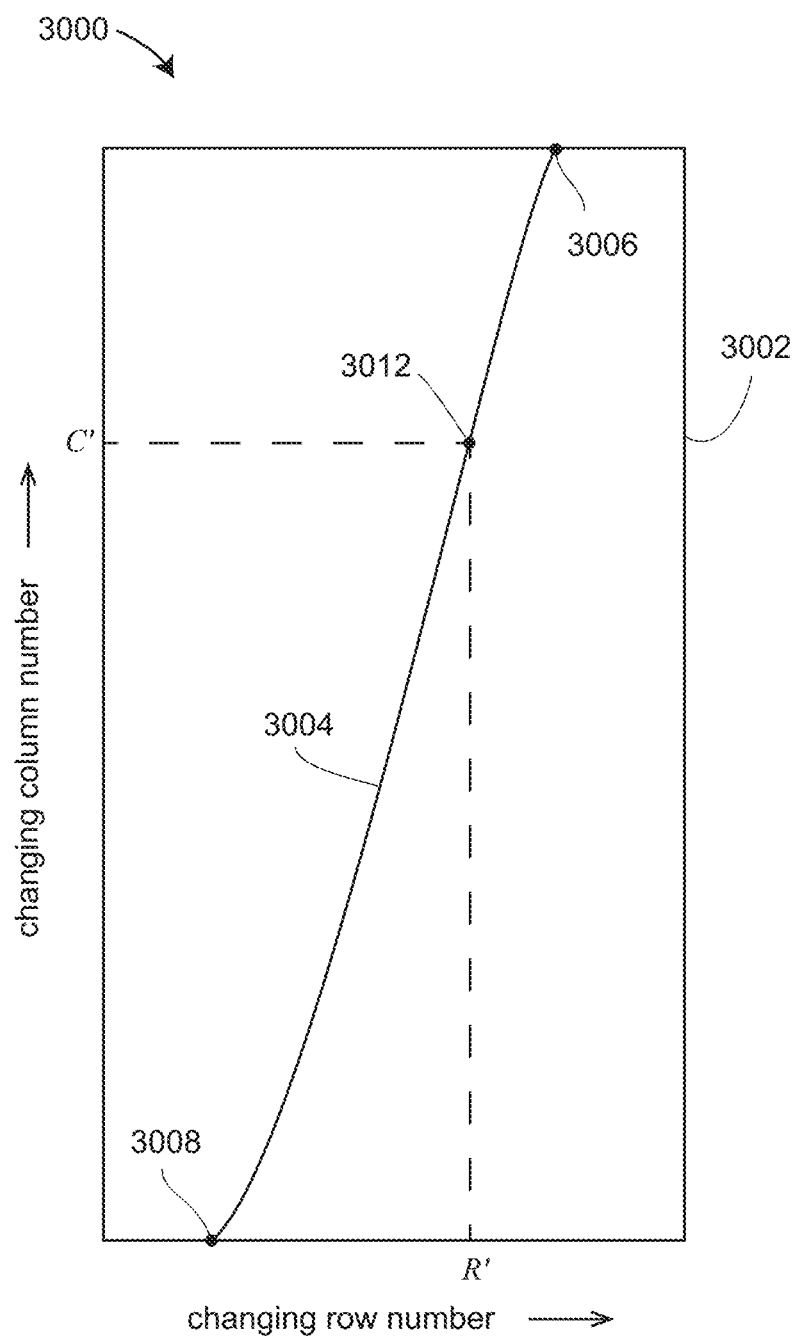
FIG. 30 is a schematic illustration of image data captured by a photosensitive array of a line scanner according to an embodiment according to an embodiment of the present disclosure.

In an embodiment, a photosensitive array has C columns and R rows of pixels. For example, a photosensitive array 2641 might have C=1900 columns and R=1000 rows of square pixels. In an embodiment, the photosensitive array is oriented so that the projected line of light (FIG. 25B) along the plane defined by line 2500 that is parallel to the long side of the photosensitive array, producing a line scan like that shown in FIG. 30 for example. In other words, in the orientation of the LLP 1100 shown in FIG. 25B in which the line of light is emitted in the vertical direction, the long side of the photosensitive array in the camera 1120 is also oriented in the vertical direction. This situation is illustrated in FIG. 30, where the active area of the photosensitive array 3000 is a rectangular shape 3002 having its long side in the vertical direction. The curve 3004 indicates the shape of the object being scanned by the vertical line emitted by the projector 1110. As can be seen from FIG. 26, in looking from the object toward the active side of the photosensitive array 2641, nearer points of light strike more toward the left side of the photosensitive array 2641, while more distant points of light strike more toward the right side. Consequently, points on the curve 3004 to the left side of the active area of photosensitive array 3000 are closer to the LLP 1100 than are points to the right side of the active area.

Object points of light above the plane of the paper in FIG. 26 pass through the camera lens perspective center 2644 before striking the photosensitive array 2641 beneath the plane of the paper. Likewise, points below the plane of the paper pass through the camera lens perspective center 2644 to strike the photosensitive array 2641 above the plane of the paper. Hence in FIG. 30 the point 3006 represents an object point that is relatively distant from the line scanner and low on the object, while the point 3008 represents an object point that is relatively near to the line scanner and high on the object. For the present example in which there are C=1900 columns and R=1000 rows of square pixels, the vertical axis represents changes in column number and the horizontal axis represents changes in row number. A triangulation calculation based at least in part on a baseline distance between the camera and projector of FIG. 26 may be performed to determine the values of object 3D coordinates 3012 corresponding to pixel coordinates (C', R'). In the remainder of this document, for convenience the terms column and row are used according to the conventions above in which the line of light 2623 is aligned to the long side of the photosensitive array 2641. However, in other embodiments, the pixel array 2641 may be oriented so that the projected line of laser light 2623 is oriented along the short side rather than the long side of the photosensitive array. In this case, the use of the words "columns" and "rows" would be reversed (for the case of square pixels). In general, the terms columns and rows are placeholders that may be reversed without a loss of generality.

In an embodiment, a line scanner 1100 is attached to an AACMM 10. In other embodiments, a line scanner having similar functionality to the scanner 1100 is attached to a different type of device such as a robot or production inspection station. The measurement made by the line scanner 1100 gives 3D coordinates in the frame of reference of the line scanner. If the line scanner is moving, the movement of the line scanner is considered in determining 3D coordinates within a stationary frame of reference. In the case of the AACMM 10, the pose of the AACMM is determined based at least in part on readings of the angular encoders within the AACMM 10 and the lengths of elements of the AACMM 10—for example, the lengths of the arm segments 295, 595. The term "pose" as used here means the six degrees-of-freedom of the LLP 1100 on the end of the AACMM 10.

As stated herein above, a procedure is desired for determining the peak value and centroid position of each row. Aspects of the procedure for determining the peak value and centroid position include (1) mathematical methods for determining peak and centroid values, (2) ways to eliminate reflections of relatively low quality, and (3) ways to identify and eliminate multipath interference reflections.

The term centroid as used herein is a shorthand way of saying "measure of central tendency." As used here, the term centroid narrowly means the same thing as alternative terms center of gravity (COG) and center of mass. In addition, the measure of central tendency may not be computed as a simple centroid but may be calculated in a more complex way using curve fitting or nonlinear methods, if desired. In the rest of this document, it is understood that the more general term "measure of central tendency" may be substituted for the term "centroid."

Figure 31A:
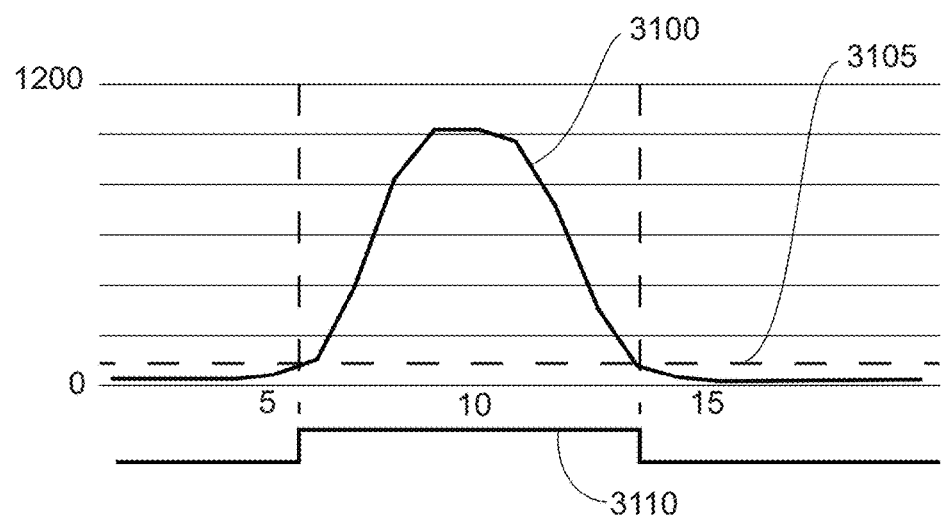
FIGS. 31A, 31B, 31C illustrates some mathematical methods of determining limits over which centroid calculations are performed according to an embodiment of the present disclosure.
Figure 31B:
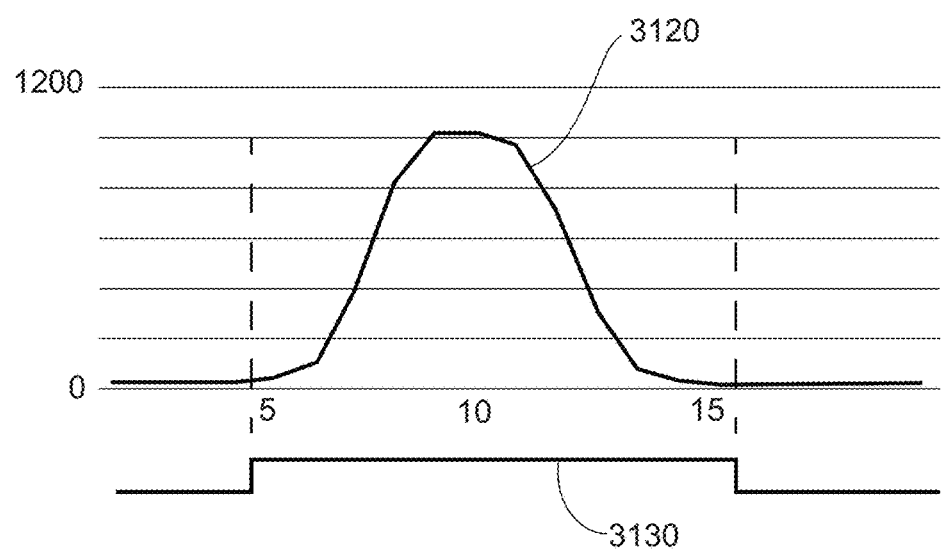

To calculate the centroid for pixel values such as those illustrated in the curves 3100 of FIG. 31A and curve 3120 of FIG. 31B, boundaries (rows) for the centroid calculation may be selected. FIG. 31A illustrates a simple thresholding approach in which a threshold value 3105 is set to 800. The range of pixels exceeding the threshold value fall within the rows of the mask 3110. Pixels within this range are included in the centroid calculation.

Figure 31C:
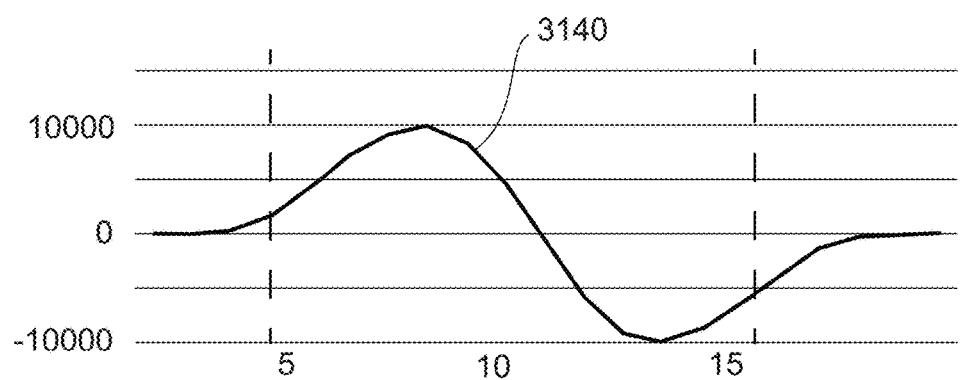

A different approach is used to find the mask 3130 in FIG. 31B. In this case, the pixel values are put into an edge filter that uses a convolutional kernel. The result of this filtering process is the edge filter output 3140 of FIG. 31C. In an embodiment, the boundaries (rows) that determine the edges of the mask 3130 are established based on a positive turn-on threshold and a negative turn-off threshold. In the example of FIGS. 31B, 31C, the mask turns on when the edge filter output 3140 exceeds 1500 and turns off when the filtered output exceeds -5000. Many other methods may be used to determine the range of pixel values to be considered when determining the centroid.

For each of column C' of the photosensitive array 2641, there will be a centroid value, which has an equivalent centroid row value R' of the array for the column C'. There will also be a peak row value for the column C'. The peak may be the maximum pixel value within the mask (such as the mask 3110 or 3130). Alternatively, the peak may be an equivalent peak value obtained by processing of the data within the mask.

More than one bump or peak value may occur in a given column C' when multipath interference is present in the measurement. In an embodiment, "bumps" within each column are evaluated as prospective reflections from the reflected line of light on the object. In an embodiment, those bumps having characteristics of a quality reflection are further evaluated to determine centroid and peak values. In an embodiment, a bump is considered unsuitable if at least one of the following conditions are met: (1) the minimum pixel value in the centroid calculation exceeds a "maximum pixel threshold" (e.g., 200); (2) the maximum pixel value in the centroid calculation is less than a "minimum pixel threshold" (e.g., 400); (3) the width of the mask (such as 1310, 1330) is less than a "minimum width threshold" (e.g., 5); (4) the maximum pixel value minus the minimum pixel value is less than a "minimum maximum threshold" (e.g., 150); (5) the level of the last pixel in the calculation minus the level of the first pixel is less than a "first last threshold" (e.g., 250); and (6) the maximum pixel level in the centroid calculation minus the "first last difference" exceeds a "flatness threshold" (e.g., 150). Here "first last difference" is defined as the difference in values between the first and last pixels within the mask.

Figure 32:
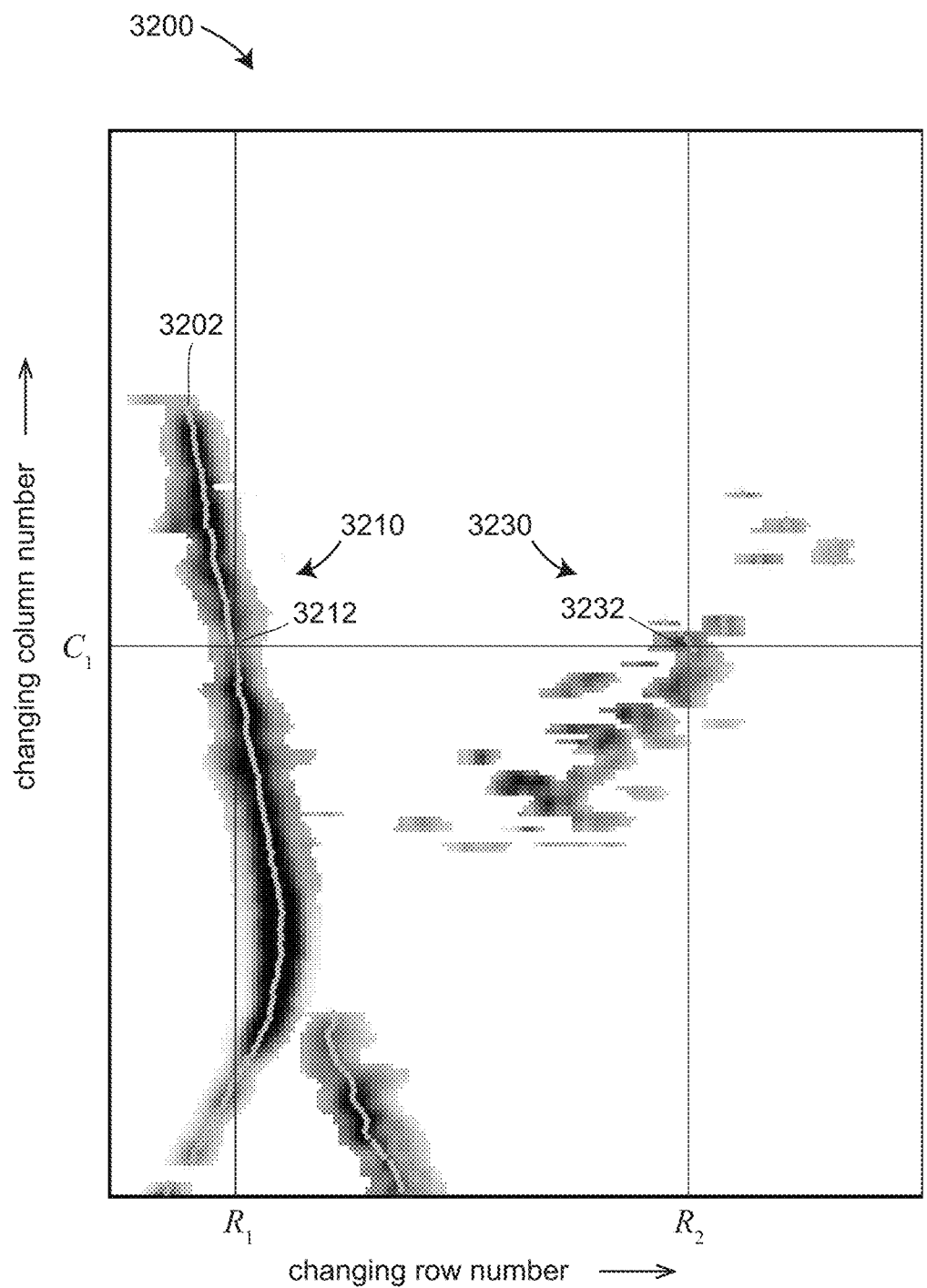
FIG. 32 is a portion of image data captured on a photosensitive array showing the appearance of multipath interference according to an embodiment.

FIG. 32 shows a portion of an image 3200 obtained by a photosensitive array 2641 of a line scanner 2600. For the column $C_1$, there are two rows $R_1$ and $R_2$ for which centroids and peak values are calculated according to the procedures described above. An example of a situation that may cause there to be more than one such bump is multipath interference. Multipath interference occurs when a point of light on the projected line of light 2623 illuminates the object in two different places to produce two different reflections from the object—a primary reflection and a secondary reflection. If the photosensitive array 2641 is positioned to receive both the primary and secondary reflections, multipath interference is said to occur. Multipath interference is most often seen when surfaces have a relatively large curvature capable of reflecting incident light onto secondary points on the object. Multipath interference is also more likely to be seen if a portion of the object reflects not only diffusely but also specularly, that is, like a mirror.

Near the column $C_1$, there is one main first branch 3210 of reflected light and one secondary branch of reflected light 3230. For each column, a centroid 3202 is calculated whenever the quality criteria described earlier are met. For the column $C_1$, calculations identify as the centroid value 3212 (e.g. the peak value for the column $C_1$) for the first branch 3210 and the centroid value 3232 for the secondary branch of light 3230.

A procedure is desired to identify the desired primary reflections and reduce or eliminate the undesired multipath reflections. One strategy for evaluating centroids on multiple rows is to look at the trend of the centroids in relation to other nearby centroids. In general, desirable reflections tend to have nearby columns that each have approximately the same centroid value and mask width. Reflections having centroid values or mask widths that depart widely from nearby columns are usually removed or eliminated, such as if those reflections occur in small clumps. If such a determination is not possible, in some embodiments the identified bumps in the column are eliminated. Afterwards, the object may be remeasured from another direction, which may result in the multipath interference being eliminated for the unmeasured portion of the object surface.

In FIG. 32, because the centroid values are relatively widely spaced for clumps of pixels of the second branch of light 3230 near the centroid 3232, it is likely that a processor coupled to the line scanner will identify the centroid 3232 as invalid (e.g. an invalid entry) based on the variation in the centroid values and mask widths of nearby neighboring clumps of pixels. If the processor cannot determine whether the centroid 3232 is valid, then in an embodiment the calculated centroid values are dropped for column $C_1$.

In an embodiment illustrated in FIG. 30, a column number C' illuminated at a point on the photosensitive array 2641 (FIG. 26) corresponds to a relative angle of a particular ray of light emitted by the projector 2620. For a given distance between the line scanner and the object, the column number C' further corresponds to the height of the point on the object. The row number R' in FIG. 30 corresponds to a distance, with nearer distances being further to the left on the photosensitive array 2641 (as viewed from the front of the array). In FIG. 33A, the leftmost row of the photosensitive array 2641, which is labeled $R_{MIN}$, corresponds to the minimum distance that can be measured with the line scanner. The rightmost row, labeled $R_{MAX}$, corresponds to the maximum distance that can be measured with the line scanner.

It should be stated that the values of $R_{MIN}$ and $R_{MAX}$ are not minimum and maximum distances that apply exactly for at least some column numbers. In general, a straight, vertical line projected onto a flat surface by a line scanner 1100 will not produce an exactly straight line that is exactly parallel to the long axis of the image region 3302. There are several types of lens aberrations and other effects such as misalignment and keystone effects that cause this to occur. Compensation procedures performed at the factory allow 3D coordinates to be mapped onto column-row positions on the photosensitive array 2641. However, even with compensation, the left edge of the window image region 3302 does not have a distance that is exactly a constant value $R_{MIN}$ for the left edge of the photosensitive array or exactly a constant value $R_{MAX}$ for the right edge of the photosensitive array. For the present discussion, rows in the photosensitive array 2641 are spoken of as having constant distance values to simplify the discussion, even though this is an approximation. Mapping corrections are desired to obtain the exact/precise distances and projected angles for each row and column in the image region 3302.

If an object being measured has a relatively large depth, which is to say that the distance between the nearest measured distance and the farthest measured distance is relatively large, then substantially all of the rows of the photosensitive array from $R_{MIN}$ to $R_{MAX}$ may be available during the measurement. On the other hand, if the depth of the object under test is relatively small, and if the line scanner is kept at a relatively constant distance from the object, then it would be advantageous to narrow the range of measured rows since this would permit measurement speed to be increased.

As an example, suppose that the camera 2640 captures an image 3300 within the full size of image region 3302, where the image 3300 includes image data 3304 as illustrated in FIG. 33A. In an embodiment, a processor sends a command to the photosensitive array 2641 to limit the captured data to a window between the rows to $R_L$ and $R_H$, the row $R_L$ being smaller than the smallest measured value 3308 and the row $R_H$ being larger than the largest measured value 3306. On the next frame, the image data 3350 is captured within the reduced window shown in FIG. 33B. If the collected image data 3354 has a smallest measured value 3358 and a largest measured value 3356 falling within the reduced window 3352, the size of the window is not reset for the next measurement. Although the example given in FIGS. 33A, 33B shows the window size being set to reduce the number of rows captured by the photosensitive array 2641, in other embodiments the number of columns in a window of the photosensitive array 2641 may also change.

In an embodiment, a processor sends a command/instruction to the photosensitive array 2641 to set the size of the window whenever window size may be changed during a measurement. A method for doing this is described herein below in reference to FIG. 35. In an embodiment, a processor determines whether image data has been collected for at least some, if not all, columns in the array. If not, this may indicate that part of the data has fallen outside the range from $R_L$ to $R_H$. Based on this, the processor may instruct the photosensitive array 2641 to change the window size.

In one embodiment, the window size is changed from the reduced size of FIG. 33B to the full array size of FIG. 33A whenever a processor has determined that some of the pixels have been missed, possibly as a result of the image data being outside the window of FIG. 33B. In an alternative embodiment, the window size is changed to the full array size of FIG. 34A on an interleaved basis as illustrated in FIG. 34B. In the method illustrated in FIGS. 34A, 34B, even if the first reduced window misses some image data, some number of measurements N continue to be made for the data sets 3404B to 3404X before the processor sends a command to the photosensitive array 2641 to capture image data over the full array as in FIG. 34A. For the case in which N=1, the embodiment illustrated in FIGS. 34A, 34B is the same as the embodiment illustrated in FIGS. 33A, 33B.

FIGS. 34C, 34D, 34E, 34F, 34Y, 34Z illustrate a method of combining the speed advantages of using window sub-regions with the HDR advantages described in relation to FIGS. 28A, 28B, 28C, 28D above. In an embodiment illustrated in FIGS. 34C, 34D, the projector 2620 projects the line of light 2623 (FIG. 26) onto the object two times, each time at a different optical power level. In response, the photosensitive array 2641 captures the plurality of illuminated object lines. The processor 2650 selects from among those captured images those pixel values that are within the linear range of the photosensitive array. In this way, valid data is obtained both for those portions of the object reflecting a relatively large amount of light and those portions reflecting a relatively small amount of light. In an exemplary case, light is projected at a relatively low-power level in the first step of FIG. 34C and projected at a relatively high-power level in a second step of FIG. 34D. In the first step of FIG. 34C, light in the regions 3445A, 3445C, 3445E, and 3445G is within the linear region of the photosensitive array, thereby producing valid results. The light in the regions 3445B, 3445D, are 3445F is too low in optical power to produce a linear response (e.g. these may form an invalid entry). Instead, the electrical signal in the pixels of these regions is dominated by electrical noise (e.g. these form an invalid entry). In the second step illustrated in FIG. 34D, light in the regions 3465B, 3465D, and 3465F is within the linear region of the photosensitive array, thereby producing valid results. The light in the regions 3465A, 3465C, 3465E, and 3465G is too high in optical power and causes saturation. Hence the digital values (e.g. the representations) obtained for the pixels in these regions cannot be trusted. By combining the digital readings (e.g. a summary representation) obtained from the regions 3445A, 3445C, 3445E, and 3445G with the digital readings obtained from the regions 3465B, 3465D, and 3465F, valid readings are obtained over the entire array.

Figure 34D:
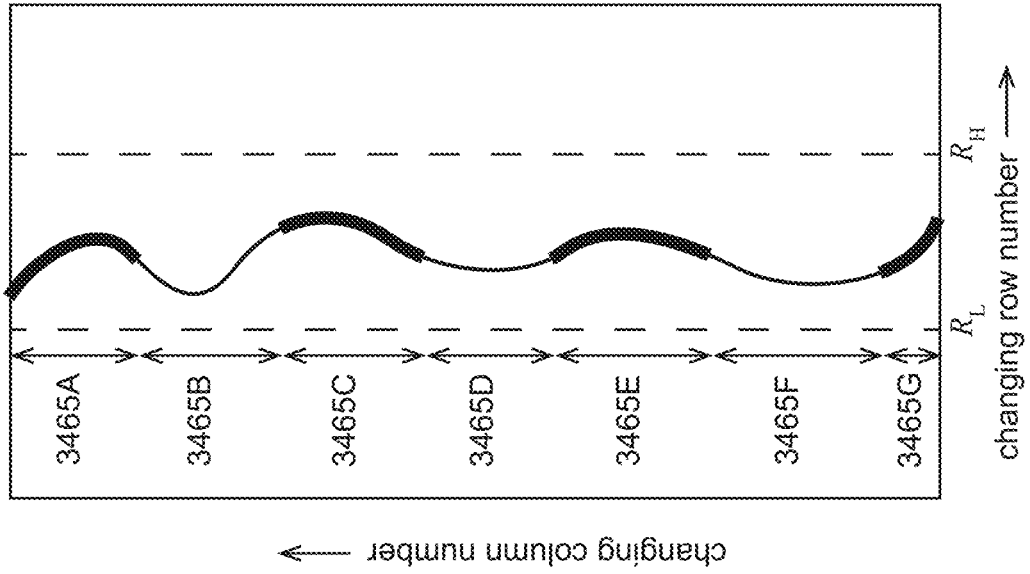
FIG. 34C, 34D, 34E, 34F, 34Y, 34Z are schematic illustrations showing window size and optical power adjusted during measurements according to an embodiment of the present disclosure.
Figure 34C:
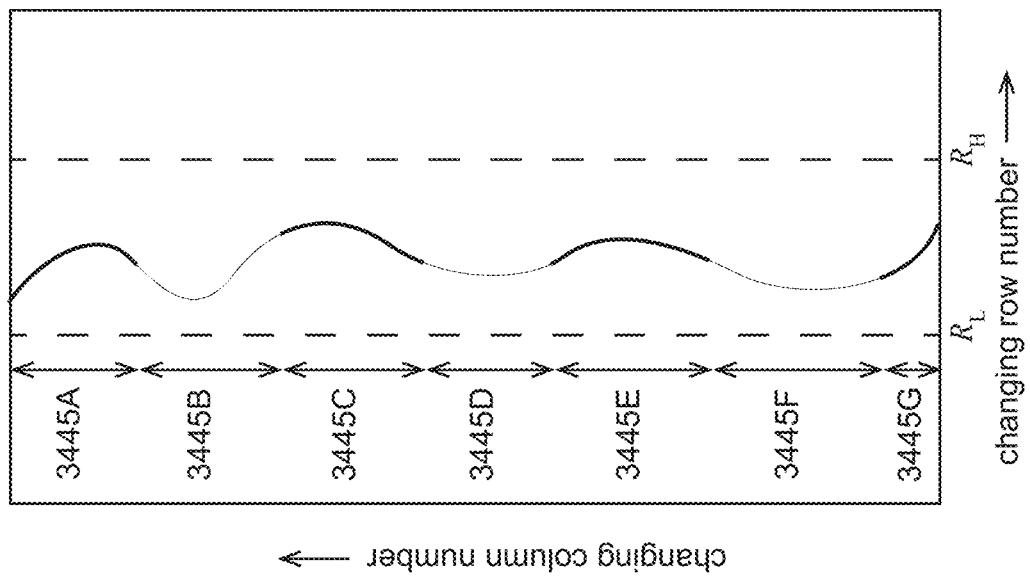
Figure 34Z:
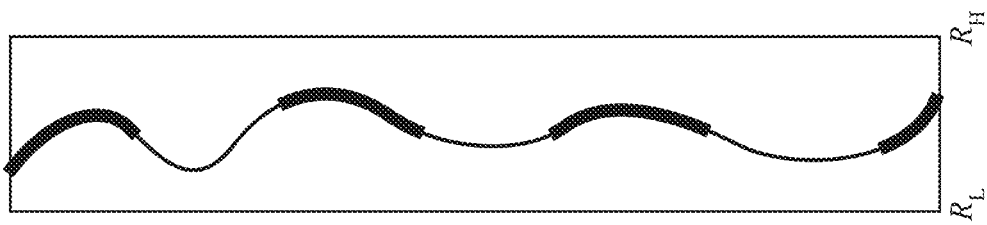
Figure 34Y:
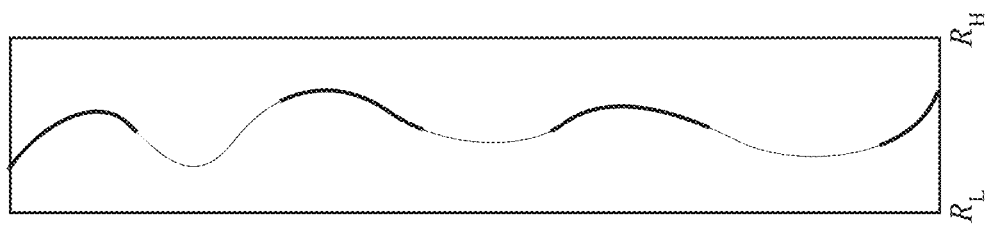
Figure 34F:
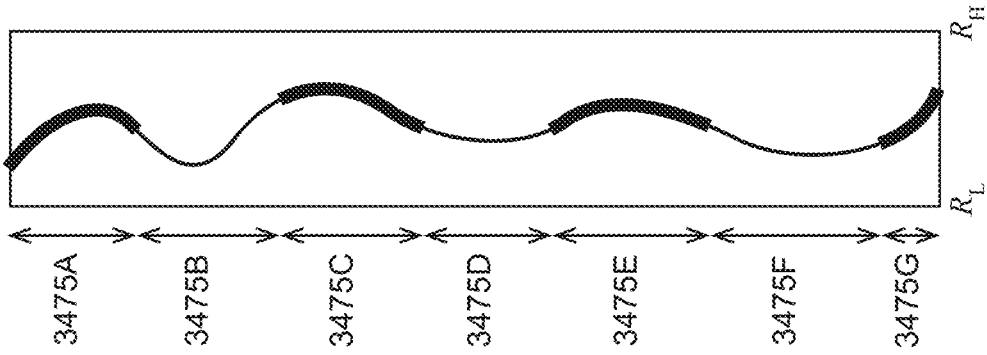
Figure 34E:
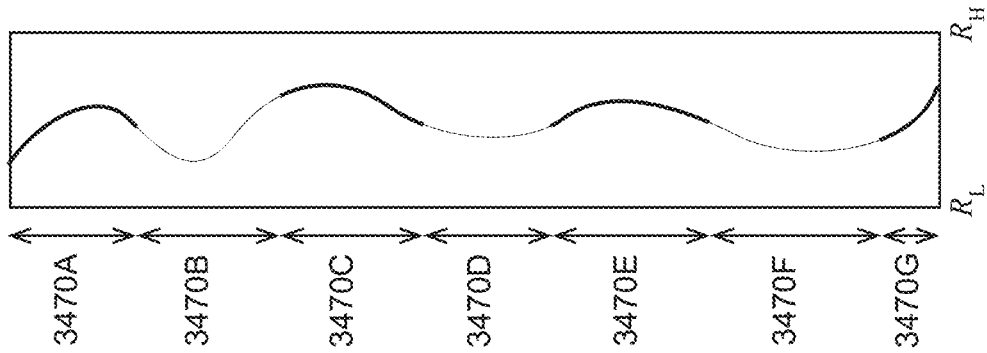

To obtain the advantages of windowing, as illustrated in FIGS. 33A, 33B, 34A, 34B, with the advantages of HDR, as illustrated in FIGS. 34C, 34D, a processor sends a command to the photosensitive array 2641 to limit the captured data to a window between the rows to $R_L$ and $R_H$ for each of the two successive frames shown in FIGS. 34C, 34D, resulting in a next sequence of frames shown in FIGS. 34E, 34F. Pixel values within the regions 3470B, 3470D, 3470F that are too small are eliminated, as are pixel values within the regions 3475A, 3475C, 3475E, 3475G that are too large. However, in an embodiment, the pixel values with the FIG. 34F and not FIG. 34E are evaluated for missing pixels to determine whether the selected window rows $R_L$ and $R_H$ could be continued in the next frames. The reason that FIG. 34E is not evaluated for missing pixels is that the relatively very small optical power level (invalid entries) of the reflected line in the regions 3470B, 3470D, 3470F increases the probability that some columns may not be seen even though the row size is in the desired location/range. In contrast, pixels in the columns of FIG. 34F receive adequate optical power from the reflected line of light. As a result, in some embodiments, for a given column evaluation, there may be a valid entry (e.g. a peak value) or an invalid entry (e.g. pixels having an undesirable pixel value, such as being below a threshold). In this embodiment, the processor may determine a summary representation of the representations of the acquire images (e.g. FIGS. 34E and 34F). Where both the first value and the second value are valid numerical values, then the larger of the two could be selected or the results could be weighted. If one of the two representations included a valid number, then the representation having the valid number would be selected. If both representations were non-valid entries, then that column would have a non-valid entry.

In an embodiment, the windowing and HDR procedure returns from a windowed array to a full array if the number of pixels in FIG. 34F that are absent is above a predetermined threshold, which might indicate that the bounds between $R_L$ and $R_H$ have been set too narrowly. If the number of absent pixels are below the threshold, measurements may continue indefinitely, for example, in the windowed regions shown in FIGS. 34Y, 34Z in a manner following that applied to FIGS. 34E, 34F. It should be appreciated that while embodiments herein describe the determination in reference to the number of absent pixels being below a threshold, in other embodiments, the determination may be based on whether the number of pixels present is above a predetermined threshold. In an embodiment, the predetermined threshold may be user-defined. In an embodiment, a "missing pixel" is an evaluated column where the pixel valves do not include a suitable peak value or bump. In other words, for a given evaluated column, the reflected line of light 2623 may be off to the side of the defined window. It should be appreciated that while embodiments herein refer to the evaluation of a column of pixels, in other embodiments, the evaluation may be based on a row of pixels.

Figure 35:
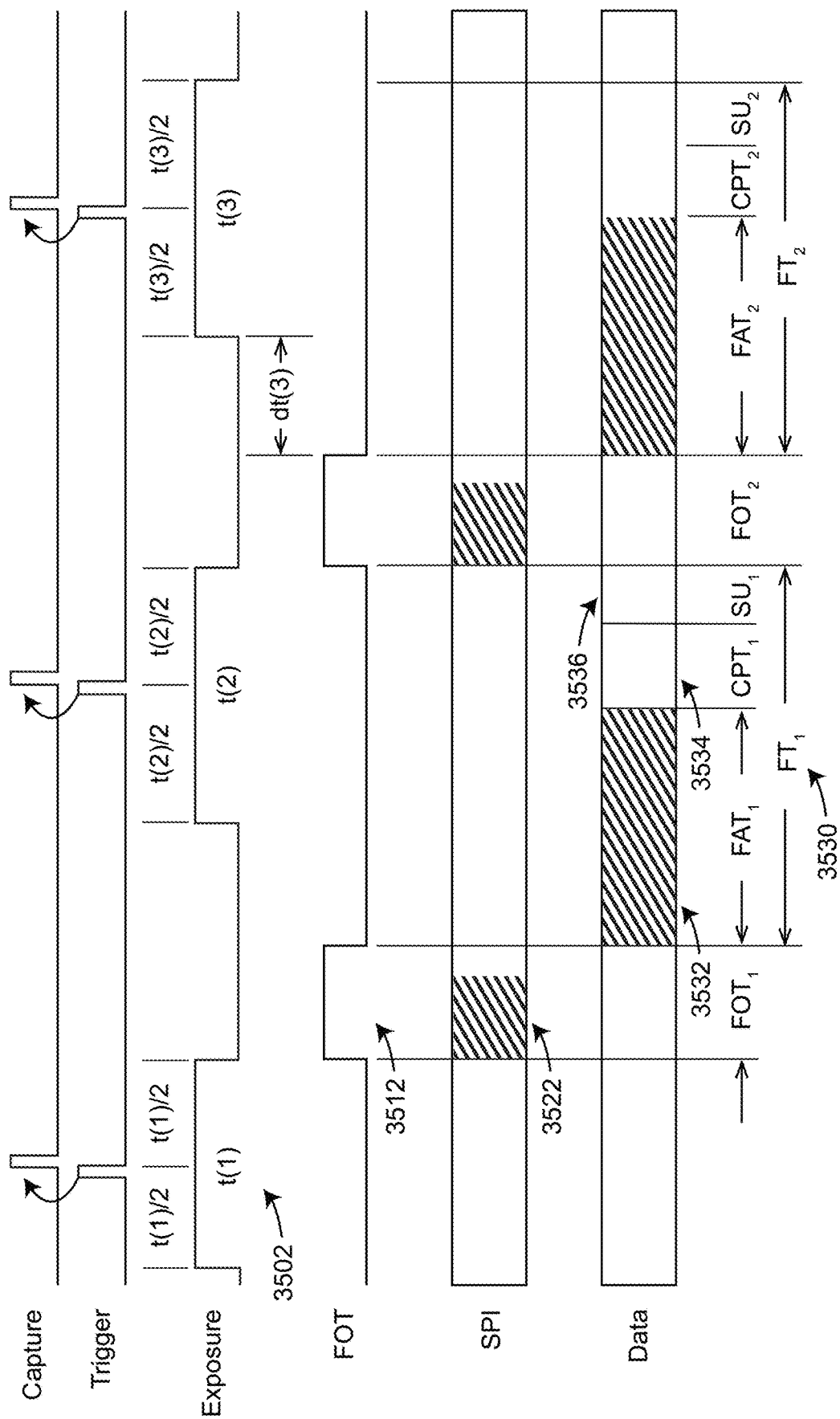
FIG. 35 is a timing diagram for a photosensitive array according to an embodiment of the present disclosure.

In an embodiment, the line scanner 1100 is attached to the AACMM 10. FIG. 35 is a timing diagram showing the relative timing of actions taken by the photosensitive array 2641 and AACMM. In an embodiment, the photosensitive array 2641 receives an initial exposure 3502 lasting a time t(1), the exposure occurring while the line of light 2623 is being reflected from the object. In an embodiment, the photosensitive array 2641 has a pipelined global shutter. For a pipelined global shutter, electrons within the pixel wells of the photosensitive array 2641 are transferred as an analog current to an analog-to-digital converter (ADC) and then into pixel buffers as digital signals during a frame overhead time (FOT) 3512. Following the FOT, the pixels in the array are emptied and new image data may be collected without overwriting old data. During the first $FOT_1$, instructions are written to the photosensitive array 2641 over a serial peripheral interface (SPI) during an interval 3522 within the $FOT_1$.

SPI was developed by Motorola in the mid-1980s and is used today as a de facto standard. The SPI instructions may indicate the window size for the next frame. In general, the SPI electrical instructions are sent during an FOT to reduce or minimize potential adverse effects on light captured by the pixels during the initial exposure 3502.

Following the $FOT_1$, data is read out from the pixel buffers to a processor during a first frame acquisition time ($FAT_1$) 3532. Afterwards, a processor calculates the centroid values during a first centroid processing time ($CPT_1$) 3534 and then performs whatever additional setup ($SU_1$) 3536 tasks are used to set the window size and exposure time. The sum of $FAT_1$, $CPT_1$, and $SU_1$ is the first framing time ($FT_1$) 3530.

In an embodiment, the end of each exposure is set to coincide with the start of an FOT. The time used to transfer pixel data from the pixel buffers to the processor is determined by the number of rows and windows in the pixel data being transferred. As an example, a window of the photosensitive array 2641 might have a FAT given by FAT=total readout time*(stop row−start row+1)/total rows. Here total rows is the number of rows in the full array and the total readout time is the time used to read out the full array. This formula assumes that the columns are included in the readout. The formula would be modified if the number of columns changes from the maximum number. In general, the frame time FT can be found since FAT, CPT and SU can be calculated. It is therefore possible to calculate the delay time from the end of a FOT interval to the desired start of the next exposure. For example, FIG. 35A shows that the delay time $dt(3)=FT_2-t(3)$, where $t(3)$ is the desired exposure for the third interval and $FT_2$ is the second frame time. In an embodiment, the desired exposure for each interval is determined based at least in part on the pixel data transferred to the processor during the last FOT. If the pixel data shows many values that are too high, a change in settings to reduce exposure might be in order. Likewise, if the pixel data shows many values that are too low, a different change in the exposure time might be desired.

For the case of the line scanner 1100 attached to the AACMM 10, a correction is made to account for the six degree-of-freedom pose of the line scanner provided by the AACMM. The pose of the line scanner is calculated based on readings of the angular encoders in the AACMM, the length of various components (e.g., arm segments) of the AACMM, and so forth. A potential issue is that a line scanner attached to an AACMM can move during an exposure time. This effect is more pronounced if the reflectance of the object is small since that results in exposure times being lengthened.

In an embodiment of the present disclosure, encoders are read near the center of the exposure interval to reduce or minimize the error resulting from movements of the AACMM during exposure. For the third exposure in FIG. 35, this is accomplished having the line scanner 1100 send an encoder trigger signal to the AACMM 10 at a time $dt(3)+t(3)/2$ following the $FOT_2$.

Figure 36:
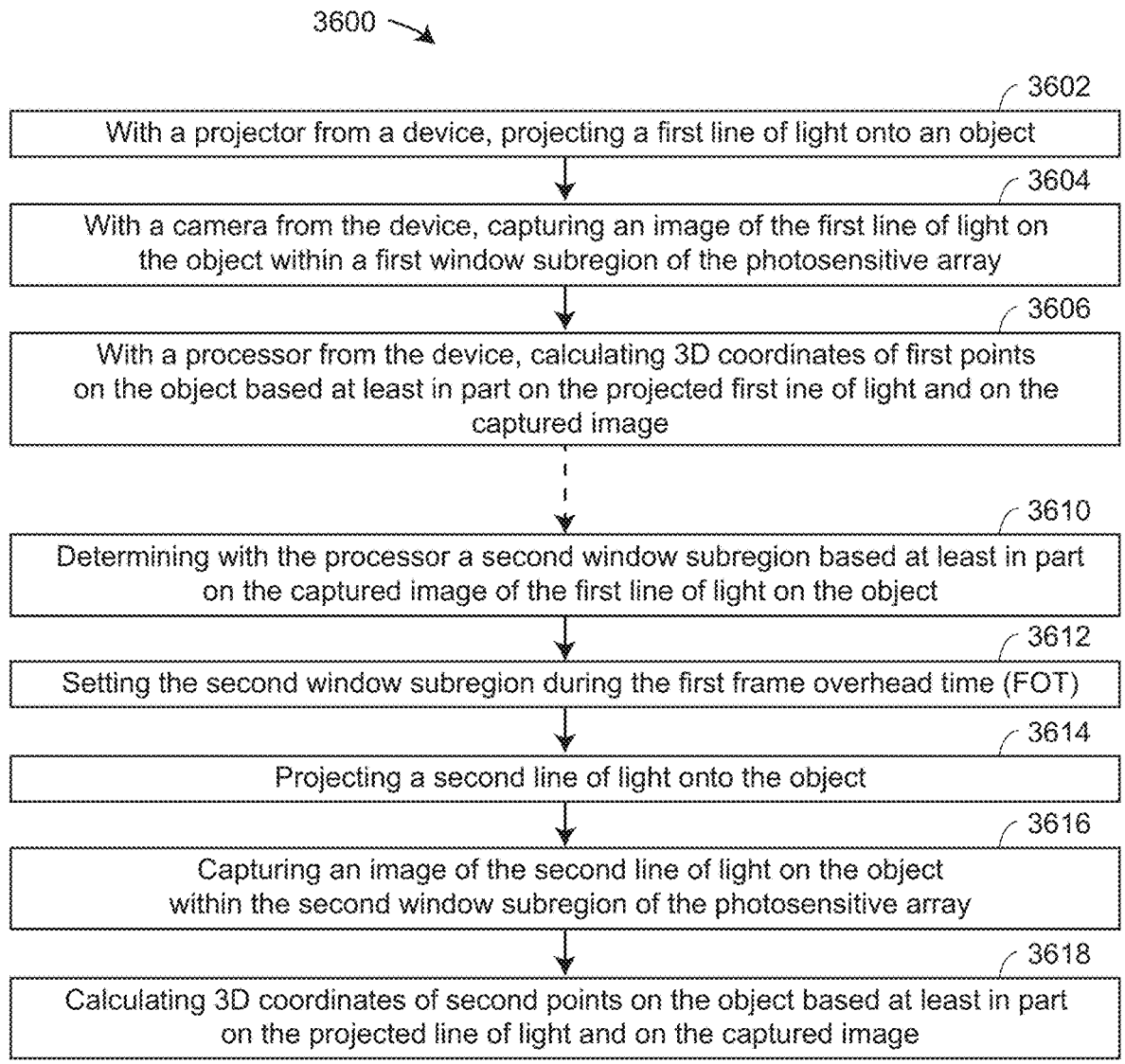
FIG. 36 is a schematic representation of elements of methods according to an embodiment of the present disclosure.

FIG. 36 is a schematic representation of steps taken in a method 3600 according to embodiments of the present disclosure. In an element 3602, a projector from a device projects a first line of light onto an object. The device in this case is a line scanner, also known as an LLP, such as the device 1100 or the device 2600. In an element 3604, a camera from the device captures an image of first line of light on the object within a first window subregion of the photosensitive array. The term window subregion means a portion of the photosensitive array smaller than the full array. In a step 3606, a processor from the device calculates 3D coordinates of first points on the object based at least in part on the projected first line of light and on the captured image. In an element 3610, the processor determines a second window subregion based at least in part on the captured image of the first line of light on the object. If the columns in the captured image include centroid values, and if those centroid values span a relatively small range of rows, the second window subregion may be advantageously made smaller than the first window subregion, permitting faster measurements to be made. On the other hand, if it was not possible to determine centroid values for several of the columns, then it may be advantageous to make the second window subregion larger than the first window subregion, perhaps even returning to the full array size. In an element 3612, the processor sets the second window subregion during the first frame overhead time (FOT). Because exposure it not occurring during the FOT in which pixel charge is converted to digital values within pixel buffers, there is a reduced or no risk of electrical contamination (e.g. interference) of light signals during this phase. In an element 3614, a second line of light is projected onto the object. In a step 3616, the photosensitive array captures an image of the second line of light on the object within the second window subregion of the photosensitive array. In an element 3618, the processor calculates 3D coordinates of second points on the object based at least in part on the projected line of light and on the captured image.

A method for improving the dynamic range of a line scanner was described herein above in reference to FIGS. 28A, 28B, 28C, 28D, 29A, 29B, 29C. In this method, pixel exposure or projected laser power was changed in successive frames, enabling 3D coordinates obtained in successive frames to be combined improve HDR. A method for improving measurement speed was also described herein above in reference to FIGS. 30, 31A, 31B, 31C, 32, 33A, 33B. In this method, reading of the photosensitive array was restricted to a windowed region within the photosensitive array. Another method obtained the benefits of both HDR and high speed by combining multiple projection and windowing methods as described in FIGS. 34A, 34B, 34C, 34D, 34E, 34F, 34Y, 34Z. A pipelined global shutter, now available in some cameras, provides benefits for obtaining HDR and high speed, as illustrated in the timing diagram of FIG. 35.

Now available in some cameras is the ability to alternate exposure time for alternate rows. This feature provides another way to obtain high speed and high dynamic range. This method may be further combined with windowing if desired.

Figure 37:
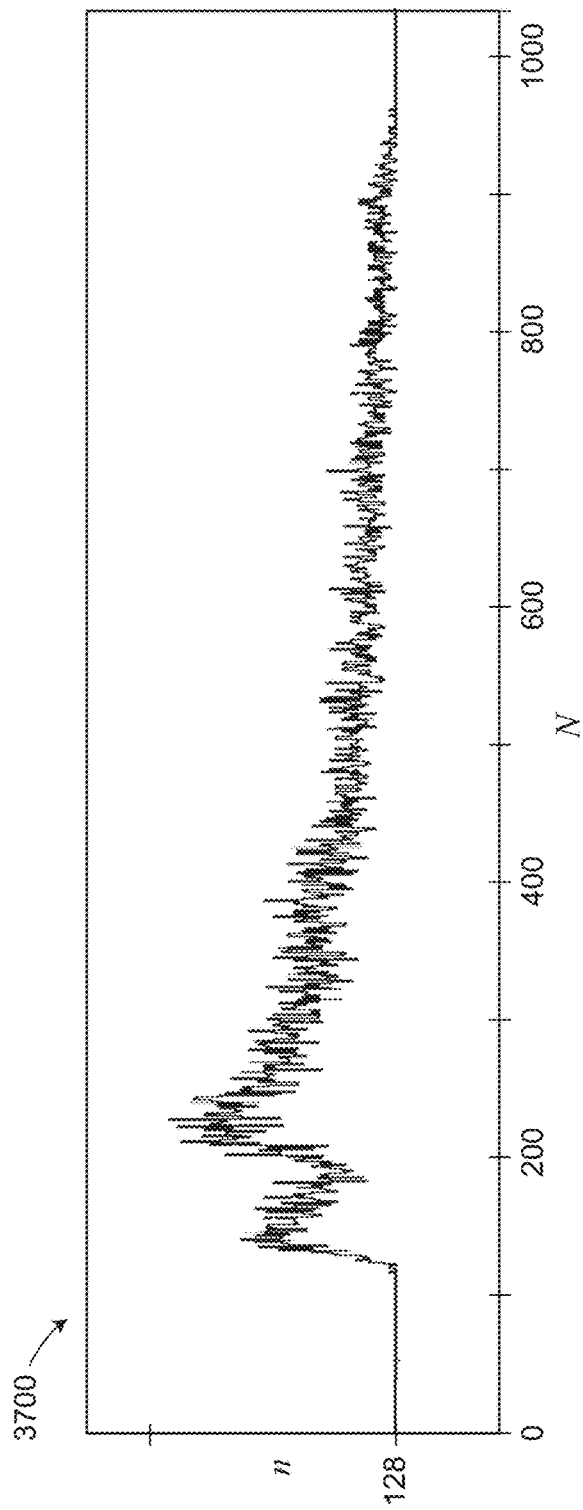
FIG. 37 is an exemplary plot of a histogram of peak pixel level according to an embodiment.
Figure 38:
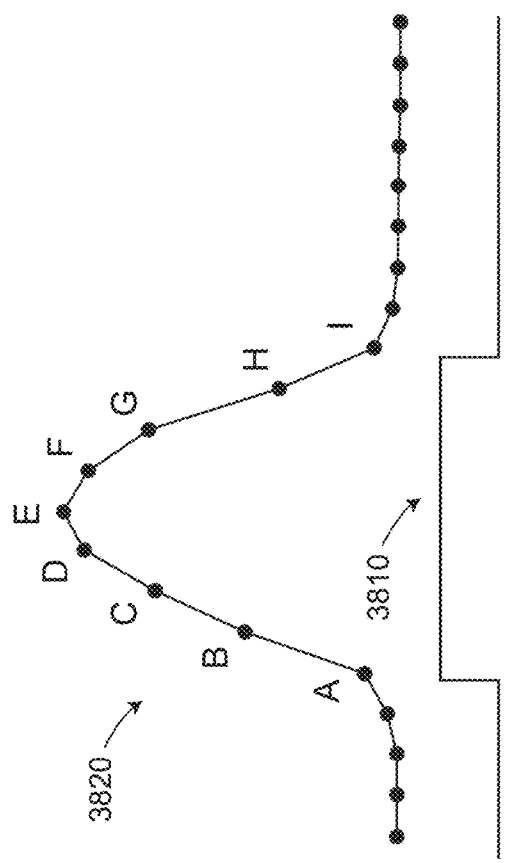
FIG. 38 is an example of line scanner points collected in the vicinity of a filter window according to an embodiment.

FIG. 37 is a histogram 3700 showing number of pixels n on the vertical axis and pixel readout level N on the horizontal axis. For a 10-bit photosensitive array, the readout levels are integer values that extend from zero to $2^{10}-1=1023$. The histogram plot of FIG. 37 was modified slightly to set pixel values less than or equal to 128 set equal to 128. This adjustment of low-level readout values to a minimum readout value such as 128 is optional or alternative element of the embodiment. Note also that in the usual case the setting of the low readouts in this case to 128 is done for the auto-exposure element 4030 described herein below in reference to FIG. 40. The later calculations leading to the calculation of COG values would use actual readout values. For the exemplary histogram 3700, the greatest number of pixels have a peak readout level between 200 and 300 out of a maximum possible readout level of 1023. In an embodiment, a processor selects the peak values of each row to construct the histogram 3700. In FIG. 38, element 3810 is a filter mask, which may be used to provide many different filtering actions, as described herein above in reference to FIGS. 31A, 31B, 31C. The points A, B, C, D, E, F, G, H, I are measured readout levels 3820 for pixels falling within the pixel mask 3810. The peak value of the pixels in FIG. 38 is the readout level E, which is the maximum value from among the measured points A, B, C, D, E, F, G, H, I. The value E is the value that would be included in calculating the histogram of FIG. 37.

Figure 39:
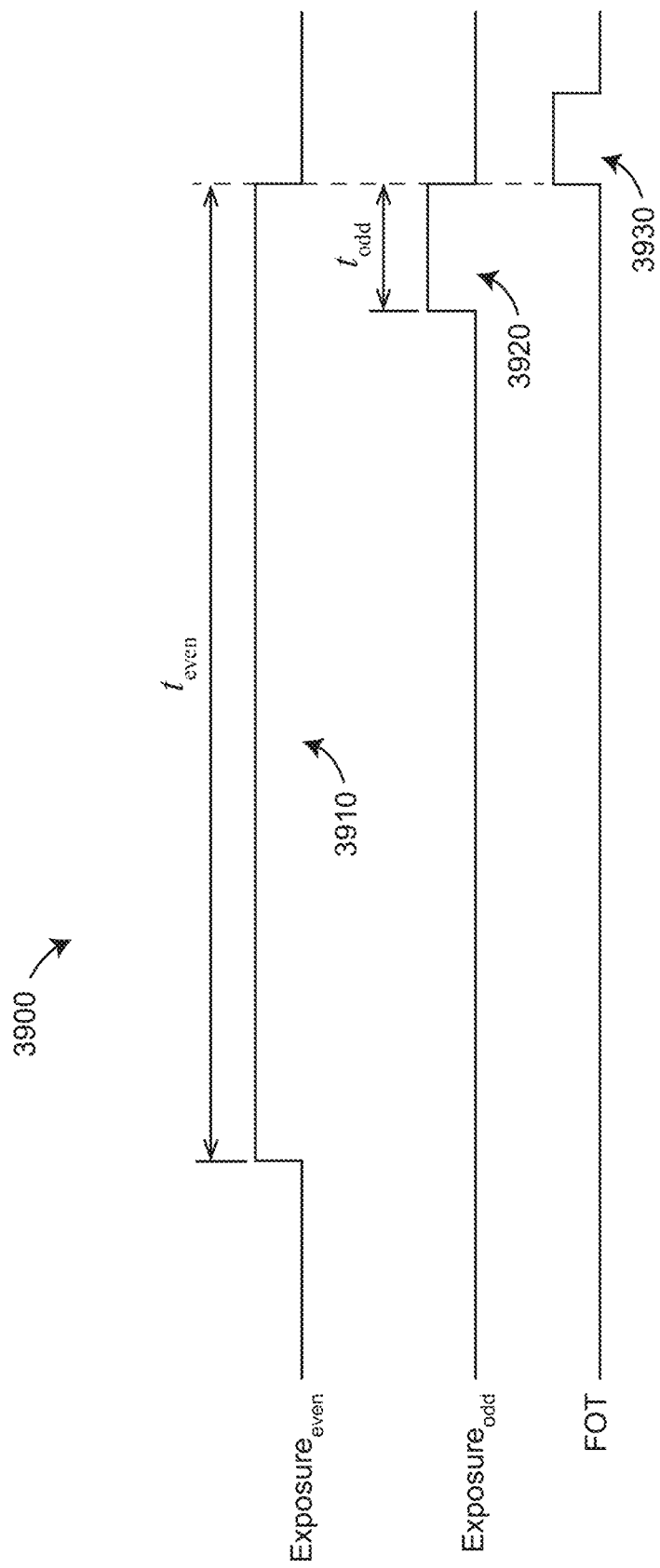
FIG. 39 is a timing diagram illustrating a difference in exposures for alternating rows according to an embodiment.

FIG. 39 is a timing diagram 3900. Even rows have an exposure interval 3910 and an exposure time $t_{even}$. Odd rows have an exposure interval 3920 and an exposure time $t_{odd}$. In an embodiment, during a frame overhead time (FOT) 3930, analog current is transferred from each pixel electron well to an analog-to-digital converter (ADC) and then into pixel buffers as digital signals. The exposure ratio $E_R$ is defined as $E_R = t_{even}/t_{odd}$. In the exemplary histogram 3700 of FIG. 37, the minimum peak intensity was set to 128. The maximum peak intensity in this case is 1023, which means that the desired exposure ratio is 1023/128=7.99. This is rounded up in this instance to make the exposure ratio equal to $E_R=8$. In other cases, other ratios may be obtained, for example, with $E_R$ equal to 1, 2, or 4.

Figure 40:
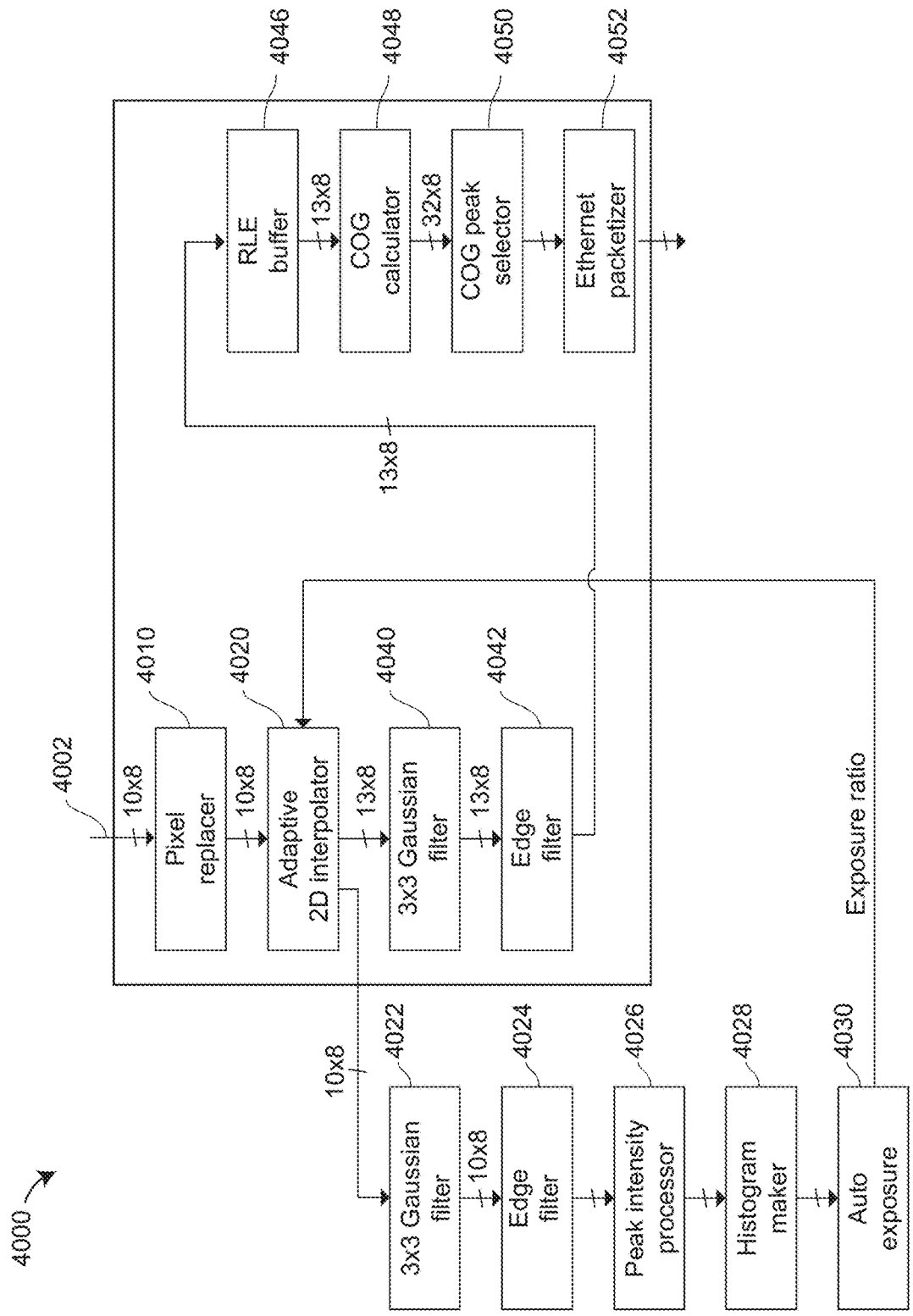
FIG. 40 is a block diagram showing processing steps in extracting values for determining 3D coordinates with high dynamic range according to an embodiment.

FIG. 40 is a block diagram 4000 of an exemplary method for image processing in which even and odd rows have different exposure times. In FIG. 40, 10-bit digital signals are transferred from a photosensitive array to a processor over a line 4002 having 8 parallel lines, hence the designation 10×8. In an element 4010, the values of defective pixels, such as pixels that are always dark, are replaced.

An element 4020 performs adaptive two-dimensional (2D) interpolation, branching to a path in which data is smoothed by a 3×3 Gaussian filter in an element 4022, filtered in an edge filter in an element 4024, processed to select peak values in a peak intensity processor in an element 4026, converted into a histogram in an element 4028, and auto exposed in an element 4030. Many variations are possible in these elements. A Gaussian 3×3 filter is a smoothing filter that filters according to the readout values of its nearest horizontal, vertical, and diagonal pixel neighbors. Other types of smoothing filters may be used. An Edge filter is one of many types of filters that could be used. A discussion of Edge filters was given herein above in reference to FIGS. 31B, 31C. The function of the peak intensity processor 4026 and the histogram maker were discussed herein above in reference to FIGS. 37, 38. The auto exposure element 4030 determines the exposure ratio to be used in processing the data from line 4002. The auto exposure element 4030 is also used in setting the exposure times for odd and even rows in the next cycle or frame of data capture.

Additional functions performed by the adaptive 2D interpolation element 4020 are described below in reference to FIG. 42. To normalize the pixel data collected in odd and even rows, the readout values for the odd rows are multiplied by the exposure ratio. So, for example, if the exposure ratio equals 8, then 3 additional bits are added to the original 10-bit values since $2^3=8$. Hence, in the example of FIG. 40, the number of bits is set to 13 following the adaptive 2D interpolation element 4020.

In an embodiment, the adaptively interpolated 2D data is passed to another Gaussian filter 4040 and another Edge filter 4042. As described herein above in reference to FIGS. 31B, 31C, an edge filter may be used to determine the boundaries (rows) of the edges of a mask such as the mask 3810 in FIG. 38. In the RLE-buffer element 4046, the processor performs run-length encoding (RLE), which is a form of lossless compression. RLE is one of the simplest ways to compress and store data.

In an element 4048, a COG calculator determines center of gravity (COG) values for each "bump" with a column of data, where the COG (centroid) calculation for each bump is based on pixel values falling within the mask edges as determined by the edge filter. In an embodiment, the COG values are determined to 32 bits. An element 4050 selects the best COG value if there is more than one COG value. The procedure used in the element 4050 is like the procedure described herein above with respect to FIG. 32. The element 4050 further includes evaluating and reducing-the-risk-of/eliminating the possibility of multipath interference from the collected data, also as described herein above with respect to FIG. 32. In the Ethernet-packetizer element 4052, Ethernet packets are formed, for example, by providing a source address, a destination address, error detection and correction information, and COG data. In other embodiments, other packetizer elements may be included. In an embodiment, the data from the Ethernet packetizer is sent to a system processor that unpacks the received data to perform triangulation calculations, encoder calculations, and compensation calculations to determine 3D coordinates of the surface scanned by the line of light from the LLP. One or more such system processors may be included within the AACMM, be external to the coordinate measurement machine in a stand-alone computer, or be kept in a remote location in the "cloud." In other embodiments, a single processor performs the calculations.

Figure 41:
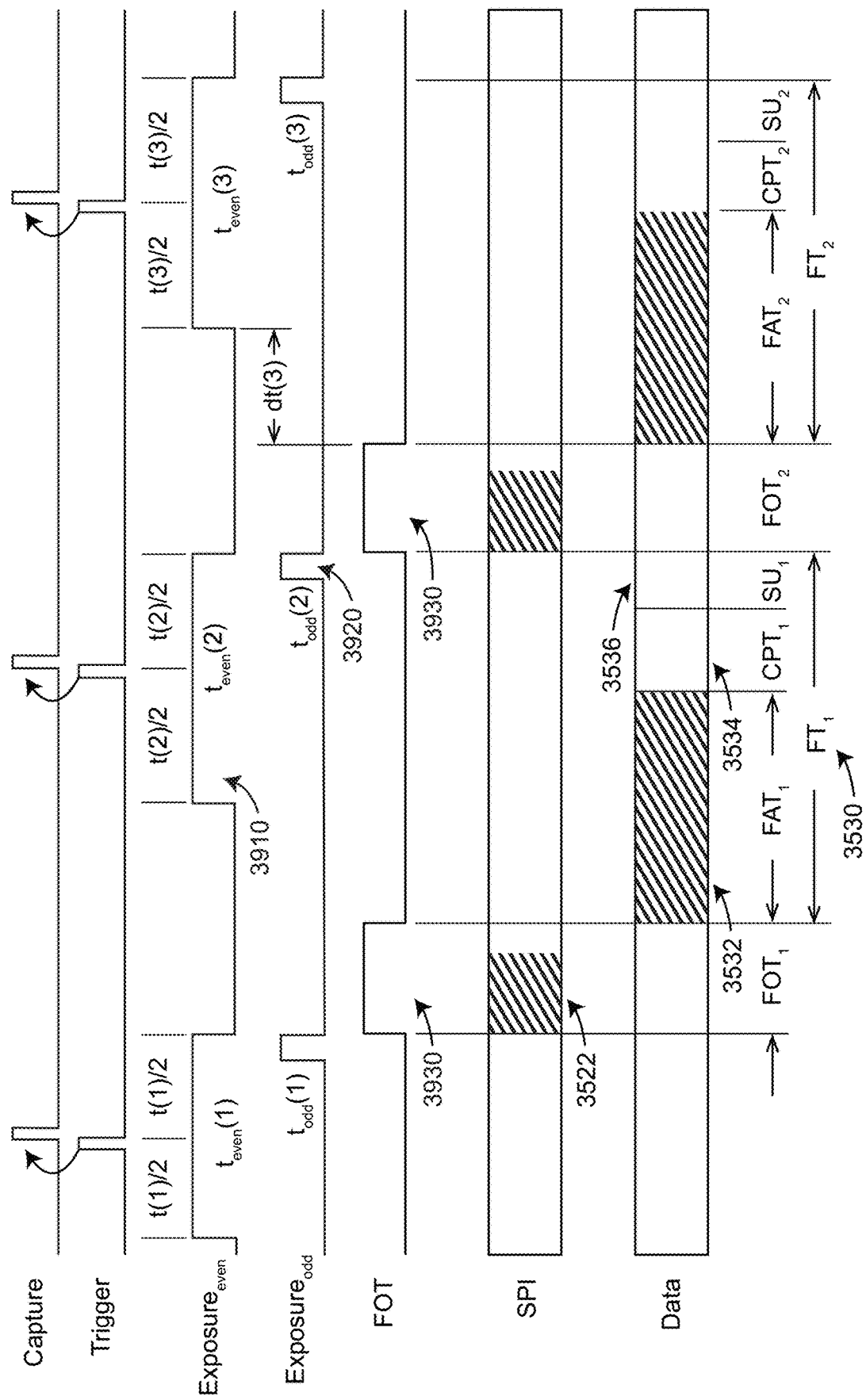
FIG. 41 is a timing diagram for the case in which exposure time alternates between even and odd rows according to an embodiment.

FIG. 41 is a timing diagram like FIG. 35 except that the single exposure channel has been replaced by even and odd exposure channels. The numbering of the elements in FIG. 41 is like that of FIG. 35 except for the timing elements labeled FOT, Exposure$_{even}$, and Exposure$_{odd}$, which correspond to the numbered elements of FIG. 39.

Figure 43:
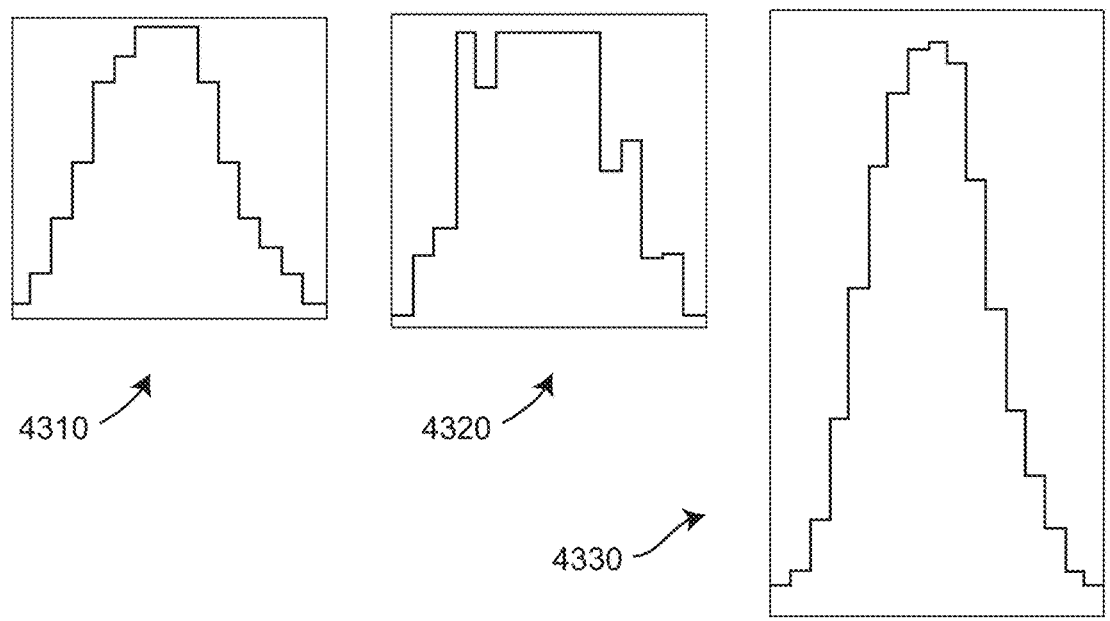
FIG. 43 is a table of measured and processed values along with plots illustrating improvement in dynamic range according to an embodiment.

FIG. 43 shows exemplary effects of equal exposures, adjusted exposures, and normalized levels for rows 339 to 353 of a given column of a photosensitive array 2641. For the adjusted exposures, an exposure ratio is set equal to $E_R=2$. When the exposure time is doubled, the readout value is also expected to double unless the readout level is equal to or greater than the maximum level of 1023 for a 10-bit array. Hence, for the row 340, the value is doubled from 112 to 224, while, for the row 344, the value increases from 912 to 1023 since saturation of the pixel at row 344 produces the maximum readout value of 1023.

Figure 42:
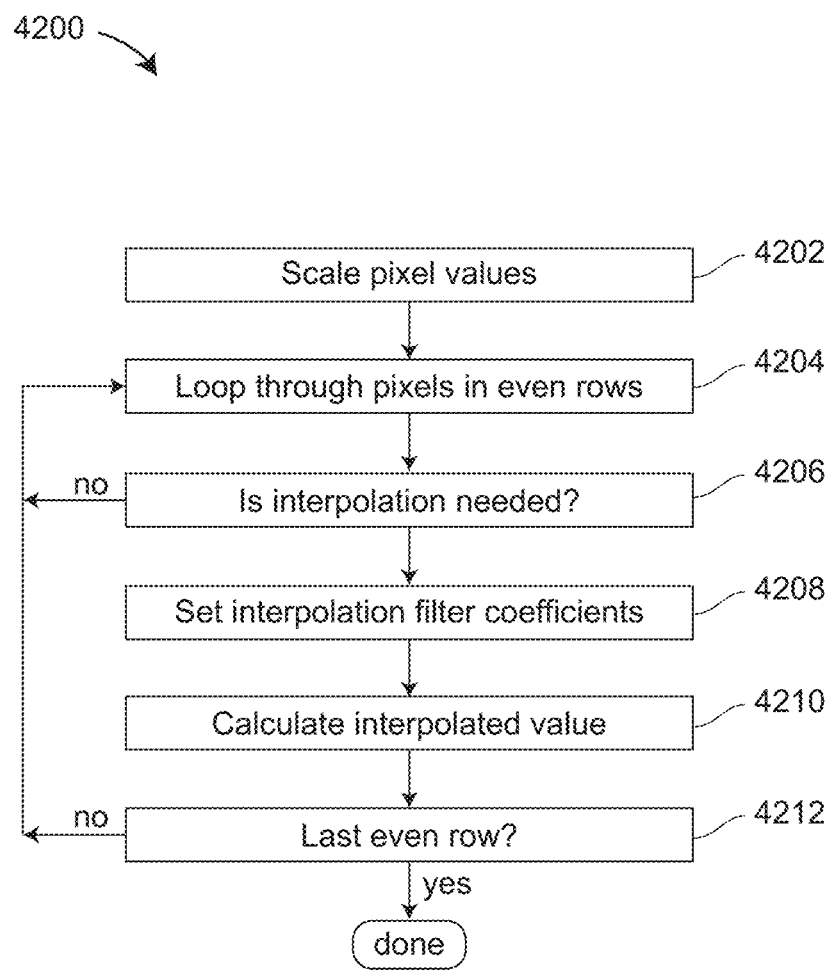
FIG. 42 is a flow chart showing elements of a method for processing collected data according to an embodiment.

FIG. 42 illustrates a method 4200 carried out in the adaptive 2D processor element 4020 of FIG. 40. In a step 4202, pixel values of odd rows are scaled by the exposure ratio. As illustrated in FIG. 43, for an exposure ratio of $E_R=2$, the odd row 343 doubles from 812 to 1624. The even rows are not doubled because they already received a doubled exposure. Any even row having a value of 1023 is saturated and, hence, cannot be directly entered as a normalized value in the table. In this case, a symbol i is placed in the table of normalized values to indicate that interpolation is desired. For example, in the row 344, the readout value for equal exposures is 912. With the exposure time doubled, the doubled value of 1824 is equal to or greater than the maximum allowable value of 1023 and is hence set to 1023. The normalized value is marked with an i since a further interpolation step is desired to determine the final normalized value for the row 344.

In an element 4204, computations are made over a loop that exits at element 4212 when interpolation elements 4206, 4208, 4210 have been carried out for the even rows. An element 4206 determines whether interpolation is desired.

Figure 44:
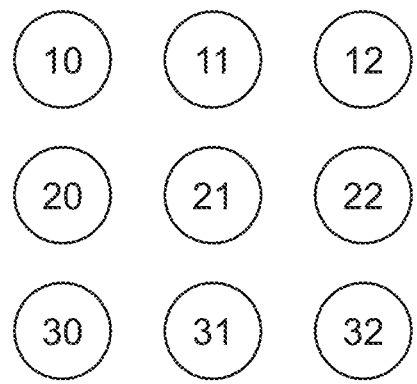
FIG. 44 is an image showing number for rows and columns of nearest neighbors in an array.

FIG. 44 illustrates pixel geometry showing three rows of pixels, each row having three column elements. Hence the elements labeled/marked 20, 21, 22 are in one row. Interpolation is used for the pixel 21 if the pixel 21 is saturated, which means having a readout value of 1023 for a 10-bit array. In an embodiment, interpolation is also used if the pixel 11 and the pixel 31 both have readout values consistent with saturation in the pixel 21. To help motivate the interpolation in this case, define pixel values following normalization:

$$\text{pixel'}(r_{odd})(c) = \text{pixel}(r_{odd})(c) * E_R, \quad (1)$$

$$\text{pixel'}(r_{even})(c) = \text{pixel}(r_{even})(c). \quad (2)$$

For a 10-bit photosensitive array, the normalized level following multiplication by the exposure ratio $E_R$ is expected to be larger than levels in nearby pixels by a factor of approximately $E_R$. If both odd pixels 11 and 31 in FIG. 44 have values of pixel'($r_{odd}$)(c) that exceed 1023, then the even pixel 21 might also be expected to exceed 1023. Hence, in an embodiment, interpolation is used not only if pixel 21 is saturated but also if both pixel 11 and pixel 31 are greater than or equal to the value that would saturate the even pixel, which for a 10-bit array is 1023. In other embodiments, different rules may be used to determine the interpolation.

Figure 45:
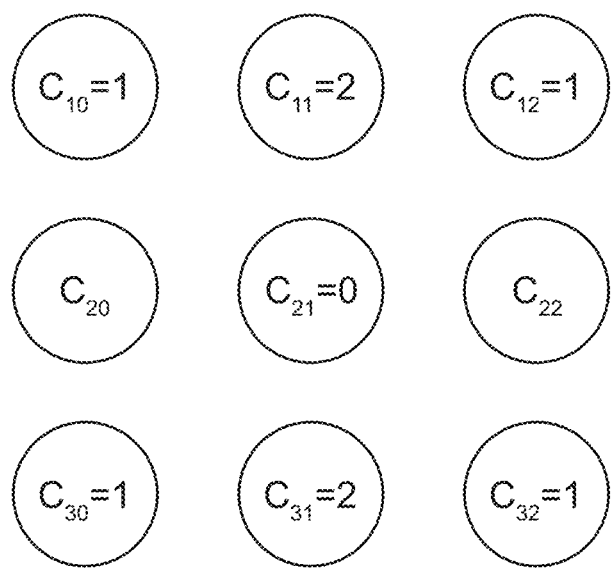
FIG. 45 is an image of interpolation coefficients assigned according to nearest neighbor position according to an embodiment.

If a processor determines in the element 4206 that interpolation is not used, looping continues by checking whether interpolation may be used for the next even pixel. In a step 4208, a processor sets interpolation filter coefficients, which are used in calculating interpolated values in an element 4210. FIG. 45 shows interpolation coefficient values for rows and columns numbered in the same way as in FIG. 44. The value of $C_{20}$ is set equal to 2 if $C_{20}$ is not saturated, which for a 10-bit array occurs when $C_{20}<1023$; otherwise $C_{20}$ is set equal to zero. Likewise, the value of $C_{22}$ is set equal to 2 if $C_{22}$ is not saturated; otherwise $C_{22}$ is set equal to zero.

The element 4210 calculates the interpolated value. In an embodiment, the interpolated value pixel$_{INT}$ of the pixel $C_{21}$ is found from Equations (3) and (4) below:

$$\text{Ratio} = C_{10} + C_{11} + C_{12} + C_{20} + C_{22} + C_{30} + C_{31} + C_{32}, \quad (3)$$

$$\begin{aligned}\text{pixel}_{INT} = (&\text{pixel'}_{10}C_{10} + \text{pixel'}_{11}C_{11} + \text{pixel'}_{12}C_{12} + \\ &\text{pixel'}_{20}C_{20} + \text{pixel'}_{22}C_{22} + \text{pixel'}_{30}C_{30} + \\ &\text{pixel'}_{31}C_{31} + \text{pixel'}_{32}C_{32})/\text{Ratio}. \quad (4)\end{aligned}$$

Equations (3) and (4) are a variation of interpolation by a Gaussian filter in which coefficients are adaptively assigned. In other embodiments, other interpolation methods are used.

The results of the method 4200 is a high-speed acquisition of normalized levels that have larger dynamic range than would have been the case if even and odd rows had received equal exposures. The plot 4310 in FIG. 43 shows the exposure levels obtained for the collection of pixel readouts from rows 339 to 353. The plot 4320 shows the corresponding levels when the even rows are multiplied by 2, and the plot 4330 show the corresponding levels following normalization. As can be seen by comparing the plots 4310 and 4330, the method described above increases the dynamic range by a factor of 2 for an exposure ratio of 2. For an exposure ratio of 8, the dynamic range would have been increased by a factor of 8. These increases in dynamic range are possible without slowing the measurement.

In the discussion above, it has been assumed that exposure time for even rows is greater than the exposure time for odd rows. This assumption was made to simplify the discussion; however, it is equally possible to make the exposure time for odd rows greater than the exposure time for even rows. In this situation, the roles of even and odd roles are reversed in the above discussion.

Figure 46B:
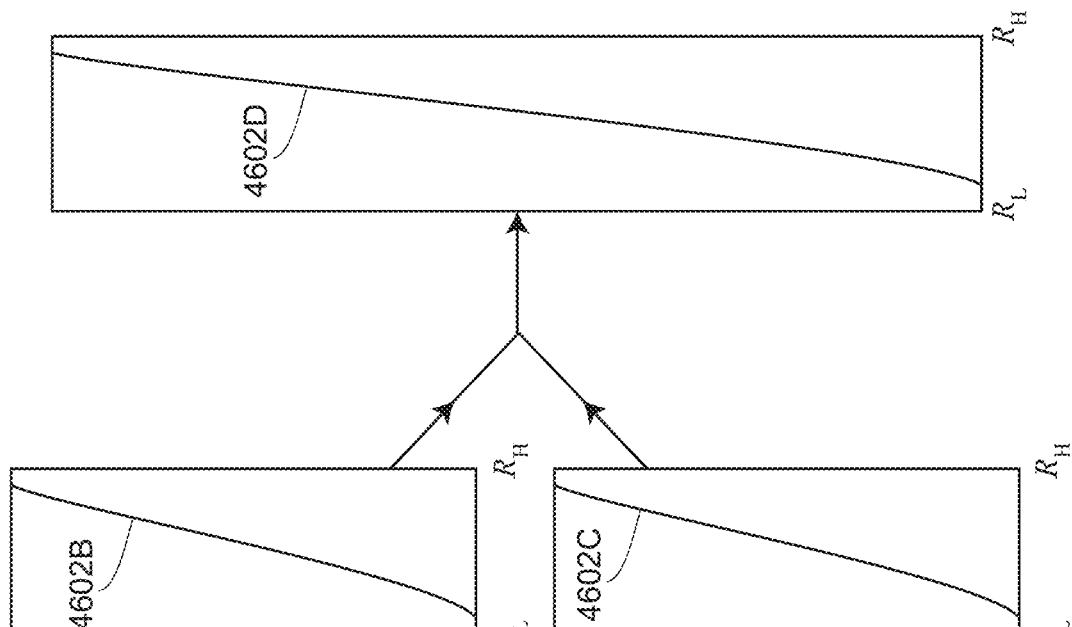
FIG. 46B illustrates odd and even rows being interleaved into a normalized representation according to an embodiment.
Figure 46A:
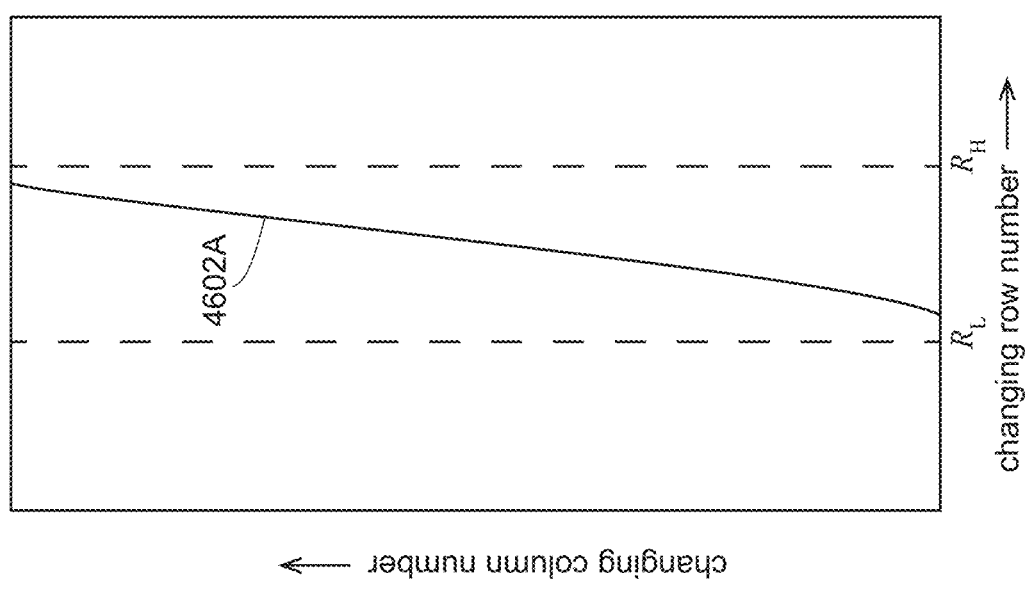
FIG. 46A is an illustration showing a windowed array of pixels.

A further enhancement in speed is possible by using windowing. FIG. 46A shows a window established to capture image data 4602A between the rows between $R_L$ and $R_H$. FIG. 46B illustrates the breaking of the captured image into two parts—a first part 4602B covering odd rows of the image data 4602A and a second part 4602C covering even rows of the image data 4602A. The odd parts 4602B are interleaved with the even parts 4602C to obtain the HDR image 4602D. In most cases, measurement time varies in direct proportion to window size.

In an embodiment, a photosensitive array has a selectable conversion gain (CG), where CG is defined as the voltage produced per electron (e) in a pixel electron well. For example, a pixel having CG=130 µV/e produces a 1.3-volt signal in response to 10,000 electrons in its electron well. A CG is said to be selectable when any of two or more CGs can be selected.

FIGS. 47A, 47B are plots showing the characteristics of a first photosensitive array 4700 and a second photosensitive array 4750, both having selectable CG. The plots show photons per pixel on the horizontal axis and pixel voltage on the vertical axis. The curves 4710, 4720 are for high conversion gain (HCG) and low conversion gain (LCG), respectively. The HCG curve 4710 causes the maximum pixel voltage to be achieved for a relatively small number of pixels compared to the LCG curve 4720. In other words, with selectable CG, the maximum number of electrons is not fixed but depends on the selected CG. The curves 4760, 4770 for HCG and LCG, respectively, do not cut off so sharply at the maximum pixel voltage as the curves 4710, 4720 but otherwise are similar in their shapes.

Figure 48:
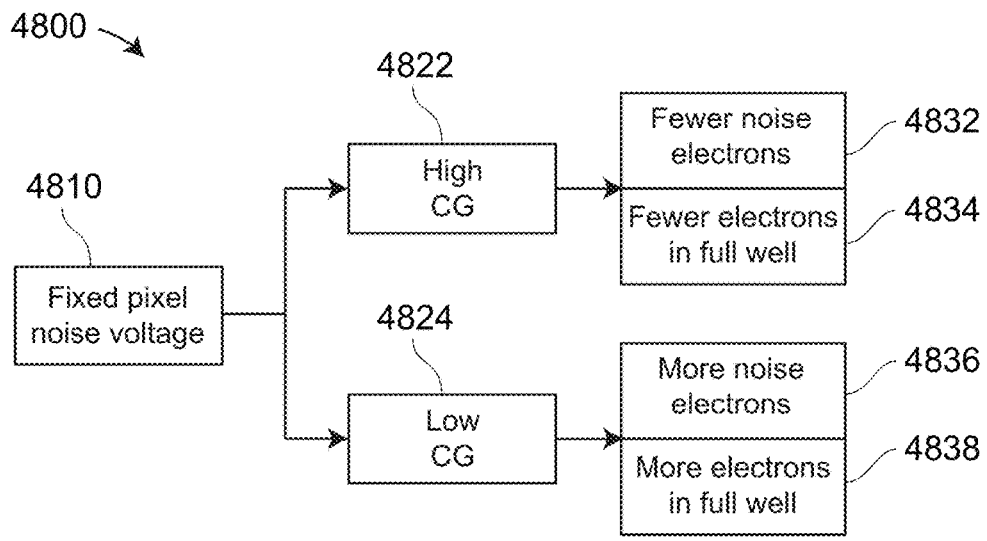
FIG. 48 is a block diagram illustrating the effects of using selecting high conversion gain (HCG) and low conversion gain (LCG)

FIG. 48 is a block diagram 4800 illustrating an advantage of selectable conversion gain. A given pixel within a photosensitive array has a fixed pixel noise 4810 in units of voltage. The pixel can operate in either of two selectable modes—a first mode 4822 having a high CG and a second mode 4824 having a low CG. The high CG mode 4822 produces fewer noise electrons 4832 but has a smaller well capacity 4834, which is to say, holds fewer electrons in its electron well. The low CG mode 4824 produces more noise electrons 4836 but has a larger well capacity 4838. For example, suppose that in the high CG mode 4822, the CG is $CG_{high}$=150 µV/e. In the low CG mode 4824, the CG is $CG_{low}$=30 µV/e. Further suppose that the fixed pixel noise voltage 4810 is $N_{\mu V}$=120 µV. The number of noise electrons for the high CG mode 4822 is $N_e = N_{\mu V}/CG_{high}$=120 µV/(150 µV/e)=0.8 e. The corresponding number of noise electron for the low CG mode 4824 is $N_e = N_{\mu V}/CG_{low}$=120 µV/(30 µV/e)=4 e. Similarly, if the pixel has a maximum voltage of $V_m$=1.2 V, the maximum number of pixels in the well is 1.2 V/(150 µV/e)=8000 e for the high CG mode 4822 and 1.2 V/(30 µV/e)=40000 e for the low CG mode 4824.

Figure 49:
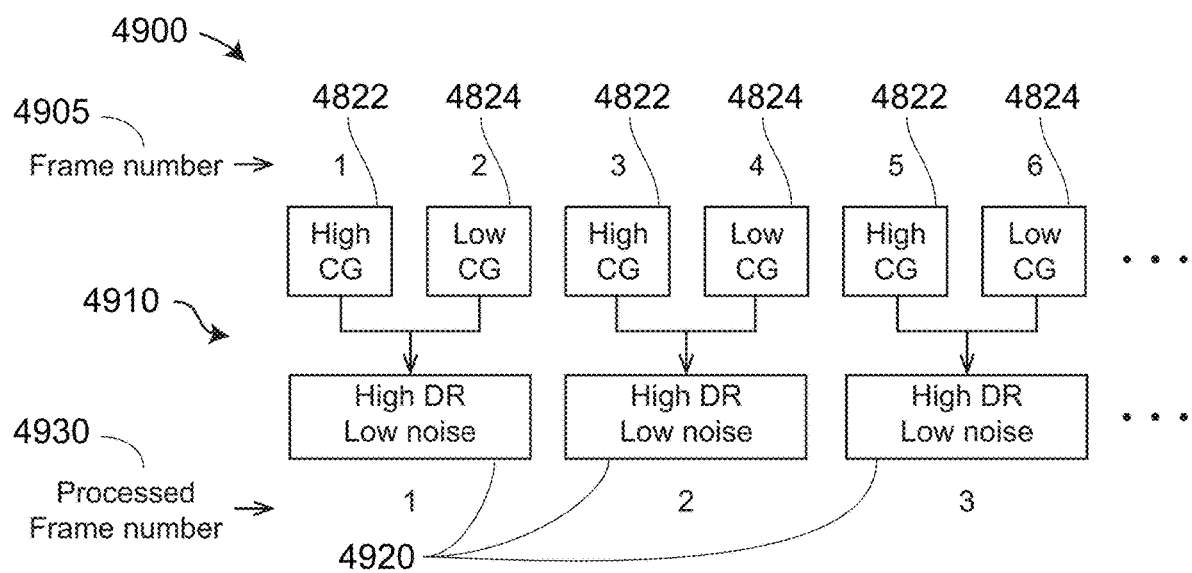
FIG. 49 shows an embodiment in which alternate frames obtained with HCG and LCG are combined to obtain high dynamic range with low noise according to an embodiment.

FIG. 49 is a block diagram 4900 illustrating how selectable CG may be used advantageously to obtain high dynamic range (HDR) and low noise in an image.

In an embodiment, each pixel in an array is alternately put into high CG mode 4822 and low CG mode 4824, as illustrated in the captured frames having frame numbers 1, 2, 3, 4, 5, 6, . . . , the frame number being indicated by the reference number 4905. In an embodiment, the adjacent high CG and low CG modes for each pair of successively collected frames are advantageously combined to obtain an image in which the range of pixel values extends from a relatively few noise electrons obtained in the high CG mode 4822 when background light is weak (e.g. low optical power) to the relatively many electrons in the full well obtained in the low CG mode 4824. In an embodiment, in a step 4910 of combining the adjacent frames, the final output is further scaled to account for the different gains applied in the high CG mode 4822 and the low CG mode 4824. The result is a sequence of composite pixel values 4920 having an increased dynamic range and reduced noise level. Each processed HDR frame has a processed frame number 1, 2, 3, . . . designated by the reference number 4930. The number of processed frames 4930 is half the number of frames 4905, which means that data collection is slowed by a factor of 2.

Figure 50C:
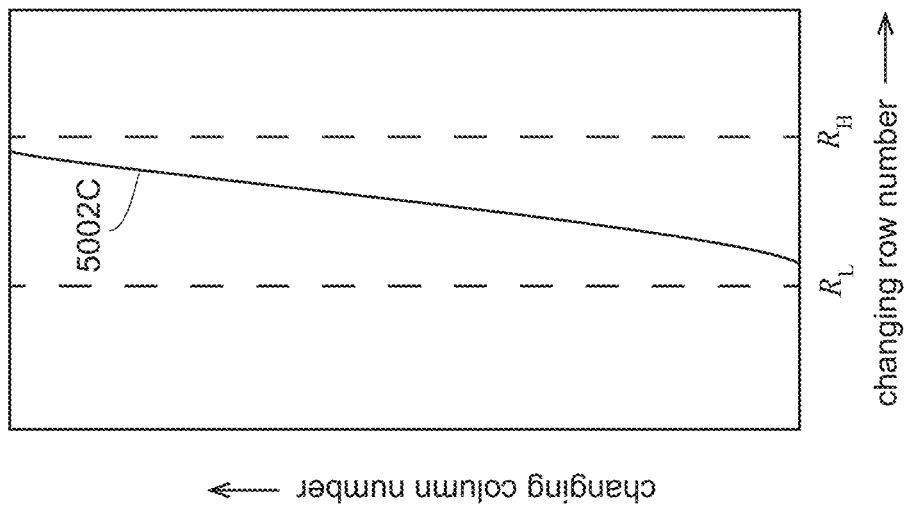
FIGS. 50A, 50B, 50C show how cameras operating in HCG and LCG captured projected lines of light within windowed regions of a photosensitive array, thereby increasing measurement speed according to an embodiment.
Figure 50B:
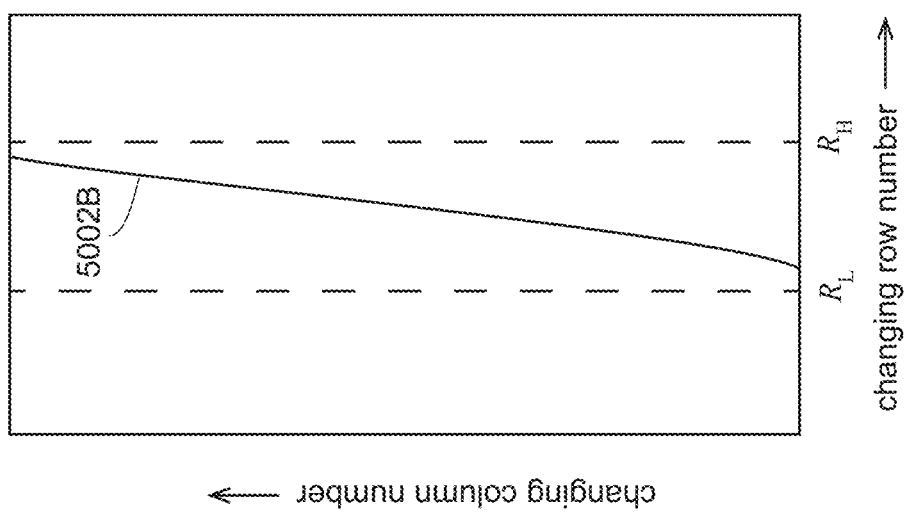
Figure 50A:
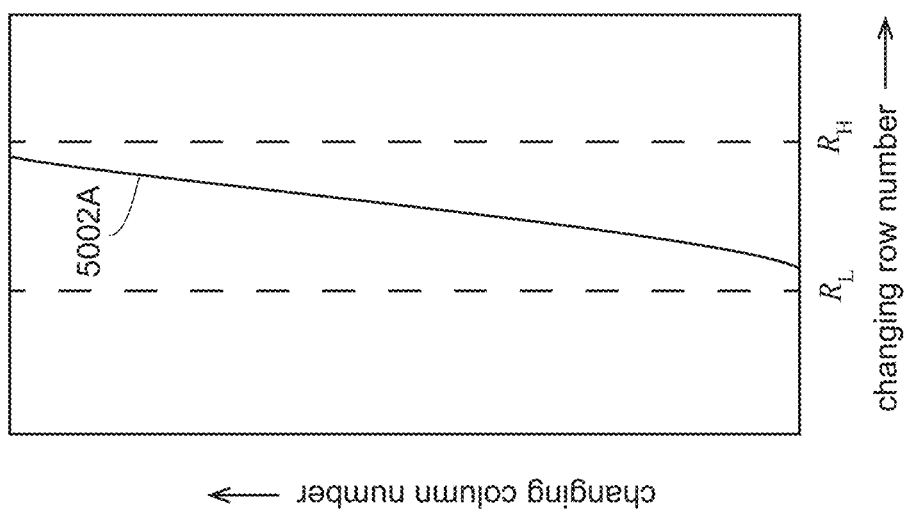

FIGS. 50A, 50B, 50C illustrate a way to get low noise and HDR by selectable CG while speeding measurements by windowing. In an embodiment, a projected laser line does not fill the entire height or width of an image sensor. A processor guides the selection of window size to speed measurements. In the embodiments of FIGS. 50A, 50B, the window is selected to span the rows from $R_L$ to $R_H$. In an embodiment, a photosensitive array captures pixel values of a projected line of light in a high CG mode 5002A. In the next frame, the photosensitive array captures pixel values of the projected line of light in a low CG mode 5002B. A processor combines the pixel values in FIG. 50A, 50B to correctly scale the values according to the brightness of the line of light as reflected from the object to the photosensitive array. The resulting scaled image 5002C of the projected line of laser light is an HDR, low-noise representation of a composite projected line of light. A processor converts the pixel values of the composite line of light 5002C, for example, as projected by an LLP, into 3D coordinates of the object as explained herein above.

In another embodiment, a photosensitive array provides a CG selectable on a row by row basis. In this case, image data is combined on a row-by-row basis, thereby retaining the maximum speed, while also providing a way to improve dynamic range.

Methods for reducing or eliminating multipath interference were described above in reference to FIGS. 32, 33A, 33B. Additional methods for reducing or eliminating multipath interference are now described.

Figure 51:
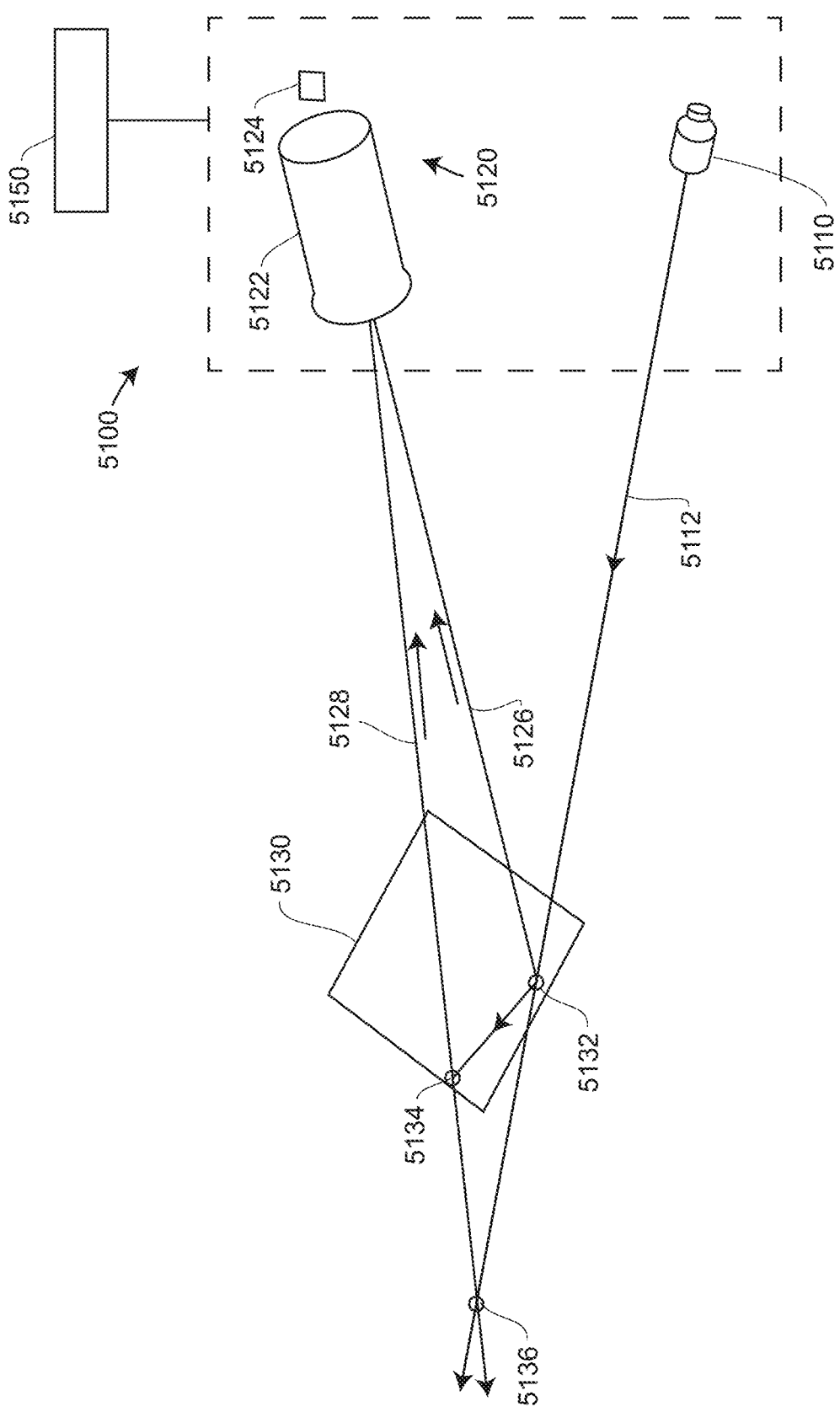
FIG. 51 is a schematic representation illustrating the generation of a spurious multipath reflection in using an LLP.

FIG. 51 is a schematic 3D representation of an LLP 5100 having a projector 5110 and a camera 5120. The projector 5110 projects a ray of light 5112 onto an object surface 5130, intersecting the surface 5130 as a first spot of light 5132. The first spot of light 5132 passes into the camera 5120, which includes a camera lens 5122 and a photosensitive array 5124. The camera lens 5122 images the first spot of light 5132 onto the photosensitive array 5124, producing a first image spot on the array. A ray of light 5126 may be drawn from the first spot of light 5132 through a perspective center of the lens system 5122 and onto the photosensitive array 5124 to locate the first image spot. A processor 5150 evaluates the position of the first image spot on the array 5124 to determine, within a local coordinate frame of the LLP 5100, 3D coordinates of the first spot of light 5132. The determined 3D coordinates of the first spot of light 5132 represent the true 3D coordinates of the spot of light 5132 on the surface 5130 within the local coordinate frame of the LLP 5100, at least to within the accuracy of the LLP 5100.

A portion of the ray of light 5112 reflects off the spot of light 5132, intersecting the surface 5130 as a second spot of light 5134. Because the ray of light 5112 has bounced off the surface 5130 before arriving at the second spot of light 5134, the second spot of light 5134 is referred to as multi-bounce light or multipath light. The camera lens 5122 images the second spot of light 5134, producing a second image spot on the photosensitive array 5124. A ray of light 5128 may be drawn from the second spot of light 5134 through the perspective center of the lens system 5122 and onto the photosensitive array 5124 to locate the second image spot. To determine 3D coordinates corresponding to the second image spot on the array 5124, the processor 5150 uses the same algorithms as it did in determining the 3D coordinates of the first image spot. This results in the processor 5150 determining the 3D coordinates of the point 5136 as the intersection of the ray 5112 with the ray 5128. The determined 3D coordinates 5136 do not lie on the object surface 5130 and hence are spurious 3D coordinates.

Figure 52:
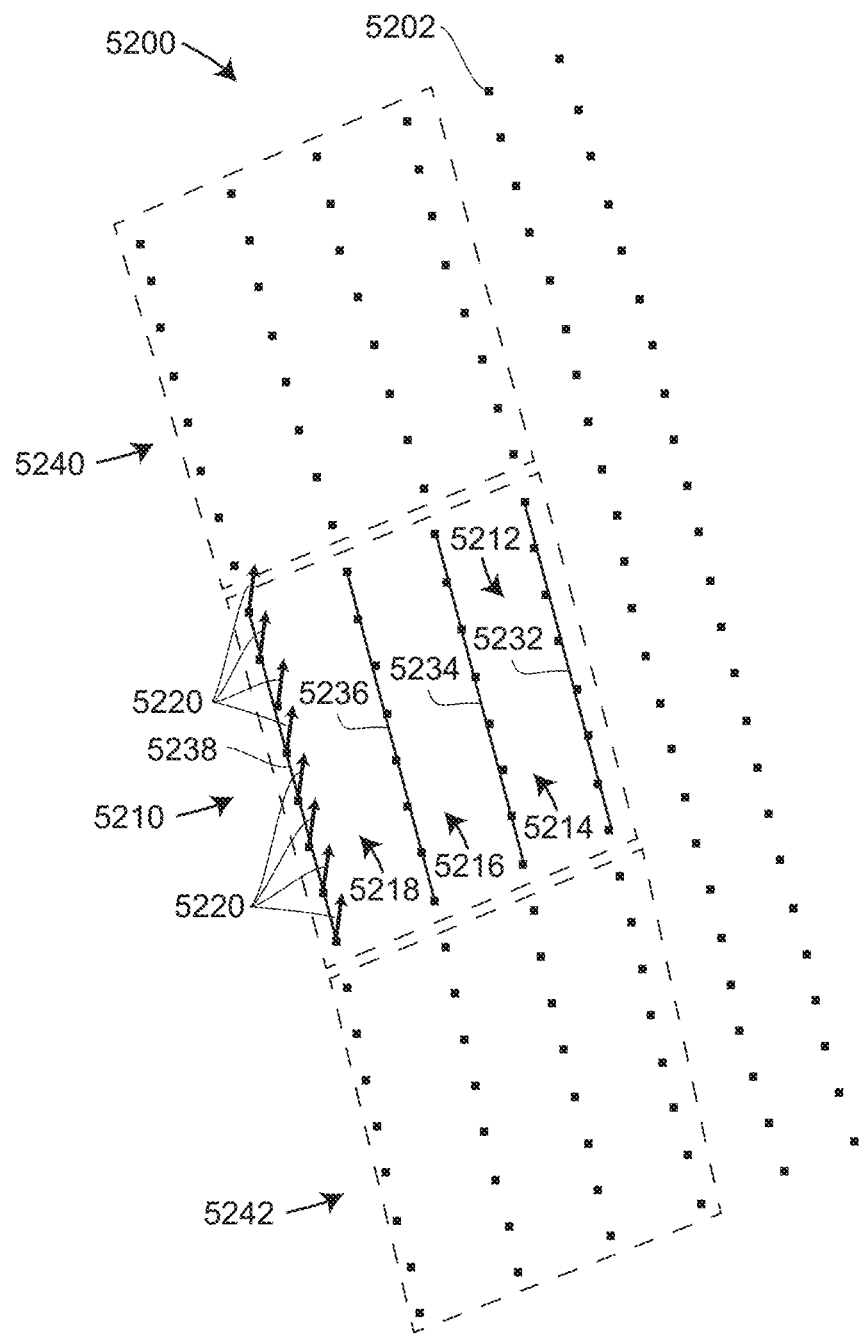
FIG. 52 is a schematic representation illustrating a method for determining normal vectors of object surfaces according to an embodiment.

In embodiments of the present disclosure, several methods may be used separately or in combination to identify and eliminate multipath interference. Some of these methods use a determining of normal vectors of an object surface based on data collected by the LLP. FIG. 52 illustrates an exemplary method by which normal vectors are determined. In an embodiment, points on an object surface are measured by an exemplary LLP 1100 and then transformed by a processor into 3D coordinates of an exemplary AACMM 10. FIG. 52 shows a collection 5200 of measured points 5202 on the object surface, as seen within the frame of reference of the AACMM 10. In an embodiment, points 5202 are grouped into units 5210, each having four rows 5212, 5214, 5216, 5218, each row having eight points. In an embodiment, the rows 5212, 5214, 5216, 5218 are collected by the LLP 1100 in the specified time order first, second, third, fourth, respectively. Normal vectors 5220 are determined by the processor for the most recent row 5218 based on the points 5202 in the units 5210.

In an embodiment, the processor first draws straight lines 5232, 5234, 5236, 5238 to represent each of the rows 5212, 5214, 5216, 5218, respectively. These rows may, for example, be drawn using the 2D image data collected by the LLP camera 1120 or using the 3D coordinates of the points 5202. In an embodiment, the processor determines the representative surface normal 5220 for a plane best represented by the straight lines 5232, 5234, 5236, 5238. In an embodiment, the representative normal vector 5220 is assigned to each of the points in the row 5238. The processor repeats this procedure for other units of grouped points such as the units 5240, 5242 so that each of the most recently acquired eight 3D points is assigned a normal vector. In other embodiments, other methods are used to obtain normal vectors for points 5202 obtained by the LLP 1100.

In embodiments, each of several different methods described herein below may be used separately or in combination to eliminate multipath outliers. These methods include removing or eliminating points having (1) an angle of incidence (AOI) exceeding an AOI acceptance angle, (2) a camera angle exceeding a camera acceptance value, (3) a relative movement angle exceeding a relative movement angle acceptance value, and (4) a branch exceeding a branch width acceptance value. As used herein, the "eliminating of points" includes the creation of subset of points that do not include points meeting certain criteria. In some embodiments, the eliminated points are segregated into a separate group. In other embodiments, the eliminated points are deleted from the data set.

Figure 53B:
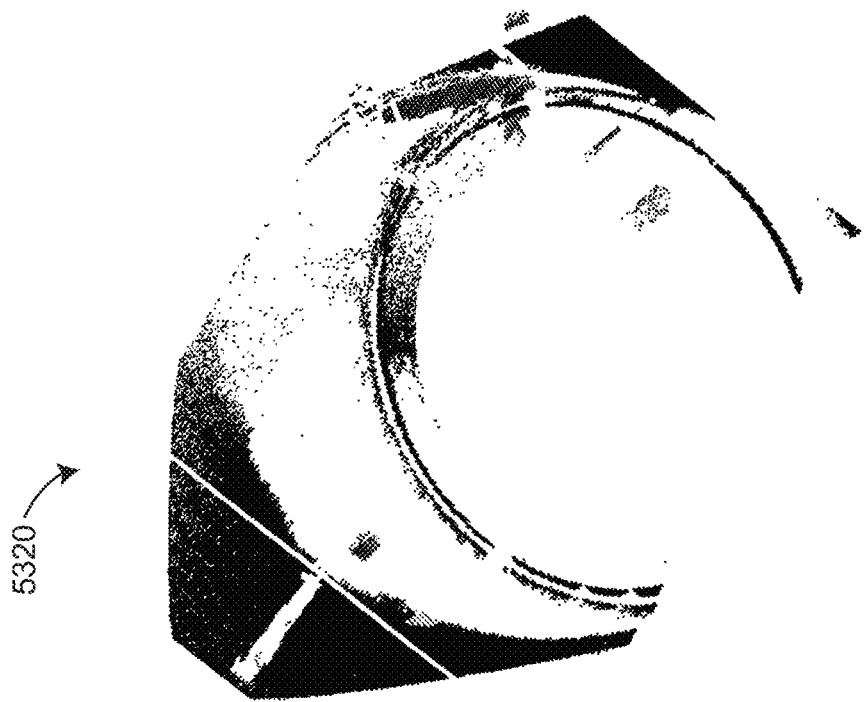
FIGS. 53A, 53B are projected images of 3D point clouds illustrating the effect of limiting angle of incidence (AOI) according to an embodiment.
Figure 53A:
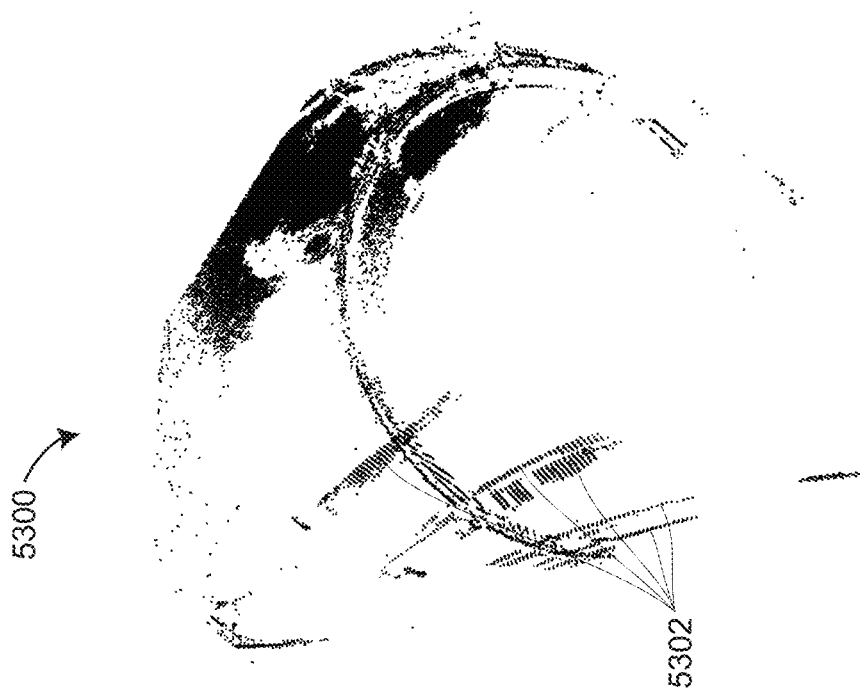

Angle of incidence (AOI) is defined as an angle between a ray of light emitted by the projector and a normal to an object surface at the point of intersection of the ray of light with the surface. The projector might be the projector 2620 or the projector 5110, for example. FIGS. 53A, 53B show 3D point clouds as seen from an arbitrarily chosen viewing angle. FIG. 53A shows the point cloud 5300 for an exemplary case in which the AOI is greater than 65 degrees. FIG. 53B shows the point cloud 5320 for the same exemplary case in which the AOI is less than 65 degrees. Included within the point cloud 5300 are multipath outlier features and points 5302. The features and points 5302 do not have corresponding real features and points on the scanned object. In contrast, the viewed point cloud 5320 does not seem to include outlier features and points. In general, multipath outliers are more likely to be seen when AOI values exceed a selected AOI acceptance value. Hence, a way to reduce the number of outliers is to filter out those points having an AOI value exceeding a prescribed AOI acceptance value.

Figure 54B:
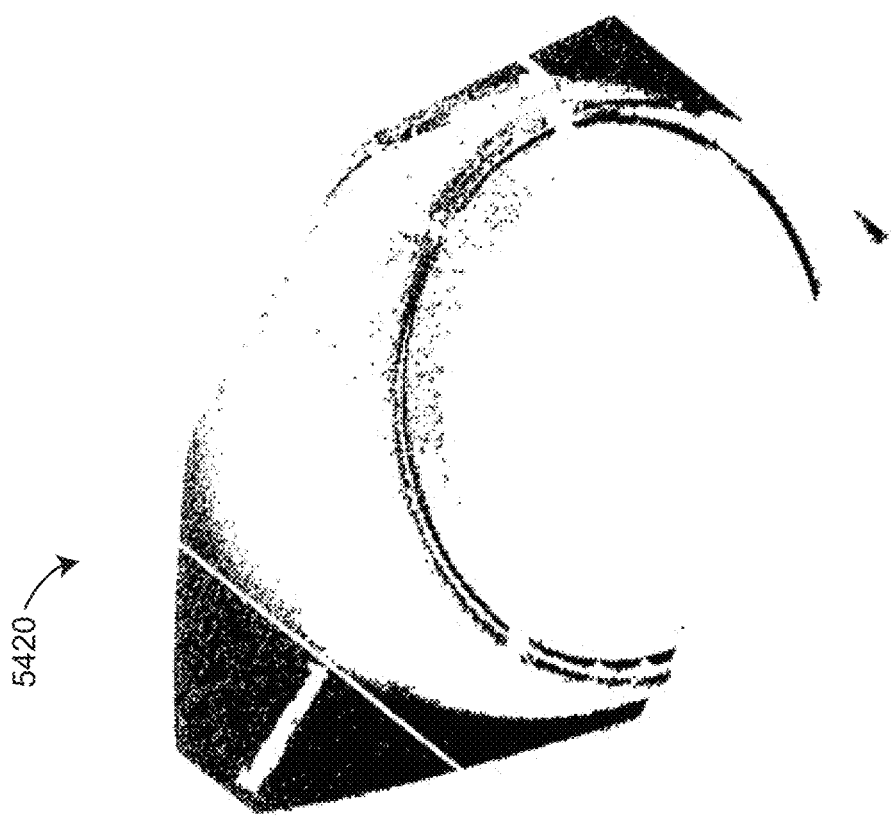
FIGS. 54A, 54B are projected images of 3D point clouds illustrating the effect of limiting camera angles according to an embodiment.
Figure 54A:
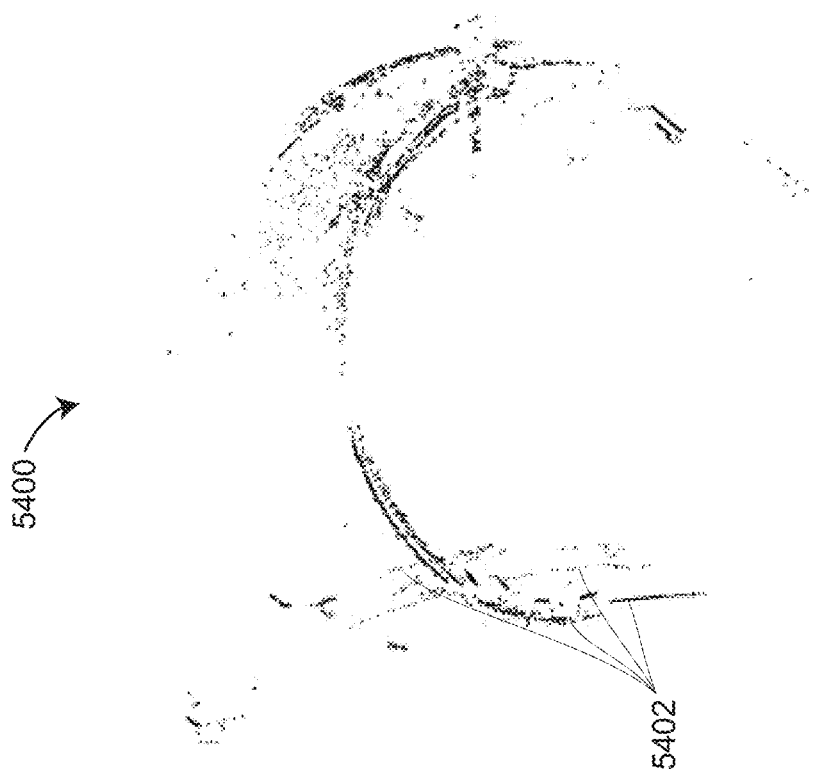

A camera vector is defined as a vector drawn from a point on an object surface to a perspective center of a camera. A camera angle is defined as an angle between the camera vector and a normal vector to the object surface at the point. The normal vector to the surface is directed so as to make the dot product of the normal vector with the camera vector a positive number. The camera might be the camera 1120 or the camera 5120, for example. FIGS. 54A, 54B show a 3D point cloud as seen from an arbitrarily chosen angle. FIG. 54A shows the point cloud 5400 for the case in which the camera angle is greater than 75 degrees. FIG. 54B shows the point cloud 5420 for the case in which the camera angle is less than 75 degrees. Included within the point cloud 5400 are multipath outlier features and points 5402. The features and points 5402 do not have corresponding real features and points on the scanned object. In contrast, the viewed point cloud 5420 does not seem to include outlier features and points. In general, multipath outliers are more likely to be seen when camera angle values exceed a selected camera angle acceptance angle. Hence, a way to reduce the number of outliers is to filter out those points having a camera angle value exceeding a prescribed camera angle acceptance value.

Figure 55:
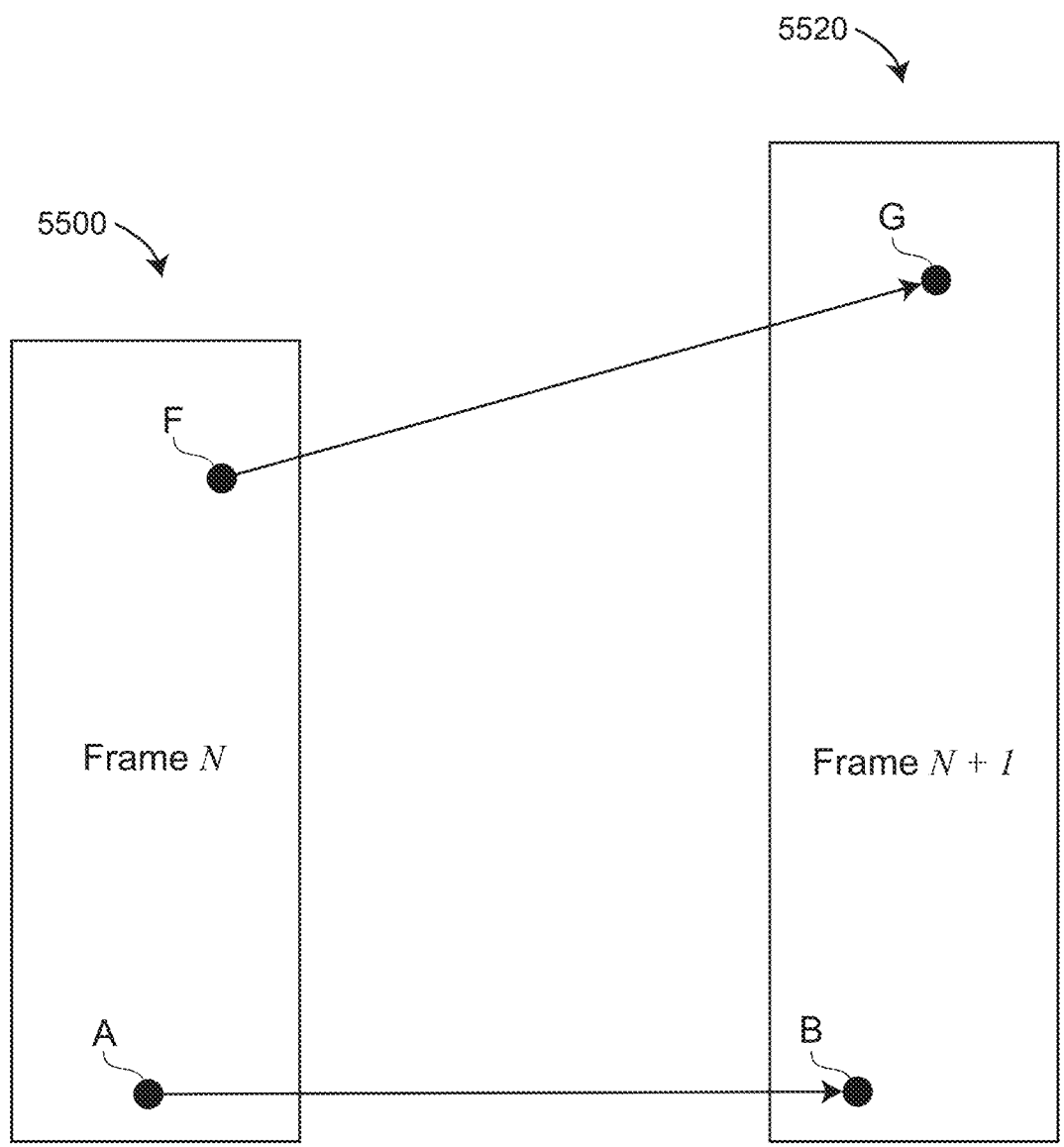
FIG. 55 is a schematic representation illustrating vectors generated between successive frame to determine a relative movement angle according to an embodiment.

FIG. 55 is a schematic illustration of a method for calculating a relative movement angle. FIG. 55 includes a representation 5500 of a frame N and a representation 5520 of a succeeding frame N+1. In an embodiment illustrated in FIG. 55, a probe tip 904 (FIG. 18A) has 3D coordinates A, B, respectively, in the successive frames N, N+1. A vector AB is drawn from A to B. Likewise, for the frames N, N+1, the LLP provides 3D surface points F, G, respectively, for a given column $C_1$ (FIG. 32). A vector FG is drawn from F to G. A relative movement angle between the vectors AB and FG is found by taking the inverse cosine of the dot product of the normalized vectors AB, FG. In other embodiments, a different point fixed relative to the exemplary LLP 1100 is used in place of the exemplary probe tip 904 in calculating the angle between the vectors.

Figure 56B:
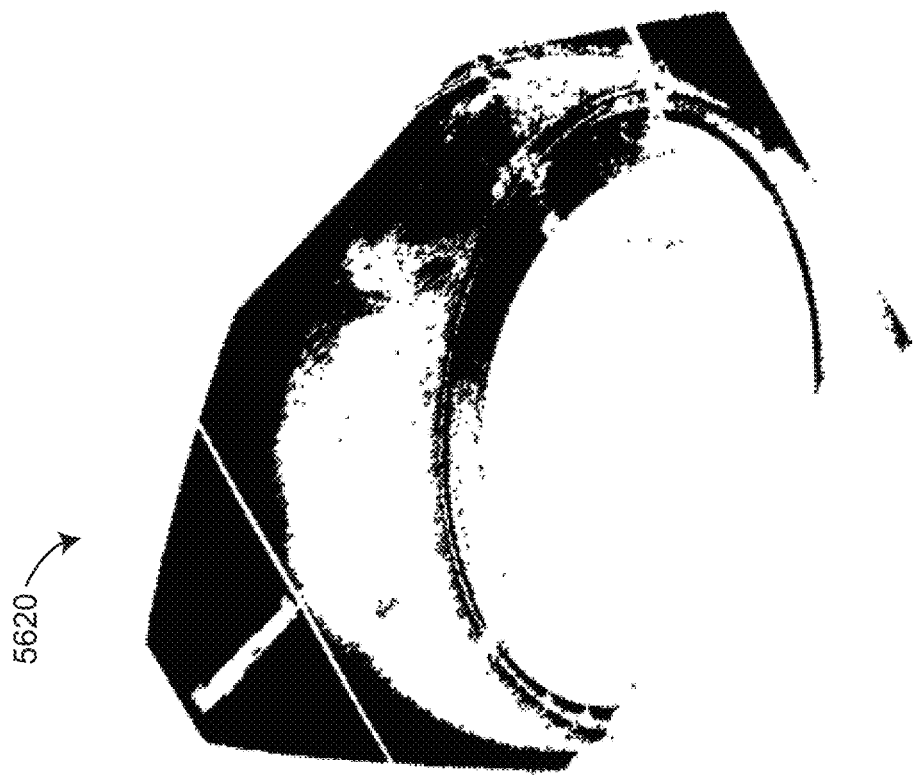
FIGS. 56A, 56B are projected images of 3D point clouds illustrating the effect of limiting the relative movement angle according to an embodiment.
Figure 56A:
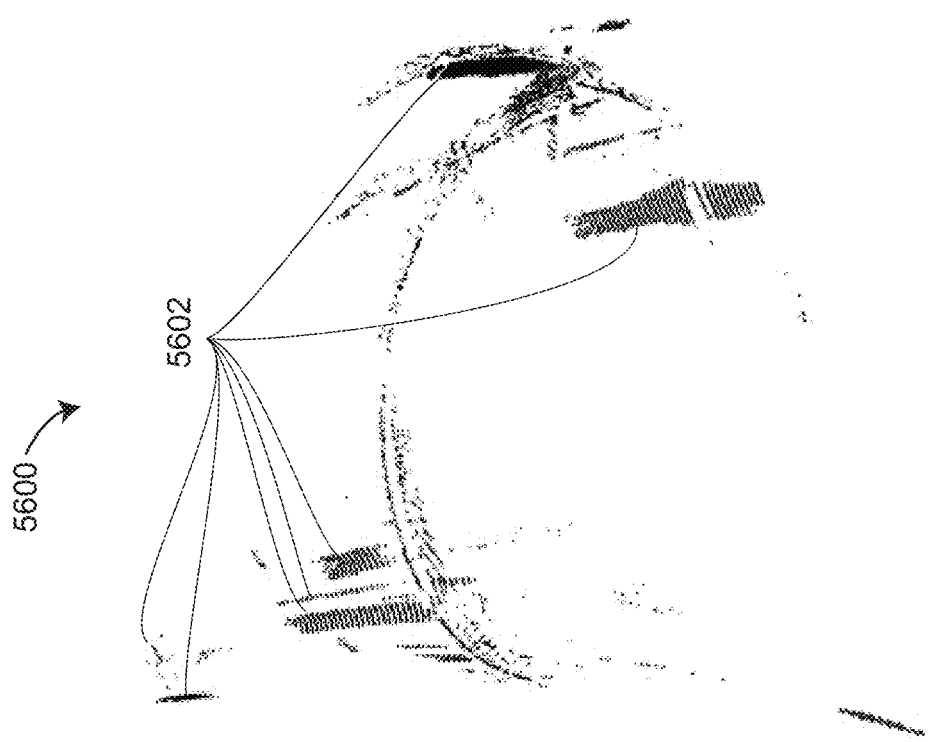

FIG. 56A, 56B show 3D point clouds as seen from an arbitrarily chosen viewing angle. FIG. 56A shows the point cloud 5600 for the case in which the relative movement angle is greater than 55 degrees. FIG. 56B shows the point cloud 5620 for the case in which the relative movement angle is less than 55 degrees. Included within the point cloud 5600 are multipath outlier features and points 5602. The features and points 5602 do not have corresponding real features and points on the scanned object. In contrast, the viewed point cloud 5620 does not seem to include outlier features and points. In general, multipath outliers are more likely to be seen when the relatively movement angles exceed a selected relative movement angle acceptance value. Hence, a way to reduce the number of outliers is to filter out those points having a relative movement angle greater that a prescribed acceptance value.

A way to understand the effectiveness of the relative movement angle as a filter for eliminating spurious 3D points is illustrated in FIGS. 57A, 57B. FIG. 57A shows an LLP 5700A having a projector 5710A, 5760A as positioned at a first time and a second time, respectively. The LLP 5700A further includes a camera 5720A, 5770A as positioned at the first time and the second time, respectively. A y axis is constructed from the projector 5710A to the camera 5720A. A z axis is constructed along a light ray emitted from the projector 5710A. For clarity, the lines in the drawing of FIGS. 57A, 57B lie in the y-z plane. In an embodiment, at the first time, the projector 5710A emits a sheet of light in the x-z plane, where x is perpendicular to y and z. The ray of light 5730A is emitted by the projector 5710A at the first time. The ray of light 5730A intersects a first surface 5742A of an object 5740A at a point 5750A. The camera 5720A images the first spot of light 5750A on a photosensitive array of the camera 5720A. A processor coupled to the LLP 5700A determines 3D coordinates of the object surface point 5750A using the principles of triangulation, as described herein above in reference to FIG. 26. A portion of the spot of light 5750A scatters off the surface 5742A of the object 5740A, arriving as a spot of light 5752A on a surface 5744A. In a typical situation, the light 5732A scattered off the object surface 5742A mainly travels along a direction in which the angle of reflection from the surface 5742A is equal to the angle of incidence of the ray of light 5730A to the surface 5742A. The spot of light 5752A is imaged by the camera 5720A, with a spot on the photosensitive array of the camera 5720A being a point drawn from the spot 5752A along a ray of light 5734A that passes through a perspective center 5721A of the camera 5720A.

The processor determines 3D coordinates of the observed spot 5752A by intersecting the ray of light 5730A from the projector with the ray of light 5734A into the camera. As can be seen in FIG. 57A, the two rays of light 5730A, 5734A intersect at the point 5745A. Likewise, the processor determines 3D coordinates of the spot of light scattered along a ray 5784A by intersecting the ray 5780A from the projector 5760A with the ray 5784A into the camera 5770A. This intersection occurs at the point 5785A.

In the example of FIG. 57A, between the first time and the second time, the LLP undergoes a displacement 5790A along the y axis. If the LLP does not rotate during this time, the displacement 5790A is also the displacement of the probe tip of an AACMM to which the LLP 5700A is attached. The displacement of the calculated 3D coordinates 5745A to 5785A is 5792A. As shown in the inset 5795A, the angle between the movement of the probe tip 5790A and the apparent 3D movement that produces the spurious points 5745A, 5785A is 84 degrees. If this angle exceeds the selected relative movement angle acceptance value, such as 55 degrees as selected in FIGS. 56A, 56B, the points 5745B and 5785B may be regarded as unreliable and eliminated.

FIG. 57A illustrated the case in which the projected points 5745A, 5785A are farther from the LLP 5700A than are points on the object 5740A. FIG. 57B, in contrast, illustrates the case in which projected (spurious) points are nearer to the LLP than are points on the object. FIG. 57B shows an LLP 5700B having a projector 5710B, 5760B as positioned at a first time and a second time, respectively. The LLP 5700B further includes a camera 5720B, 5770B as positioned at the first time and the second time, respectively. A y axis is constructed from the projector 5710B to the camera 5720B. A z axis is constructed along a light ray emitted from the projector 5710B. For clarity, the lines in the drawing of FIGS. 57A, 57B lie in the y-z plane. In an embodiment, at the first time, the projector 5710B emits a sheet of light in the x-z plane, where x is perpendicular to y and z. A ray of light 5730B is emitted by the projector 5710B at the first time. It intersects a first surface 5742B of an object 5740B at a point 5750B. The camera 5720B images the first spot of light 5750B on a photosensitive array of the camera 5720B. A processor coupled to the LLP 5700B determines 3D coordinates of the object surface point 5750B using the principles of triangulation, as described herein above in reference to FIG. 26. A portion of the spot of light 5750B scatters off the surface 5742B of the object 5740B, arriving as a spot of light 5752B on a surface 5744B. In a typical situation, the light 5732B scattered off the object surface 5742B mainly travels along a direction in which the angle of reflection from the surface 5742B is equal to the angle of incidence of the ray of light 5730B to the surface 5742B. The spot of light 5752B is imaged by the camera 5720B, with a spot on the photosensitive array of the camera 5720B being a point drawn from the spot 5752B along a ray of light 5734B that passes through a perspective center 5721B of the camera 5720B.

The processor determines 3D coordinates of the observed spot 5752B by intersecting the ray of light 5730B from the projector with the ray of light 5734B into the camera. As can be seen in FIG. 57B, the two rays of light 5730B, 5734B intersect at the point 5745B. Likewise, the processor determines 3D coordinates of the spot of light scattered along a ray 5784B by intersecting the ray 5780B from the projector 5760B with the ray 5784B into the camera 5770B. This intersection occurs at the point 5785B.

In the example of FIG. 57B, between the first time and the second time, the LLP undergoes a displacement 5790B along the y axis. If the LLP does not rotate during this time, the displacement 5790B is also the displacement of the probe tip of an AACMM to which the LLP 5700B is attached. The displacement of the calculated 3D coordinates 5745B to 5785B is 5792B. As shown in the inset 5795A, the angle between the movement of the probe tip 5790B and the apparent 3D movement 5792B that produces the spurious points 5745B, 5785B is 72 degrees. If this angle exceeds the selected relative movement angle acceptance value, such as 55 degrees as selected in FIGS. 56A, 56B, the points 5745A and 5785A may be regarded as unreliable and eliminated.

In the discussion of FIG. 32 herein above, some methods were described for reducing or eliminating multipath reflections associated with multiple COG values for a given column. A method is now described for further enhancing the ability to distinguish between direct reflections and spurious reflections, such as for the case in which there are multiple COG values in a given column $C_1$.

Here, as in the rest of this document, the term "column" refers to an angular projection of a ray from a projected fan of laser light emitted by an LLP projector. Hence, in FIG. 32, the column $C_1$ is indicative of an angle of projection of a point of light onto an object from the LLP, while the multiple rows crossed by the line labeled $C_1$ in FIG. 32 are indicative of possible distances to that projected point of light on the object. This is the broad meaning of the term "column" as used in this document. The term column does not refer specifically to a column of a particular model of a photosensitive array as defined by a manufacturer as that photosensitive array could be rotated by ninety degrees within an LLP, in which case the meaning for the terms column and row would be reversed from that given by the manufacturer. Furthermore, in the example of FIG. 32, the angles of projection onto the object and the distance to the object correspond to orthogonal columns and rows, respectively.

However, in a non-ideal system, a further compensation may be desired to correctly map pixels on a photosensitive array to angles and distances of projection onto an object surface.

In the discussion herein above for FIGS. 31A, 31B, 31C, a distinction was made between a simple thresholding approach of FIG. 31A for finding edges of a filter mask and the somewhat more complex method of FIGS. 31B, 31C in which a convolutional kernel was used for finding edges of a filter mask. The type of filter illustrated in FIGS. 31B, 31C is an example of an "edge filter." As explained herein above, it may be advantageous in some cases to use an edge filter in determining the COG values for the exemplary columns of FIG. 32.

Figure 58A:
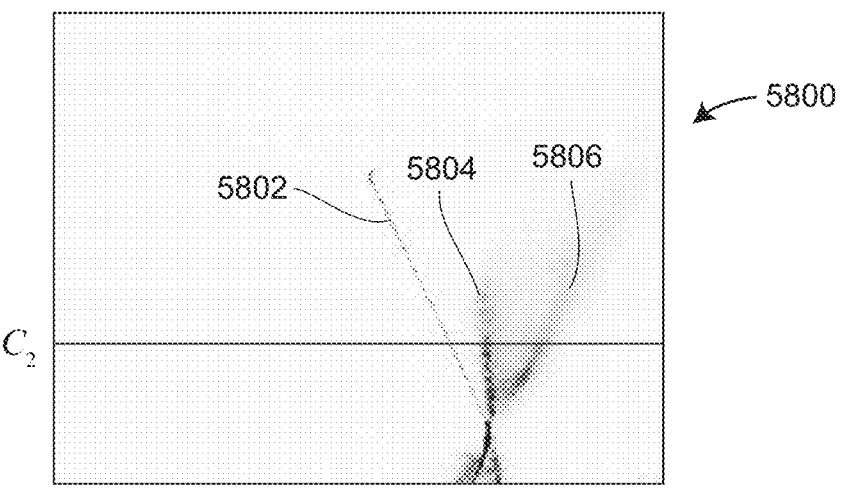
FIGS. 58A, 58B, 58C are LLP scan data that is unprocessed, processed using an edge filter and processed using a threshold filter, respectively, according to an embodiment.
Figure 58B:
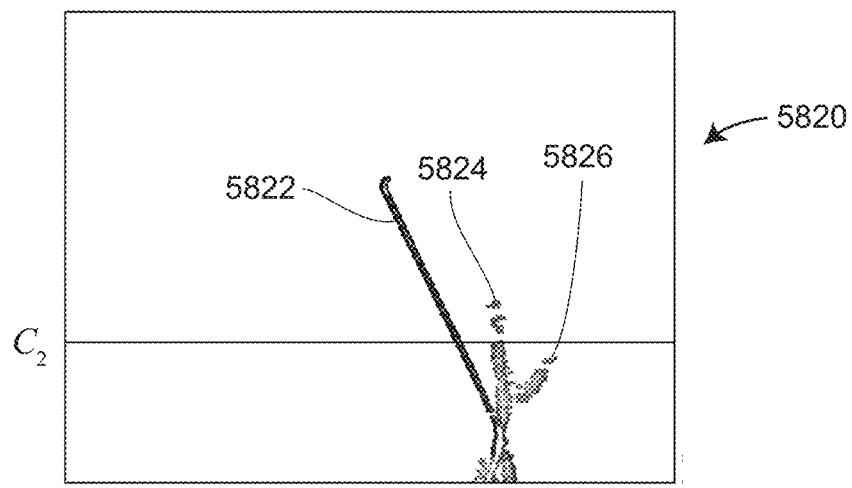

FIG. 58A is a portion of an image obtained from an exemplary camera 1120 within the LLP 1100. The displayed images 5800, 5820, 5840 of FIGS. 58A, 58B, 58C, respectively, are based on the same raw data extracted from the exemplary camera 1120 but with the final result processed in different ways. The displayed image 5800 in FIG. 58A is based on unprocessed (raw) data. The displayed image 5820 in FIG. 58B is based on edge filtering described herein above in reference to FIGS. 31B, 31C. The displayed image 5840 in FIG. 58C is based on a simple thresholding approach as described herein above in reference to FIG. 31A.

In each of the images 5800, 5820, 5840, a column line is drawn through rows of a single column $C_2$. In the FIGS. 58A, 58B, 58C, branches 5802, 5822, 5842, respectively, correspond to actual 3D coordinates on the object surface. The branches 5804, 5824, 5844 represent spurious multipath reflections arising from scattering off a secondary reflective surface. The branches 5806, 5826, 5846 represent spurious multipath reflections arising from scattering off a different secondary reflective surface. Comparison of the three displayed images 5800, 5820, 5840 reveals that the simple thresholding approach of FIG. 58C shows the widening caused by multipath scattering than does the raw data approach of FIG. 58A or the convolutional filter approach of FIG. 58B. For example, in FIG. 58C, the multipath scattering branches 5844 and 5846 are relatively broad compared to the direct scattering branch 5842. In contrast, in FIG. 58B, the multipath scattering branches 5824 and 5826 are relatively nearer in width to the direct scattering branch 5822 than is the case in FIG. 58C. This demonstrates that the simple thresholding approach provides advantages over the convolutional edge filter approach in identifying instances of multipath scattering.

Figure 58C:
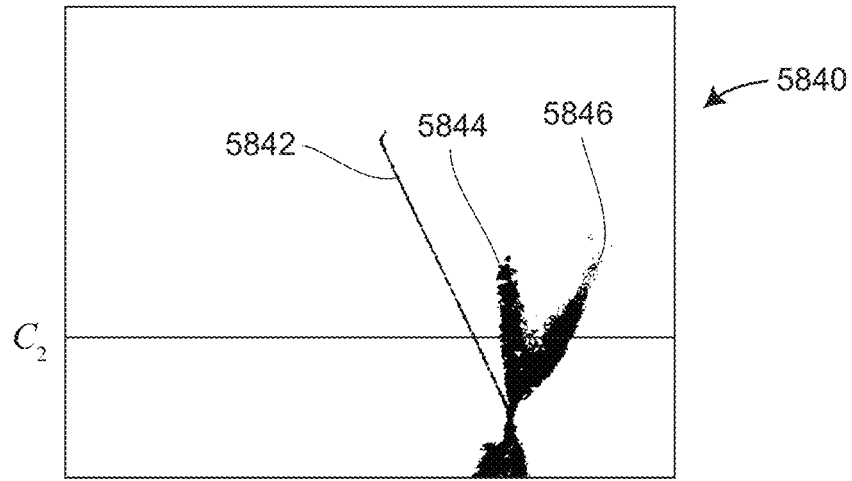

The width of the branches in FIG. 58B differ from the widths of the corresponding branches in FIG. 58C. The width of these branches for a given column $C_2$ is determined based on the width of filter masks such as the filter masks 3110, 3130 in FIGS. 31A, 31B, respectively, used in each of the FIGS. 58B, 58C. In other words, the calculated width of an imaged branch of projected light is established by the width of the filter mask for a selected type of filter. As illustrated in FIG. 58C, the method of simple thresholding (as in FIG. 31A) is generally relatively more effective than the method of edge filtering (as in FIG. 31B) in identifying and reducing/eliminating outliers caused by multipath reflection.

As demonstrated by the above discussion, the four methods described above for identifying and reducing/eliminating spurious multipath reflections can be used separately or in combination. One such embodiment, for example, uses the four methods sequentially, keeping those COGs that satisfy the desired characteristics of the four methods. In an exemplary first step, the columns having multiple COG values are identified and the width of each COG determined using the simple thresholding approach. An alternative first step would be to compare the width of the different COGs and to eliminate those COGs that are too wide relative to the at least one of the other COGs.

In an exemplary second step, an AOI value is determined for each measured COG. Those COGs having an AOI value exceeding a prescribed AOI acceptance value are removed or eliminated. In an exemplary third step, a camera angle value is determined for each measured COG. Those COGs having a determined camera angle value exceeding a prescribed camera angle acceptance value are eliminated. In an exemplary fourth step, a relative movement angle is determined for each measured COG. Those COGs having a relative movement angle exceeding a relative movement angle acceptance value are eliminated. In an exemplary fifth step, if after carrying out the first four steps there still remain a plurality of COGs on a given column, the COGs on that column are eliminated. In other embodiments, the order of five exemplary steps are changed, arranged in a different order, or some of the five exemplary steps are eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description but is only limited by the scope of the appended claims.

The invention claimed is:

1. A method performed by a device having a projector, a camera with a photosensitive array, and at least one processor, the method comprising:
   projecting with the projector a first line of light onto an object;
   capturing with the camera a first image of the first line of light on the object within a first window subregion of the photosensitive array, the first image producing at least two collections of pixel readout values from the photosensitive array, the at least two collections including a first collection of pixel readout values having a first exposure time and a second collection of pixel readout values having a second exposure time greater than the first exposure time, the first collection of pixel readout values being assigned to odd rows within the first window, the second collection of pixel readout values being assigned to even rows of the first window, wherein a first size of the first window subregion is based at least in part on a first number of rows and a first number of columns within the photosensitive array;
   determining with the at least one processor a plurality of three-dimensional (3D) coordinates of points on the object based on the first line of light, the first image of the first line of light, the first exposure time, and the second exposure time;
   determining with the at least one processor a second window subregion within the first window subregion based at least in part on the first image of the first line of light on the object, a second size of the second window subregion based on at least one of:

a second number of rows of the photosensitive array, that are different from the first number of rows of the photosensitive array, and a second number of columns of the photosensitive array, that are different from the first number of columns of the photosensitive array; and projecting with the projector a second line of light on the object;

capturing with the camera a second image of the second line of light on the object within the second window subregion;

determining with the at least one processor a plurality 3D coordinates of second points on the object based at least in part on the second line of light and the second image of the second line of light;

storing the plurality of 3D coordinates determined for the first image, and the plurality of 3D coordinates of second points on the object based on the second size of the second window subregion.

2. The method of claim 1, further comprising:
determining for each of the first number of columns of the first image a first representation of the object;
determining for each of the second number of columns of the second image a second representation of the object;
determining a summary representation for each column of the first window subregion based at least in part on the first representation and the second representation; and
determining the plurality of 3D coordinates of points on the object based at least in part on the summary representation.

3. The method of claim 1, the method further comprising:
dividing the second exposure time by the first exposure time to obtain an exposure ratio;
multiplying the pixel readout values in the first collection of pixel readout values by the exposure ratio to obtain an adjusted first collection; and
determining the plurality of 3D coordinates of first points on the object from the first image further based on the adjusted first collection of pixel readout values.

4. The method of claim 3, the method further comprising:
adjusting values of the pixel readout values in the second collection of pixel readout values to obtain an adjusted second collection; and
determining the plurality 3D coordinates of points on the object from the first image, and further based on the adjusted second collection.

5. The method of claim 4, the method further comprising further adjusting a pixel readout value in the second collection of pixel readout values based on a pixel readout value in the adjusted first collection.

6. The method of claim 5, further comprising: when centroid values for at least two of the second number of columns of the first image are unable to be determined, setting the second window subregion to be larger than the first window subregion.

7. The method of claim 1, further comprising:
setting the camera to a high conversion gain (HCG) mode;
capturing with the camera in the HCG mode the first image of the first line of light on the object;
setting the camera to a low conversion gain (LCG) mode;
capturing with the camera in the LCG mode a second image of the first line of light on the object; and
determining the plurality of 3D coordinates of points on the object based at least in part on the projected line of light, the first image of the first line of light, and the second image of the first line of light.

8. The method of claim 7, further comprising:
capturing with the camera the first image within the first window subregion of the photosensitive array;
capturing with the camera the second image within the second window subregion of the photosensitive array; and
determining the plurality of 3D coordinates of points on the object based at least in part on the first image of the first line of light, and the second image of the second line of light.

9. The method of claim 1, further comprising:
identifying a plurality of first points in the first image, the plurality of first points potentially corresponding to the 3D coordinates of the object;
obtaining a plurality of second points from among the plurality of first points by eliminating any of the plurality of first points arising from one or more conditions comprising: (1) an angle of incidence (AOI) exceeding an AOI acceptance angle, (2) a camera angle exceeding a camera acceptance value, (3) a relative movement angle exceeding a relative movement angle acceptance value, and (4) a branch that includes one of the plurality of first points exceeding a branch width acceptance value;
determining the 3D coordinates of the plurality of second points; and
storing the 3D coordinates of the plurality of second points as the plurality of 3D coordinates of points from the first line of light.

10. The method of claim 9, further comprising calculating the AOI and the camera angle based at least in part on a determined normal vector, the determined normal vector based at least in part on additional captures of the first image obtained at different times.

11. The method of claim 10, further comprising:
determining a first vector representing a 3D displacement of a plurality of first 3D coordinates from one of the plurality of first points in the first image and from a corresponding plurality of second 3D coordinates obtained at a second time from a corresponding second image point in the second image, wherein the one of the plurality of first points is obtained from the projected first line of light and the corresponding second image point is obtained from the projected second line of light;
determining a second vector representing 3D displacement of a point fixed on the device; and
determining the relative movement angle based at least in part on the first vector and the second vector.

12. A method performed by a device having a projector, a camera with a photosensitive array, and a processor, the method comprising:
projecting with the projector a first line of light onto an object;
capturing with the camera a first image of the first line of light on the object within a first window subregion of the photosensitive array, the first image producing at least two collections of pixel readout values from the photosensitive array, the at least two collections including a first collection of pixel readout values having a first exposure time and a second collection of pixel readout values having a second exposure time greater than the first exposure time, the first collection of pixel readout values being assigned to even rows within the first window, the second collection of pixel readout values being assigned to odd rows within the first window, wherein a first size of the first window subregion is based at least in part on a first number of rows and a first number of columns within the photosensitive array;

determining with the at least one processor a plurality of three-dimensional (3D) coordinates of points on the object based on the first line of light, the first image of the line of light, the first exposure time, and the second exposure time;

determining with the at least one processor a second window subregion within the first window subregion based at least in part on the captured image of the first line of light on the object, a second size of the second window subregion based on at least one of:
  a second number of rows of the photosensitive array, that are different from the first number of rows of the photosensitive array, and
  a second number of columns of the photosensitive array, that are different from the first number of columns of the photosensitive array; and projecting with the projector a second line of light on the object;

capturing with the camera a second image of the second line of light on the object within the second window subregion;

determining with the at least one processor a plurality of 3D coordinates of second points on the object based at least in part on the second line of light and the second image of the second line of light;

storing the plurality of 3D coordinates of the points determined for the first image, and the plurality of 3D coordinates of second points on the object based on the second size of the second window subregion.

13. The method of claim 1, further comprising:
determining for each first number of columns of the first image a first representation of the object;
determining for each second number of columns of the second image a second representation of the object;
determining a summary representation for each column of the first window subregion based at least in part on the first representation and the second representation; and
determining 3D coordinates of points on the object based at least in part on the summary representation.

14. A method performed by a device having a projector, a camera with a photosensitive array, and at least one processor, the method comprising: projecting a first line of light onto an object;
capturing with the camera a first image of the first line of light on the object within a first window subregion, the first image producing two collections of pixel readout values, the two collections including a first collection of pixel readout values having a first exposure time and a second collection of pixel readout values having a second exposure time, the first collection of pixel readout values being assigned to odd rows, the second collection of pixel readout values being assigned to even rows, wherein a first size of the first window subregion is based at least in part on a first number of rows and a first number of columns of the photosensitive array;

determining three-dimensional (3D) coordinates of points on the object based at least in part on the projected first line of light, the captured first image of the first line of light, the first exposure time, and the second exposure time;

determining a second window subregion based at least in part on the captured image of the first line of light on the object, wherein a second size of the second window subregion is based at least in part on:
  a second number of rows of the photosensitive array, that are different from the first number of rows of the photosensitive array,
  a second number of columns of the photosensitive array, that are different from the first number of columns of the photosensitive array; and storing the determined 3D coordinates, and 3D coordinates of second points on the object based at least in part on the second size of the second window subregion.

15. The method of claim 14, further comprising:
dividing the second exposure time by the first exposure time to obtain an exposure ratio;
multiplying the pixel readout values in the first collection of pixel readout values by the exposure ratio to obtain an adjusted first collection; and
determining the 3D coordinates of points on the object further based on the adjusted first collection of pixel readout values.

16. The method of claim 15, further comprising:
adjusting values of the pixel readout values in the second collection of pixel readout values to obtain an adjusted second collection; and
determining the 3D coordinates of points on the object further based on the adjusted second collection.

17. The method of claim 16, further comprising:
adjusting a pixel readout value in the second collection of pixel readout values based at least in part on a pixel readout value in the adjusted first collection.

18. The method of claim 17, wherein the second exposure time is greater than the first exposure time.

19. The method of claim 17, further comprising: when centroid values for at least two of the number of columns of the first image are unable to be determined, setting the second window subregion to be larger than the first window subregion.

20. The method of claim 14, wherein the determined 3D coordinates of points on the object is based at least in part on the first line of light, the first image of the first line of light, the first exposure time, and the second exposure time.

* * * * *